United States Patent
Hinz et al.

(10) Patent No.: US 11,477,467 B2
(45) Date of Patent: *Oct. 18, 2022

(54) SCALABLE VIDEO CODING USING DERIVATION OF SUBBLOCK SUBDIVISION FOR PREDICTION FROM BASE LAYER

(71) Applicant: GE Video Compression, LLC, Albany, NY (US)

(72) Inventors: Tobias Hinz, Schorfheide (DE); Haricharan Lakshman, Berlin (DE); Jan Stegemann, Berlin (DE); Philipp Helle, Berlin (DE); Mischa Siekmann, Berlin (DE); Karsten Suehring, Berlin (DE); Detlev Marpe, Berlin (DE); Heiko Schwarz, Panketal (DE); Christian Bartnik, Berlin (DE); Ali Atef Ibrahim Khairat Abdelhamid, Berlin (DE); Heiner Kirchhoffer, Berlin (DE); Thomas Wiegand, Berlin (DE)

(73) Assignee: GE Video Compression, LLC, Albany, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/871,866

(22) Filed: May 11, 2020

(65) Prior Publication Data
US 2020/0404266 A1 Dec. 24, 2020

Related U.S. Application Data

(63) Continuation of application No. 16/142,195, filed on Sep. 26, 2018, now Pat. No. 10,694,183, which is a
(Continued)

(51) Int. Cl.
*H04N 19/85* (2014.01)
*H04N 19/30* (2014.01)
(Continued)

(52) U.S. Cl.
CPC .......... *H04N 19/33* (2014.11); *H04N 19/105* (2014.11); *H04N 19/107* (2014.11);
(Continued)

(58) Field of Classification Search
CPC .... H04N 19/119; H04N 19/18; H04N 19/593; H04N 19/503; H04N 19/198;
(Continued)

(56) References Cited

U.S. PATENT DOCUMENTS 5,583,657 A 12/1996 Jeong
5,606,642 A 2/1997 Stautner
(Continued)

FOREIGN PATENT DOCUMENTS

CA 2582665 C 4/2012
CN 1722838 A 1/2006
(Continued)

OTHER PUBLICATIONS

ITU-T, "Series H: Audiovisual and Multimedia Systems—Infrastructure of audiovisual services—Coding of moving video Advanced video coding for generic audiovisual services" (Jun. 2011) (Year: 2011).*
(Continued)

*Primary Examiner* — Philip P. Dang
(74) *Attorney, Agent, or Firm* — Morgan, Lewis & Bockius LLP

(57) ABSTRACT

Scalable video coding is rendered more efficient by deriving/selecting a subblock subdivision to be used for enhancement layer prediction, among a set of possible subblock subdivisions of an enhancement layer block by evaluating the spatial variation of the base layer coding parameters over the base layer signal. By this measure, less of the signalization overhead has to be spent on signaling this subblock subdivision within the enhancement layer data stream, if any. The
(Continued)

subblock subdivision thus selected may be used in predictively coding/decoding the enhancement layer signal.

13 Claims, 37 Drawing Sheets

Related U.S. Application Data continuation of application No. 14/666,634, filed on Mar. 24, 2015, now Pat. No. 10,212,419, which is a continuation of application No. PCT/EP2013/070490, filed on Oct. 1, 2013.

(60) Provisional application No. 61/708,201, filed on Oct. 1, 2012.

(51) Int. Cl.

| | | |
|---|---|---|
| *H04N 19/31* | (2014.01) | |
| *H04N 19/33* | (2014.01) | |
| *H04N 19/105* | (2014.01) | |
| *H04N 19/117* | (2014.01) | |
| *H04N 19/157* | (2014.01) | |
| *H04N 19/187* | (2014.01) | |
| *H04N 19/82* | (2014.01) | |
| *H04N 19/136* | (2014.01) | |
| *H04N 19/159* | (2014.01) | |
| *H04N 19/34* | (2014.01) | |
| *H04N 19/119* | (2014.01) | |
| *H04N 19/587* | (2014.01) | |
| *H04N 19/59* | (2014.01) | |
| *H04N 19/18* | (2014.01) | |
| *H04N 19/48* | (2014.01) | |
| *H04N 19/61* | (2014.01) | |
| *H04N 19/70* | (2014.01) | |
| *H04N 19/86* | (2014.01) | |
| *H04N 19/107* | (2014.01) | |
| *H04N 19/137* | (2014.01) | |
| *H04N 19/176* | (2014.01) | |
| *H04N 19/196* | (2014.01) | |
| *H04N 19/503* | (2014.01) | |
| *H04N 19/593* | (2014.01) | |
| *H04N 19/615* | (2014.01) | |
| *H04N 19/11* | (2014.01) | |
| *H04N 19/463* | (2014.01) | |

(52) U.S. Cl.
CPC ......... *H04N 19/117* (2014.11); *H04N 19/119* (2014.11); *H04N 19/136* (2014.11); *H04N 19/137* (2014.11); *H04N 19/157* (2014.11); *H04N 19/159* (2014.11); *H04N 19/176* (2014.11); *H04N 19/18* (2014.11); *H04N 19/187* (2014.11); *H04N 19/198* (2014.11); *H04N 19/34* (2014.11); *H04N 19/48* (2014.11); *H04N 19/503* (2014.11); *H04N 19/587* (2014.11); *H04N 19/59* (2014.11); *H04N 19/593* (2014.11); *H04N 19/61* (2014.11); *H04N 19/615* (2014.11); *H04N 19/70* (2014.11); *H04N 19/82* (2014.11); *H04N 19/865* (2014.11); *H04N 19/11* (2014.11); *H04N 19/463* (2014.11)

(58) Field of Classification Search
CPC .. H04N 19/176; H04N 19/137; H04N 19/107; H04N 19/865; H04N 19/70; H04N 19/61; H04N 19/615; H04N 19/48; H04N 19/59; H04N 19/587; H04N 19/33; H04N 19/82; H04N 19/187; H04N 19/157; H04N 19/117; H04N 19/105; H04N 19/463; H04N 19/11
See application file for complete search history.

(56) References Cited

U.S. PATENT DOCUMENTS

| | | |
|---|---|---|
| 5,619,256 A | 4/1997 | Haskell |
| 5,764,805 A | 6/1998 | Martucci |
| 5,819,214 A | 10/1998 | Suzuki |
| 5,933,538 A | 8/1999 | Fukuda et al. |
| 5,943,054 A | 8/1999 | Hirano et al. |
| 5,988,863 A | 11/1999 | Demos |
| 6,266,414 B1 | 7/2001 | Bradley |
| 6,266,450 B1 | 7/2001 | Yip |
| 6,304,606 B1 | 10/2001 | Murashita et al. |
| 6,337,881 B1 | 1/2002 | Chaddha |
| 6,360,200 B1 | 3/2002 | Edler |
| 6,385,343 B1 | 5/2002 | Kuroda |
| 6,392,705 B1 | 5/2002 | Chaddha |
| 6,476,805 B1 | 11/2002 | Shum |
| 6,545,687 B2 | 4/2003 | Scott |
| 6,587,590 B1 | 7/2003 | Pan |
| 6,728,317 B1 | 4/2004 | Demos |
| 6,900,748 B2 | 5/2005 | Marpe |
| 7,082,164 B2 | 7/2006 | Chaddha |
| 7,227,894 B2 | 6/2007 | Lin |
| 7,262,721 B2 | 8/2007 | Jeon |
| 7,348,903 B2 | 3/2008 | Lee |
| RE40,281 E | 4/2008 | Tzannes |
| 7,418,144 B2 | 8/2008 | Wang |
| 7,545,293 B2 | 6/2009 | Reznik |
| 7,562,021 B2 | 7/2009 | Mehrotra |
| 7,573,407 B2 | 8/2009 | Reznik |
| 7,630,882 B2 | 12/2009 | Mehrotra |
| 7,733,963 B2 | 6/2010 | Park |
| 7,792,385 B2* | 9/2010 | Kwan ............... H04N 19/61 |
| | | 382/268 |
| 7,847,861 B2 | 12/2010 | Zhai |
| 7,876,833 B2* | 1/2011 | Segall .............. H04B 1/66 |
| | | 382/233 |
| 7,885,471 B2* | 2/2011 | Segall ............. H04N 19/122 |
| | | 382/233 |
| 7,899,115 B2 | 3/2011 | Jeon et al. |
| 7,903,735 B2 | 3/2011 | Cha |
| 7,949,195 B2 | 5/2011 | Tian et al. |
| 7,965,773 B1* | 6/2011 | Schlanger ........... H04N 19/43 |
| | | 382/243 |
| 8,005,137 B2 | 8/2011 | Han |
| RE42,949 E | 11/2011 | Tzannes |
| 8,050,321 B2 | 11/2011 | Hannuksela |
| 8,050,329 B2 | 11/2011 | Li |
| 8,107,535 B2 | 1/2012 | Woods et al. |
| 8,117,313 B2 | 2/2012 | Yin |
| 8,135,065 B2 | 3/2012 | Henocq |
| 8,149,914 B2 | 4/2012 | Shimauchi |
| 8,155,454 B2* | 4/2012 | Raveendran ......... H04N 19/172 |
| | | 382/233 |
| 8,160,158 B2 | 4/2012 | Choi et al. |
| 8,204,129 B2* | 6/2012 | He ................. H04N 19/187 |
| | | 375/240.24 |
| 8,223,842 B2* | 7/2012 | Fuchigami ........... H04N 19/51 |
| | | 375/240.12 |
| 8,253,752 B2* | 8/2012 | Raveendran ......... H04N 19/80 |
| | | 345/581 |
| 8,265,144 B2* | 9/2012 | Christoffersen ...... H04N 19/91 |
| | | 375/240.1 |
| 8,345,762 B2 | 1/2013 | Vieron |
| 8,369,406 B2 | 2/2013 | Kim |
| 8,619,860 B2 | 12/2013 | Chen et al. |
| 10,477,210 B2 | 11/2019 | Hinz |
| 11,134,255 B2 | 9/2021 | Hinz |
| 2003/0118113 A1 | 6/2003 | Comer et al. |
| 2003/0138150 A1* | 7/2003 | Srinivasan .......... H04N 19/154 |
| | | 375/E7.199 |
| 2005/0013498 A1 | 1/2005 | Srinivasan et al. |

(56) References Cited

U.S. PATENT DOCUMENTS

| | | |
|---|---|---|
| 2005/0157797 A1* | 7/2005 | Gaedke .............. H04N 19/593 |
| | | 375/E7.176 |
| 2005/0190979 A1 | 9/2005 | Li |
| 2005/0226335 A1 | 10/2005 | Lee |
| 2006/0008003 A1 | 1/2006 | Ji et al. |
| 2006/0008038 A1 | 1/2006 | Song et al. |
| 2006/0013309 A1 | 1/2006 | Ha |
| 2006/0088102 A1 | 4/2006 | Lee |
| 2006/0104354 A1 | 5/2006 | Han |
| 2006/0114993 A1 | 6/2006 | Xiong et al. |
| 2006/0120450 A1 | 6/2006 | Han |
| 2006/0133503 A1 | 6/2006 | Park |
| 2006/0153295 A1 | 7/2006 | Wang et al. |
| 2006/0165181 A1* | 7/2006 | Kwan ................ H04N 19/176 |
| | | 375/E7.176 |
| 2006/0262216 A1 | 11/2006 | Zhai et al. |
| 2007/0014348 A1 | 1/2007 | Bao |
| 2007/0019726 A1* | 1/2007 | Cha ................... H04N 19/136 |
| | | 375/E7.176 |
| 2007/0025444 A1 | 2/2007 | Okada |
| 2007/0047644 A1 | 3/2007 | Lee |
| 2007/0053426 A1 | 3/2007 | Lee |
| 2007/0126853 A1 | 6/2007 | Ridge et al. |
| 2007/0160133 A1 | 7/2007 | Bao |
| 2007/0160137 A1 | 7/2007 | Guo |
| 2007/0195878 A1 | 8/2007 | Bruls et al. |
| 2007/0201550 A1 | 8/2007 | Wang |
| 2007/0223582 A1* | 9/2007 | Borer ................. H04N 19/521 |
| | | 375/E7.137 |
| 2007/0230567 A1* | 10/2007 | Wang ................. H04N 19/29 |
| | | 375/E7.199 |
| 2007/0286508 A1 | 12/2007 | Le Leannec |
| 2008/0002767 A1 | 1/2008 | Schwarz |
| 2008/0008247 A1 | 1/2008 | Segall |
| 2008/0056356 A1 | 3/2008 | Wang |
| 2008/0069247 A1* | 3/2008 | He ..................... H04N 19/176 |
| | | 375/240.29 |
| 2008/0089417 A1* | 4/2008 | Bao ................... H04N 19/523 |
| | | 375/E7.176 |
| 2008/0095228 A1 | 4/2008 | Hannuksela |
| 2008/0095238 A1 | 4/2008 | Wu |
| 2008/0095241 A1 | 4/2008 | Amon |
| 2008/0127258 A1 | 5/2008 | Walker |
| 2008/0137752 A1* | 6/2008 | He ..................... H04N 19/159 |
| | | 375/E7.076 |
| 2008/0137753 A1* | 6/2008 | He ..................... H04N 19/70 |
| | | 375/E7.193 |
| 2008/0152005 A1 | 6/2008 | Oguz |
| 2008/0159404 A1* | 7/2008 | Hong ................. H04N 19/30 |
| | | 375/E7.092 |
| 2008/0165848 A1* | 7/2008 | Ye ..................... H04N 19/159 |
| | | 375/E7.17 |
| 2008/0165855 A1 | 7/2008 | Wang |
| 2008/0165858 A1 | 7/2008 | Karczewicz |
| 2008/0170611 A1* | 7/2008 | Ramaswamy ....... H04N 19/42 |
| | | 375/E7.026 |
| 2008/0170618 A1 | 7/2008 | Choi |
| 2008/0205508 A1* | 8/2008 | Ziauddin ............. H04N 19/577 |
| | | 375/E7.262 |
| 2008/0211901 A1* | 9/2008 | Civanlar ............. H04N 19/61 |
| | | 348/14.09 |
| 2008/0225952 A1 | 9/2008 | Wang |
| 2008/0267291 A1 | 10/2008 | Vieran |
| 2008/0304569 A1 | 12/2008 | Lee |
| 2009/0015662 A1 | 1/2009 | Kim |
| 2009/0028245 A1 | 1/2009 | Vieron et al. |
| 2009/0074061 A1* | 3/2009 | Yin ................... H04N 19/31 |
| | | 375/E7.126 |
| 2009/0080535 A1 | 3/2009 | Yin |
| 2009/0096643 A1 | 4/2009 | Chang |
| 2009/0103616 A1 | 4/2009 | Ho |
| 2009/0175338 A1 | 7/2009 | Segall |
| 2009/0175349 A1* | 7/2009 | Ye ..................... H04N 19/70 |
| | | 375/240.23 |
| 2009/0175550 A1 | 7/2009 | Taleb |
| 2009/0207919 A1 | 8/2009 | Yin |
| 2009/0238278 A1 | 9/2009 | Mauchly |
| 2009/0257492 A1 | 10/2009 | Andersson et al. |
| 2009/0285299 A1 | 11/2009 | Chen |
| 2009/0290643 A1 | 11/2009 | Yang |
| 2010/0002069 A1 | 1/2010 | Eleftheriadis |
| 2010/0020867 A1 | 1/2010 | Wiegand et al. |
| 2010/0034260 A1 | 2/2010 | Shimizu et al. |
| 2010/0046622 A1 | 2/2010 | Doser et al. |
| 2010/0080284 A1* | 4/2010 | Lee ................... H04N 19/16 |
| | | 375/E7.076 |
| 2010/0080285 A1* | 4/2010 | Lee ................... H04N 19/593 |
| | | 375/E7.076 |
| 2010/0080296 A1* | 4/2010 | Lee ................... H04N 19/44 |
| | | 375/E7.076 |
| 2010/0086029 A1 | 4/2010 | Chen et al. |
| 2010/0111183 A1 | 5/2010 | Jeon et al. |
| 2010/0158129 A1 | 6/2010 | Lai et al. |
| 2010/0183080 A1 | 7/2010 | Jeon et al. |
| 2010/0215095 A1 | 8/2010 | Hayase |
| 2010/0220791 A1 | 9/2010 | Lin |
| 2010/0220795 A1* | 9/2010 | Yin ................... H04N 19/176 |
| | | 375/E7.193 |
| 2010/0260260 A1* | 10/2010 | Wiegand ............. H04N 19/59 |
| | | 375/E7.243 |
| 2010/0260265 A1 | 10/2010 | Jeon |
| 2010/0260268 A1* | 10/2010 | Cowan ............... H04N 19/635 |
| | | 348/E13.001 |
| 2010/0284466 A1 | 11/2010 | Pandit |
| 2010/0309292 A1 | 12/2010 | Ho et al. |
| 2010/0316122 A1 | 12/2010 | Chen |
| 2010/0316134 A1 | 12/2010 | Chen |
| 2010/0316139 A1* | 12/2010 | Le Leannec ........ H04N 19/154 |
| | | 375/E7.078 |
| 2010/0329334 A1 | 12/2010 | Kim |
| 2010/0329342 A1 | 12/2010 | Joshi |
| 2010/0329361 A1* | 12/2010 | Choi .................. H04N 19/176 |
| | | 375/E7.193 |
| 2011/0002392 A1 | 1/2011 | Park |
| 2011/0038418 A1 | 2/2011 | Pandit |
| 2011/0044550 A1 | 2/2011 | Tian |
| 2011/0090959 A1* | 4/2011 | Wiegand ............. H04N 19/117 |
| | | 375/240.12 |
| 2011/0110434 A1 | 5/2011 | Park et al. |
| 2011/0142138 A1 | 6/2011 | Tian |
| 2011/0190008 A1 | 8/2011 | Eronen |
| 2011/0286520 A1* | 11/2011 | Xu .................... H04N 19/70 |
| | | 375/E7.243 |
| 2011/0296009 A1 | 12/2011 | Baranov |
| 2011/0317930 A1 | 12/2011 | Kim |
| 2012/0023250 A1* | 1/2012 | Chen ................. H04N 21/234327 |
| | | 709/231 |
| 2012/0057631 A1 | 3/2012 | Le Leannec |
| 2012/0057777 A1 | 3/2012 | Uemori et al. |
| 2012/0063516 A1 | 3/2012 | Kwon |
| 2012/0075436 A1* | 3/2012 | Chen ................. H04N 13/161 |
| | | 348/51 |
| 2012/0081242 A1 | 4/2012 | He |
| 2012/0082222 A1* | 4/2012 | Wang ................. H04N 19/61 |
| | | 375/E7.243 |
| 2012/0082235 A1 | 4/2012 | Lou et al. |
| 2012/0082244 A1* | 4/2012 | Chen ................. H04N 19/82 |
| | | 375/E7.189 |
| 2012/0092452 A1* | 4/2012 | Tourapis ............. H04N 19/597 |
| | | 348/43 |
| 2012/0106624 A1* | 5/2012 | Huang ............... H04N 19/86 |
| | | 375/E7.126 |
| 2012/0114036 A1 | 5/2012 | Po |
| 2012/0121011 A1 | 5/2012 | Coban |
| 2012/0163448 A1 | 6/2012 | Zheng |
| 2012/0170646 A1 | 7/2012 | Baylon et al. |
| 2012/0170647 A1 | 7/2012 | He |
| 2012/0170857 A1 | 7/2012 | He |
| 2012/0177124 A1 | 7/2012 | Laroche |
| 2012/0183056 A1 | 7/2012 | He et al. |

(56) References Cited

U.S. PATENT DOCUMENTS

| | | | |
|---|---|---|---|
| 2012/0207227 A1* | 8/2012 | Tsai | H04N 19/174 |
| | | | 375/E7.194 |
| 2012/0230392 A1* | 9/2012 | Zheng | H04N 19/196 |
| | | | 375/E7.256 |
| 2012/0230414 A1 | 9/2012 | Taubman et al. | |
| 2012/0230420 A1 | 9/2012 | Sole Rojals | |
| 2012/0236115 A1* | 9/2012 | Zhang | H04N 19/117 |
| | | | 348/43 |
| 2012/0236939 A1* | 9/2012 | Filippini | H04N 19/70 |
| | | | 375/E7.031 |
| 2012/0250769 A1 | 10/2012 | Bross | |
| 2012/0269270 A1 | 10/2012 | Chen | |
| 2013/0229485 A1 | 9/2013 | Rusanovskyy | |
| 2013/0279577 A1 | 10/2013 | Schwarz et al. | |
| 2013/0293676 A1 | 11/2013 | Sugio et al. | |
| 2013/0322536 A1 | 12/2013 | Yang | |
| 2019/0116360 A1 | 4/2019 | Hinz et al. | |
| 2020/0036956 A1 | 1/2020 | Schwarz et al. | |

FOREIGN PATENT DOCUMENTS

| | | |
|---|---|---|
| CN | 1722839 A | 1/2006 |
| CN | 1751519 A | 3/2006 |
| CN | 101040533 A | 9/2007 |
| CN | 101622877 A | 12/2007 |
| CN | 101198064 A | 6/2008 |
| CN | 101213840 A | 7/2008 |
| CN | 101248669 A | 8/2008 |
| CN | 101366283 A | 2/2009 |
| CN | 101491107 A | 7/2009 |
| CN | 101507282 A | 8/2009 |
| CN | 101542926 A | 9/2009 |
| CN | 101606391 A | 12/2009 |
| CN | 101820541 A | 9/2010 |
| DE | 102004041664 A1 | 3/2006 |
| EP | 0230632 A2 | 8/1987 |
| EP | 0607484 A1 | 7/1994 |
| EP | 0843481 A1 | 5/1998 |
| EP | 1694074 A1 | 6/2006 |
| EP | 1694074 A1 | 8/2006 |
| EP | 1867171 A1 | 12/2007 |
| EP | 1972146 A1 | 9/2008 |
| EP | 2 348 733 A2 | 7/2011 |
| EP | 2400763 A2 | 12/2011 |
| EP | 2497271 A2 | 9/2012 |
| EP | 3059961 A1 | 8/2016 |
| JP | 5-308631 A | 11/1993 |
| JP | 6-209468 A | 7/1994 |
| JP | 7-162870 A | 6/1995 |
| JP | H08237661 A | 9/1996 |
| JP | 9-238350 A | 9/1997 |
| JP | 2005135249 A | 5/2005 |
| JP | 2007-028034 A | 2/2007 |
| JP | 2007028034 A | 2/2007 |
| JP | 2007067552 A | 3/2007 |
| JP | 2008099045 A | 4/2008 |
| JP | 2008-530927 A | 8/2008 |
| JP | 2008530927 A | 8/2008 |
| JP | 2009-510807 A | 3/2009 |
| JP | 2009-510962 A | 3/2009 |
| JP | 2009510962 A | 3/2009 |
| JP | 2009520383 A | 5/2009 |
| JP | 2009523395 A | 6/2009 |
| JP | 2009-532979 A | 9/2009 |
| JP | 2009536479 A | 10/2009 |
| JP | 2009-543508 A | 12/2009 |
| JP | 2010507941 A | 3/2010 |
| JP | 2010-517343 A | 5/2010 |
| JP | 2010-525724 A | 7/2010 |
| JP | 2010-537484 A | 12/2010 |
| JP | 2011-501565 A | 1/2011 |
| JP | 2011501565 A | 1/2011 |
| JP | 2011-509631 A | 3/2011 |
| JP | 2012-504910 A | 2/2012 |
| JP | 2012-149982 A | 8/2012 |
| JP | 2012-169762 | 9/2012 |
| JP | 2015-167267 A | 9/2015 |
| JP | 2015-531561 A | 11/2015 |
| JP | 6301932 A | 3/2018 |
| KR | 10-2006-0063532 A | 6/2006 |
| KR | 1020060063532 A | 6/2006 |
| KR | 10-2009-0046826 A | 5/2009 |
| KR | 10-2008-0094041 | 1/2011 |
| KR | 10-2010-0081348 | 4/2015 |
| KR | 10-1835360 B1 | 3/2018 |
| KR | 10-1962442 B1 | 3/2019 |
| KR | 10-2090106 B1 | 3/2020 |
| WO | 01/30085 A1 | 4/2001 |
| WO | 2006059848 A1 | 6/2006 |
| WO | 2006087319 A2 | 8/2006 |
| WO | 2006106039 A1 | 10/2006 |
| WO | 2007008018 A1 | 1/2007 |
| WO | 2007/081756 A2 | 7/2007 |
| WO | 2007114610 A1 | 10/2007 |
| WO | 2007114622 A2 | 10/2007 |
| WO | 2008/007913 A1 | 1/2008 |
| WO | 2008004940 A1 | 1/2008 |
| WO | 2008007792 A1 | 1/2008 |
| WO | 2008/051755 A2 | 5/2008 |
| WO | 2008/056969 A1 | 5/2008 |
| WO | 2009/005626 A2 | 1/2009 |
| WO | 2010/043773 A1 | 4/2010 |
| WO | 2011/054879 A2 | 5/2011 |
| WO | 2011081643 A2 | 7/2011 |
| WO | 2011/128056 A2 | 10/2011 |
| WO | 2011128303 A2 | 10/2011 |
| WO | 2011/146451 A1 | 11/2011 |
| WO | 2011142817 A | 11/2011 |
| WO | 2012/018197 A2 | 2/2012 |
| WO | 2012044487 A | 4/2012 |
| WO | 2012059577 A1 | 5/2012 |
| WO | 2012/075193 A1 | 6/2012 |
| WO | 2012/088325 A1 | 6/2012 |
| WO | 2012/167712 A1 | 12/2012 |
| WO | 2013/072484 A1 | 5/2013 |
| WO | 2013145021 A1 | 10/2013 |

OTHER PUBLICATIONS

Office Action dated May 31, 2020 in Korean Application 10-2020-7008700.

Office Action dated May 19, 2020 in Japanese Application 2018-122462.

Office Action dated Jul. 21, 2020 in European Application 18177341.7.

Office Action dated Aug. 13, 2020 in U.S. Appl. No. 16/861,540.

Boyce, J., "Description of Low Complexity Scalable Video Coding Technology Proposal by Vidyo and Samsung", JCT- VC of ITU-T SG16 WP3 and ISO/IEC JTC1/SC29/WG11, 11th meeting, JCTVC-K0045, Oct. 10-19, 2012, pp. 1-25.

Bross, B. et al., "High Efficiency Video Coding (HEVC) Text Specification Draft 8", JCT-VC of of ITU-T SG16 WP3 and ISO/IEC JTC1/SC29/WG11, JCTVC-J1003_d0, Jul. 11-20, 2012, pp. 1-102.

Chen, J., "Description of Scalable Video Coding Technology Proposal by Qualcomm (Configuration 2)", JCT-VC of ITU-T SG16 WP3 and ISO/IEC JTC1/SC29/WG11, 11th meeting, JCTVC-K0036, Oct. 10-19, 2012, pp. 1-22.

Choi, Hyomin, et al., "Scalable Video Coding Based on High Efficiency Video Coding (HEVC)", Communications, Computers and Signal Processing (PacRim), 2011 IEEE Pacific Rim Conference on, IEEE, Aug. 23, 2011, p. 346-351, 7 pages.

Hong, D. et al., "Scalability Support in HEVC", JCT-VC of ITU-T SG16 WP3 and ISO/IEC JTC1/SC29/WG11, 6th meeting, JCTVC-F290, Jul. 14-22, 2011, 20 pages.

Hong, Danny, et al., "Scalability Support in HEVC", 20012 IEEE Intern, Symposium on Circuits and Systems, IEEE, May 20, 2012, p. 890-893, 5 pages.

Hong, Danny, et al., "Scalability Support in HEVC", Joint Collaborative Team on Video coding (JVC-VC) of ITU-T SG16 WP3 and

(56) References Cited

OTHER PUBLICATIONS

ISO/IEC JTC1/SC29/WG11, JCTVC-F290, ITU-T, Jul. 13, 2011, p. 1-15, 15 pages.
Hsiang, S-T, et al., "Non-CE3: Modified method for coding transform coefficient level", Apr. 28, 2012, 8 pages.
Karczewicz, M. et al., "Modifications to intra blocks coefficient coding with VLC", Jul. 2, 2011, 4 pages.
Kim, C. et al., "Suggested Design of Initial Software Model for Scalable HEVC Extension Proposal by LG Electronics and MediaTek Inc.", JCT-VC of ITU-T SG16 WP3 and ISO/IEC JTC1/SC29/WG11, 11th meeting, JCTVC-K0370, Oct. 10-19, 2012, pp. 1-14.
Kim, Chul Keun et al., "Non-CE9: swapping of merge candidate", JCT-VC of ITU-T SG16 WP3 and ISO/IEC JTC1/SC29/WG11 JCTVC-G396, ITU-T, Nov. 30, 2011, p. 1-4, 5 pages.
Laroche, G. et al., "RD Optimized Coding for Motion Vector Predictor Selection", IEEE Transactions on Circuits and Systems for Video Technology, vol. 18, No. 9, Sep. 2008, pp. 1247-1257.
Nguyen, N. et al., "Multi-level significance maps for Large Transform Units", JCT-VC of ITU-T SG16 WP3 and ISO/IEC JTC1/SC29/WG11, 7th Meeting, Geneva, Nov. 21-30, 2011, (JCTVC-G644), 14 pages.
Office Action dated Jul. 26, 2016, issued in parallel European Patent Application No. 13776752.1, 8 pages.
Office Action dated Jun. 7, 2016, issued in parallel Japanese Patent Application No. 2015-534997, with English translation, 27 pages.
Office Action dated May 31, 2016, issued in parallel Japanese Patent Application No. 2015-534996, with English translation, 14 pages.
Office Action dated May 31, 2016, issued in parallel Japanese Patent Application No. 2015-534998, with English translation, 15 pages.
Office Action dated May 10, 2016, issued in parallel Japanese Patent Application No. 2015-534999, with English translation; 6 pages.
Office Action dated Aug. 22, 2016 in Korean Application No. 10-2015-7011347.
Office Action dated Aug. 31, 2016 in Korean Application No. 10-2015-7011364.
Office Action, dated May 17, 2016, issued in corresponding Japanese Patent Application No. 2015-535000, with English translation, 15 pages.
Office Action, dated Apr. 29, 2016, in parallel European Patent Application No. 13 773 691.4; 7 pages.
Official Communication issued in corresponding International Application PCT/EP2013/070486, dated Jun. 12, 2013.
Official Communication issued in International Patent Application No. PCT/EP2013/070490, dated Dec. 13, 2013.
Official Communication issued in International Patent Application No. PCT/EP2013/070491, dated Dec. 3, 2013.
Official Communication issued in International Patent Application No. PCT/EP2013/070492, dated Dec. 4, 2013.
Official Communication issued in International Patent Application PCT/EP2013/070484, dated Dec. 17, 2013.
Schwarz et al., "Overview of the Scalable Video Coding Extension of the H.264/AVC Standard," IEEE Transactions on Circuits and Systems for Video Technology, vol. 17, No. 9, Sep. 2007, pp. 1103-1120.
Schwarz, C. et al., "Description of Scalable Video Coding Technology Proposal by Fraunhofer HHI (Configuration A)", JCT-VC of ITU-T SG16 WP3 and ISO/IEC JTC1/SC29/WG11, 11th meeting, JCTVC-K0042, Oct. 10-19, 2012, pp. 1-37.
Schwarz, C. et al., "Description of Scalable Video Coding Technology Proposal by Fraunhofer HHI (Configuration B)", JCT-VC of ITU-T SG16 WP3 and ISO/IEC JTC1/SC29/WG11, 11th meeting, JCTVC-K0043, Oct. 10-19, 2012, pp. 1-36.
Segall, Andrew, C. et al., "Spatial Scalability within the H264/AVC Scalable Video Coding Extension", IEEE Transactions on Circuits and Systems for Video Technology; IEEE, Sep. 24, 2007, vol. 17, Issue 9, p. 1121-1135, 15 pages.
Srinivasan, R., et al., AHG15: Slice-Level Control of In-Loop Filter, JCT-VC of ITU-T and ISO/IEC, JCTVC-H0391 Ver. 2, Jan. 21, 2012, pp. 1-6.
Srinivasan, Ranga Ramanujam et al., "AHG15: Slice-Level Control of In-Loop Filter", Joint Collaborative Team on Video Coding (JCT-VC) of ITU-T SG16 WP3 and ISO/IEC JTC1/SC29/WG11 JCTVC-H0391, ITU-T, Feb. 10, 2012, p. 1-6; 7 pages.
Winken, Martin, et al., "Description of video coding technology proposal by Fraunhofer HHI", JCT-VC of ITU-T SG16WP3 and ISO/IEC JTC1/SC29/WG11 JCTVC-A116, ITU-T, Apr. 23, 2010, p. 1-44, 45 pages.
Office Action dated Feb. 13, 2017 in European Patent Application 13770936.6.
Office Action dated Feb. 20, 2017 in European Patent Application 13773691.4.
Yang (Huawei) H. et al., „Video coding technology proposal by Huawei Technologies and Hisilicon Technologies, 1. JCT-VC Meeting, Apr. 15, 2010-Apr. 23, 2010, Dresden (Jointcollaborative Team on Video Coding of ISO/IEC JTC1/SC29/WG11 and ITU-TSG.16), URL: Http://Wftp3.itu.int/av-arch/jctvc-site, Apr. 17, 2010, XP030007548, ISSN: 0000-0049.
Chen S. et al., "Re-prediction in Inter-prediction of H.264", 33. VCEG Meeting, 82. MPEG Meeting, Oct. 20, 2007, Shenzhen (Video Coding Experts Group of ITU-T SG.16), No. VCEG-AG20, Sep. 1, 2008, XP030003624, ISSN: 0000-0095.
Office Action dated Mar. 2, 2017 in U.S. Appl. No. 14/666,662.
Office Action dated Mar. 20, 2017 in U.S. Appl. No. 14/666,600.
Office Action dated Mar. 29, 2017 in U.S. Appl. No. 14/666,634.
Office Action dated Mar. 29, 2017 in U.S. Appl. No. 14/666,658.
Office Action dated Jun. 2, 2017 in Chinese Application 2013800627011.
Office Action dated Jun. 13, 2017 in Japanese Application 2015-534998.
Schwarz, Heiko et al., "Overview of the Scalable Video Coding Extension of the H.264/AVC Standard", IEEE Transactions on Circuits and Systems for Video Technology, vol. 17, No. 9, Sep. 30, 2007.
Office Action dated Jun. 27, 2017 in Japanese Application 2015-534997.
Vivienne Sze, "Parallel Context Processing of Coefficient Level", Joint Collaborative Team on Video Coding (JCT-VC) of ITU-T SG16 WP3 and ISO/IEC JTC1/SC29/WG11 JCTVC-F130, ITU-T, Jul. 22, 2011.
Yiliang Bao, "A Low-Complexity AVC-based Scalable Video Codec", ITU-T SG16 Q.6 VCEG-Y13, ITU-T, Nov. 14, 2004.
Office Action dated Aug. 2, 2017 in U.S. Appl. No. 14/673,908.
Office Action dated Aug. 19, 2017 in Chinese Application 2013800626752.
Office Action dated Aug. 31, 2017 in Chinese Application 2013800626945.
Office Action dated Oct. 16, 2017 in U.S. Appl. No. 14/666,662.
Office Action dated Oct. 16, 2017 in U.S. Appl. No. 14/666,634.
Office Action dated Nov. 30, 2017 in U.S. Appl. No. 14/666,600.
Office Action dated Dec. 21, 2017 in U.S. Appl. No. 14/666,658.
Final Office Action U.S. Appl. No. 14/673,908 dated Mar. 30, 2018.
Office Action EP Patent Application No. 13773689.8 dated Mar. 15, 2018.
Notice of Allowance U.S. Appl. No. 14/666,634 dated Jun. 26, 2018.
Notice of Allowance U.S. Appl. No. 14/666,658 dated Aug. 3, 2018.
Notice of Allowance U.S. Appl. No. 14/666,662 dated Jun. 25, 2018.
Thomas Wiegand et al., "Joint Draft ITU-T Rec. H. 2641|ISO/IEC 144 96-10/Amd. 3 Scalable Video Coding", Joint Video Team (JVT) of ISO/IEC MPEG & ITU-T VECG (ISO/IEC JTC1/SC29/WG11 and ITU-T SG16 Q.6) JVT-X201wcm, ITU-T, Jul. 5, 2007, p. 64, 395-396.
Decision of Rejection Japanese Patent Application No. 2015-534997 dated Jun. 12, 2018.
Notification of the Second Office Action Chinese Patent Application No. 201380062694.5 dated Jul. 16, 2018.
Non-final Office Action U.S. Appl. No. 14/673,908 dated Sep. 26, 2018.
Non-final Office Action U.S. Appl. No. 14/666,600 dated Sep. 24, 2018.
Partial European Search Report EP Application No. 18177341.7 dated Nov. 15, 2018.

(56) References Cited

OTHER PUBLICATIONS

V. Seregin et al., "Low-complexity adaptive coefficient scanning", 3rd Meeting,Oct. 7, 2010-Oct. 15, 2010, Guangzhou, Joint Collaborative Team on Video Coding of ISO/IEC JTC1/SC29/WG11 and ITU-T SG.16, Document No. JCTVC-C205, Oct. 2, 2010, XP030007912, 4 pgs.
M. Winken et al., "Video Coding Technology Proposal by Fraunhofer HH1", 1st Meeting, Dresden, DE Apr. 15, 2010-Apr. 23, 2010, Joint Collaborative Team on Video Coding (JCT-VC) of ITU-T SG16 WP3 and ISO/IEC JTC1/SC29/WG11, Document No. JCTVC-A116, Apr. 24, 2010, XP030007557, 44 pgs.
Notification of Reasons for Refusal Japanese Patent Application No. 2017-198961 dated Nov. 6, 2018.
Non-final Office Action U.S. Appl. No. 16/140,796 dated Jan. 24, 2019.
Kim et al., "Low Bit-Rate Scalable Video Coding with 3-D Set Partitioning in Hierarchical Trees (3-D SPIHT)", IEEE Transactions on Circuits and Systems for Video Technology vol. 10, No. 8, Dec. 2000.
Adami et al., "State-of-the-Art and Trends in Scalable Video Compression with Wavelet-Based Approaches", IEEE Transactions on Circuits and Systems for Video Technology vol. 17, No. 9, Sep. 2007.
Non-final Office Action U.S. Appl. No. 16/180,292 dated Jan. 31, 2019.
Non-final Office Action U.S. Appl. No. 16/142,195 dated Feb. 1, 2019.
ITU-T. Series H: Audiovisual and Multimedia Systems—Infrastructure of audiovisual services—Coding of moving video Advanced video coding for generic audiovisual services (Jun. 2011) pp. 1-686.
Notification of Reasons for Refusal Japanese Patent Application No. 2017-240170 dated Jan. 15, 2019.
Jie Dong et al., Description of scalable video coding technology proposal by InterDigital Communications, Joint collaborative Team on Video Coding (JCT-VC) of ITU-T SG16 WP3 and ISO/IEC JTC1/SC29/WG11, 11$^{th}$ Meeting: Shanghai, CN, Oct. 2012, JCTVC-K0034_r1, pp. 1-30.
Ken McCann et al., Description of high efficiency scalable video coding technology proposal by Samsung and Vidyo, Joint collaborative Team on Video Coding (JCT-VC) of ITU-T SG16 WP3 and ISO/IEC JTC1/SC29/WG11, 11$^{th}$ Meeting: Shanghai, CN, Oct. 2012, JCTVC-K0044, pp. 1-31.
Search Report EP Application No. 18210240.0 dated Mar. 11, 2019.
D. Hong et al., "Scalability Support in HEVC" Joint Collaborative Team on Video Coding (JCT-VC) of ITU-T SG16 WP3 and ISO/IEC JTC1/SC29/WG11 6th Meeting, Orino Italy Jul. 14-22, 2011.
H. Schwarz et al., "Overview of the Scalable Extension of the H.264/MPEG-4 AVC Video Coding Standard", 21. JVT Meeting 78, MPEG Meeting Oct. 20, 2006-Oct. 27, 2006, Hangzhou CN (Joint Video Team of ISO/IEC JTC1/SC29/WG11 and ITU-T-SC16) No. JVT-U145, Oct. 20, 2006.
Search Report EP Application No. 18177341.7 dated Mar. 18, 2019.
Office Action EP Application No. 13773689.8 dated Mar. 21, 2019.
Notice of Allowance U.S. Appl. No. 14/666,600 dated Apr. 3, 2019.
Decision to Grant a Patent dated Apr. 24, 2019 issued in Korean Patent Application No. 10-2018-7000276.
Extended European Search Report EP Application No. 18210240.0 dated Jun. 5, 2019.
Notification of Grant Chinese Patent Application No. 201380062705.X dated Jun. 5, 2019.
Final Office Action U.S. Appl. No. 14/673,908 dated Jun. 20, 2019.
Final Office Action U.S. Appl. No. 16/140,796 dated Jul. 16, 2019.
Final Office Action U.S. Appl. No. 16/142,195 dated Jul. 16, 2019.
Notification of Reasons for Refusal Japanese Patent Application No. 2018-122462 dated Jun. 18, 2019.
Final Office Action U.S. Appl. No. 16/180,292 dated Jul. 16, 2019.
Notice of Allowance dated Aug. 2, 2019 in Korean Application 10-2018-7024669.

Office Action dated Jul. 2, 2109 in Japanese Application 2017-198961.
Anonymous: "Test Model under Consideration", Joint Collaborative Team on Video Coding (JCT-VC) of ITU-T SG 16 WP3 and ISO/IEC JTC1/SC29/WG11, 1st Meeting, Dresden, DE, Apr. 15-23, 2010.
Notice of Allowance dated Sep. 19, 2019 in Chinese Application 201380062675.2.
Office Action dated Sep. 3, 2019 in Japanese Application 2017-240170.
Decision to Grant dated Sep. 30, 2019 in Korean Application 10-2018-7005900.
Notice of Issuance dated Oct. 31, 2019 in Chinese Application 2013800626998.
Office Action dated Nov. 5, 2019 in Japanese Application 2018-193252.
Ji-Ho Park et al., CABAC Context-Re-modeling in JSVM, Joint Video Team (JVT) of ISO/IEC MPEG & ITU-T VCEG (ISO/IEC JTC1/SC29/WG11 and ITU-T SG16 Q.6) 16th Meeting: Poznan, PL, Jul. 24-29, 2005, [JVT-P104], ITU-T, Jul. 2005, pp. 1-16.
Philipp Helle et al., A Scalable Video Coding Extension of HEVC, 2013, Data Compression Conference, U.S.A., IEEE, Jun. 20, 2013, pp. 201-210.
Office Action dated Nov. 14, 2019 in Korean Application No. 10-2019-7021988.
M. Narroschke, et al., CE12 Subtest 5: Deblocking filter using adaptive weighting factors, JCT-VC of ITU-T and ISO/IEC. JCTVC-0574 Ver. 4, Nov. 22, 2011, pp. 1-16.
Office Action dated Nov. 26, 2019 in Japanese Application 2015-534996.
Office Action dated Dec. 4, 2019 in European Application 19171218.1.
Office Action dated Dec. 18, 2019 in Korean Application 10-2015-7011336.
Decision to Grant dated Dec. 25, 2019 in Korean Application 10-2019-7008139.
Office Action dated Nov. 19, 2019 in Japanese Application 2015-534997.
Woong II Choi, "CE3. Improve coding efficiency of entropy coding", Joint Video Team (JVT) of ISO/IEC MPEG & ITU-T VCEG (ISO/IEC JTC1/SC29/WG11 and ITU-T SG16 Q.6) 15th Meeting, Busan, KR,Apr. 22, 2005, JVT-0303, p. 1-5.
Office Action dated Dec. 26, 2018 in Korean Application 10-2015-7011530.
Danny Hong et al., "Scalability support in HEVC", 2012 IEEE International Symposiumon Circuits and Systems (ISCAS), May 20-23, 2012, Aug. 20, 2012.
Winken et al., "Description of video coding technology proposal by Fraunhofer HHI", Joint Collaborative Team on Video Coding (JCT-VC) of ITU-T SG16 WP3 and ISO/IEC JTC1/SC29/WG11 1st Meeting: Dresden, DE, Mar. 19, 2010., JCTVC-A116.
Chul Keun Kim et al., "Non-CE9: swapping of merge candidate", Joint Collaborative Team on Video Coding (JCT-VC) of ITU-T SG16 WP3 and ISO/IEC JTC1/SC29/WG11 7th Meeting: Geneva, CH, Nov. 8, 2011., JCTVC-G396.
Notice of Allowance dated Jan. 16, 2020 in U.S. Appl. No. 14/673,908.
Extended European Search Report EP Application No. 19187886.7 dated Jan. 20, 2020.
Notice of Allowance dated Jan. 29, 2020 in U.S. Appl. No. 16/180,292.
Notice of Allowance dated Feb. 11, 2020 in U.S. Appl. No. 16/142,195.
Office Action dated Jan. 21, 2020 in Japanese Application 2017-198961.
Office Action dated Jan. 28, 2020 in Japanese Application 2018-013673.
Office Action dated Oct. 23, 2020 Japanese Application 2018-193886. ( No New Refs—Schoppe Reported Late).
Decision to Grant dated Mar. 17, 2020 in Japanese Application 2017-240170.
Office Action dated Apr. 10, 2020 in U.S. Appl. No. 16/459,940.
U.S. Appl. No. 16/871,919, filed May 11, 2020.
U.S. Appl. No. 16/848,297, filed Apr. 14, 2020.
U.S. Appl. No. 16/592,433, filed Oct. 3, 2019.

(56) References Cited

OTHER PUBLICATIONS

U.S. Appl. No. 17/129,450, filed Dec. 21, 2020.
Office Action dated Apr. 23, 2020 in European Application 19195147.4.
Office Action dated Apr. 23, 2020 in European Application 19195133.4.
Office Action dated Jun. 1, 2020 in Korean Application 10-2020-7007160.
Notice of Allowance issued in corresponding U.S. Appl. No. 16/592,433 dated Sep. 3, 2020.
Office Action issued in corresponding Japanese Patent Application No. 2019-105062 dated Jul. 14, 2020.
Haitao Yang et al., "Regional Disparity Based Motion and Disparity Prediction for MVC", Joint Video Team (JVT) of ISO/IEC MPEG & ITU-T VCEG (ISO/IEC JTC1/SC29/WG11 and ITU-T SG16 Q.6), 22nd Meeting: Marrakech, Morocco, Jan. 2007, JVT-VO71r1, pp. 1-6.
Office Action issued in corresponding European Patent Application No. 20168600.3 dated Sep. 30, 2020.
Office Action issued in corresponding Korean Application No. 10-2002-7007160 dated Jun. 1, 2020.
Bartnik et al., "HEVC Extension for Multiview Video Coding and Multiview Video plus Depth Coding"; ITU-Telecommunications Standardization Sector Study Group 16 Question 6, Document VCEG-AR13, Feb. 3-10, 2012, 42 pages.
Ekmekcioglu et al., "Content Adaptive Enhancement of Multi-View Depth Maps for Free Viewpoint Video", IEEE Journal of Selected Topics in Signal Processing, vol. 5, No. 2, Apr. 2011, pp. 352-361.
ITU-T and ISOIIEC JTC 1, "Advanced Video Coding for Generic Audiovisual Services", Recommendation ITU-T H.264 and ISO/IEC 14496-10 (MPEG-4 AVC), 2010.
Merkle et al., "3D Video Coding: An Overview of Present and Upcoming Standards", Visual Communications and Image Processing, Jul. 11, 2010, 7 pages, Huang Shan, An Hui, China.
Na, S. et al., "Multi-View Depth Video Coding using Depth View Synthesis", IEEE International Symposium on Circuits and Systems, May 18, 2008, pp. 1400-1403.
Office Action dated Feb. 25, 2016 in parallel European Patent Application No. 12784624.4, 4 pages.
Office Action dated Sep. 30, 2016 in U.S. Appl. No. 14/273,730.
Official Communication issued in corresponding International Application PCT /EP2012/072889, dated Mar. 19, 2013.
Official Communication issued in corresponding Korean Patent Application No. 10-2014-7015900 dated Jul. 29, 2016.
Official Communication issued in International Patent Application No. PCT /EP2012/072299, dated May 21, 2013.
Schwarz et al., "Description of 30 Video Coding Technology Proposal by Fraunhofer HHI (HEVC compatible, configuration A)", ISO/IEC JTC1/SC29/WG11, MPEG2011/M22570, Nov. 2011, 46 pages, Geneva, Switzerland.
Schwarz, H. et al., "Overview of the Scalable Video Coding Extension of the H.264/AVC Standard", IEEE Transactions on Circuits and Systems for Video Technology, vol. 17, No. 9, pp. 1103-1120, Sep. 2007.
Seo et al., "Motion Information Sharing Mode for Depth Video Coding", IEEE, 3DTV-Conference: The True Vision-Capture, Transmission and Display of 30 Video, Jun. 7, 2010, pp. 1-4.
Shimizu, S. et al., "View Scalable Multiview Video Coding Using 3-D Warping With Depth Map", IEEE Transactions on Circuits and Systems for Video Technology, vol. 17, No. 11, Nov. 2007, pp. 1485-1495.
Stefanoski, N. et al., "Description of 30 Video Coding Technology Proposal by Disney Research Zurich and Fraunhofer HHI", Motion Picture Expert Group meeting, No. M22668, Nov. 22, 2011, 34 pages.
Tanimoto et al., "Multi-view Depth Map of Rena and Akko & Kayo", ISO/IEC JTC1/SC29/WG11 M14888, Oct. 2007, 5 pages, Shenzhen, China.
Tanimoto et al., "View Synthesis Algorithm in View Synthesis Reference Software 2.0 (VSRS2.0)", ISO/IEC JTCI/SC29/WG11, MPEG 2008/M16090, Feb. 2009,5 pages, Lausanne, Switzerland.
Vetro et al., ""Overview of the Stereo and Multiview Video Coding Extensions of the H.264/MPEG-4 AVC Standard"", Proceedings of the IEEE, vol. 99, No. 4, Apr. 11, 2011, pp. 626-642.
Vetro et al., "Joint Multiview Video Model (JMVM) 6.0", Joint Video Team (JVT) of ISO/IEC MPEG & ITU-T VCEG (ISO/IEC JTC1/SC29/WG11 and ITU-T SG16 0.6, 25th Meeting, Document JVT-Y207, Oct. 2007, 10 pages, Shenzhen, China.
Zheng et al., "Affine Model for Disparity Estimation in Multiview Sequence Coding", International Conference on Information Theory and Information Security (ICITIS), Dec. 17, 2010, pp. 736-740, Nanning, China.
Office Action dated Dec. 27, 2016 in U.S. Appl. No. 14/277,850.
Office Action dated Feb. 17, 2017 in Chinese Application No. 201280066739.1.
Office Action dated Mar. 15, 2017 in U.S. Appl. No. 14/272,671.
Office Action dated Oct. 20, 2017 in U.S. Appl. No. 14/273,730.
Office Action dated Oct. 3, 2017 in U.S. Appl. No. 14/277,850.
Office Action dated Nov. 23, 2017 in European Application 12784624.4.
Non-final Office Action U.S. Appl. No. 14/277,850 dated May 10, 2018.
Konieczny et al., "Depth-Based Inter-view Prediction of Motion Vectors for Improved Multiview Video Coding", 2010, IEEE. pp. 1-4.
Notice of Allowance U.S. Appl. No. 14/272,671 dated Jun. 4, 2018.
Non-final office action U.S. Appl. No. 14/273,730 dated Jun. 1, 2018.
Final office action U.S. Appl. No. 14/277,850 dated Dec. 10, 2018.
Summons to Attend Oral Hearing EP Application No. 1284624.4 dated Jan. 2, 2019.
Final Office Action U.S. Appl. No. 14/273,730 dated Jan. 28, 2019.
Non-final Office Action U.S. Appl. No. 16/120,731 dated Mar. 21, 2019.
Non-final Office Action U.S. Appl. No. 14/277,850 dated May 30, 2019.
Notice of Allowance U.S. Appl. No. 16/120,731 dated Jul. 3, 2019.
Non-final Office Action U.S. Appl. No. 14/273,730 dated Jun. 14, 2019.
Notice of Allowance Korean Patent Application No. 10-2018-7024889 dated Jul. 1, 2019.
Office Action dated Sep. 17, 2019 in Japanese Patent Application 2017-137033.
Office Action dated Dec. 11, 2019 in Korean Application 10-2019-7028653.
Notice of Allowance dated Jan. 14, 2020 in U.S. Appl. No. 14/277,850.
Office Action dated Jan. 7, 2020 in Japanese Application 2017-137033.
Notice of Allowance dated Feb. 11, 2020 in U.S. Appl. No. 14/273,730.
Decision to Grant dated Aug. 4, 2020 in Japanese Application 2017-198961.
Nguyen, N. et al., "Multi-level significance maps for Small Transform Units", JCT-VC of ITU-T SG16 WP3 and ISO/IEC JTC1/SC29/WG11, 8th Meeting, San Jose, Feb. 1-10, 2012.
Office Action dated Aug. 18, 2020 in Japanese Application 2015-534997.
Decision to Grant dated Aug. 31, 2020 in Korean Application 10-2020-7008700.
Notice of Allowance dated Sep. 23, 2020 in Korean Application 10-2015-7011336.
Office Action dated Aug. 11, 2020 in U.S. Appl. No. 16/867,181.
Office Action dated Sep. 21, 2020 in U.S. Appl. No. 16/850,588.
Communication pursuant to Article 94(3) EPC issued in corresponding European Application No. 19 171 218.1 dated Apr. 29, 2021.
Extended European Search Report issued in corresponding European Application No. 20211111.8 dated May 18, 2021.
Office Action issued in corresponding Korean Patent Application No. 10-2020-7036488 dated Feb. 2, 2021, with English translation.

(56) References Cited

OTHER PUBLICATIONS

Decision of Rejection issued in corresponding Japanese Patent Application No. 2018-122462 dated Mar. 30, 2021, with English translation.
Decision of Dismissal of Amendment issued in corresponding Japanese Patent Application No. 2018-122462 dated Mar. 30, 2021, with English translation.
Office Action issued in corresponding Korean Patent Application No. 10-2020-7034470 dated Mar. 22, 2021, with English translation.
Office Action issued in corresponding Korean Patent Application No. 10-2021-7002851 dated Mar. 9, 2021, with English translation.
Office Action issued in corresponding Korean Patent Application No. 10-2019-7021988 dated Feb. 22, 2021, with English translation.
Decision to Grant a Patent issued in corresponding Korean Patent Application No. 10-2019-7039023 dated Feb. 23, 2021, with English translation.
Communication pursuant to Article 94(3) EPC issued in corresponding European Application No. 19 187 886.7 dated Jan. 25, 2021.
Final Office Action issued in corresponding U.S. Appl. No. 16/850,588 dated Jan. 11, 2021.
Final Office Action issued in corresponding U.S. Appl. No. 16/867,181 dated Jan. 27, 2021.
Final Office Action issued in corresponding U.S. Appl. No. 16/861,540 dated Jan. 21, 2021.
Office Action issued in corresponding Japanese Patent Application 2018-122462 dated Sep. 21, 2021, with English translation.
Office Action issued in corresponding Japanese Patent Application 2020-148098 dated Sep. 24, 2021, with English translation.
Cheung Auyeung et al., "Additional horizontal and vertical scan for transform coefficients", Joint Collaborative Team on Video Coding (JCT-VC), Jul. 3, 2012, [JCTVC-J0281] (version 1).
Office Action issued in corresponding Korean Patent Application 10-2020-7036488 dated Nov. 22, 2021, with English translation.
Office Action issued in corresponding Chinese Patent Application 201810455061.5 dated Aug. 2, 2021.
Decision to Grant a Patent in corresponding Japanese Patent Application No. 2018-193252 dated Jun. 8, 2021, with English translation.
Decision to Grant a Patent in corresponding Japanese Patent Application No. 2018-193886 dated Jun. 8, 2021, with English translation.
Office Action issued in corresponding Korean Patent Application No. 10-2021-7015435 dated Aug. 19, 2021, with English translation.
Office Action issued in corresponding Korean Patent Application No. 10-2021-7015529 dated Aug. 19, 2021, with English translation.
Final Office Action issued in corresponding U.S. Appl. No. 16/850,588 dated Jan. 24, 2022.
Office Action issued in corresponding Korean Patent Application 10-2020-7034470 dated Jan. 14, 2022 with English translation.
Office Action issued in corresponding Chinese Patent Application 2019111946325 dated Jan. 12, 2022 with English translation.
Li Qiang et al., "Scalable video coding theory analysis and testing", Digital Communication, Apr. 25, 2012, with English abstract.
C. N. Doukas et al., "Advanced scalable medical video transmission based on H.264 temporal and spatial compression," Africon 2007, Sep. 28, 2007.
Final Office Action issued in corresponding U.S. Appl. No. 16/867,181 dated Mar. 7, 2022.
Final Office Action issued in corresponding U.S. Appl. No. 16/861,540 dated Mar. 22, 2022.
Office Action issued in corresponding European Patent Application 18 177 341.7 dated Mar. 16, 2022.
Notice of Issuance in corresponding Chinese Patent Application 201810455061.5 dated Mar. 21, 2022.
Office Action issued in corresponding Korean Patent Application 10-2022-7005755 dated May 9, 2022, with English translation.
Office Action issued in corresponding Korean Patent Application 10-2021-7015529 dated Jun. 14, 2022, with English translation.
Office Action issued in corresponding Korean Patent Application 10-2022-7009728 dated Jun. 8, 2022, with English translation.
Benjamin Bross, et al., "High Efficiency Video Coding (HEVC) text specification draft 9," Joint Collaborative Team an Video Coding (JCT-VC) of ITU-T SG16 WP3 and ISO/IEC JTC1/SC29/WG11, 11th Meeting: Shanghai, CN, Oct. 10-19, 2012, JCTVC-K0030-v1.
Office Action issued in corresponding U.S. Appl. No. 17/412,171 dated Jul. 26, 2022.
Office Action (Decision to Grant) issued in corresponding Korean Patent Application No. 10-2021-7015435 dated Jun. 21, 2022, with English translation.
Extended European Search Report issued in corresponding European Patent Application 22 152 073.7-1208 dated Jul. 25, 2022.
Office Action issued in corresponding European Patent Application 19 187 886.7-1208 dated Jul. 22, 2022.
Office Action issued in corresponding U.S. Appl. No. 16/850,588 dated Jun. 15, 2022.
Office Action issued in corresponding Japanese Patent Application 2020-148098 dated Jul. 19, 2022, with English translation.
Junghye Min et al., "Non-CE11: Simplified multi-level significance map coding", Joint Collaborative Team on Video Coding (JCT-VC), Jan. 30, 2012, [JCTVC-H0131] (version 3).
Office Action issued in corresponding Korean Patent Application 10-2020-7034470 dated Aug. 25, 2022, with English translation.
Office Action issued in corresponding Chinese Patent Application 2019103410316 dated Sep. 1, 2022.
Notice of Issuance issued in corresponding Chinese Patent Application 2019111946325 dated Aug. 24, 2022.

\* cited by examiner

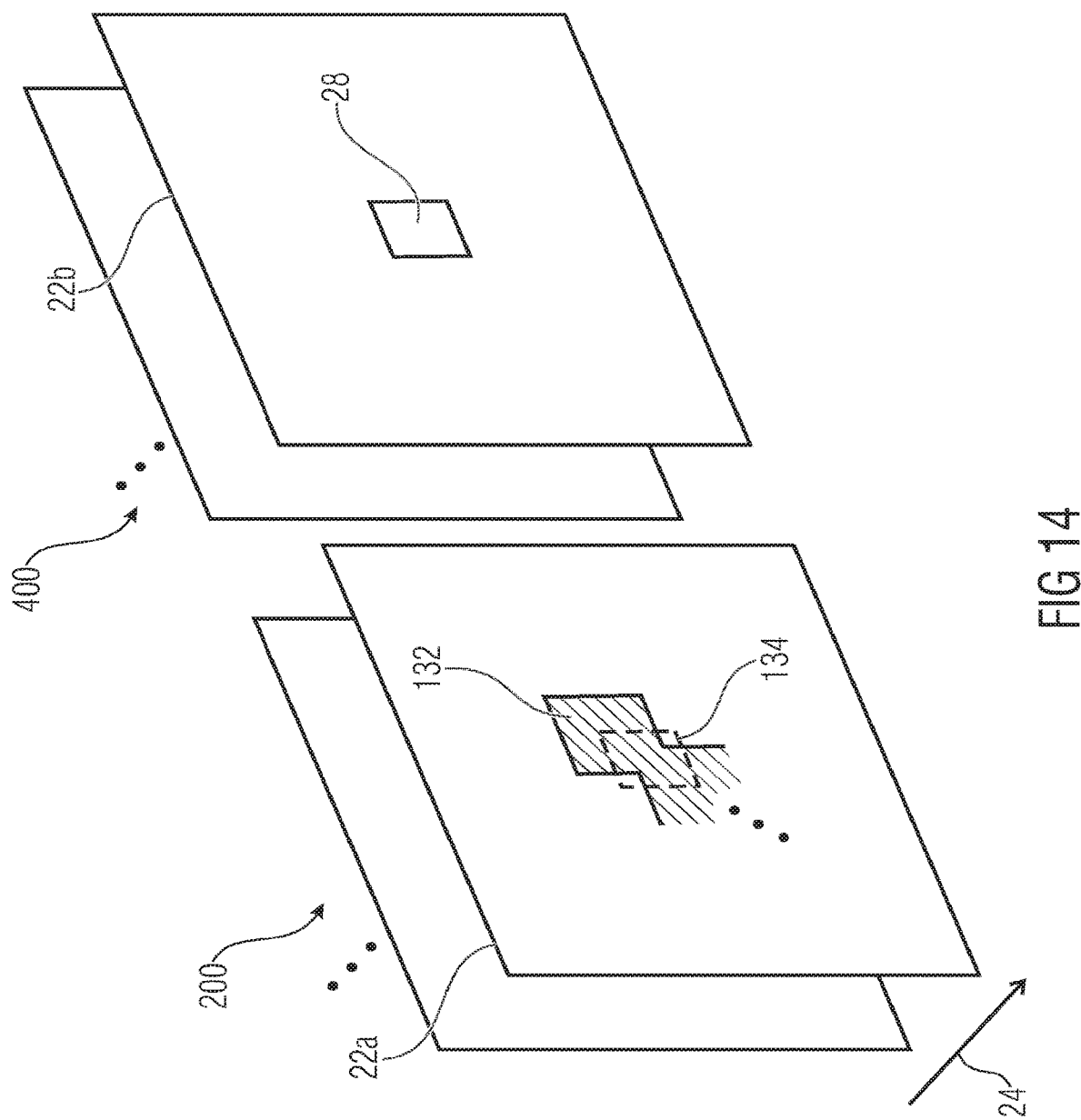

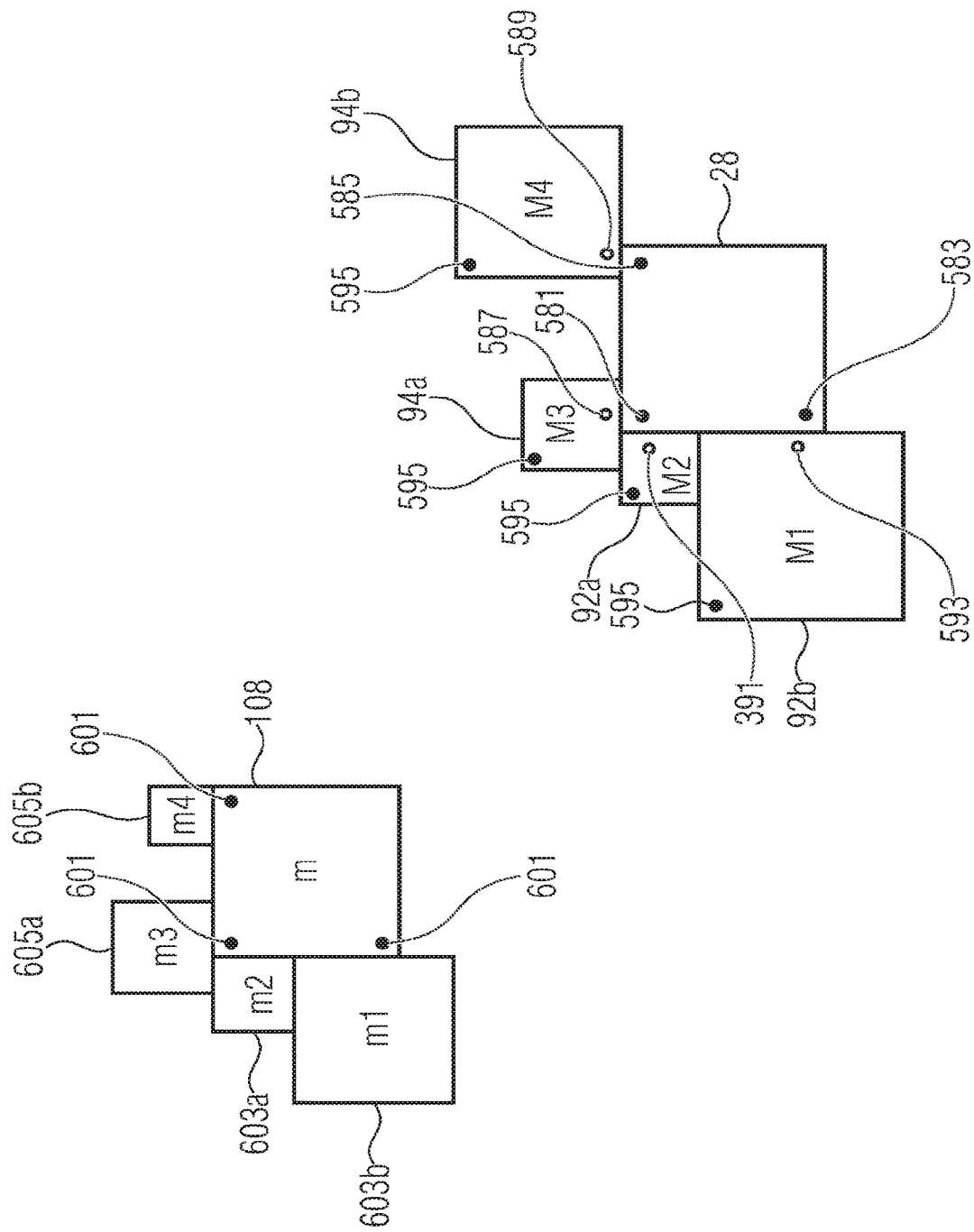

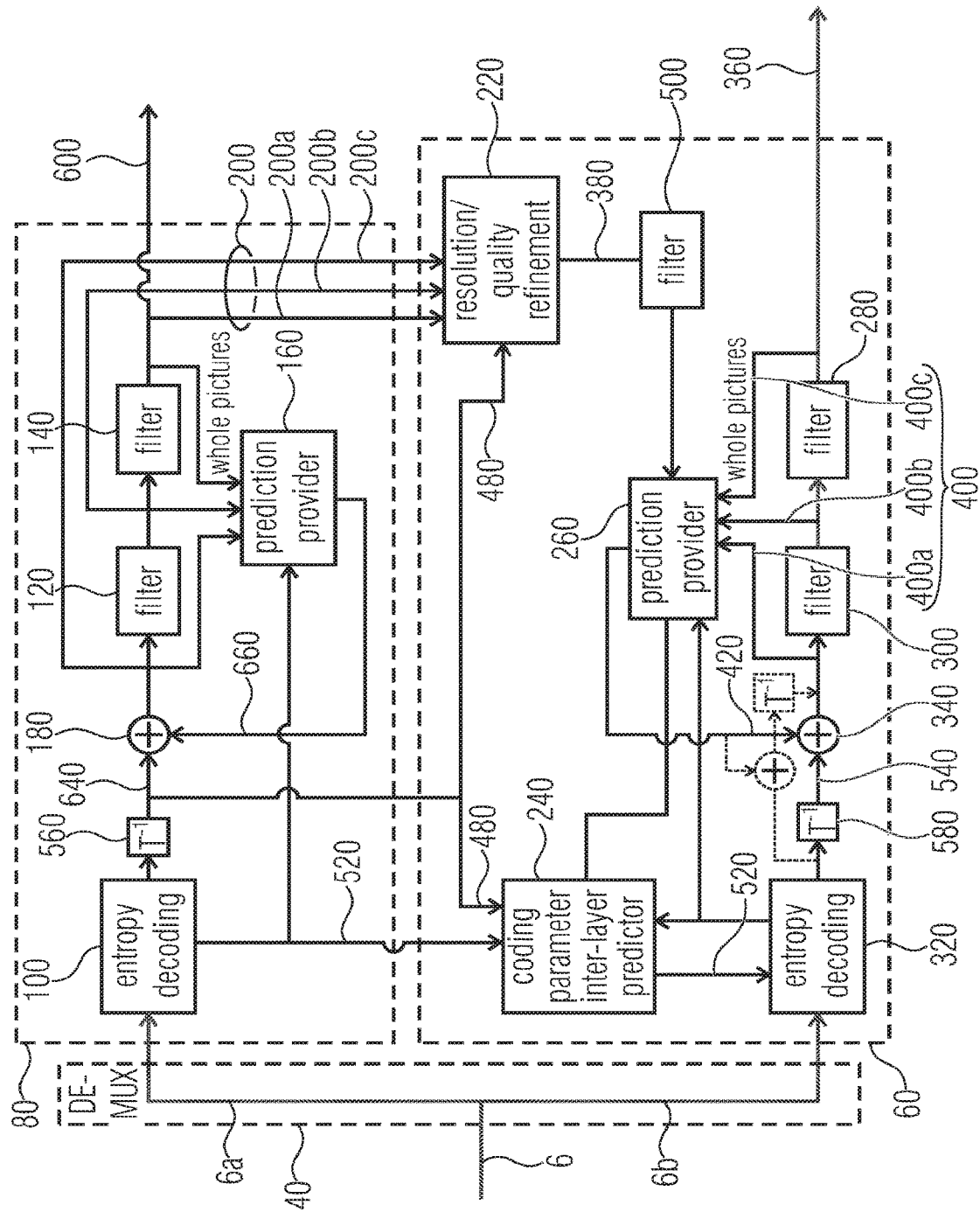

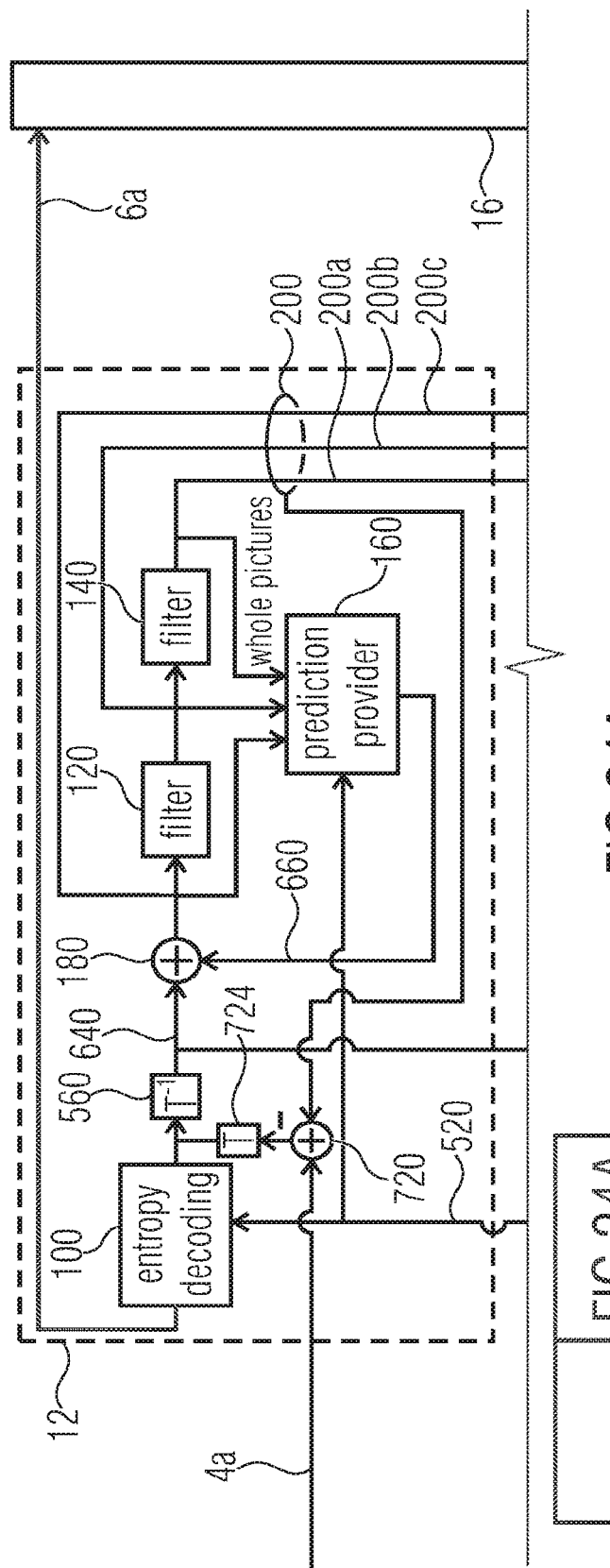
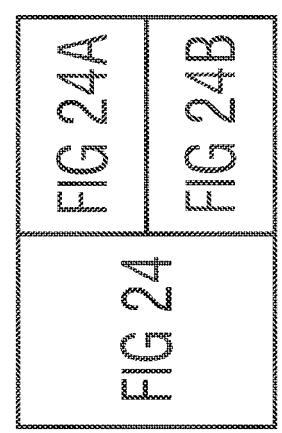
FIG 24A

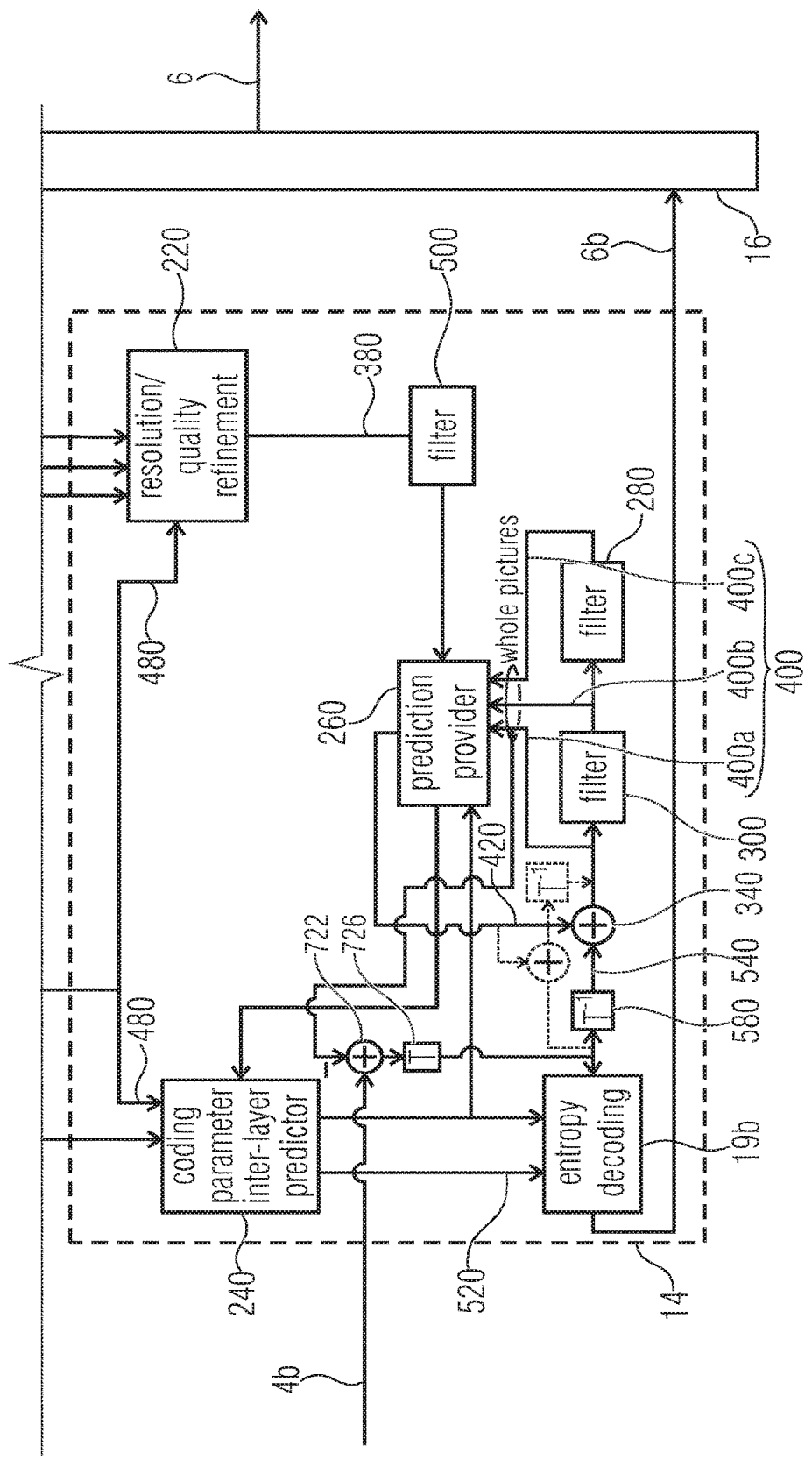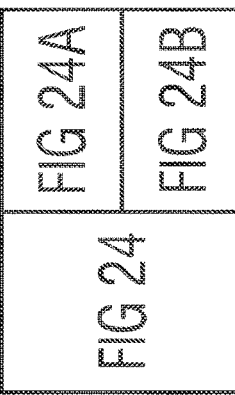
FIG 24B

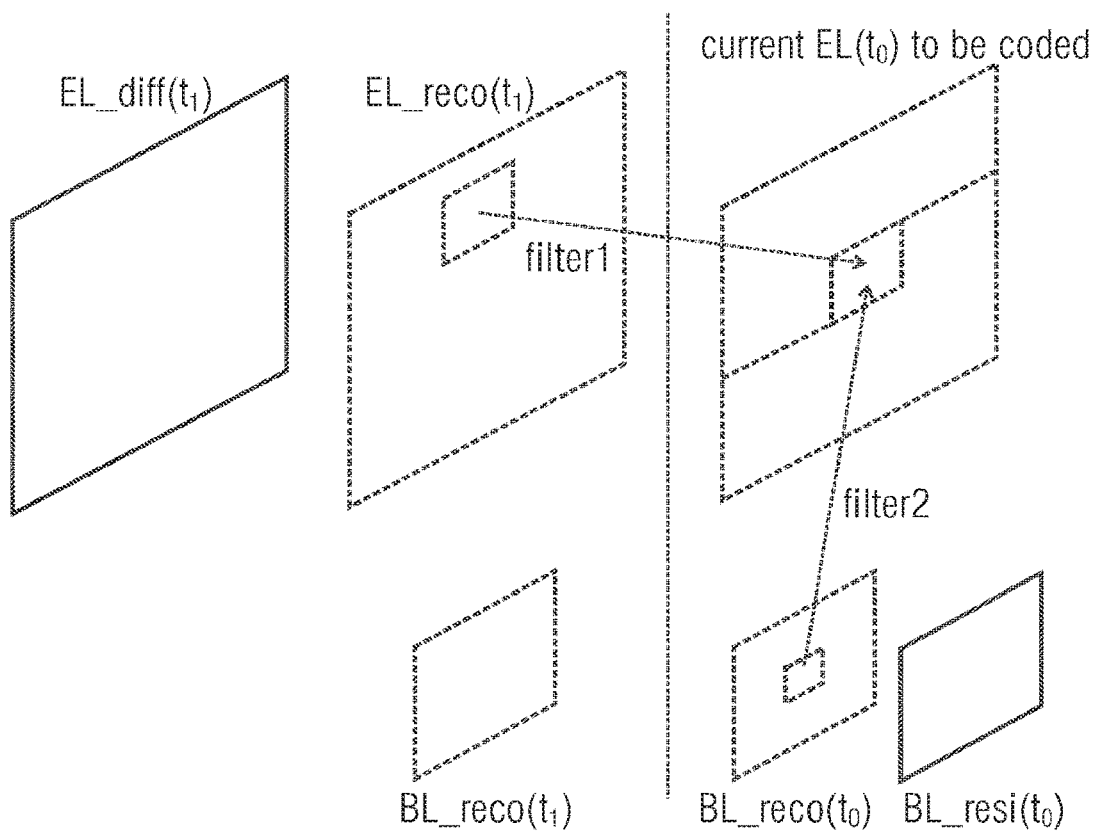
FIG 33
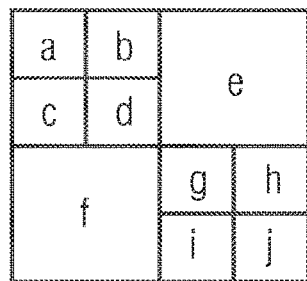 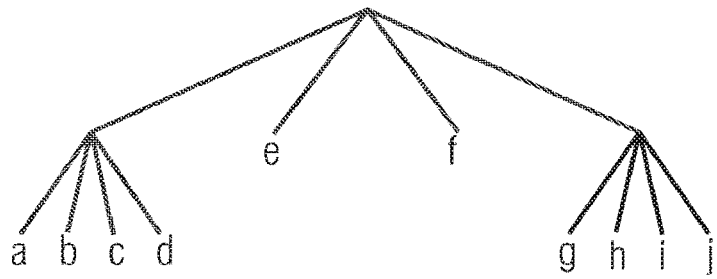
FIG 34
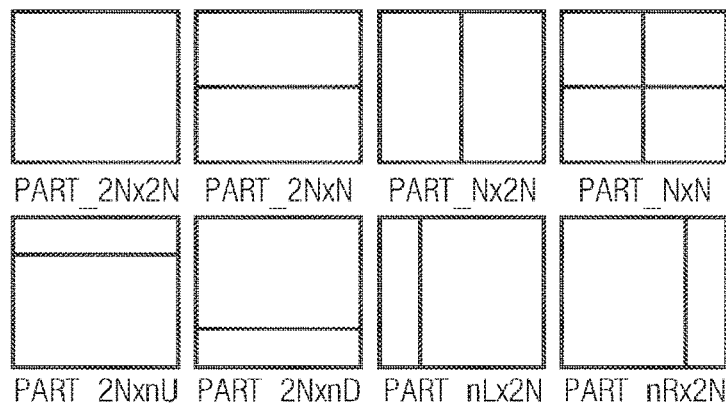
FIG 35

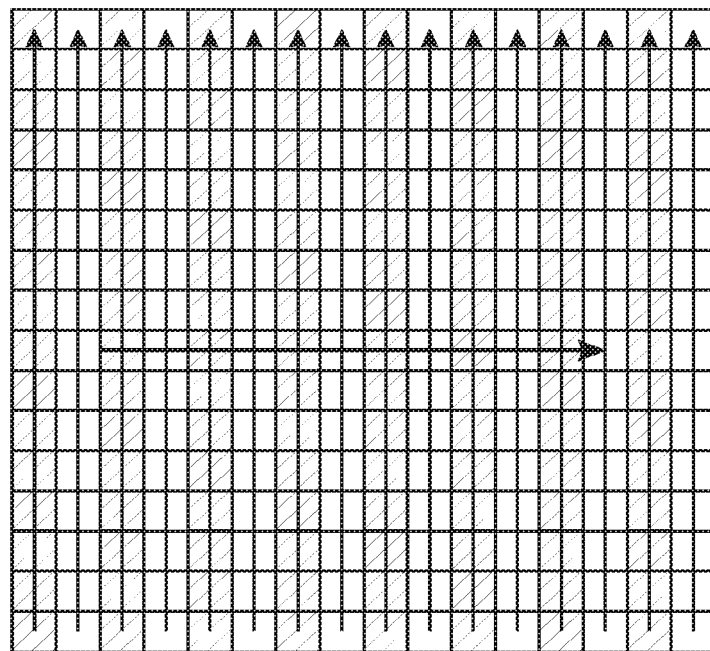
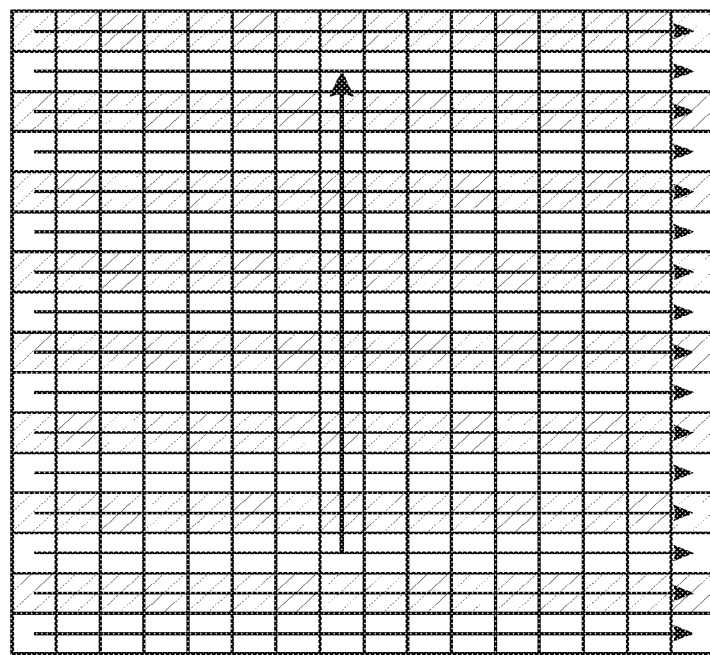
FIG 43

SCALABLE VIDEO CODING USING DERIVATION OF SUBBLOCK SUBDIVISION FOR PREDICTION FROM BASE LAYER

CROSS-REFERENCE TO RELATED APPLICATIONS

The present application is a continuation of U.S. patent application Ser. No. 16/142,195 filed Sep. 26, 2018, which is a continuation of U.S. patent application Ser. No. 14/666,634, filed Mar. 24, 2015, which is a continuation of International Application PCT/EP2013/070490, filed Oct. 1, 2013, and claims priority from U.S. Patent Application 61/708,201, filed Oct. 1, 2012, all of which are incorporated herein by reference in their entireties.

BACKGROUND OF THE INVENTION

The present invention concerns scalable video coding.

In non-scalable coding, intra coding refers to coding techniques that do not reference data of already coding pictures, but exploit only data (e.g., reconstructed samples, coding mode, or symbol statistics) of already coded parts of the current picture. Intra-coded pictures (or intra pictures) are for example used in broadcast bitstreams in order to allow decoders to tune into a bitstream at so-called random access points. Intra pictures are also used to limit the error propagation in error-prone environments. In general, the first picture of a coded video sequence has to be coded as an intra picture, since here no picture is available that can be used as reference pictures. Often, intra pictures are also used at scene cuts where temporal prediction typically cannot provide a suitable prediction signal.

Furthermore, intra coding modes are also used for particular areas/blocks in so-called inter pictures, where they might perform better in terms of rate-distortion efficiency than inter coding modes. This is the often case in flat regions as well as in regions where temporal predictions performs rather poorly (occlusions, partially dissolves or fading objects).

In scalable coding, the concept of intra coding (coding of intra pictures and coding of intra blocks in inter pictures) can be extended to all pictures that belong to the same access unit or time instant. Therefore intra coding modes for a spatial or quality enhancement layer can also make use of inter-layer prediction from a lower layer picture at the same time instant to increase the coding efficiency. That means that not only already coded parts inside the current enhancement layer picture can be used for intra prediction, but also already coded lower layer pictures at the same time instant can be exploited. The latter concept is also referred to as inter-layer intra prediction.

In the state-of-the-art hybrid video coding standards (such as H.264/AVC or HEVC), the pictures of a video sequence are divided into blocks of samples. The block size can either be fixed or the coding approach can provide a hierarchical structure which allows blocks to be further subdivided into blocks with smaller block sizes. The reconstruction of a block is typically obtained by generating a prediction signal for the block and adding a transmitted residual signal. The residual signal is typically transmitted using transform coding, which means the quantization indices for transform coefficients (also referred to as transform coefficient levels) are transmitted using entropy coding techniques, and at the decoder side, these transmitted transform coefficient levels are scaled and inverse transformed to obtain the residual signal which is added to the prediction signal. The residual signal is generated either by intra prediction (using only already transmitted data for the current time instant) or by inter prediction (using already transmitted data for different time instants).

If inter prediction is used, the prediction block is derived by motion-compensated prediction using samples of already reconstructed frames. This can be done by unidirectional prediction (using one reference picture and one set of motion parameters), or the prediction signal can be generated by multi-hypothesis prediction. In the latter case, two or more prediction signals are superimposed, i.e., for each sample, a weighted average is constructed to form the final prediction signal. The multiple prediction signals (which are superimposed) can be generated by using different motion parameters for the different hypotheses (e.g., different reference pictures or motion vectors). For unidirectional prediction, it is also possible to multiply the samples of the motion-compensated prediction signal with a constant factor and add a constant offset in order to form the final prediction signal. Such a scaling and offset correction can also be used for all or selected hypothesis in multi-hypotheses prediction.

In current state-of-the-art video coding techniques, the intra prediction signal for a block is obtained by predicting samples from the spatial neighborhood (which was reconstructed before the current block according to the blocks processing order) of the current block. In the most recent standards various prediction methods are utilized that perform prediction in the spatial domain. There are fine-granular directional prediction modes where filtered or unfiltered samples of neighboring blocks are extended in a specific angle to generate the prediction signal. Furthermore, there are also plane-based and DC-based prediction modes that use neighboring block samples to generate flat prediction planes or DC prediction blocks.

In older video coding standards (e.g., H.263, MPEG-4) intra prediction was performed in the transform domain. In this case the transmitted coefficients were inverse quantized. And for a subset of the transform coefficients, the transform coefficient value was predicted using the corresponding reconstructed transform coefficient of a neighboring block. The inverse quantized transform coefficients were added to the predicted transform coefficient values, and the reconstructed transform coefficients were used as input to the inverse transform. The output of the inverse transform did form the final reconstructed signal for a block.

In scalable video coding also the base layer information can be utilized to support the prediction process for the enhancement layer. In the state-of-the-art video coding standard for scalable coding, the SVC extension of H.264/AVC, there is one additional mode for improving the coding efficiency of the intra prediction process in an enhancement layer. This mode is signaled at a macroblock level (a block of 16×16 luma samples). This mode is only supported if the co-located samples in the lower layer are coded using an intra prediction mode. If this mode is selected for a macroblock in a quality enhancement layer, the prediction signal is built by the co-located samples of the reconstructed lower layer signal before the deblocking filter operation. If the inter-layer intra prediction mode is selected in a spatial enhancement layer, the prediction signal is generated by upsampling the co-located reconstructed base layer signal (after the deblocking filter operation). For upsampling, FIR filters are used. In general, for the inter-layer intra prediction mode, an additional residual signal is transmitted by transform coding. The transmission of the residual signal can also be omitted (inferred to be equal to zero) if it is correspondingly signaled inside the bitstream. The final reconstruction signal is obtained by adding the reconstructed residual signal (obtained by scaling the transmitted transform coefficient levels and applying an inverse spatial transform) to the prediction signal.

However, it would be favorable to be able to achieve a higher coding efficiency in scalable video coding.

SUMMARY

An embodiment may have a scalable video decoder configured to predictively reconstruct a base layer signal using base layer coding parameters spatially varying over the base layer signal; reconstruct an enhancement layer signal in units of blocks including selecting, for a predetermined block of the blocks, a subblock subdivision among a set of possible subblock subdivisions such that the selected subblock subdivision is the coarsest among the set of possible subblock subdivisions subdividing, when transferred onto a co-located portion of the base layer signal, the base layer signal into areas such that within each area, the base layer coding parameters are sufficiently similar to each other; and predictively reconstructing the predetermined block using the selected subblock subdivision.

Another embodiment may have a scalable video decoder configured to predictively reconstruct a base layer signal by sub-dividing frames of the base layer signal into intra-blocks and inter-blocks with using spatial intra prediction for intra-blocks and temporal inter-prediction for inter blocks, and setting prediction parameters associated with the spatial intra and temporal inter prediction, respectively, in units of blocks into which the intra- and inter-blocks are sub-divided; predictively reconstruct an enhancement layer signal including assigning, controlled via prediction mode syntax in the coded data stream, coding units into which frames of the enhancement signal are subdivided to a respective one of a set of prediction modes including a spatial intra prediction mode, a temporal inter-prediction mode, and an inter-layer prediction mode, predictively reconstructing each coding unit using the respective prediction mode to which the respective coding unit has been assigned with for coding units having any of the spatial intra prediction mode and the temporal inter-prediction mode assigned thereto, further sub-dividing the coding units into prediction blocks and setting prediction parameters associated with the respective prediction mode to which the respective coding unit has been assigned in units of the prediction blocks; and subjecting all prediction blocks to spatial intra prediction using the prediction parameters set, in case of the respective coding unit having the spatial intra prediction assigned thereto, and subjecting all prediction blocks to temporal inter prediction using the prediction parameters set, in case of the respective coding unit having the temporal inter prediction assigned thereto, for each coding unit having the inter-layer prediction mode assigned thereto, locally transferring the sub-division of the intra and inter-blocks of the base layer signal onto the respective coding unit such that coding units locally overlaying both intra and inter blocks, are sub-divided into at least one prediction block associated with the non-temporal mode and locally coinciding with the intra blocks, and at least one prediction block associated with the temporal inter prediction mode and locally coinciding with the inter blocks; subjecting all prediction blocks of the respective coding unit, having the non-temporal prediction mode assigned thereto, to spatial intra prediction with using prediction parameters derived from the prediction parameters of the locally coinciding intra blocks, or inter layer prediction by subjecting the base layer signal to a resolution or quality refinement to obtain a resolution/quality-increased inter-layer prediction signal, predicting the prediction blocks of the respective coding unit, having the non-temporal prediction mode assigned thereto, using the resolution/quality-increased inter-layer prediction signal; and subjecting all prediction blocks of the respective coding unit, having the temporal inter prediction mode assigned thereto, to temporal inter prediction using the prediction parameters derived from the prediction parameters of the locally coinciding inter blocks.

Another embodiment may have a scalable video decoding method including predictively reconstruct a base layer signal using base layer coding parameters spatially varying over the base layer signal; reconstruct an enhancement layer signal in units of blocks including selecting, for a predetermined block of the blocks, a subblock subdivision among a set of possible subblock subdivisions such that the selected subblock subdivision is the coarsest among the set of possible subblock subdivisions subdividing, when transferred onto a co-located portion of the base layer signal, the base layer signal into areas such that within each area, the base layer coding parameters are sufficiently similar to each other; and predictively reconstructing the predetermined block using the selected subblock subdivision.

Another embodiment may have a scalable video encoder configured to predictively encode a base layer signal using base layer coding parameters spatially varying over the base layer signal; encoding an enhancement layer signal in units of blocks including selecting, for a predetermined block of the blocks, a subblock subdivision among a set of possible subblock subdivisions such that the selected subblock subdivision is the coarsest among the set of possible subblock subdivisions subdividing, when transferred onto a co-located portion of the base layer signal, the base layer signal into areas such that within each area, the base layer coding parameters are sufficiently similar to each other; and predictively reconstructing the predetermined block using the selected subblock subdivision.

Another embodiment may have a scalable video encoding method including predictively encode a base layer signal using base layer coding parameters spatially varying over the base layer signal; encoding an enhancement layer signal in units of blocks including selecting, for a predetermined block of the blocks, a subblock subdivision among a set of possible subblock subdivisions such that the selected subblock subdivision is the coarsest among the set of possible subblock subdivisions subdividing, when transferred onto a co-located portion of the base layer signal, the base layer signal into areas such that within each area, the base layer coding parameters are sufficiently similar to each other; and predictively reconstructing the predetermined block using the selected subblock subdivision.

Another embodiment may have a computer program having a program code for performing, when running on a computer, the inventive methods.

One aspect of the present application is that scalable video coding may be rendered more efficient by deriving/selecting a subblock subdivision to be used for enhancement layer prediction, among a set of possible subblock subdivisions of an enhancement layer block by evaluating the spatial variation of the base layer coding parameters over the base layer signal. By this measure, less of the signalization overhead has to be spent on signaling this subblock subdivision within the enhancement layer data stream, if any. The subblock subdivision thus selected may be used in predictively coding/decoding the enhancement layer signal.

One aspect of the present application is that a better predictor for predictively coding the enhancement layer signal in scalable video coding may be achieved by forming the enhancement layer prediction signal out of a inter-layer prediction signal and an enhancement layer internal prediction signal in a manner differently weighted for different spatial frequency components, i.e. by forming a weighted average of the inter-layer prediction signal and the enhancement layer internal prediction signal at a portion currently to be reconstructed to obtain an enhancement layer prediction signal such that the weights at which the inter-layer prediction signal and the enhancement layer internal prediction signal contribute to the enhancement layer prediction signal vary over different spatial frequency components. By this measure, it is feasible to construe the enhancement layer prediction signal from the inter-layer prediction signal and the enhancement layer internal prediction signal in a manner optimized with respect to spectral characteristics of the individual contribution components, i.e. the inter-layer prediction signal on the one hand and the enhancement layer internal prediction signal on the other hand. For example, owing to the resolution or quality refinement based on which the inter-layer prediction signal is obtained from a reconstructed base layer signal, the inter-layer prediction signal may be more accurate at lower frequencies than compared to higher frequencies. As far as the enhancement layer internal prediction signal is concerned, its characteristic may be the other way around, i.e. its accuracy may be increased for higher frequencies compared to lower frequencies. In this example, the inter-layer prediction signal's contribution to the enhancement layer prediction signal should, by respective weighting, exceed the enhancement layer internal prediction signal's contribution to the enhancement layer prediction signal in the lower frequencies and remain below the enhancement layer internal prediction signal's contribution to the enhancement layer prediction signal as far as the higher frequencies are concerned. By this measure, a more accurate enhancement layer prediction signal may be achieved, thereby increasing the coding efficiency and resulting in a higher compression rate.

By way of various embodiments, different possibilities are described to build the just outlined concept into any scalable video coding based concept. For example, the formation of the weighted average may be formed either in the spatial domain or the transform domain. Performance of the spectrally weighted average necessitates transformations to be performed on the individual contributions, i.e. inter-layer prediction signal and the enhancement layer internal prediction signal but avoids for example spectrally filtering any of the inter-layer prediction signal and enhancement layer internal prediction signal in the spatial domain involving, for example, FIR or IIR filtering. However, performing the formation of the spectrally weighted average in the spatial domain avoids the detour of the individual contributions to the weighted average via the transform domain. The decision as to which domain is actually chosen for performing the formation of the spectrally weighted average may be dependent on whether the scalable video data stream contains, for the portion currently to be constructed in the enhancement layer signal, a residual signal in the form of transform coefficients or not: if not, the detour via the transform domain could be left off, while in case of an existing residual signal, the detour via the transform domain is even more advantageous since it allows for the transmitted residual signal in the transform domain to be added to the spectrally weighted average in the transform domain, directly.

One aspect of the present application is that information available from coding/decoding the base layer, i.e. base-layer hints, may be exploited to render the motion-compensated prediction of the enhancement layer more efficient by more efficiently coding the enhancement layer motion parameters. In particular, a set of motion parameter candidates gathered from neighboring already reconstructed blocks of the frame of the enhancement layer signal maybe enlarged by a set of one or more base layer motion parameters of a block of the base layer signal, co-located to the block of the frame of the enhancement layer signal, thereby improving the available quality of the motion parameter candidate set based on which the motion compensated prediction of the block of the enhancement layer signal may be performed by selecting one of the motion parameter candidates of the extended motion parameter candidate set and using the selected motion parameter candidate for the prediction. Additionally or alternatively, the motion parameter candidate list of an enhancement layer signal may be ordered dependent on base layer motion parameters involved in coding/decoding the base layer. By this measure, the probability distribution for selecting the enhancement layer motion parameter out of the ordered motion parameter candidate list is condensed so that, for example, an explicitly signaled index syntax element may be coded using less bits such as, for example, using entropy coding. Even further, additionally or alternatively, an index used in coding/decoding the base layer, may serve as a basis for determining the index into the motion parameter candidate list for the enhancement layer. By this measure, any signaling of the index for the enhancement layer may be avoided completely, or merely a deviation of the thus determined prediction for the index may be transmitted within the enhancement layer substream, thereby improving the coding efficiency.

One aspect of the present application is that a subblock-based coding of transform coefficient blocks of the enhancement layer may be rendered more efficient if the subblock subdivision of the respective transform coefficient block is controlled on the basis of the base layer residual signal or the base layer signal. In particular, by exploiting the respective base layer hint, the subblocks may be made longer along a spatial frequency axis transverse to edge extensions observable from the base layer residual signal or the base layer signal. By this measure, it is feasible to adapt the subblocks' shape to an estimated distribution of the energy of the transform coefficients of the enhancement layer transform coefficient block in such a manner that, at an increased probability, each subblock will either be almost completely filled with significant, i.e. transform coefficients not having been quantized to zero, or with insignificant transform coefficients, i.e. only transform coefficients quantized to zero, while at a reduced probability any subblock has a similar number of significant transform coefficients on the one hand and insignificant transform coefficients on the other hand. Due to the fact, however, that subblocks having no significant transform coefficient may be signaled within the data stream efficiently, such as by use of merely one flag, and that subblocks almost completely filled with significant transform coefficients do not necessitate a waste of signalization amount for coding the insignificant transform coefficients which may be interspersed therein, the coding efficiency for coding the transform coefficient blocks of the enhancement layer is increased.

One aspect of the present application is that the coding efficiency of scalable video coding may be increased by substituting missing spatial intra prediction parameter candidates in a spatial neighborhood of a current block of the enhancement layer by use of intra prediction parameters of a co-located block of the base layer signal. By this measure, the coding efficiency for coding the spatial intra prediction parameters is increased due to the improved prediction quality of the set of intra prediction parameters of the enhancement layer, or, more precisely stated, the increased likelihood, that appropriate predictors for the intra prediction parameters for an intra predicted block of the enhancement layer are available thereby increasing the likelihood that the signaling of the intra prediction parameter of the respective enhancement layer block may be performed, on average, with less bits.

BRIEF DESCRIPTION OF THE DRAWINGS

Embodiments of the present invention will be detailed subsequently referring to the appended drawings, in which:

FIG. 14 shows a schematic of a portion out of a layered video signal in order to illustrate the prediction parameter granularity derivation from base layer in accordance with an embodiment;

FIG. 19C illustrates a second possibility of transferring a base layer ordering onto a list of enhancement layer motion parameter candidates;

FIG. 23 shows a block diagram of an even more detailed embodiment for a scalable video decoder, where the embodiments and aspects described herein may be implemented;

FIG. 24A and FIG. 24B show a block diagram of a scalable video encoder fitting to the embodiment of FIG. 23, where the embodiments and aspects outlined herein may be implemented;

FIG. 33 illustrates prediction using BL reconstruction and EL reconstruction;

FIG. 34 illustrates an example—decomposition of a picture into square blocks and corresponding quad tree structure;

FIG. 35 illustrates allowed decompositions of a square block into sub-blocks in an embodiment;

FIG. 43 illustrates a realization of vertical and horizontal scans for 16×16 transformation blocks. A coefficient subgroup is defined as a single column or single row, respectively;

DETAILED DESCRIPTION OF THE INVENTION

Figure 1:
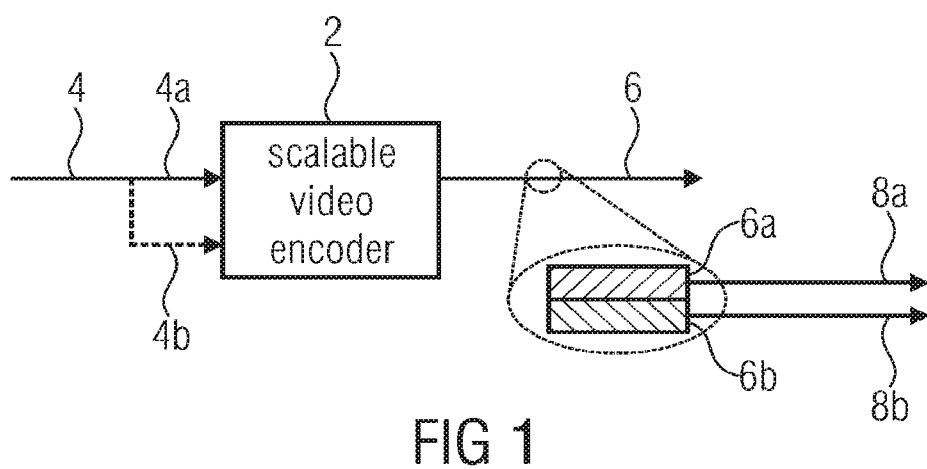
FIG. 1 shows a block diagram of a scalable video encoder within which the embodiments and aspects described herein may be implemented.

FIG. 1 shows in a general manner an embodiment for a scalable video encoder into which the embodiments outlined further below could be built into. The scalable video encoder of FIG. 1 is generally indicated using reference sign 2 and receives a video 4 to be encoded. The scalable video encoder 2 is configured to encode video 4 into a data stream 6 in a scalable manner. That is, data stream 6 comprises a first portion 6a having video 4 encoded thereinto at a first information content amount, and a further portion 6b having video 4 encoded thereinto at an information content amount greater than the one of portion 6a. The information content amount of portions 6a and 6b may differ, for example, in quality or fidelity, i.e. in the amount of pixel-wise deviation from the original video 4, and/or in spatial resolution. However, other forms of differences of information content amount may also apply such as, for example, color fidelity or the like. Portion 6a may be called base layer data stream or base layer substream, while portion 6b may be called enhancement layer data stream or enhancement layer substream.

Scalable video encoder 2 is configured to exploit redundancies between the versions 8a and 8b of video 4 reconstructible from base layer substream 6a without enhancement layer substream 6b on the one hand and both substreams 6a and 6b on the other hand, respectively. In order to do so, scalable video encoder 2 may use inter-layer prediction.

As shown in FIG. 1, scalable video encoder 2 may alternatively receive two versions 4a and 4b of video 4, both versions differing from each other in the amount of information content just as base layer and enhancement layer substreams 6a and 6b do. Then, for example, scalable video encoder 2 would be configured to generate substreams 6a and 6b such that base layer substream 6a has version 4a encoded thereinto, while enhancement layer data stream 6b, using inter-layer prediction based on the base layer substream 6b, has encoded thereinto version 4b. The encoding of substreams 6a and 6b may both be lossy.

Even if scalable video encoder 2 merely receives the original version of video 4, same may be configured to derive therefrom the two versions 4a and 4b internally, such as for example by obtaining the base layer version 4a by spatial down-scaling and/or tone mapping from higher bit depth to lower bit depth.

Figure 2:
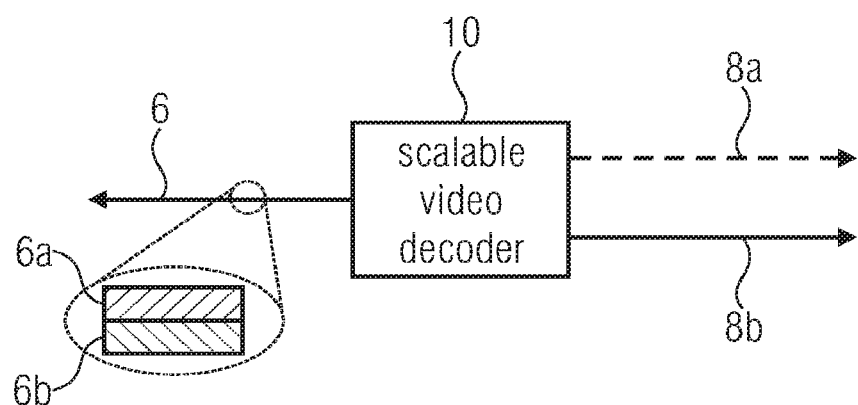
FIG. 2 shows a block diagram of a scalable video decoder fitting to the scalable video encoder of FIG. 1, in which the embodiments and aspects described herein may be implemented likewise.

FIG. 2 shows a scalable video decoder fitting to the scalable video encoder of FIG. 1 and also, in the same manner, suitable for incorporating any of the subsequently outlined embodiments. The scalable video decoder of FIG. 2 is generally indicated using reference sign 10 and is configured to decode the coded data stream 6 so as to reconstruct therefrom the enhancement layer version 8b of the video if both portions 6a and 6b of data stream 6 arrive at scalable video decoder 10 in an intact manner, or base layer version 8a if, for example, portion 6b is not available due transmission loss or the like, for example. That is, scalable video decoder 10 is configured such that same is able to reconstruct version 8a from base layer substream 6a solely, and to reconstruct version 8b from both portions 6a and 6b using inter-layer prediction.

Figure 3:
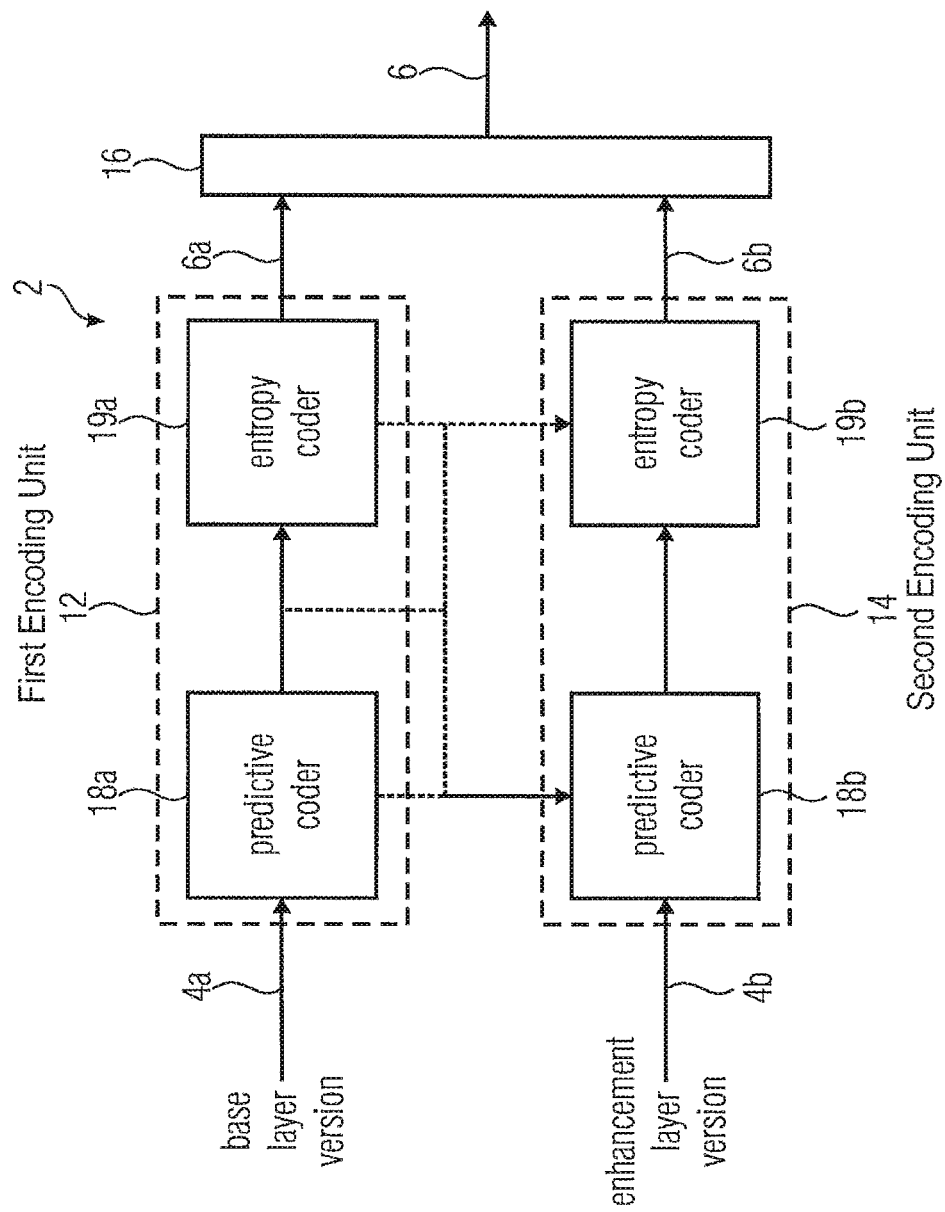
FIG. 3 shows a block diagram of a more specific embodiment for a scalable video encoder in which the embodiments and aspects described herein may be implemented.

Before describing details of embodiments of the present application in more detail below, i.e. embodiments showing as to how the embodiments of FIGS. 1 and 2 may be specifically embodied, more detailed implementations of the scalable video encoder and decoder of FIGS. 1 and 2 are described with respect to FIGS. 3 and 4. FIG. 3 shows a scalable video encoder 2 as comprising a base layer coder 12, an enhancement layer coder 14 and a multiplexer 16. Base layer coder 12 is configured to encode base layer version 4a of the inbound video, while enhancement layer coder 14 is configured to encode the enhancement layer version 4b of the video. Accordingly, multiplexer 16 receives the base layer substream 6a from base layer coder 12 and the enhancement layer substream 6b from the enhancement layer coder 14 and multiplexes both into coded data stream 6 at its output.

As shown in FIG. 3, both coders 12 and 14 may be predictive coders using, for example, spatial and/or temporal prediction in order to encode the respective inbound version 4a and 4b into the respective substreams 6a and 6b, respectively. In particular, coders 12 and 14 may be hybrid video block coders, respectively. That is, each one of coders 12 and 14 may be configured to, on a block-by-block basis, encode the respective inbound version of the video while choosing, for example, between different prediction modes for each block of the blocks into which the pictures or frames of the respective video version 4a and 4b, respectively, are subdivided. The different prediction modes of base layer coder 12 may comprise spatial and/or temporal prediction modes, while enhancement layer coder 14 may additionally support an inter-layer prediction mode. The subdivision into blocks may be different among base layer and enhancement layer. Prediction modes, prediction parameters for the prediction modes selected for the various blocks, prediction residual and, optionally, the block subdividing of the respective video version may be described by the respective coder 12, 14 using a respective syntax including syntax elements which, in turn, may be coded into the respective substream 6a, 6b using entropy coding. Inter-layer prediction may be exploited at one or more occasions such as, for example, in order to predict samples of the enhancement layer video, prediction modes, prediction parameters and/or the block subdividing, just to mentioned a few examples. Accordingly, both the base layer coder 12 and the enhancement layer coder 14 may comprise a predictive coder 18a, 18b, respectively, followed by an entropy coder 19a, 19b, respectively. While the predictive coder 18a,b forms the syntax element stream using predictive coding from the inbound version 4a and 4b, respectively, the entropy coder entropy encodes the syntax elements output by the respective predictive coder. As just mentioned, the inter-layer prediction of encoder 2 may pertain to different occasions in the encoding procedure of the enhancement layer, and accordingly predictive coder 18b is shown to be connected to one or more of the predictive coder 18a, the output thereof, and entropy coder 19a. Likewise, entropy coder 19b may, optionally, also take advantage of inter-layer prediction, for example, such as by predicting contexts used for entropy coding from the base layer and accordingly, entropy coder 19b is optionally shown as being connected to any of the elements of the base layer coder 12.

Figure 4:
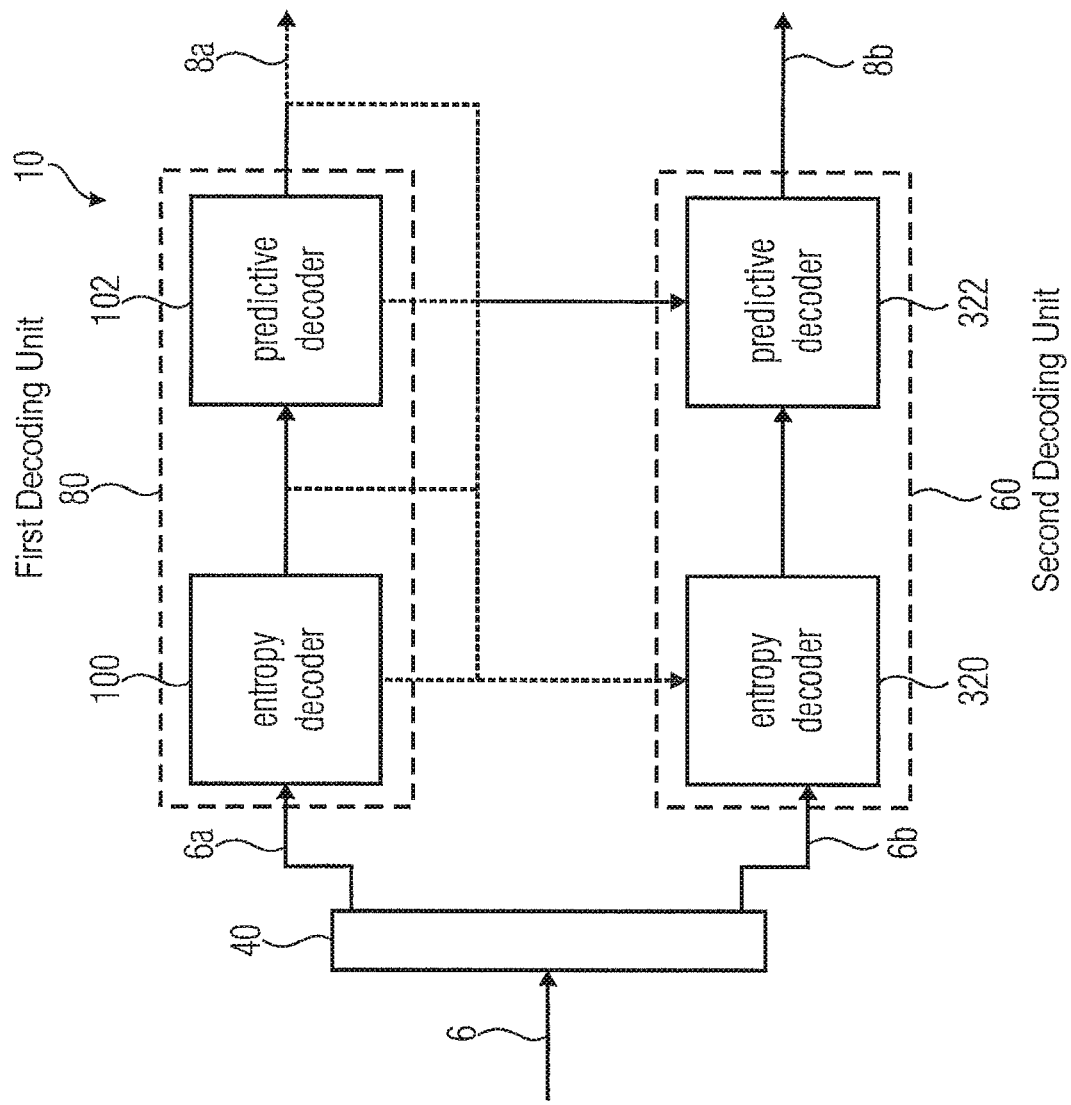
FIG. 4 shows a block diagram of a scalable video decoder fitting to the scalable video encoder of FIG. 3, in which the embodiments and aspects described herein may likewise be implemented.

In the same manner as FIG. 2 with respect to FIG. 1, FIG. 4 shows a possible implementation of scalable video decoder 10 fitting to the scalable video encoder of FIG. 3. Accordingly, the scalable video decoder 10 of FIG. 4 comprises a demultiplexer 40 receiving data stream 6 so as to obtain substreams 6a and 6b, and a base layer decoder 80 configured to decode base layer substream 6a, and an enhancement layer decoder 60 configured to decode the enhancement layer substream 6b. As shown, decoder 60 is connected to the base layer decoder 80 so as to receive information therefrom in order to take advantage of inter-layer prediction. By this measure, base layer decoder 80 is able to reconstruct the base layer version 8a from the base layer substream 6a, and the enhancement layer decoder 60 is configured to reconstruct the enhancement layer version 8b of the video using the enhancement layer substream 6b. Analogously to the scalable video encoder of FIG. 3, each of the base layer and enhancement layer decoders 60 and 80 may, internally comprise an entropy decoder 100, 320 followed by a predictive decoder 102, 322, respectively.

Figure 5:
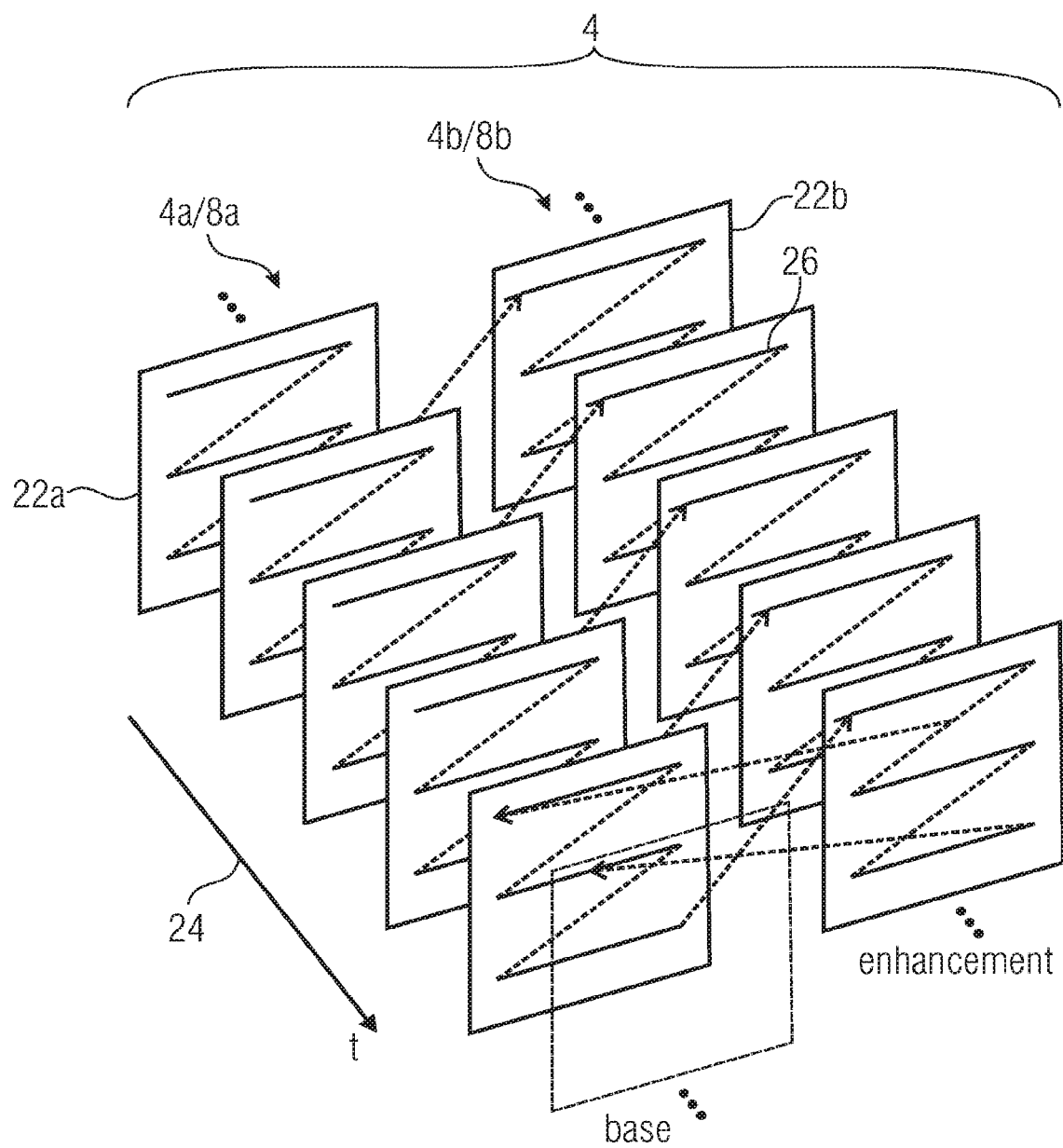
FIG. 5 shows a schematic of a video and its base layer and enhancement layer versions while additionally illustrating the coding/decoding order.

For the sake of simplifying the understanding of the following embodiments, FIG. 5 exemplarily shows the different versions of video 4, namely the base layer versions 4a and 8a deviating from each other merely by coding loss, and the enhancement layer versions 4b and 8b, respectively, which likewise merely deviate from each other by coding loss. As shown, base layer and enhancement layer signal may be composed of a sequence of pictures 22a and 22b, respectively. They are illustrated in FIG. 5 as being registered to each other along a temporal axis 24, i.e. a picture 22a of the base layer version besides the temporally corresponding picture 22b of the enhancement layer signal. As described above, picture 22b may have a higher spatial resolution and/or may represent the video 4 at a higher fidelity such as, for example, at a higher bit depth of the sample values of the pictures. By using continuous and dashed lines, a coding/decoding order is shown to be defined among pictures 22a, 22b. According to the example illustrated in FIG. 5, the coding/decoding order traverses pictures 22a and 22b in a manner so that the base layer picture 22a of a certain time stamp/instance is traversed prior to the enhancement layer picture 22b of the same time stamp of the enhancement layer signal. Regarding the temporal axis 24, the pictures 22a, 22b may be traversed by the coding/decoding order 26 in presentation time order, but an order deviating from the presentation time order of pictures 22a, 22b would also be feasible. Neither encoder nor decoder 10, 2 needs to sequentially encode/decode along the coding/decoding order 26. Rather, parallel coding/decoding may be used. The coding/decoding order 26 may define an availability of between portions of base and enhancement layer signals neighboring each other, in a spatial, temporal and/or inter-layer sense, so that, at the time of coding/decoding a current portion of the enhancement layer, the available portions for that current enhancement layer portion are defined via the coding/decoding order. Accordingly, merely neighboring portions being available in accordance with this coding/decoding order 26 are used for prediction by the encoder so that the decoder has a access to the same source of information for redoing the prediction.

With respect to the following figures, it is described how a scalable video encoder or decoder such as those described above with respect to FIGS. 1 to 4, could be implemented so as to form an embodiment of the present application in accordance with one aspect of the application. Possible implementations of the aspect described now are discussed in the following using the indication "aspect C".

Figure 6:
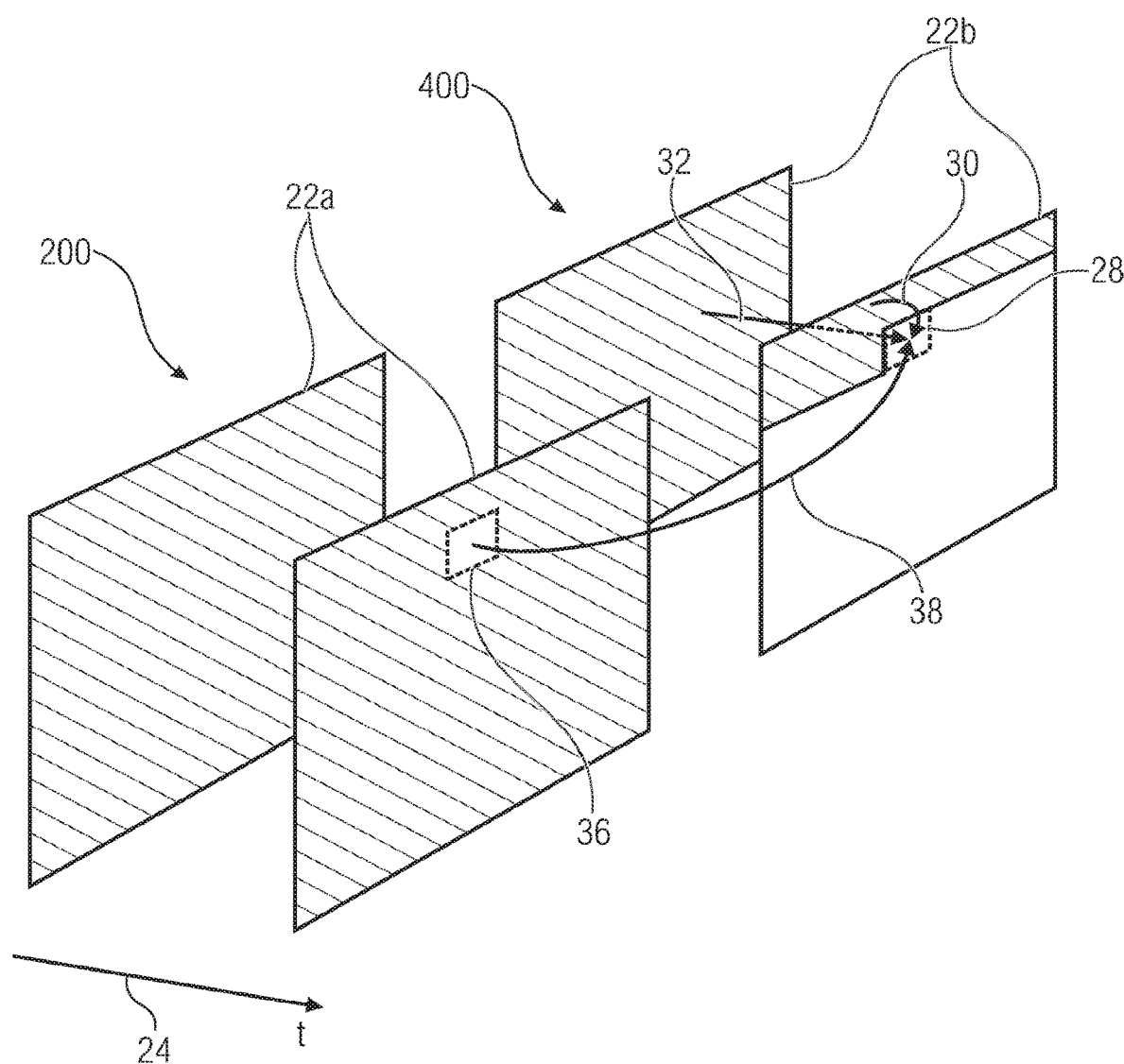
FIG. 6 shows a schematic of a portion of a layered video signal in order to illustrate possible prediction modes for the enhancement layer.

In particular, FIG. 6 illustrates pictures 22b of the enhancement layer signal, here indicated using reference sign 360, and pictures 22a of the base layer signal, here indicated using reference sign 200. Temporally corresponding pictures of the different layers are shown in a manner registered to each other with respect to temporal axis 24. Using hatching, portions within the base and enhancement layer signals 200 and 36, which have already been coded/decoded according to the coding/decoding order, are distinguished over portions not yet coded or decoded in accordance with the coding/decoding order shown in FIG. 5. FIG. 6 also shows a portion 28 of the enhancement layer signal 360, which is currently to be coded/decoded.

In accordance with the embodiments described now, the prediction of portion 28 uses both intra-layer prediction within the enhancement layer itself as well as inter-layer prediction from the base layer, so as to predict portion 28. However, the predictions are combined in a manner so that these predictions contribute to the final predictor of portion 28 in a spectrally varying manner so that, in particular, the ratio between both contributions varies spectrally.

In particular, the portion 28 is spatially or temporally predicted from an already reconstructed portion of the enhancement layer signal 400, namely any portion illustrated by hatching in FIG. 6 within enhancement layer signal 400. Spatial prediction is illustrated using arrow 30 while temporal prediction is illustrated using arrow 32. Temporal prediction may involve, for example, motion compensated prediction, according to which information on a motion vector is transmitted within the enhancement layer substream for current portion 28, the motion vector indicating a displacement of a portion of a reference picture of the enhancement layer signal 400 to be copied in order to obtain a temporal prediction of current portion 28. Spatial prediction 30 may involve extrapolating spatially neighboring, already coded/decoded portions of the picture 22b, spatially neighboring current portion 28, into the current portion 28. To this end, intra prediction information such as an extrapolation (or angular) direction, may be signaled within the enhancement layer substream for current portion 28. A combination of spatial and temporal prediction 30 and 32 may be used as well. In any case, an enhancement layer internal prediction signal 34 is obtained thereby as illustrated in FIG. 7.

In order to obtain another prediction of current portion 28, inter-layer prediction is used. To this end, the base layer signal 200 is subject to a resolution or quality refinement at a portion 36 spatially and temporally corresponding to current portion 28 of the enhancement layer signal 400, so as to obtain a potentially resolution increased inter-layer prediction signal for current portion 28, with a refinement procedure being illustrated using arrow 38 in FIG. 6, resulting in the inter-layer prediction signal 39, as shown in FIG. 7.

Figure 7:
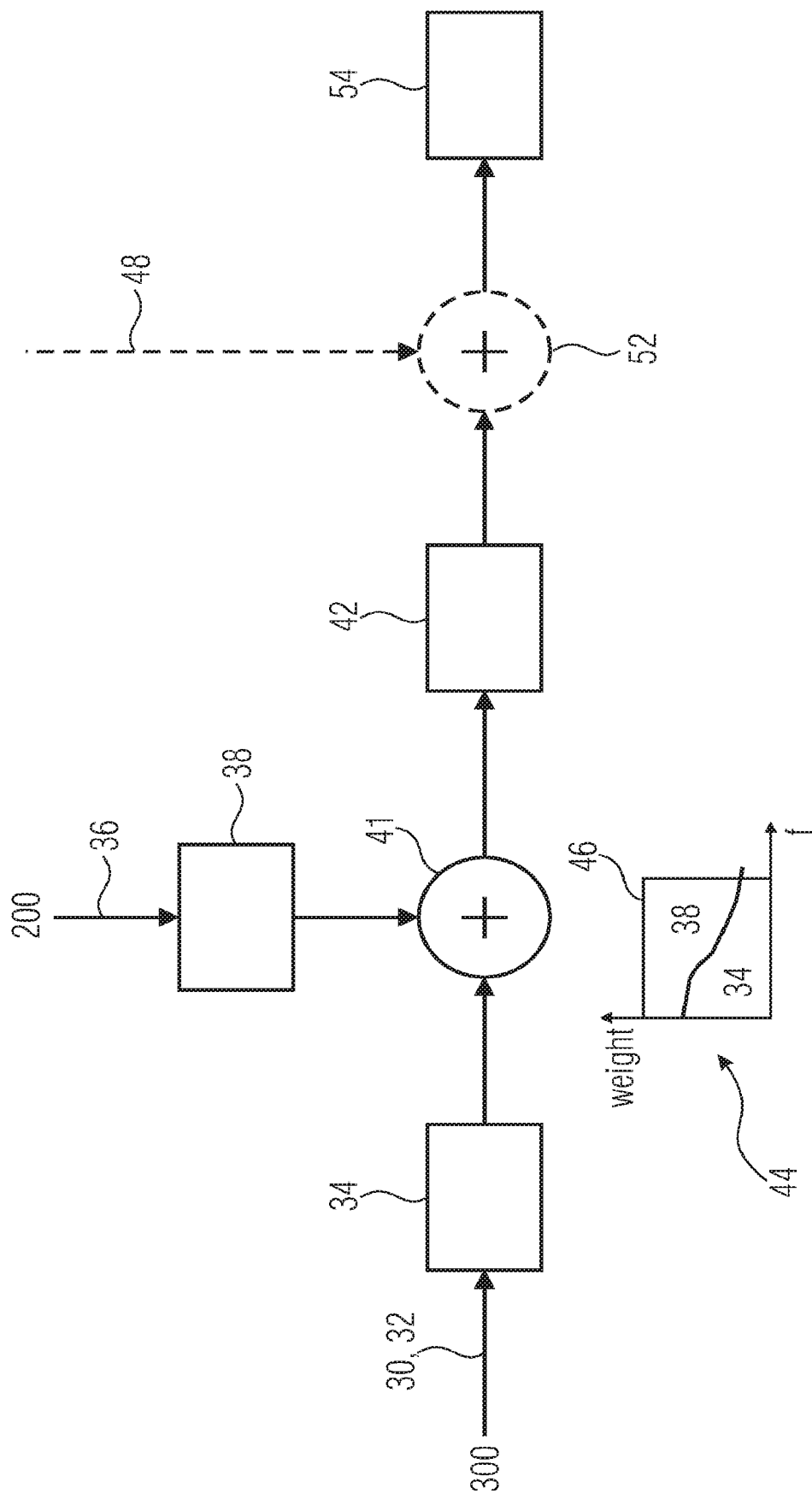
FIG. 7 shows the formation of an enhancement layer prediction signal using a spectrally varying weighting between an enhancement layer internal prediction signal and an inter-layer prediction signal in accordance with an embodiment.
Figure 8:
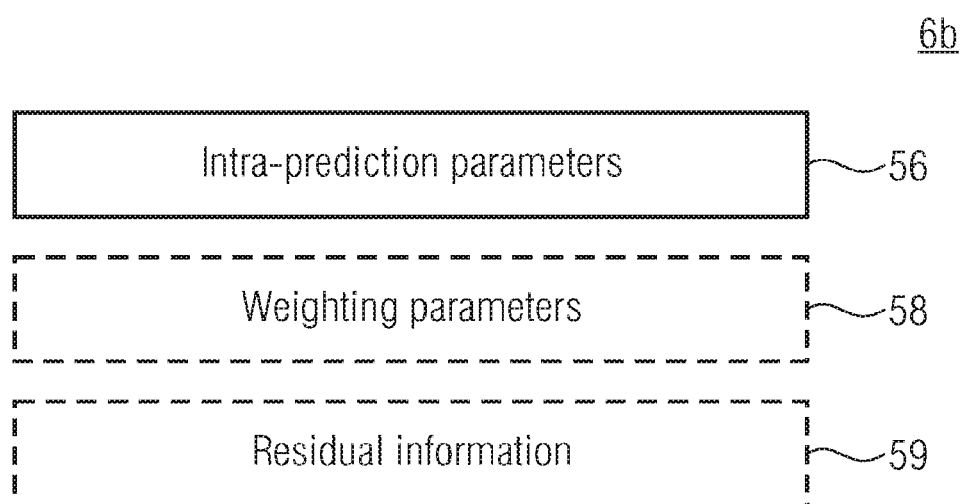
FIG. 8 shows a schematic of syntax elements possibly contained within the enhancement layer substream in accordance with an embodiment.

Accordingly, two prediction contributions 34 and 39 exist for the current portion 28, and a weighted average of both contributions is formed to obtain an enhancement layer prediction signal 42 for the current portion 28 in a manner so that the weights at which the inter-layer prediction signal and the enhancement layer internal prediction signal contribute to the enhancement layer prediction signal 42 vary differently over spatial frequency components as illustrated schematically at 44 in FIG. 7, where exemplarily a graph shows the case where, for every spatial frequency component, the weight at which prediction signals 34 and 38 contribute to the final prediction signal add up to the same value 46 for all spectral components, however with spectral varying ratio between the weight applied to prediction signal 34 and the weight applied to prediction signal 39.

While the prediction signal 42 may be directly used by the enhancement layer signal 400 at current portion 28, alternatively a residual signal may be present within the enhancement layer substream 6b for current portion 28 resulting, by a combination 50 with the prediction signal 42 such as, for example, an addition as illustrated in FIG. 7, in the reconstructed version 54 of the current portion 28. As an intermediary note, it is noted that both scalable video encoder and decoder may be hybrid video decoder/encoders using predictive coding with using transform coding so as to encode/decode the prediction residual.

Summarizing the description of FIGS. 6 and 7, the enhancement layer substream 6b may comprise, for current portion 28, intra prediction parameters 56 for controlling the spatial and/or temporal prediction 30, 32, and, optionally, weighting parameters 58 for controlling the formation 41 of the spectrally weighted average and residual information 59 for signaling the residual signal 48. While the scalable video encoder determines all of these parameters 56, 58 and 59 accordingly and inserts same into the enhancement layer substream 6b, the scalable video decoder uses the same in order to reconstruct the current portion 28 as outlined above. All of these elements 56, 58 and 59 may be subject to some of quantization, and accordingly the scalable video encoder may determine these parameters/elements, i.e. as quantized, using a rate/distortion cost function. Interestingly, the encoder 2 uses the parameters/elements 56, 58 and 59, thus determined, itself so as to obtain the reconstructed version 54 for the current portion 28 so as to serve itself as a basis for any prediction for portions of, for example, the enhancement layer signal 400 succeeding in coding/decoding order.

Different possibilities exist for the weighting parameters 58 and how they control the formation of the spectrally weighted average in 41. For example, the weighting parameters 58 could merely signal one of two states for the current portion 28, namely one state activating the formation of the spectrally weighted average as described so far, and the other state deactivating the contribution of the inter-layer prediction signal 38 so that the final enhancement layer prediction signal 42 is, in that case, merely made up by the enhancement layer internal prediction signal 34. Alternatively, weighting parameter 58 for current portion 28 could switch between activating spectrally weighted average formation on the one hand and inter-layer prediction signal 39 forming the enhancement layer prediction signal 42 alone on the other hand. The weighting parameter 58 could also be designed to signal one of the three states/alternatives just mentioned. Alternatively, or additionally, weighting parameters 58 could control the spectrally weighted average formation 41 for the current portion 28 with respect to the spectral variation of the ratio between the weight at which prediction signals 34 and 39 contribute to the final prediction signal 42. Later on, it will be described that the spectrally weighted average formation 41 may involve filtering one or both of prediction signals 34 and 39 before adding same, such as using, for example, a high pass and/or low pass filter, and in that case weighting parameters 58 could signal a filter characteristic for the filter or filters to be used for the prediction of current portion 28. As an alternative, it is described hereinafter that the spectral weighting in step 41 could be achieved by a spectral component individual weighting in the transform domain, and accordingly in this case the weighting parameters 58 could signal/set these spectral component individual weighting values.

Additionally or alternatively, the weighting parameter for the current portion 28 could signal whether the spectral weighting in step 41 is to be performed in the transform domain or the spatial domain.

Figure 9:
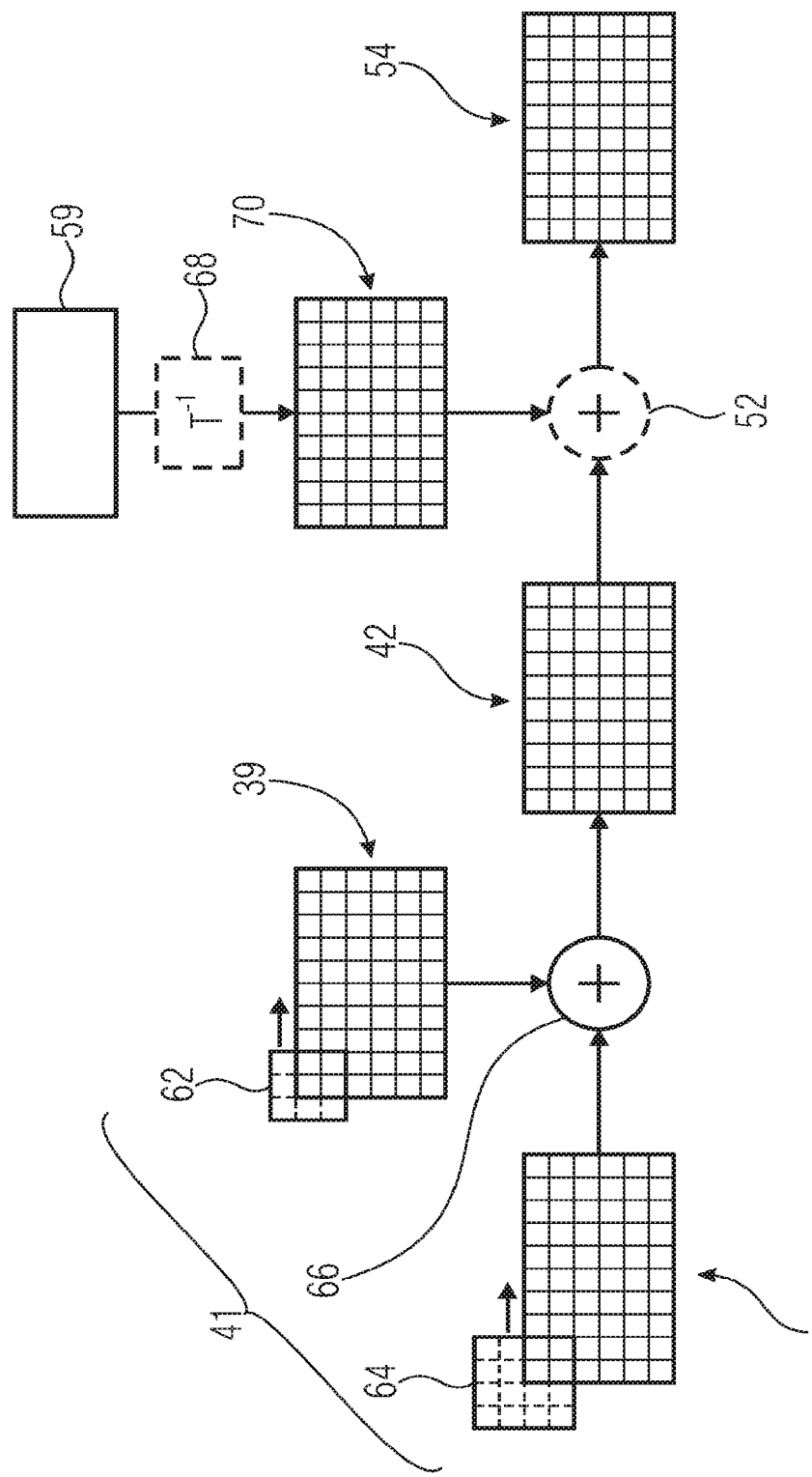
FIG. 9 shows a schematic illustrating a possible implementation of the formation of FIG. 7 in accordance with an embodiment where the formation/combination is performed in the spatial domain.

FIG. 9 illustrates an embodiment for performing the spectrally weighted average formation in the spatial domain. Prediction signals 39 and 34 are illustrated as obtained in the form of respective pixel arrays coinciding with the pixel raster of current portion 28. In order to perform the spectrally weighted average formation, both pixel arrays of both prediction signals 34 and 39 are shown to be subject to filtering. FIG. 9 illustrates the filtering illustratively by showing filter kernels 62 and 64 traversing the pixel arrays of prediction signals 34 and 39 so as to perform, for example, an FIR filtering. IIR filtering would, however, also be feasible. Furthermore, merely one of prediction signals 34 and 39 may be subject to filtering. The transfer functions of both filters 62 and 64 is different so that adding up 66 the filtering results of the pixel arrays of prediction signals 39 and 34 results in the spectrally weighted average formation result, namely the enhancement layer prediction signal 42. In other words, the adding 66 would simply add up co-located samples within prediction signal 39 and 34 as filtered using filter 62 and 64, respectively. 62 to 66 would thus result in the spectrally weighted average formation 41. FIG. 9 illustrates that in case of the residual information 59 being present in the form of transform coefficients, thereby signaling the residual signal 48 in the transform domain, an inverse transform 68 may be used to result in the spatial domain in the form of a pixel array 70 so that the combination 52 resulting in the reconstructed version 55 may be realized by a simple pixel-wise addition of the residual signal array 70 and the enhancement layer prediction signal 42.

Again, it recalled that the prediction is performed by scalable video encoder and decoders, with using the prediction for reconstruction in decoder and encoder, respectively.

Figure 10:
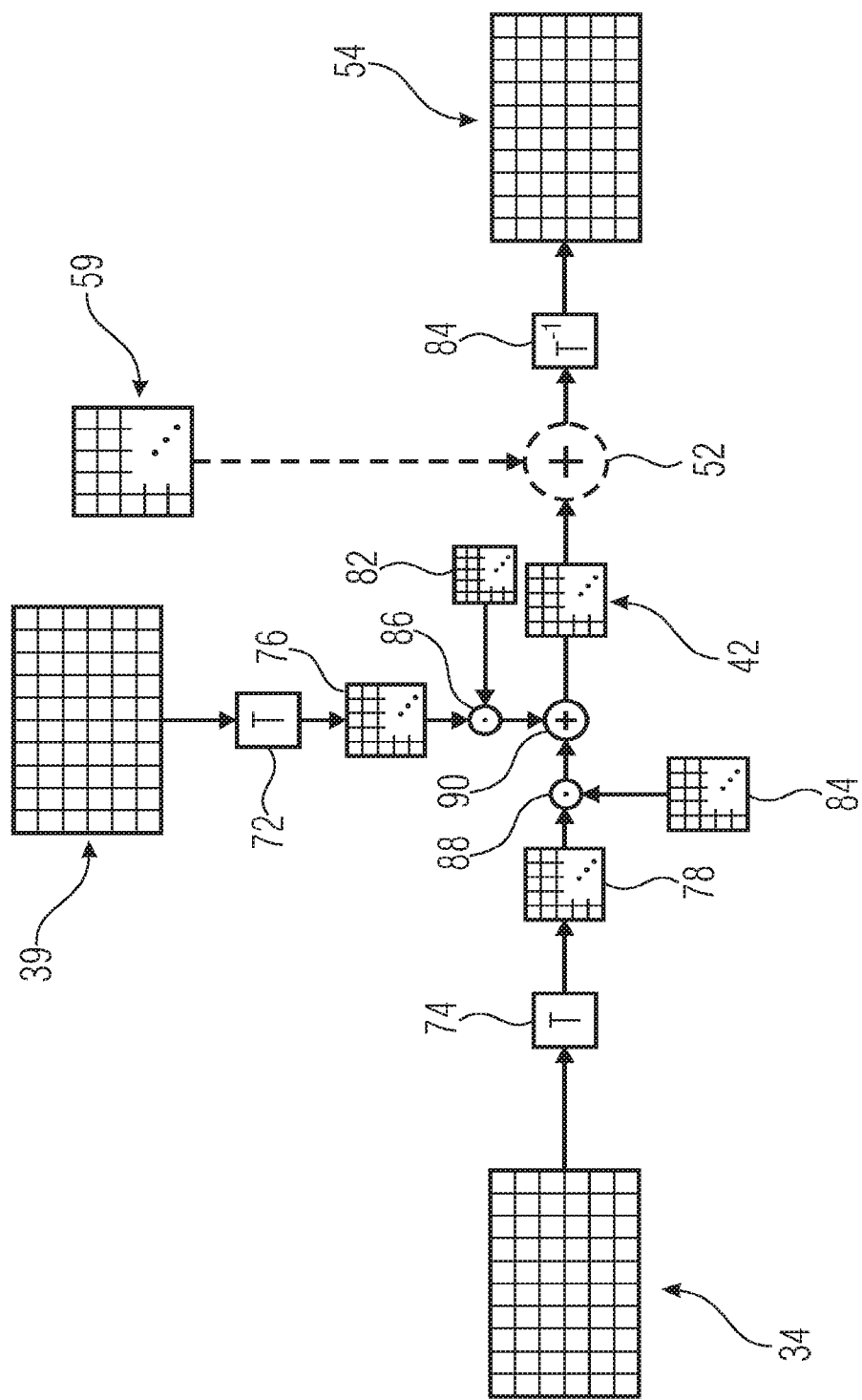
FIG. 10 shows a schematic illustrating a possible implementation of the formation of FIG. 7 in accordance with an embodiment where the formation/combination is performed in the spectral domain.

FIG. 10 shows exemplarily how to perform the spectrally weighted average formation in the transform domain. Here, the pixel arrays of the prediction signals 39 and 34 are subject to transformation 72 and 74, respectively, thereby resulting in spectral decompositions 76 and 78, respectively. Each spectral decomposition 76 and 78 is made up of an array of transform coefficients with one transform coefficient per spectral component. Each transform coefficient block 76 and 78 is multiplied with a corresponding block of weights, namely blocks 82 and 84. Thereby, at each spectral component, the transform coefficients of blocks 76 and 78 are weighted individually. At each spectral component, the weighting values of blocks 82 and 84 may add-up to a value common to all spectral components, but this is not mandatory. In effect, the multiplication 86 between block 76 and 82 and the multiplication 88 between block 78 and block 84, each represents a spectral filtering in the transform domain, and a transform coefficient/spectral component-wise adding 90 finishes the spectrally weighted average formation 41 so as to result in a transform domain version of the enhancement layer prediction signal 42 in the form of a block of transform coefficients. As illustrated in FIG. 10, in case of the residual signal 59 signaling the residual signal 48 in the form of a transform coefficients block, same may be simply transform coefficient-wise added up or otherwise combined 52 with the transform coefficient block representing the enhancement layer prediction signal 42 to result in the reconstructed version of current portion 28 in the transform domain. Accordingly, inverse transformation 84 applied to the additional result of combination 52, results in a pixel array reconstructing current portion 28, i.e. the reconstructed version 54.

As described above, the parameters present within the enhancement layer substream 6b for the current portion 28 such as the residual information 59, or the weighting parameters 58, may signal as to whether the average formation 41 is performed within the transform domain as shown in FIG. 10, or the spatial domain according to FIG. 9. For example, if the residual information 59 indicates the absence of any transform coefficient block for current portion 28, then the spatial domain could be used, or the weighting parameter 58 could switch between both domains irrespective of the residual information 59 comprising transform coefficients or not.

Later, it is described that, to obtain the layer-internal enhancement layer prediction signal, a difference signal may be computed, and managed, between an already reconstructed portion of an enhancement layer signal and the inter-layer prediction signal. Spatial prediction of the difference signal at a first portion collocated to the portion of the enhancement layer signal, currently to be reconstructed, from a second portion of the difference signal, spatially neighboring the first portion and belonging to the already reconstructed portion of the enhancement layer signal, may then be used to spatial predict the difference signal. Alternatively, temporal prediction of the difference signal at the first portion collocated to the portion of the enhancement layer signal, currently to be reconstructed, from a second portion of the difference signal, belonging to previously reconstructed frames of the enhancement layer signal may be used to obtain a temporally predicted difference signal. A combination of the inter-layer prediction signal and the predicted difference signal may then be used to obtain the layer-internal enhancement layer prediction signal, which is then combined with the inter-layer prediction signal.

With respect to the following figures, it is described how a scalable video encoder or decoder such as those described above with respect to FIGS. 1 to 4, could be implemented so as to form an embodiment of the present application in accordance with a another aspect of the application.

Figure 11:
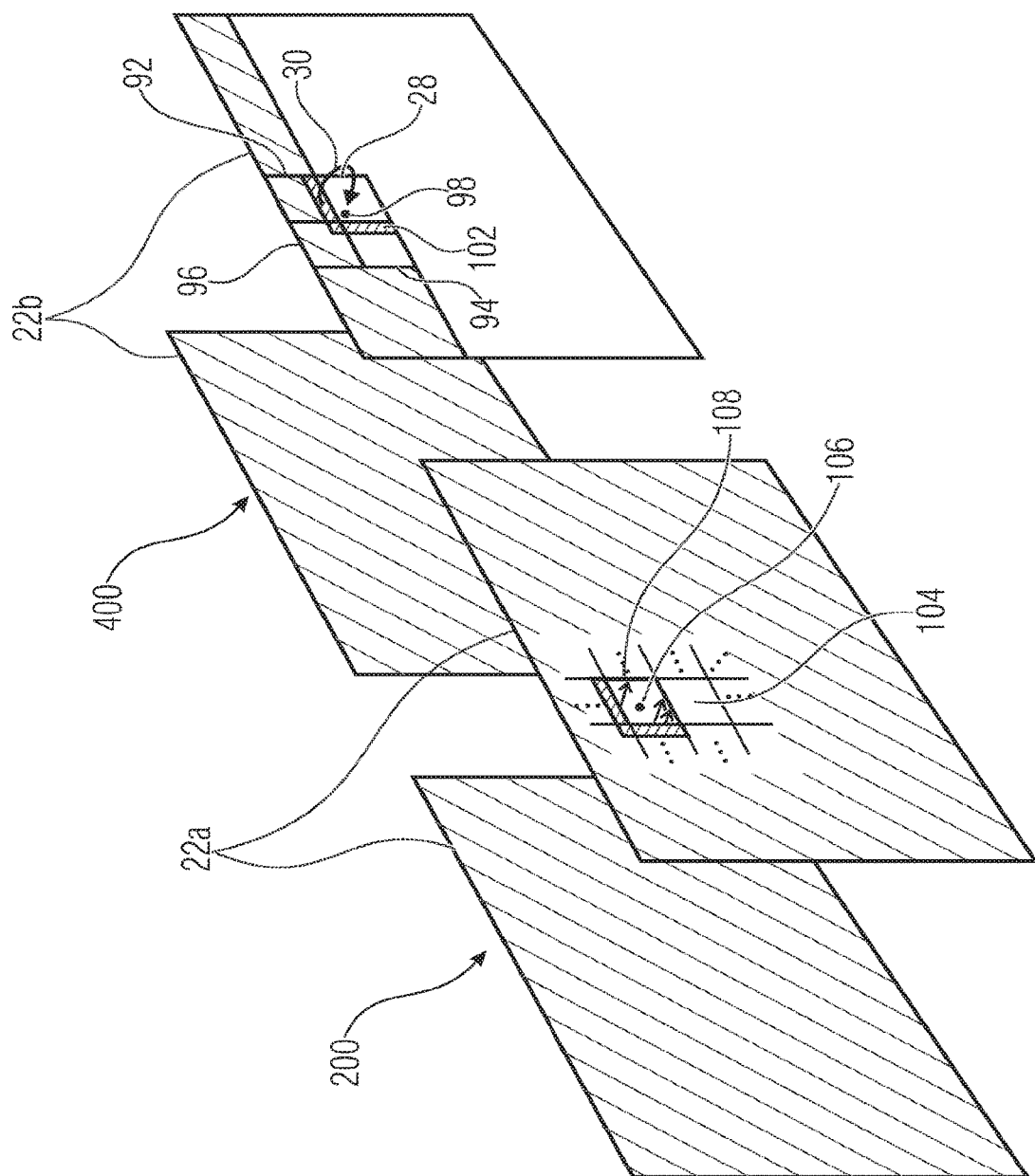
FIG. 11 shows a schematic of a portion out a layered video signal so as to illustrate spatial intra prediction parameter derivation from base layer to enhancement layer signal in accordance with an embodiment.

To explain this aspect, reference is made to FIG. 11. FIG. 11 illustrates a possibility to perform spatial prediction 30 of the current portion 28. The following description of FIG. 11 may thus be combined with the description with respect to FIGS. 6 to 10. In particular, the aspect described hereinafter will be described later on with respect to illustrative implementation examples by referring to aspects X and Y.

The situation shown in FIG. 11 corresponds to the one shown in FIG. 6. That is, base layer and enhancement layer signals 200 and 400 are shown, with the already coded/decoded portions being illustrated using hatching. The portion currently to be coded/decoded within the enhancement layer signal 400 has neighboring blocks 92 and 94, here exemplarily depicted as a block 92 above and a block 94 to the left of current portion 28, with both blocks 92 and 94 having exemplarily the same size as current block 28. The coinciding size however is not mandatory. Rather, the portions of blocks into which picture 22b of the enhancement layer signal 400 is subdivided may have different sizes. They are not even restricted to quadratic forms. They may be rectangular or of other shape. Current block 28 has further neighboring blocks not specifically depicted in FIG. 11 which, however, have not yet been decoded/coded, i.e. they follow in coding/decoding order and are thus not available for prediction. Beyond this, there may be other blocks than blocks 92 and 94 already coded/decoded in accordance with the coding/decoding order, such as block 96, which neighbor the current block 28—here exemplarily diagonally at the top left corner of the current block 28—, but blocks 92 and 94 are predetermined neighboring blocks which play a role in predicting the intra prediction parameter for current block 28 which is subject to intra prediction 30 in the example considered here. The number of such predetermined neighboring blocks is not restricted to be two. It may be higher or merely one, too.

Scalable video encoder and scalable video decoder may determine the set of predetermined neighboring blocks, here blocks 92, 94, out of the set of already coded neighboring blocks, here blocks 92 to 96, depending on, for example, a predetermined sample position 98 within current portion 28 such as the upper left sample thereof. For example, merely those already coded neighboring blocks of the current portion 28 may form the set of "predetermined neighboring blocks" which comprise sample positions immediately adjacent to predetermined sample position 98. In any case, the neighboring already coded/decoded blocks comprise samples 102 adjacent to current block 28 based on the sample values of which the area of current block 28 is to be spatially predicted. To this end, a spatial prediction parameter such as 56 is signaled in the enhancement layer substream 6b. For example, the spatial prediction parameter for current block 28 indicates a spatial direction along which sample values of samples 102 are to be copied into the area of current block 28.

In any case, at the time of spatially predicting current block 28, the scalable video decoder/encoder has already reconstructed (and encoded in case of the encoder) the base layer 200 using the base layer substream 6a, at least as far as the relevant spatially corresponding area of the temporally corresponding picture 22a is concerned such as, as described above, using block-wise prediction and using, for example, a block-wise selection between spatial and temporal prediction modes.

In FIG. 11 a few blocks 104 into which the time aligned picture 22a of the base layer signal 200 is subdivided, which lie in an area locally corresponding to, and around, current portion 28 are exemplarily depicted. Just as it is the case with spatially predicted blocks within the enhancement-layer signal 400, spatial prediction parameters are contained or signaled within the base layer substream for those blocks 104 within the base layer signal 200, for which the selection of the spatial prediction mode is signaled.

In order to allow for a reconstruction of the enhancement layer signal from the coded data stream with respect to block 28, for which here exemplarily the spatial intra-layer prediction 30 has been selected, an intra prediction parameter is used and coded within the bitstream as follows:

Intra prediction parameters are often coded using the concept of most probable intra prediction parameters, which is a rather small subset of all possible intra prediction parameters. The set of most probable intra prediction parameters may, for example, include one, two or three intra prediction parameters, while the set of all possible intra prediction parameters can for example include 35 intra prediction parameters. If the intra prediction parameter is contained in the set of most probable intra prediction parameters, it can be signaled inside the bitstream with a small number of bits. If the intra prediction parameter is not contained in the set of most probable intra prediction parameters, its signaling inside the bitstream necessitates more bits. Thus, the amount of bits to be spent for the syntax element for signaling the intra prediction parameter for the current intra-predicted block depends on the quality of the set of most probable, or probably advantageous, intra prediction parameters. By using this concept, on average a lower number of bits is necessitated for coding the intra prediction parameters, assuming that a set of most probable intra prediction parameters can be suitably derived.

Typically, the set of most probable intra prediction parameters is chosen in a way that it includes the intra prediction parameters of directly neighboring blocks and/or additional often used intra prediction parameters in form of, for example, default parameters. Since, for example, the main gradient direction of neighboring blocks is similar, it is generally advantageous to include the intra prediction parameters of neighboring blocks in the set of most probable intra prediction parameters.

However, if the neighboring blocks are not coded in an spatial intra prediction mode, those parameters are not available at the decoder side.

In scalable coding, it is however possible to use the intra prediction parameter of a co-located base layer block, and accordingly, in accordance with the aspect outlined below, this circumstance is exploited, by using the intra prediction parameters of a co-located base layer block in case of the neighboring blocks not being coded in an spatial intra prediction mode.

Thus, according to FIG. 11 a set of possibly advantageous intra prediction parameters for a current enhancement layer block is composed by inspecting intra prediction parameters of predetermined neighboring blocks and exceptionally resorting to a co-located block in the base layer in case of any of the predetermined neighboring blocks not having suitable intra prediction parameters associated therewith because, for example, the respective predetermined neighboring block not being coded in the intra prediction mode.

First of all, a predetermined neighboring block such as block 92 or 94 of the current block 28 is checked whether same has been predicted using the spatial intra prediction mode, i.e. whether the spatial intra prediction mode has been selected for that neighboring block. Depending thereon, the intra prediction parameter of that neighboring block is included in the set of probably advantageous intra prediction parameters for the current block 28 or, as a substitute, the intra prediction parameter of the co-located block 108 of the base layer, if any. This process can be performed for each of the predetermined neighboring blocks 92 and 94.

If, for example, the respective predetermined neighboring block is not a spatial intra prediction block, then instead of using default predictors or the like, the intra prediction parameter of a block 108 of the base layer signal 200 is included in the set of probably advantageous inter prediction parameters for the current block 28, which is co-located to the current block 28. For example, the co-located block 108 is determined using a predetermined sample position 98 of current block 28, namely the block 108 covering the position 106 locally corresponding to the predetermined sample position 98 within the temporally aligned picture 22a of the base layer signal 200. Naturally, beforehand a further check could be performed as to whether this co-located block 108 within the base layer signal 200 is actually a spatially intra predicted block. In the case of FIG. 11, it is exemplarily illustrated that this is the case. If, however, the co-located block is not coded in the intra prediction mode, too, then the set of possibly advantageous intra prediction parameters could be left without any contribution for that predetermined neighboring block, or a default intra prediction parameter could be used a substitute instead, i.e. the default intra prediction parameter is inserted into the set of possibly advantageous intra prediction parameters.

Thus, if block 108 co-located to current block 28 is spatially intra predicted, its intra prediction parameter signaled within the base layer substream 6a is used as a kind of substitute for any predetermined neighboring block 92 or 94 of current block 28, which does not have any intra prediction parameter due to same being coded using another prediction mode, such as a temporal prediction mode.

In accordance with another embodiment, in certain cases, the intra prediction parameter of a predetermined neighboring block is substituted by the intra prediction parameter of the co-located base layer block, even if the respective predetermined neighboring block is of the intra prediction mode. For example, a further check may be performed for any predetermined neighboring block of the intra prediction mode, as to whether the intra prediction parameter fulfills a certain criterion. If a certain criterion is not fulfilled by the intra prediction parameter of the neighboring block, but the same criterion is fulfilled by the intra prediction parameter of the co-located base layer block, then the substitution performed despite the very neighboring block being intra-coded. For example, the intra prediction parameter of the neighboring block could be replaced by the intra prediction parameter of the base layer block, if the intra prediction parameter of the neighboring block does not represent an angular intra prediction mode (but for example a DC or planar intra prediction mode), but the intra prediction parameter of the co-located base layer block represents an angular intra prediction mode.

The inter prediction parameter for the current block 28 is then determined based on a syntax element present in the coded data stream such as the enhancement layer substream 6b for the current block 28, and the set of probably advantageous intra prediction parameters. That is, the syntax element may be coded using less bits in case of the inter prediction parameter for the current block 28 being member of the set of probably advantageous intra prediction parameters than in case of being member of a remainder of the set of possible intra prediction parameters, disjoint to the set of probably advantageous intra prediction parameters.

The set of possible intra prediction parameters may encompass several angular directional modes, according to which the current block is filled by copying from the already coded/decoded adjacent samples by copying along the angular direction of the respective mode/parameter, one DC mode according to which the samples of the current block are set to a constant value determined based on the already coded/decoded adjacent samples such as, for example, by some averaging, and a plane mode according to which the samples of the current block are set to a value distribution following a linear function the slopes in x and y and the intercept of which are determined based on the already coded/decoded adjacent samples, for example.

Figure 12:
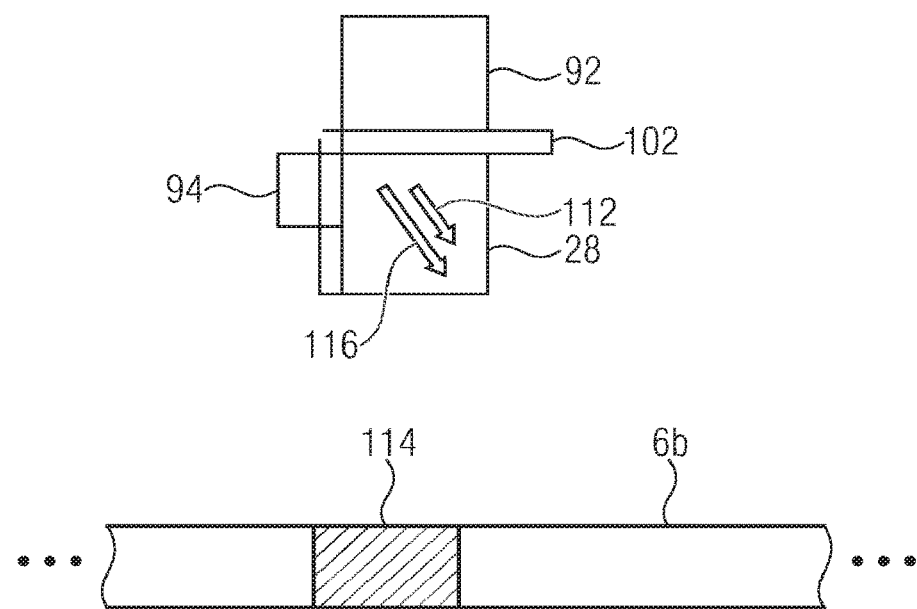
FIG. 12 shows a schematic illustrating the exploitation of the derivation of FIG. 11 in accordance with an embodiment.

FIG. 12 illustrates a possibility as to how the spatial prediction parameter substitute obtained from the co-located block 108 of the base layer could be used along with a syntax element signaled in the enhancement layer substream. FIG. 12 shows, in an enlarged manner, current block 28 along with the adjacent already coded/decoded samples 102 and the predetermined neighboring blocks 92 and 94. FIG. 12 also exemplarily illustrates an angular direction 112 as indicated by the spatial prediction parameter of the co-located block 108.

Figure 13:
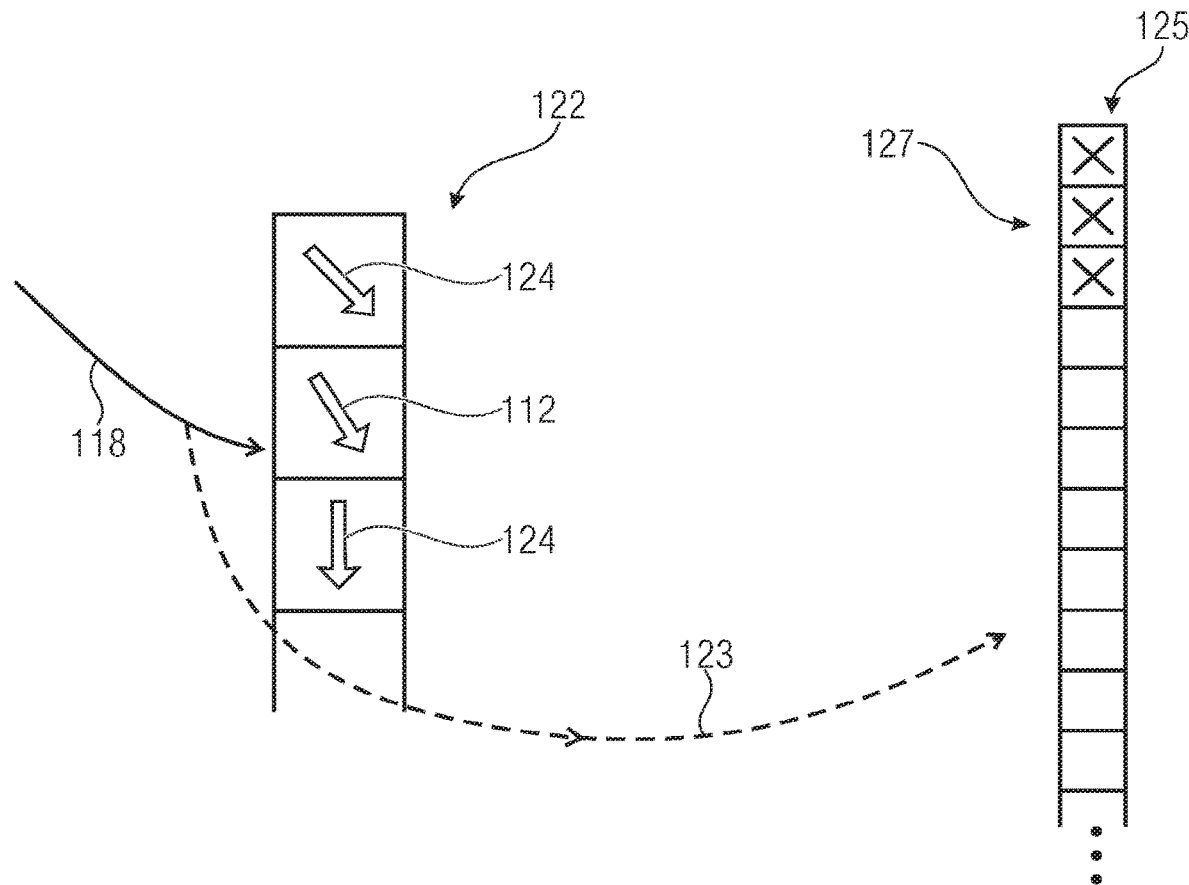
FIG. 13 shows a schematic of a set of spatial intra prediction parameter candidates into which one derived from the base layer is inserted in accordance with an embodiment.

The syntax element 114 signaled within the enhancement layer substream 6b for current block 28 could, for example, as illustrated in FIG. 13, signal, conditionally coded, an index 118 into the resulting list 122 of possible advantageous intra prediction parameters, here exemplarily illustrated as angular directions 124, or, if the actual intra prediction parameter 116 is not within the most probable set 122, in index 123 into list 125 of possible intra prediction modes, possibly excluding—as shown at 127—, the candidates of list 122, thereby identifying the actual intra prediction parameter 116. The coding of the syntax element could consume less bits, in case of the actual intra prediction parameter lying within list 122. The syntax element could, for example, comprise a flag and an index field, the flag indicating whether the index points into list 122 or list 125—including or excluding members of list 122, or the syntax element comprises a field identifying one of a member 124 of list 122 or an escape code, and, in case of the escape code, a second field identifying a member out of list 125—including or excluding members of list 122. The order among the members 124 within the list 122 may be determined, for example, based on default rules.

Thus, the scalable video decoder may obtain or retrieve the syntax element 114 from the enhancement layer substream 6b, and the scalable video encoder may insert the syntax element 114 into the same, and the syntax element 114 is then used, for example, to index one spatial prediction parameter out of list 122. In forming list 122, the above described substitution may be performed according to which the predetermined neighboring blocks 92 and 94 are checked as to whether same are of the spatial prediction coding mode type. As described, if not, the co-located block 108 is, for example, checked as to whether same, in turn, is a spatially predicted block and if yes the spatial prediction parameter of the same, such as an angular direction 112, having been used for spatially predicting this co-located block 108, is included in list 122. If the base layer block 108 does also not comprise a suitable intra prediction parameter, list 122 may be left without any contribution from the respective predetermined neighboring block 92 or 94. In order to avoid list 122 being empty because, for example, both the predetermined neighboring blocks 92, 98 as well as the co-located block 108 lacking suitable intra prediction parameters because of, for example, being inter predicted, at least one of members 124 may unconditionally be determined using a default intra prediction parameter. Alternatively, list 122 may be allowed to be empty.

Naturally, the aspect explained with respect to FIGS. 11 to 13 is combinable with the aspect outlined above with respect to FIGS. 6 to 10. The intra prediction obtained using the spatial intra prediction parameter derived via the detour over the base layer according to FIGS. 11 to 13 may in particular represent the enhancement layer internal prediction signal 34 of the aspect of FIGS. 6 to 10, so as to be, in a spectrally weighted manner, combined with the inter-layer prediction signal 38 as explained above.

With respect to the following figures, it is described how a scalable video encoder or decoder such as those described above with respect to FIGS. 1 to 4, could be implemented so as to form an embodiment of the present application in accordance with an even further aspect of the application. Later on, some additional implementation examples for the aspect described hereinafter are presented using a reference to aspects T and U.

Reference is made to FIG. 14 showing, in a temporally registered manner, pictures 22b and 22a of enhancement layer signal 400 and base layer signal 200, respectively. A portion currently to be coded/decoded is shown at 28. In accordance with the present aspect, the base layer signal 200 is predictively coded by the scalable video encoder and predictively reconstructed by the scalable video decoder, using base layer coding parameters spatially varying over the base layer signal. The spatial variation is illustrated in FIG. 14 using a hatched portion 132 within which the base layer coding parameters used for predictively coding/reconstructing the base layer signal 200 are constant, surrounded by non-hatched areas where, when transitioning from the hatched portion 132 to the non-hatched area, the base layer coding parameters change. According to the aspect outlined above, the enhancement layer signal 400 is encoded/reconstructed in units of blocks. The current portion 28 is such a block. In accordance with the aspect outlined above, a subblock subdivision for current portion 28 is selected out of a set of possible subblock subdivisions on the basis of the spatial variation of the base layer coding parameters within a co-located portion 134 of the base layer signal 200, i.e. within a spatially co-located portion of a temporally corresponding picture 22a of base layer signal 200.

Figures 15A, 15B:
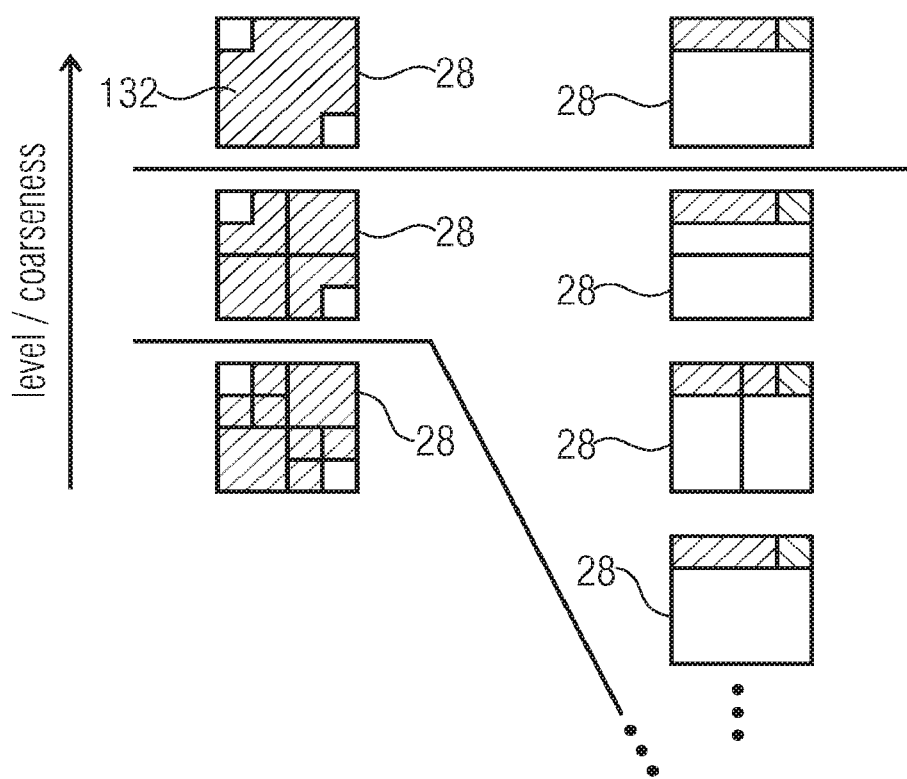
FIGS. 15A and 15B show schematically the way of selecting an appropriate subdivision for a current block using the spatial variation of the base layer motion parameters within the base layer in accordance with two different examples.

In particular, instead of signaling within the enhancement layer substream 6b subdivision information for current portion 28, the above description suggests selecting a subblock subdivision among a set of possible subblock subdivisions of current portion 28 such that the selected subblock subdivision is the coarsest among the set of possible subblock subdivisions which, when transferred onto the co-located portion 134 of the base layer signal, subdivides the base layer signal 200 such that within each subblock of the respective subblock subdivision the base layer coding parameters are sufficiently similar to each other. In order to ease the understanding, reference is made to FIG. 15A. FIG. 15A shows portion 28 having inscribed thereinto, using hatching, the spatial variation of the base layer coding parameters within the co-located portion 134. In particular, portion 28 is shown three times with different subblock subdivisions having been applied to block 28. In particular, a quad-tree subdivisioning is exemplarily used in case of FIG. 15A. That is, the set of possible subblock subdivisions is, or is defined by, a quad-tree subdivisioning and the three instantiations of subblock subdivisionings of portion 28 depicted in FIG. 15A belong to different hierarchical levels of the quad-tree subdivisioning of bock 28. From bottom to top, the level or coarseness of the subdivisioning of block 28 into subblocks increases. In the highest level, portion 28 is left as it is. In the next lower level, bock 28 is subdivided into four subblocks and at least one of the latter is subdivided further into four subblocks in the next lower level and so forth. In FIG. 15A, in each level, the quad-tree subdivisioning is selected where the number of subblocks is smallest with, nevertheless, no subblock overlaying a base layer coding parameter change border. That is, it can be seen that in the case of FIG. 15A, the quad-tree subdivisioning of block 28 which should be selected for subdividing block 28 is the lowest one shown in FIG. 15A. Here, the base layer coding parameters of the base layer are constant within each portion co-located to a respective subblock of the subblock subdivisioning.

Accordingly, no subdivisioning information for block 28 needs to be signaled within the enhancement layer substream 6b, thereby increasing the coding efficiency. Moreover, the way of obtaining the subdivisioning as just outlined is applicable irrespective of any registration of the location of current portion 28 with respect to any grid or the sample array of base layer signal 200. In particular, the subdivision derivation also works in case of fractional spatial resolution ratios between base layer and enhancement layer.

Based on the subblock subdivisioning of portion 28 thus determined, portion 28 may be predictively reconstructed/coded. With regard to the above description, it should be noted that different possibilities exist in order to "measure" the coarseness of the different available subblock subdivisions of current block 28. For example, the measure of coarseness could be determined based on the number of subblocks: the more subblocks a respective subblock subdivisioning has, the lower its level. This definition has obviously not been applied in the case of FIG. 15A where the "measure of coarseness" is determined by a combination of the number of subblocks of the respective subblock subdivisioning, and the smallest size of all subblocks of the respective subblock subdivisioning.

For the sake of completeness, FIG. 15B exemplarily shows the case of selecting a possible subblock subdivisioning out of a set of available subblock subdivisioning for a current block 28 when exemplarily using the subdivisioning of FIG. 35 as the available set. Different hatchings (and non-hatchings) show areas within which the respective co-located areas within the base layer signal have the same base layer coding parameters associated therewith.

As described above, the selection just outlined may be implemented by traversing the possible subblock subdivisions according to some sequential order, such as an order of increasing or decreasing level of coarseness, and selecting that possible subblock subdivision from which possible subblock subdivision on the circumstance that within each subblock of the respective subblock subdivision the base layer coding parameters are sufficiently similar to each other, no longer applies (in case of using a traversal according to increasing coarseness) or firstly happens to apply (in case of using a traversal according to decreasing level of coarseness). Alternatively, all possible subdivisions may be tested.

Although in the above description of FIGS. 14,15A, and 15B, the broad term "base layer coding parameters" has been used, in an embodiment, these base layer coding parameters represent base layer prediction parameters, i.e. parameters pertaining to the formation of the prediction of the base layer signal, but not pertaining to the formation of the prediction residual. Accordingly, base layer coding parameters may, for example, comprise prediction modes distinguishing, for example, between spatial prediction and temporal prediction, prediction parameters for blocks/portions of the base layer signal assigned to the spatial prediction such as angular direction, and prediction parameters for blocks/portions of the base layer signal assigned to temporal prediction such as motion parameters or the like.

Interestingly, however, the definition of "sufficiency" of similarity of base layer coding parameters within a certain subblock may be determined/defined merely over a subset of the base layer coding parameters. For example, the similarity may be determined based on the prediction modes only. Alternatively, prediction parameters further adjusting spatial and/or temporal prediction may form parameters which the similarity of base layer coding parameters within a certain subblock depends on.

Further, as already outlined above, to be sufficiently similar to each other, base layer coding parameters within a certain subblock may need to be equal to each other within the respective subblock completely. Alternatively, the measure of similarity used may need to be within a certain interval in order to fulfill the criterion of "similarity".

As outlined above, the subblock subdivision selected is not the only quantity which may be predicted or transferred from the base layer signal. Rather, the base layer coding parameters themselves may be transferred onto the enhancement layer signal so as to derive, based thereon, enhancement layer coding parameters for the subblocks of the subblock subdivision obtained by transferring the selected subblock subdivision from the base layer signal to the enhancement layer signal. As far as motion parameters are concerned, for example, scaling may be used in order to take the transition from the base layer to the enhancement layer into account. Advantageously, merely those portions, or syntax elements, of the prediction parameters of the base layer are used to set the subblocks of the current portions subblock subdivision obtained from the base layer, which influence the similarity measure. By this measure, the fact that these syntax elements of the prediction parameters within each subblock of the subblock subdivision selected, are somehow similar to each other, guarantees that the syntax elements of the base layer prediction parameters, used to predict the corresponding prediction parameters of the subblocks of the current portion 308 are similar, or even equal to each other, so that, in the first case of allowing for some variance, some meaningful "mean" of the syntax elements of the base layer prediction parameters corresponding to the base layer signal's portion covered by the respective subblock may be used as the predictor for the corresponding subblock.

However, it may also be that merely a part of the syntax elements contributing to the similarity measure, are used for predicting the prediction parameters of the subblocks of the subdivision of the enhancement layer in addition to the mere subdivision transferal itself such as merely predicting or pre-setting the modes of the subblocks of current portion 28 although the mode-specific base layer prediction parameters participate in the similarity measure determination.

Figure 16:
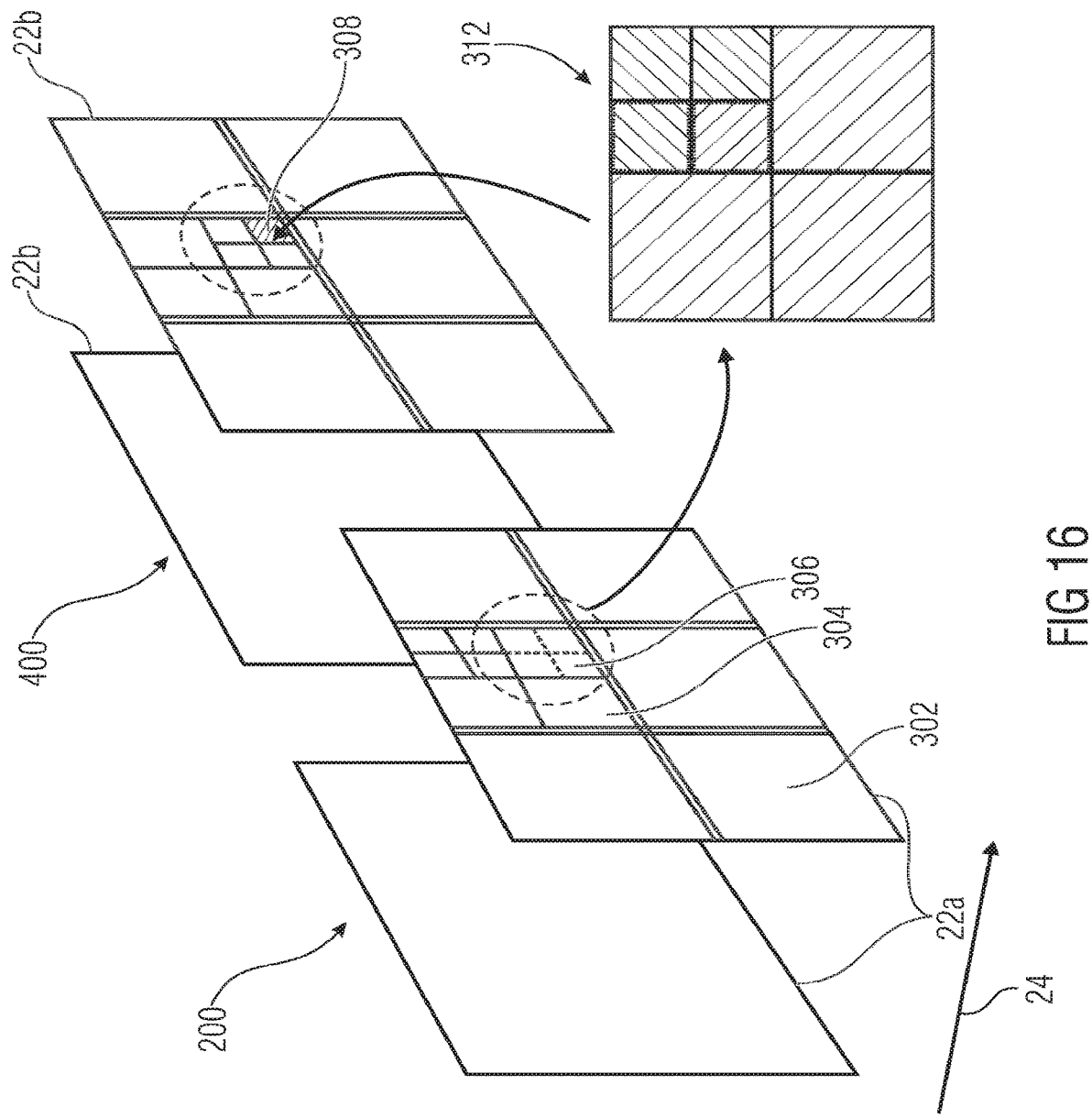
FIG. 16 schematically shows a portion out of a layered video signal so as to illustrate the use of the subblock subdivision derivation for a current enhancement layer block in accordance with an embodiment.

One such possibility of using not only the subdivision inter-layer prediction from base layer to enhancement layer will now be described with respect to the next figures, FIG. 16. FIG. 16 shows, in a manner registered along the presentation time axis 24, pictures 22b of the enhancement layer signal 400, and pictures 22a of the base layer signal 200.

In accordance with the embodiment of FIG. 16, the base layer signal 200 is predictively reconstructed by a scalable video decoder, and predictively encoded by use of a scalable video encoder, by subdividing frames 22a of the base layer signal 200 into intra-blocks and inter-blocks. In accordance with the example of FIG. 16, the latter subdivision is done in a two-stage manner: first of all, frames 22a are regularly subdivided into largest blocks or largest coding units, indicated by reference sign 302 in FIG. 16 and using a double line along the circumference thereof. Then, each such largest block 302 is subject to hierarchical quad-tree subdivision into coding units forming the aforementioned intra-blocks and inter-blocks. They are, thus, the leafs of the quad-tree subdivisioning of largest blocks 302. In FIG. 16, the reference sign 304 is used to indicate these leaf blocks or coding units. Normal, continuous lines are used to indicate the circumference of these coding units. While spatial intra prediction is used for intra-blocks, temporal inter prediction is used for inter-blocks. Prediction parameters associated with the spatial intra and temporal inter prediction, respectively, are set in units of smaller blocks, however, into which the intra- and inter-blocks or coding units 304 are subdivided. Such a subdivision is illustrated in FIG. 16 exemplarily for one of the coding units 304, using the reference sign 306 to denote the smaller blocks. Smaller blocks 304 are outlined using dashed lines. That is, in case of the embodiment of FIG. 16, the spatial video encoder has the opportunity to select, for each coding unit 304 of the base layer, between spatial prediction on the one hand and temporal prediction on the other hand. As far as the enhancement layer signal is concerned, however, the freedom is increased. In particular, here, the frames 22b of the enhancement layer signal 400 are assigned, in coding units into which frames 22b of the enhancement layer signal 400 are subdivided, to a respective one of a set of prediction modes comprising not only spatial intra prediction and temporal inter prediction, but also inter-layer prediction as will be outlined in more detail below. The subdivision into these coding units may be done in a similar manner as described with respect to the base layer signal: first of all, a frame 22b may be subdivided regularly into columns and rows of largest blocks outlined using double-lines which then are subdivided in a hierarchical quad-tree subdivision process into coding units outlined using normal, continuous lines.

One such coding unit 308 of current picture 22b of the enhancement layer signal 400 is exemplarily assumed to be assigned to the inter-layer prediction mode and is illustrated using hatching. In a manner similar to FIGS. 14, 15A and 15B, FIG. 16 illustrates at 312 how the subdivision of coding unit 308 is predictively derived by local transferal from the base layer signal. In particular, at 312 the local area overlaid by coding unit 308 is shown. Within this area, dotted lines indicate borders between neighboring blocks of the base layer signal or, more generally, boarders via which the base layer coding parameters of the base layer may possibly change. These borders could, thus, be borders of prediction blocks 306 of the base layer signal 200 and could partially coincide with borders between neighboring coding units 304 or even neighboring largest coding units 302 of the base layer signal 200, respectively. Dashed lines at 312 indicate the current coding unit's 308 subdivision into prediction blocks as derived/selected by the local transferal from the base layer signal 200. Details with regard to the local transferal were described above.

As already announced above, according to the embodiment of FIG. 16, not only the subdivision into prediction blocks is adopted from the base layer. Rather, prediction parameters of the base layer signal as used within area 312 are used for deriving the prediction parameters to be used for performing the prediction with respect to their prediction blocks of coding unit 308 of the enhancement layer signal 400, too.

In particular, according to the embodiment of FIG. 16, not only the subdivision into prediction blocks is derived from the base layer signal, but also the prediction modes having been used in the base layer signal 200 so as to code/reconstruct the respective area locally covered by the respective subblocks of the derived subdivision. One example is the following: in order to derive the subdivision of coding unit 308 in accordance with the above description, the prediction mode used in connection with the base layer signal 200 along with the associated, mode-specific prediction parameters may be used in order to determine the above discussed "similarity". Accordingly, the different hatchings indicated in FIG. 16 may correspond to different prediction blocks 306 of the base layer, each one of which may have the intra or the inter prediction mode, i.e. spatial or temporal prediction mode associated therewith. As described above, in order to be "sufficiently similar", the prediction mode used within an area co-located to a respective subblock of the subdivision of coding unit 308, and the prediction parameters being specific for the respective prediction modes within the subarea, may have to be equal to each other completely. Alternatively, some variation may be endured.

In particular, in accordance with the embodiment of FIG. 16, all blocks shown by hatchings extending from the top left to the bottom right may set to be intra prediction blocks of coding unit 308 since the locally corresponding portion of the base layer signal is covered by prediction blocks 306 having the spatial intra prediction mode associated therewith, while the others, i.e. the ones hatched from bottom left to top right, may be set to be inter prediction blocks since the locally corresponding portion of the base layer signal is covered by prediction blocks 306 having the temporal inter prediction mode associated therewith.

While in accordance with an alternative embodiment, the derivation of prediction details for performing the prediction within coding unit 308 could stop here, i.e. could be restricted to the derivation of the subdivision of coding unit 308 into prediction blocks and the assignment of these prediction blocks into ones coded using non-temporal or spatial prediction and to ones being coded using temporal prediction, it does not in accordance with the embodiment of FIG. 16.

In accordance with the latter embodiment, all prediction blocks of coding unit 308 having the non-temporal prediction mode assigned thereto, are subject to non-temporal, such as spatial intra prediction while using prediction parameters derived from the prediction parameters of the locally coinciding intra-blocks of the base layer signal 200 as the enhancement layer prediction parameters of these non-temporal mode blocks. Such derivation may thus involve the spatial prediction parameters of the locally co-located intra-blocks of the base layer signal 200. Such spatial prediction parameters may, for example, be indications of an angular direction along which spatial prediction is to be performed. As outlined above, either the similarity definition by itself necessitates that the spatial base layer prediction parameters overlaid by each non-temporal prediction block of coding unit 308 are identical to each other, or, for each non-temporal prediction block of coding unit 308, some averaging over the spatial base layer prediction parameters overlaid by the respective non-temporal prediction block is used to derive the prediction parameters of the respective non-temporal prediction block.

Alternatively, all prediction blocks of coding unit 308 having the non-temporal prediction mode assigned thereto may be subject to inter-layer prediction in the following manner: first of all, the base layer signal is subject to a resolution or quality refinement to obtain a inter-layer prediction signal, at least within those areas spatially co-located to the non-temporal prediction mode prediction blocks of coding unit 308, and then these prediction blocks of coding unit 308 are predicted using the inter-layer prediction signal.

Scalable video decoder and encoder may either subject all of coding unit 308 to the spatial prediction or to the inter-layer prediction by default. Alternatively, scalable video encoder/decoder may support both alternatives, and signaling within the coded video data stream signals which version is used as far as the non-temporal prediction mode prediction blocks of coding unit 308 are concerned. In particular, the decision among both alternatives may be signaled within the data stream at any granularity such as, for example, individually for coding unit 308.

As far as the other prediction blocks of coding unit 308 are concerned, same may be subject to temporal inter prediction using the prediction parameters which may, just as it is the case for the non-temporal prediction mode prediction blocks, be derived from the prediction parameters of the locally coinciding inter-blocks. The derivation may thus, in turn, relate to motion vectors assigned to the corresponding portions of the base layer signal.

For all other coding units having any of the spatial intra prediction mode and the temporal inter prediction mode assigned thereto, same are subject to spatial prediction or temporal prediction in the following manner: in particular, same are further subdivided into prediction blocks having a prediction mode assigned thereto which is common for all of the prediction blocks within a coding unit and is, in particular, the same prediction mode as assigned to the respective coding unit. That is, differing from coding units such as coding unit 308 which has the inter-layer prediction mode associated therewith, coding units having the spatial intra prediction mode or having the temporal inter prediction mode associated therewith, are subdivided into prediction blocks of the same prediction mode, only, namely the prediction mode inherited from the respective coding unit from which they are derived by subdivision of the respective coding unit.

The subdivision of all coding units including 308 may be a quad-tree subdivision into prediction blocks.

A further difference between coding units of the inter-layer prediction mode, such as coding unit 308, and coding units of a spatial intra prediction mode or a temporal inter prediction mode is that when subjecting prediction blocks of spatial intra prediction mode coding units or temporal inter prediction mode coding units to spatial prediction and temporal prediction, respectively, the prediction parameters are set without any dependency on the base layer signal 200 such as, for example, by way of signaling within the enhancement layer substream 6b. Even the subdivision of coding units other than those having the inter-layer layer prediction mode associated therewith such as coding unit 308, may be signaled within the enhancement layer signal 6b. That is, inter-layer prediction mode coding units such as 308 have the advantage of a low bit rate signalization need: in accordance with an embodiment, the mode indicator for the coding unit 308 itself needs not to be signaled within the enhancement layer substream. Optionally, further parameters may be transmitted for coding unit 308 such as prediction parameter residuals for the individual prediction blocks. Additionally or alternatively, a prediction residual for the coding unit 308 may be transmitted/signaled within the enhancement layer substream 6b. While the scalable video decoder retrieves this information from the enhancement layer substream, a scalable video encoder in accordance with a current embodiment determines these parameters and inserts same into the enhancement layer substream 6b.

In other words, the prediction of the base layer signal 200 may be done using the base layer coding parameters in such a manner that same spatially vary over the base layer signal 200 in units of base layer blocks 304. The prediction modes available for the base layer may comprise, for example, spatial and temporal prediction. The base layer coding parameters may further comprise prediction mode individual prediction parameters such as an angular direction as far as spatially predicted blocks 304 are concerned, and motion vectors as far as temporally predicted blocks 304 are concerned. The latter prediction mode individual prediction parameters may vary over the base layer signal in units smaller than the base layer blocks 304, namely the aforementioned prediction blocks 306. To fulfill the above outlined requirement of sufficient similarity, it may be a requirement that the prediction mode of all base layer blocks 304 overlapping an area of a respective possible subblock subdivision, are equal to each other. Merely then may the respective subblock subdivision be shortlisted to get the selected subblock subdivision. The requirement may, however, be even more strict: It could be that the prediction mode individual prediction parameters of the prediction blocks, overlapping a common area of a respective subblock subdivision, have to be equal to each other, too. Merely subblock subdivisions which fulfill this requirement with respect to each subblock of this respective subblock subdivision and the corresponding area within the base layer signal may be shortlisted to get the finally selected subblock subdivision.

Figure 15C:
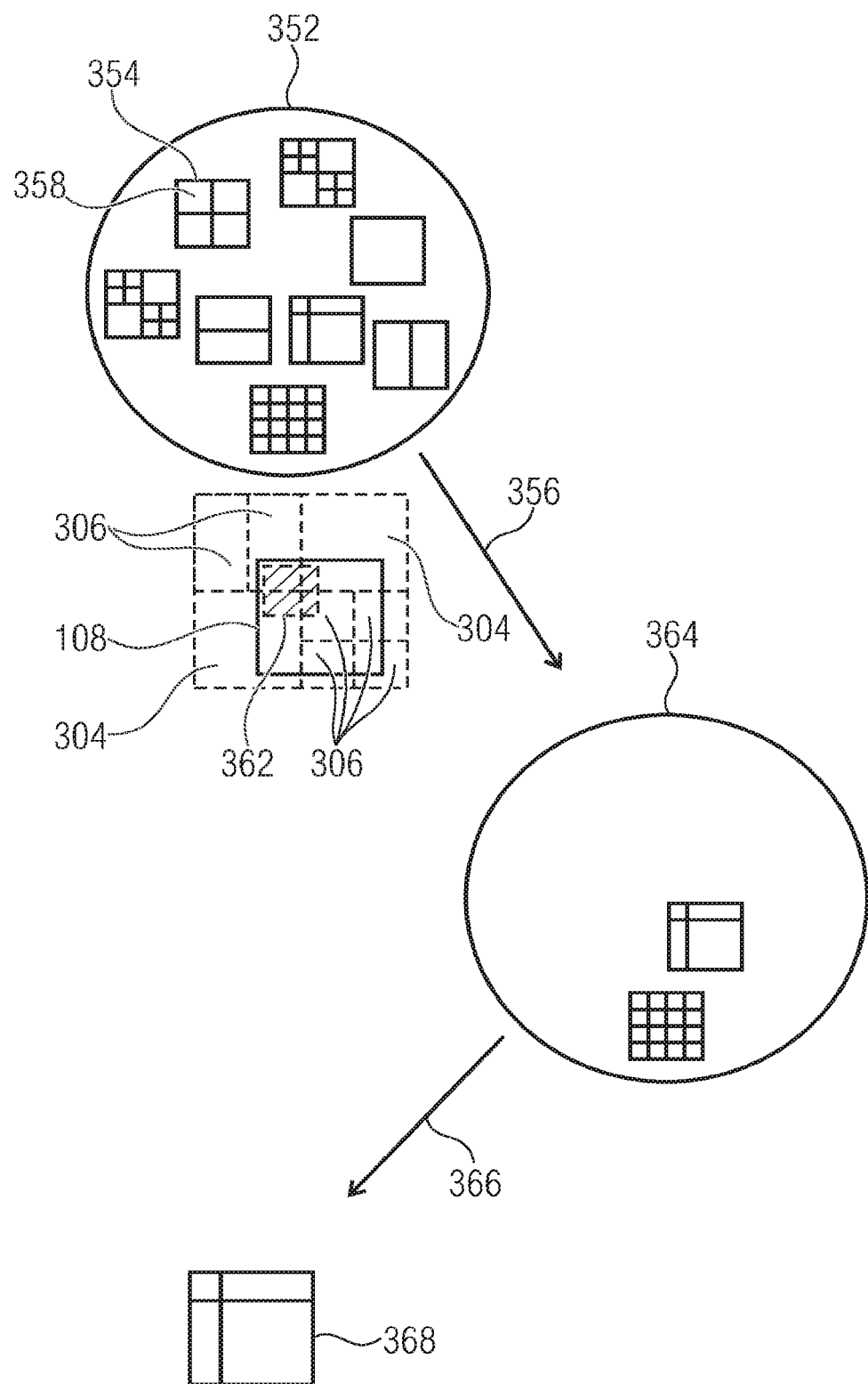
FIG. 15C schematically illustrates a first possibility of choosing a coarsest among possible subblock subdivisions for a current enhancement layer block.

In particular, as briefly outlined above, there are different possibilities as to how to perform the selection among the set of possible subblock divisions. To outline this in even further detail, reference is made to FIG. 15C and FIG. 15D. Imagine that set 352 would encompass all possible subblock subdivisions 354 of current block 28. Naturally, FIG. 15C is merely an illustrative example. The set 352 of possible or available subblock subdivisions of current block 28 could be known to scalable video decoder and scalable video encoder by default or could be signaled within the coded data stream such as, for example, for a sequence of pictures or the like. In accordance with the example of FIG. 15C, each member of set 352, i.e. each available subblock subdivision 354, is subject to a check 356, checking whether the areas into which co-located portion 108 of the base layer signal is subdivided by transferring the respective subblock subdivision 354 from enhancement layer to base layer, is merely overlaid by prediction blocks 306 and coding unit 304, the base layer coding parameters of which fulfill the requirement of sufficient similarity. See, for example, the exemplary subdivision to which the reference number 354 is attached. According to this exemplary available subblock subdivision, current block 28 is subdivided into four quadrants/subblocks 358, and the upper left subblock corresponds, in the base layer, to area 362. Obviously, this area 362 overlaps with four blocks of the base layer, namely two prediction blocks 306 and two coding units 304 which are not further subdivided into prediction blocks and thus represent prediction blocks themselves. Accordingly, if the base layer coding parameters of all of these prediction blocks overlapping area 362 fulfill the similarity criterion, and this is further the case for all subblocks/quadrants of possible subblock subdivision 354 and the base layer coding parameters overlapping their corresponding areas, then this possible subblock subdivision 354 belongs to the set 364 of subblock subdivisions, fulfilling the sufficiency requirement for all areas covered by subblocks of the respective subblock subdivision. Among this set 364, the coarsest subdivision is then selected as illustrated by arrow 366, thereby obtaining the selected subblock subdivision 368 out of set 352.

Figure 15D:
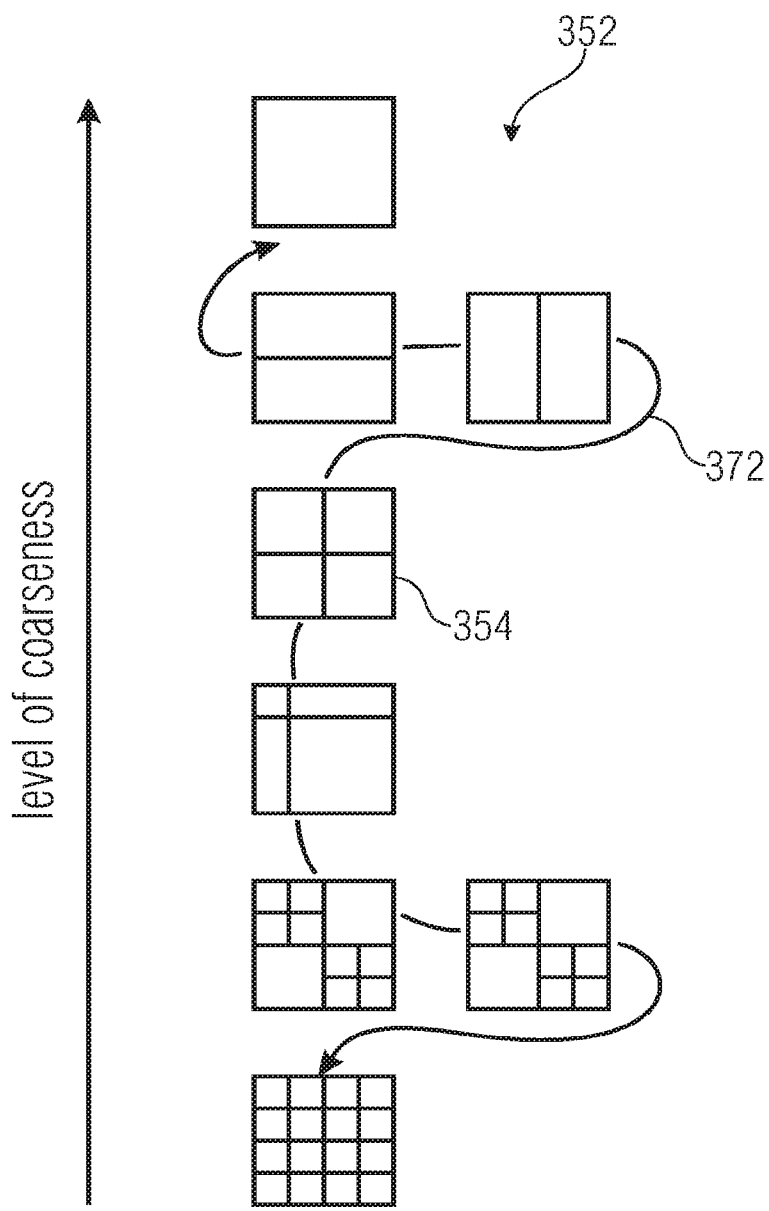
FIG. 15D schematically illustrates a second possibility of how to choose a coarsest among possible subblock subdivisions for a current enhancement layer block.

Obviously, it is favorable to try to avoid performing check 356 for all members of set 352, and accordingly, as shown in FIG. 15D and as outlined above, the possible subdivisions 354 may be traversed in an order of increasing or decreasing coarseness. The traversal is illustrated using double-headed arrow 372. FIG. 15D illustrates that the level or measure of coarseness may, at least for some of the available subblock subdivisions, be equal to each other. In other words, the ordering according to increasing or decreasing level of coarseness may be ambiguous. However, this does not disturb the searching of the "coarsest subblock subdivision" belonging to set 364, since merely one of such equally coarse possible subblock subdivisions may belong to set 364. Accordingly, the coarsest possible subblock subdivision 368 is found as soon as the result of the criterion check 356 changes from fulfilled to not-fulfilled when traversing into the direction of increasing level of coarseness, with the second to last traversed possible subblock subdivision being the subblock subdivision 354 to be selected, or when switching from not-fulfilled to fulfilled when traversing along the direction of decreasing level of coarseness, with the most recently traversed subblock subdivision being subblock subdivision 368.

With respect to the following figures, it is described how a scalable video encoder or decoder such as those described above with respect to FIGS. 1 to 4, could be implemented so as to form an embodiment of the present application in accordance with an even further aspect of the application. Possible implementations of the aspect described hereinafter are presented below referring to aspects K, A and M.

Figure 17:
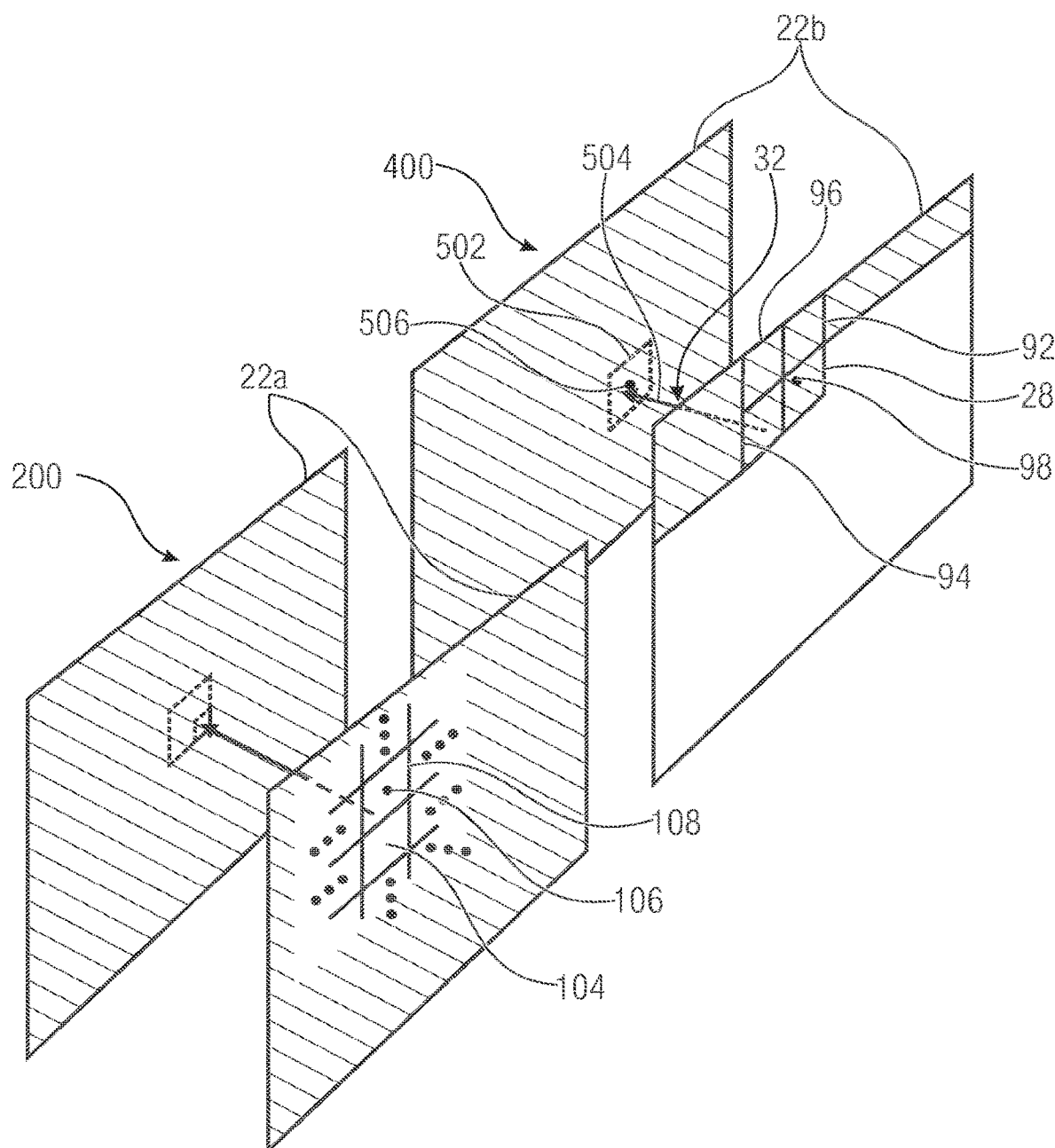
FIG. 17 shows schematically a portion out of a layered video signal so as to illustrate the exploitation of base layer hints for effectively coding enhancement layer motion parameter data in accordance with an embodiment.

To explain the aspect, reference is made to FIG. 17. FIG. 17 illustrates a possibility to temporal prediction 32 of the current portion 28. The following description of FIG. 17 may thus be combined with the description with respect to FIGS. 6 to 10 as far as the combination with the inter-layer prediction signal is concerned, or with respect to 11 to 13 as the temporal inter-layer prediction mode.

Figure 36:
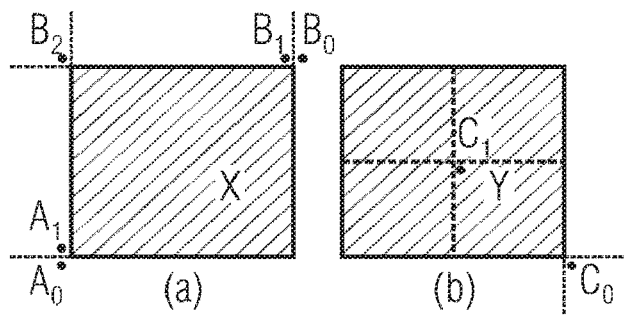
FIG. 36 illustrates positions of the motion vector predictors. (a) depicts the position of the spatial candidates and (b) depicts the positions of the temporal candidates.

The situation shown in FIG. 17 corresponds to the one shown in FIG. 6. That is, base layer and enhancement layer signals 200 and 400 are shown, with the already coded/decoded portions being illustrated using hatching. The portion currently to be coded/decoded within the enhancement layer signal 400 has neighboring blocks 92 and 94, here exemplarily depicted as a block 92 above and a block 94 to the left of current portion 28, with both blocks 92 and 94 having exemplarily the same size as current block 28. The coinciding size however is not mandatory. Rather, the portions of blocks into which picture 22b of the enhancement layer signal 400 is subdivided may have different sizes. They are not even restricted to quadratic forms. They may be rectangular or of other shape. Current block 28 has further neighboring blocks not specifically depicted in FIG. 17 which, however, have not yet been decoded/coded, i.e. they follow in coding/decoding order and are thus not available for prediction. Beyond this, there may be other blocks than blocks 92 and 94 already coded/decoded in accordance with the coding/decoding order, such as block 96, which neighbor the current block 28—here exemplarily diagonally at the top left corner of the current block 28, but blocks 92 and 94 are predetermined neighboring blocks which play a role in predicting inter prediction parameters for current block 28 which is subject to inter prediction 30 in the example considered here. The number of such predetermined neighboring blocks is not restricted to be two. It may be higher or merely one, too. Discussions of possible implementations are presented with respect to FIGS. 36 to 38.

Scalable video encoder and scalable video decoder may determine the set of predetermined neighboring blocks, here blocks 92, 94, out of the set of already coded neighboring blocks, here blocks 92 to 96, depending on, for example, a predetermined sample position 98 within current portion 28 such as the upper left sample thereof. For example, merely those already coded neighboring blocks of the current portion 28 may form the set of "predetermined neighboring blocks" which comprise sample positions immediately adjacent to predetermined sample position 98. Further possibilities are described with respect to FIGS. 36 to 38.

In any case, a portion 502 of a, according to the decoding/coding order, previously coded/decoded picture 22b of the enhancement layer signal 400, displaced from a co-located position of current block 28 by a motion vector 504 comprises reconstructed sample values based on which the sample values of portion 28 may be predicted such as by mere copying or by interpolation. To this end, the motion vector 504 is signaled in the enhancement layer substream 6b. For example, the temporal prediction parameter for current block 28 indicates a displacement vector 506 indicating the displacement of portion 502 from the co-located position of portion 28 in the reference picture 22b so as to be copied, optionally by interpolation, onto the samples of portion 28.

In any case, at the time of temporally predicting current block 28, the scalable video decoder/encoder has already reconstructed (and encoded in case of the encoder) the base layer 200 using the base layer substream 6a, at least as far as the relevant spatially corresponding area of the temporally corresponding picture 22a is concerned such as, as described above, using block-wise prediction and using, for example, a block-wise selection between spatial and temporal prediction modes.

In FIG. 17 a few blocks 104 into which the time aligned picture 22a of the base layer signal 200 is subdivided, which lie in an area locally corresponding to, and around, current portion 28 are exemplarily depicted. Just as it is the case with spatially predicted blocks within the enhancement-layer signal 400, spatial prediction parameters are contained or signaled within the base layer substream 6a for those blocks 104 within the base layer signal 200, for which the selection of the spatial prediction mode is signaled.

Figure 18:
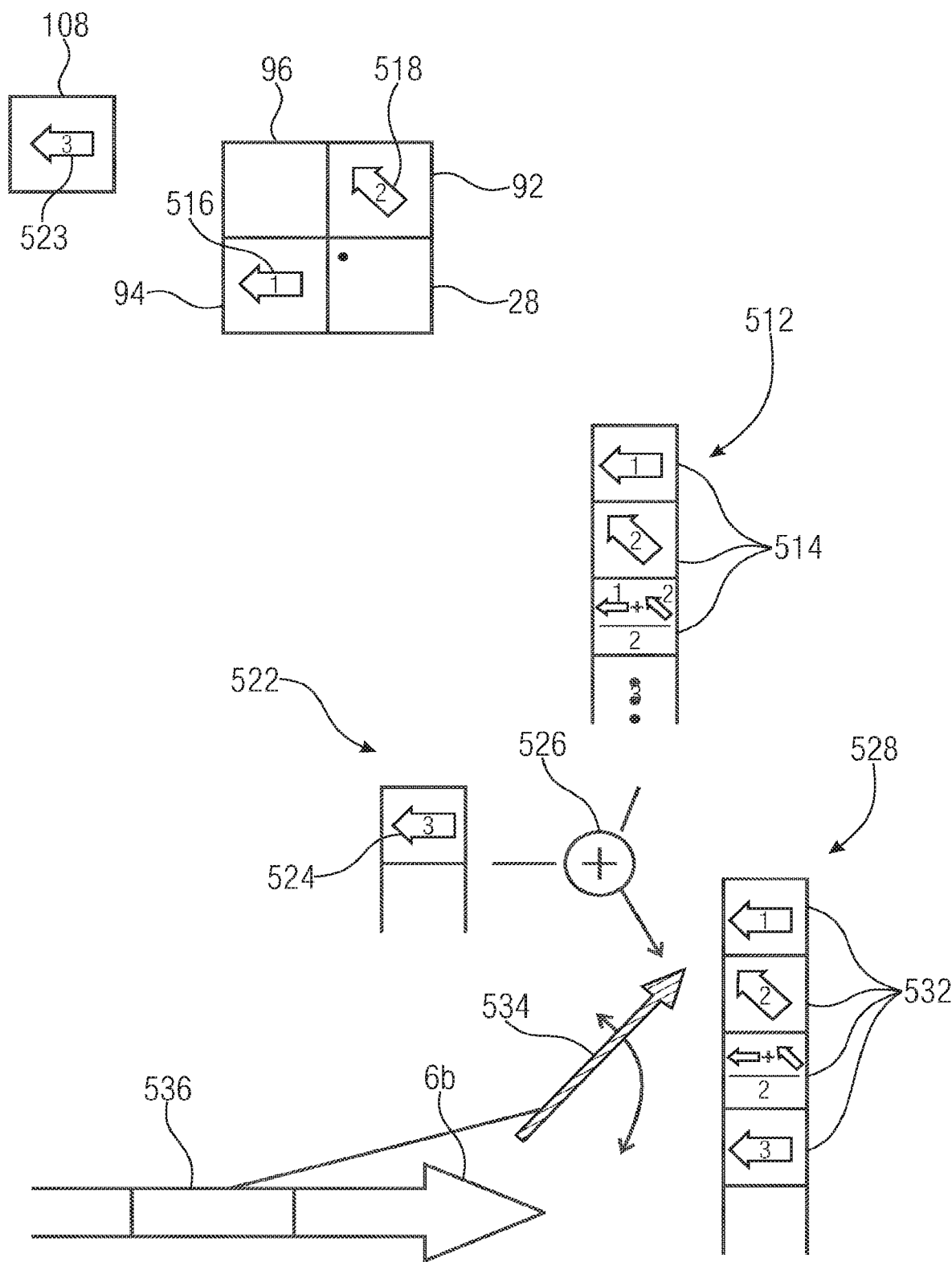
FIG. 18 schematically illustrates a first possibility of increasing the efficiency of the enhancement layer motion parameter signalization.

In order to allow for a reconstruction of the enhancement layer signal from the coded data stream with respect to block 28, for which here exemplarily the temporal intra-layer prediction 32 has been selected, an inter prediction parameter such as a motion parameter is used and determined in any of the following manners:

A first possibility is explained with respect to FIG. 18. In particular, firstly, a set 512 of motion parameter candidates 514 is gathered, or generated, from neighboring already reconstructed blocks of the frame such as the predetermined blocks 92 and 94. The motion parameters may be motion vectors. The motion vector of blocks 92 and 94 are symbolized using arrows 516 and 518 having a one and a two inscribed thereinto, respectively. As can be seen, these motion parameters 516 and 518 may form a candidate 514 directly. Some candidates may be formed by combining motion vectors such as the 518 and 516 as illustrated in FIG. 18.

Further, a set 522 of one or more base layer motion parameters 524 of a block 108 of the base layer signal 200, collocated to portion 28, is gathered or generated from the base layer motion parameters. In other words, the motion parameter associated with co-located block 108 in the base layer is used to derive one or more base layer motion parameters 524.

The one or more base layer motion parameters 524, or a scaled version thereof, is then added 526 to the set 512 of motion parameter candidates 514 so as to obtain an extended motion parameter candidate set 528 of motion parameter candidates. This may be done in any of manifold ways such as simply appending the base layer motion parameters 524 at the end of the list of candidates 514, or in a different manner for which an example is outlined with respect to FIG. 19A.

At least one of the motion parameter candidates 532 of the extended motion parameter candidate set 528, is then selected and the temporal prediction 32, by motion compensated prediction, of the portion 28 is then performed using the selected one of the motion parameter candidates of the extended motion parameter candidate set. The selection 534 may be signalized within the data stream such as substream 6b for portion 28, by way of an index 536 into list/set 528, or may be performed otherwise as explained with respect to FIG. 19A.

As described above, it could be checked as to whether the base layer motion parameter 523 has been coded in the coded data stream such as base layer substream 6a using merging or not, and, if the base layer motion parameter 523 is coded in the coded data stream using merging, the adding 526 could be suppressed.

The motion parameters mentioned in in accordance with FIG. 18 may pertain to the motion vectors only (motion vector prediction), or to the complete set of motion parameters including the number of motion hypotheses per block, reference indices, partitioning information (merging). Accordingly, the "scaled version" may stem from a scaling of the motion parameters used in the base layer signal in accordance with the spatial resolution ratio between base and enhancement layer signal in case of spatial scalability. The coding/decoding of base layer motion parameters of the base layer signal by way of the coded data stream, may involve motion vector prediction such as spatially or temporally, or merging.

The incorporation 526 of the motion parameters 523 used at a co-located portion 108 of the base layer signal into the set 528 of merging/motion vector candidates 532 enables a very effective indexing among the intra-layer candidates 514 and the one or more inter-layer candidate 524. The selection 534 may involve explicit signaling of an index into the extended set/list of motion parameter candidates in the enhancement layer signal 6b such as per prediction block, per coding unit or the like. Alternatively, the selection index 536 may be inferred from other information of the enhancement layer signal 6b or inter-layer information.

Figure 19A:
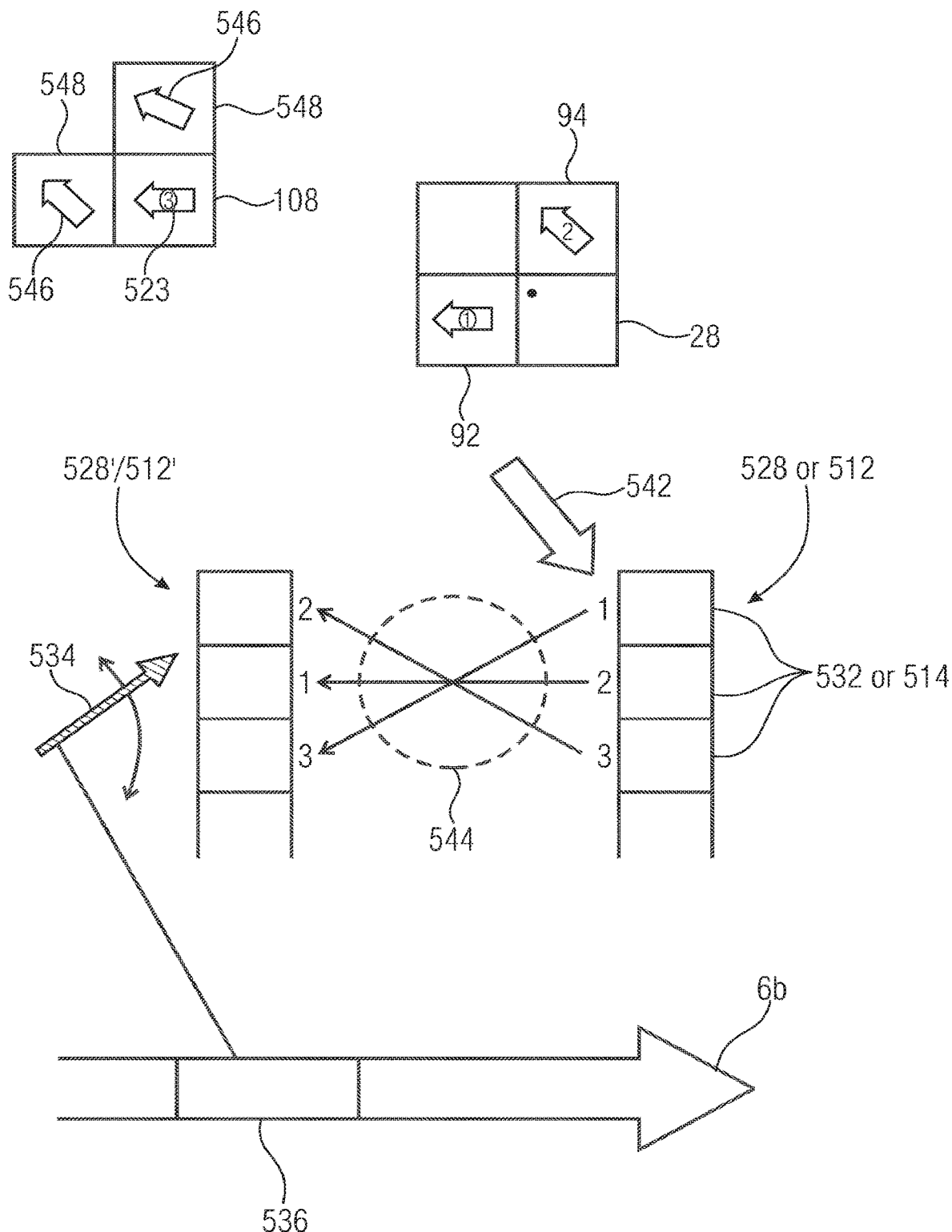
FIG. 19A shows schematically a second possibility of how to exploit base layer hints so as to render the enhancement layer motion parameter signalization more efficient.

According to the possibility of FIG. 19A, the formation 542 of the final motion parameter candidate list for the enhancement layer signal for portion 28 is merely optionally performed as outlined with respect to FIG. 18. That is, same may be 528 or 512. However, the list 528/512 is ordered 544 depending on base layer motion parameters such as, for example, the motion parameter, represented by the motion vector 523, of the co-located base layer block 108. For example, the rank of the members, i.e. motion parameter candidates, 532 or 514 of list 528/512 is determined based on a deviation of each of same to the potentially scaled version of motion parameter 523. The greater the deviation is, the lower the respective member's 532/512 rank in the ordered list 528/512' is. The ordering 544 may, thus, involve a determination of a deviation measure per member 532/514 of list 528/512. The selection 534 of one candidate 532/512 within ordered list 528/512' is then performed controlled via the explicitly signaled index syntax element 536 in the coded data stream, so as to obtain an enhancement layer motion parameter from the ordered motion parameter candidate list 528/512' for portion 28 of the enhancement layer signal, and then the temporal prediction 32, by motion compensated prediction, of portion 28 of the enhancement layer signal is performed using the selected motion parameter to which index 536 points 534.

As to the motion parameters mentioned in FIG. 19A, the same as said above with respect to FIG. 18 applies. The decoding of the base layer motion parameters 520 from the coded data stream, same may (optionally) involve spatial or temporal motion vector prediction or merging. The ordering may, as just-said, be done in accordance with a measure which measures the difference between the respective enhancement layer motion parameter candidates and the base layer motion parameters of the base layer signal, relating to a block of the base layer signal co-located to a current block of the enhancement layer signal. That is, for a current block of the enhancement layer signal, the list of enhancement layer motion parameter candidates may be determined first. Then, the ordering is performed is just-described. Thereinafter, the selection is performed by explicit signaling.

The ordering 544 may, alternatively, be done in accordance with a measure which measures the difference between the base layer motion parameter 523 of the base layer signal, relating to the block 108 of the base layer signal co-located to the current block 28 of the enhancement layer signal, and the base layer motion parameters 546 of spatially and/or temporally neighboring blocks 548 in the base layer. The determined ordering in the base layer is then transferred to the enhancement layer, so that the enhancement layer motion parameter candidates are ordered in a way that the ordering is the same as the determined ordering for the corresponding base layer candidates. In this regard, a base layer motion parameter 546 may be said to correspond to an enhancement layer motion parameter of a neighboring enhancement layer block 92, 94 when the associated base layer block 548 is spatially/temporally co-located to the neighboring enhancement layer block 92 and 94 that is associated with the considered enhancement layer motion parameters. Even alternatively, a base layer motion parameter 546 may be said to correspond to an enhancement layer motion parameter of a neighboring enhancement layer block 92, 94 when the neighborhood relation (left neighbor, top neighbor, A1, A2, B1, B2, B0 or see FIGS. 36 to 38 for further examples) between the associated base layer block 548 and the block 108 co-located to current enhancement layer block 28 is the same as the neighborhood relation between current enhancement layer block 28 and the respective enhancement layer neighboring block 92, 94. Based on the base layer ordering, the selection 534 is performed then by explicit signaling.

Figure 19B:
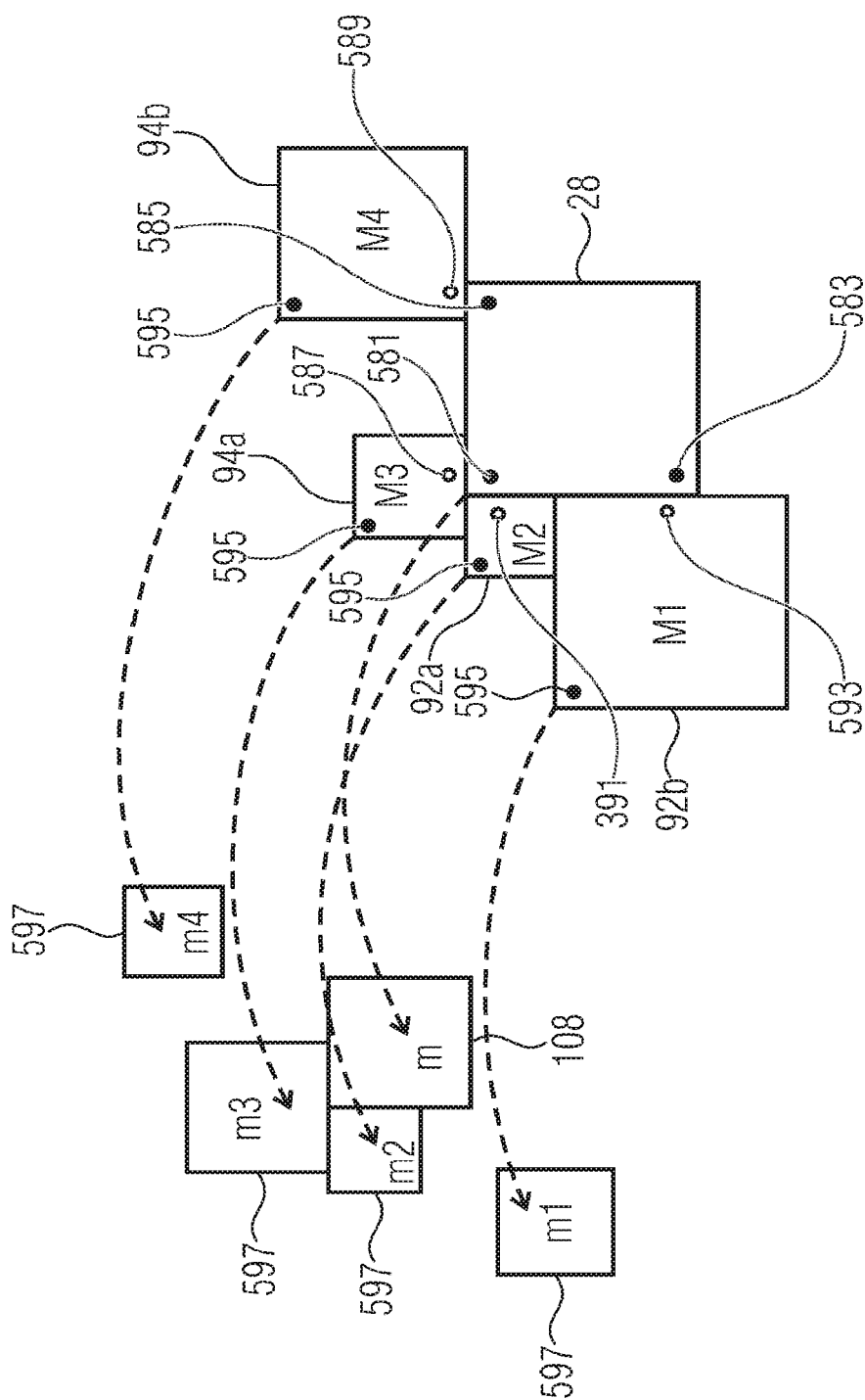
FIG. 19B illustrates a first possibility of transferring a base layer ordering onto a list of enhancement layer motion parameter candidates.

In order to explain this in more detail, reference is made to FIG. 19B. FIG. 19B shows the first of the just outlined alternatives for deriving the enhancement layer ordering for the list of motion parameter candidates by use of base layer hints. FIG. 19B shows current block 28 and three different predetermined sample positions of the same, namely exemplarily the upper left sample 581, the lower left sample 583 and the upper right sample 585. The example shall be interpreted merely as being illustrative. Imagine that the set of predetermined neighboring blocks would exemplarily encompass four types of neighbors: a neighboring block 94a covering the sample position 587 immediately adjacent and positioned above sample position 581, and a neighboring block 94b including or covering the sample position 589 adjacent to, and located immediately above, sample position 585. Likewise, neighboring blocks 92a and 92b are those blocks including the immediately adjacent sample positions 591 and 593, positioned to the left of sample position 581 and 583. Please note that the number of predetermined neighboring blocks may vary, despite the predetermined number determination rules as will be described also with respect to FIGS. 36 to 38. Nevertheless, the predetermined neighboring blocks 92a,b and 94a,b are distinguishable by the rule of their determination.

In accordance with the alternative of FIG. 19B, for each predetermined neighboring block 92a,b, 94a,b, a co-located block in the base layer is determined. For example, to this end the upper left sample 595 of each neighboring block is used, just as it is the case with current block 28 with respect to the upper left sample 581 formally mentioned in FIG. 19A. This is illustrated in FIG. 19B using dashed arrows. By this measure, for each of the predetermined neighboring blocks a corresponding block 597 is found in addition to the co-located block 108, co-located to current block 28. Using the motion parameters m1, m2, m3 and m4 of the co-located base layer blocks 597, and their respective difference to the base layer motion parameter m of the co-located base layer block 108, the enhancement layer motion parameters M1, M2, M3 and M4 of predetermined neighboring blocks 92a,b and 94a,b are ordered within list 528 or 512. For example, the larger the distance of any of m1-m4 is, the higher the corresponding enhancement layer motion parameter M1-M4 may be, i.e. higher indices may be necessitated to index same out of list 528/512'. For the distance measure, an absolute difference may be used. In a similar manner, motion parameter candidates 532 or 514 may be rearranged within the list with regard to their ranks, which are combinations of enhancement layer motion parameters M1-M4.

FIG. 19C shows an alternative where the corresponding blocks in the base layer are determined in another way. In particular, FIG. 19C shows the predetermined neighbor blocks 92a,b and 94a,b of current block 28 and the co-located block 108 of current block 28. In accordance with the embodiment of FIG. 19C, base layer blocks corresponding to those of current block 28, i.e. 92a,b and 94a,b are determined in a manner so that these base layer blocks are associable with the enhancement layer neighbor blocks 92a,b and 94a,b by using the same neighbor determination rules for determining these base layer neighbor blocks. In particular, FIG. 19C shows the predetermined sample positions of co-located block 108, i.e. the upper left, lower left, and upper right sample positions 601. Based on these sample positions, four neighbor blocks of block 108 are determined in the same manner as described with respect to the enhancement layer neighbor blocks 92a,b and 94a,b with respect to the predetermined sample positions 581, 583 and 585 of current block 28: four base layer neighbor blocks 603a, 603b, 605a and 605b are found in this manner, 603a obviously corresponds to enhancement layer neighbor block 92a, base layer block 603b corresponds to enhancement layer neighbor block 92b, base layer block 605a corresponds to enhancement layer neighbor block 94a and base layer block 605b corresponds to enhancement layer neighbor block 94b. In the same manner as described before, the base layer motion parameters M1 to M4 of the base layer blocks 903a,b and 905a,b and their distances to the base layer motion parameter m of the co-located base layer block 108 are used so as to order the motion parameter candidates within list 528/512 formed out of motion parameters M1 to M4 of the enhancement layer blocks 92a,b and 94a,b.

Figure 20:
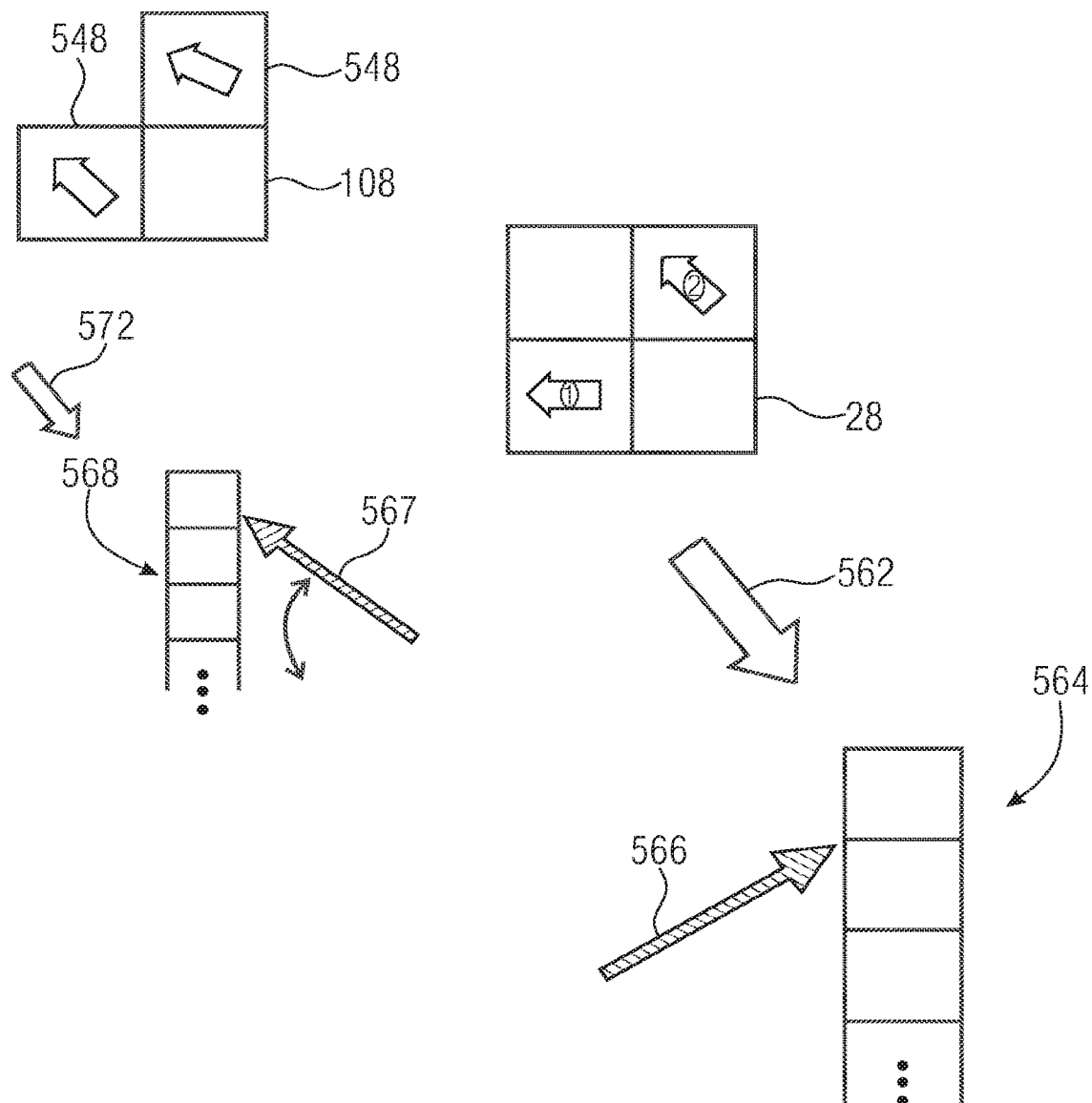
FIG. 20 schematically illustrates another possibility of exploiting base layer hints so as to render enhancement layer motion parameter signalization more efficient.

According to the possibility of FIG. 20, the formation 562 of the final motion parameter candidate list for the enhancement layer signal for portion 28 is merely optionally performed as outlined with respect to FIGS. 18 and/or 19. That is, same may be 528 or 512 or 528/512' and the reference sign 564 is used in FIG. 20. In accordance with FIG. 20, the index 566 pointing into a motion parameter candidate list 564 is determined depending on an index 567 into a motion parameter candidate list 568 having been used for coding/decoding the base layer signal with respect to co-located block 108, for example. For example, in reconstructing the base layer signal at block 108, the list 568 of motion parameter candidates may have been determined based on the motion parameters 548 of neighboring blocks 548 of block 108 having a neighborhood relation (left neighbor, top neighbor, A1, A2, B1, B2, B0 or see FIGS. 36 to 38 for further examples) to block 108 being the same as the neighborhood relation between predetermined neighboring enhancement layer blocks 92, 94 and current block 28, with the determination 572 of list 567 potentially also using the same construction rules as used in formation 562 such as the ordering among the list members of lists 568 and 564. More generally, the index 566 for the enhancement layer may be determined in a way that that neighboring enhancement layer block 92, 94 is pointed to by index 566 which is co-located with the base layer block 548 associated with the indexed base layer candidate, i.e. the one which index 567 points to. The index 567 may thus serve as a meaningful prediction of index 566. An enhancement layer motion parameter is then determined using the index 566 into the motion parameter candidate list 564 and the motion compensated prediction of block 28 is performed using the determined motion parameter.

As to the motion parameters mentioned in FIG. 20, the same as said above with respect to FIGS. 18 and 19 applies.

With respect to the following figures, it is described how a scalable video encoder or decoder such as those described above with respect to FIGS. 1 to 4, could be implemented so as to form an embodiment of the present application in accordance with an even further aspect of the application. Detailed implementations of the aspects described hereinafter are described below by reference to aspect V.

Figure 21:
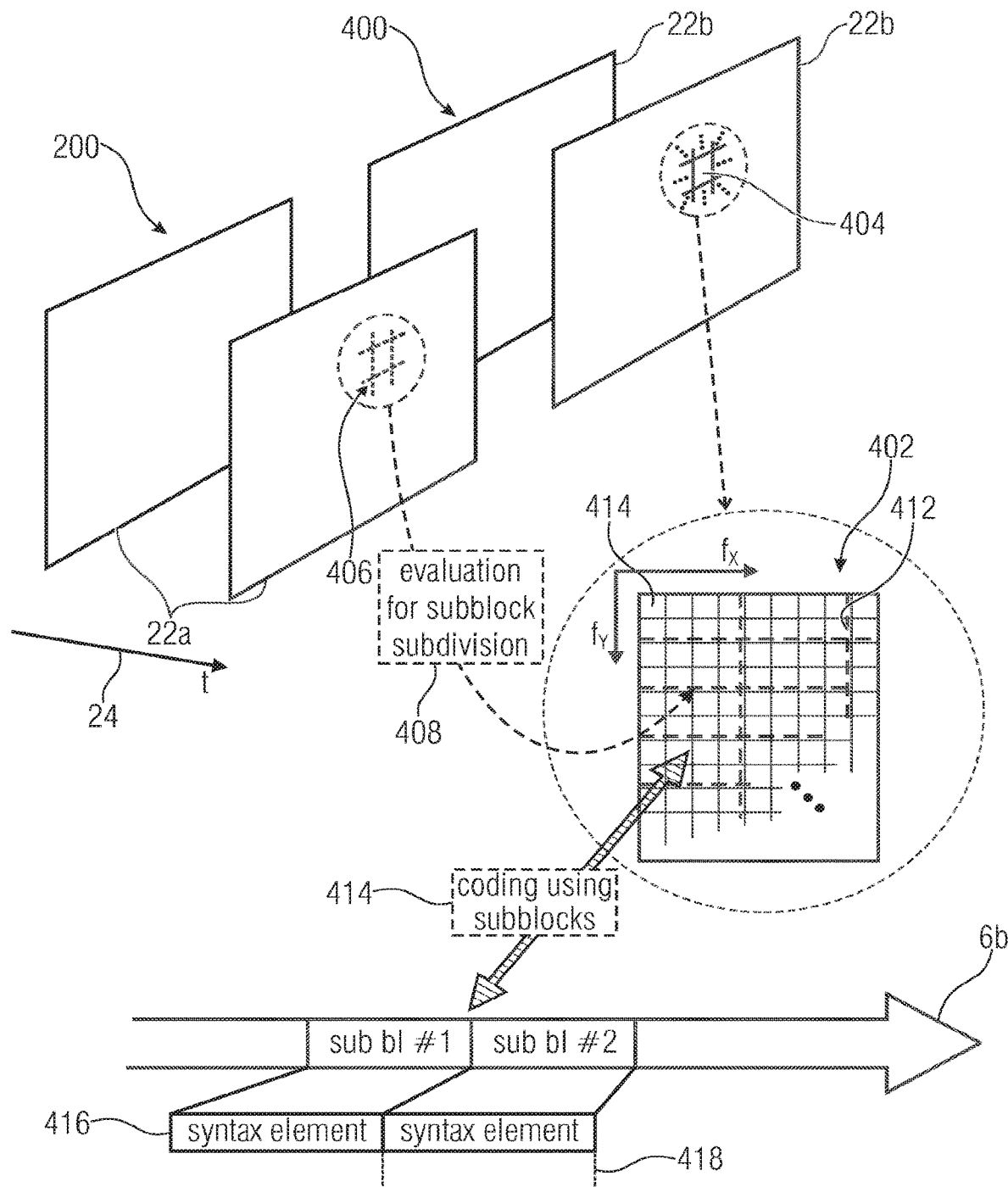
FIG. 21 schematically illustrates a portion out of a layered video signal so as to illustrate an embodiment according to which the subblock subdivision of a transform coefficient block is appropriately adjusted to hints derived from the base layer in accordance with an embodiment.

The present aspect regards residual coding within the enhancement layer. In particular, FIG. 21 shows exemplarily in a temporally registered manner picture 22b of the enhancement layer signal 400, and picture 22a of the base layer signal 200. FIG. 21 illustrates the way of reconstructing within a scalable video decoder, or encoding within a scalable video encoder, the enhancement layer signal and concentrates on a predetermined transform coefficient block of transform coefficients 402 representing the enhancement layer signal 400 and a predetermined portion 404. In other words, the transform coefficient block 402 represents a spatial decomposition of portion 404 of the enhancement layer signal 400. As described above already, in accordance with the coding/decoding order, the corresponding portion 406 of the base layer signal 200 may have already been decoded/coded at the time of decoding/coding the transform coefficient block 402. As far as the base layer signal 200 is concerned, predictive coding/decoding may have been used therefore, including the signalization of a base layer residual signal within the coded data stream, such as the base layer substream 6a.

Figure 40:
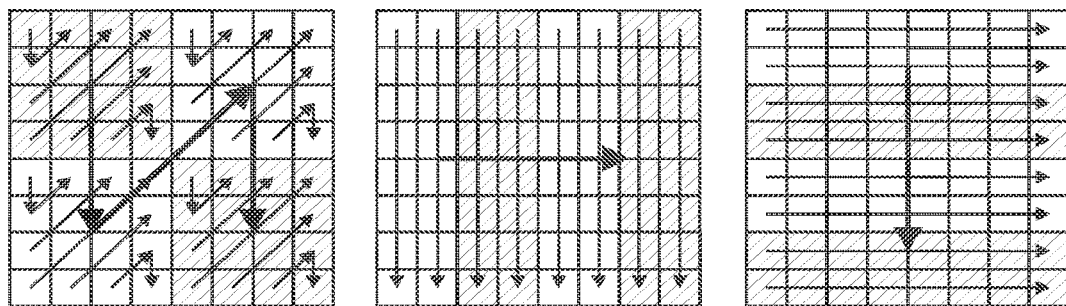
FIG. 40 illustrates scan directions for 8×8 transformation blocks (diagonal, vertical, horizontal). The shaded areas define significant sub-groups.

In accordance with the aspect described with respect to FIG. 21, scalable video decoder/encoder exploits the fact that an evaluation 408 of the base layer signal or the base layer residual signal at portion 406 co-located to portion 404 may result in an advantageous selection of the subdivision of transform coefficient block 402 into subblocks 412. In particular, several possible subblock subdivisions for subdividing the transform coefficient block 402 into subblocks may be supported by the scalable video decoder/encoder. These possible subblock subdivisions may regularly subdivide the transform coefficient block 402 into rectangular subblocks 412. That is, the transform coefficients 414 of transform coefficient block 402 may be arranged in rows and columns, and in accordance with the possible subblock subdivisions, these transform coefficients 414 are clustered into the subblocks 412 on a regular basis so that the subblocks 412 themselves are arranged in columns and rows. The evaluation 408 enables setting the ratio between the number of columns and number of rows of subblocks 412, i.e. their width and height, in a manner so that the coding of the transform coefficient block 402 using the thus selected subblock subdivision is most efficient. If, for example, the evaluation 408 reveals that the reconstructed base layer signal 200 within the co-located portion 406, or at least the base layer residual signal within the corresponding portion 406, is primarily composed of horizontal edges in the spatial domain, then the transform coefficient block 402 will most likely be populated with the significant, i.e. non-zero, transform coefficient levels, i.e. quantized transform coefficients, near the zero horizontal frequency side of the transform coefficient block 402. In case of vertical edges, the transform coefficient block 402 will most likely be populated with non-zero transform coefficient levels at positions near the zero vertical frequency side of the transform coefficient block 402. Accordingly, in the first instance, the subblocks 412 should be selected to be longer along the vertical direction and smaller along the horizontal direction and in the second instance, the subblocks should be longer in the horizontal direction and smaller in the vertical direction. The latter case is illustratively shown in FIG. 40.

That is, scalable video decoder/encoder would select a subblock subdivision among a set of possible subblock subdivisions on the basis of the base layer residual signal or the base layer signal. Then, a coding 414, or decoding, of the transform coefficient block 402 would be performed by applying the selected subblock subdivision. In particular, the positions of the transform coefficients 414 would be traversed in units of the subblocks 412 such that all positions within one subblock are traversed in an immediately consecutive manner with then proceeding to a next subblock in a subblock order defined among the subblocks. For a currently visited subblock, such as the subblock 412 for which the reference sign 412 has exemplarily been shown in 22 FIG. 40, a syntax element is signaled within the data stream such as the enhancement layer substream 6b, indicating whether the currently visited subblock has any significant transform coefficient or not. In FIG. 21, the syntax elements 416 are illustrated for two exemplary subblocks. If the respective syntax element of the respective subblock indicates an insignificant transform coefficient, nothing else needs to be transmitted within the data stream or enhancement layer substream 6b. Rather, the scalable video decoder may set the transform coefficients within that subblock to zero. If, however, the syntax element 416 of a respective subblock indicates that this subblock has any significant transform coefficient, then further information pertaining to the transform coefficients within that subblock are signaled within the data stream or substream 6b. At the decoding side, the scalable video decoder decodes from the data stream or substream 6b syntax elements 418 indicating the levels of the transform coefficients within the respective subblock. The syntax elements 418 may signal the positions of significant transform coefficients within that subblock in accordance with a scan order among these transform coefficients within the respective subblock, and optionally the scan order among the transform coefficients within the respective subblock.

Figure 22:
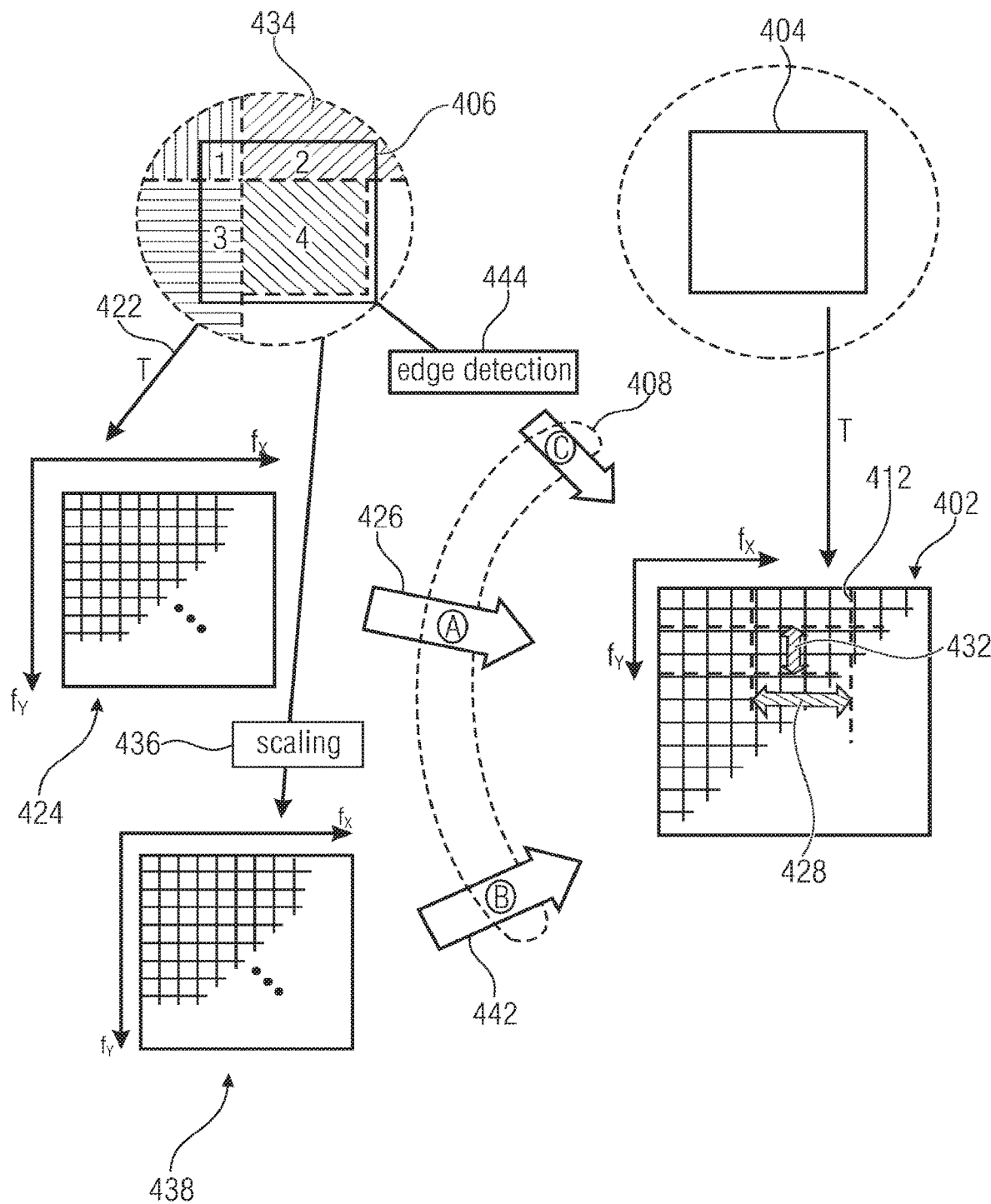
FIG. 22 illustrates different possibilities as to how to derive the appropriate subblock subdivision of the transform coefficient block from the base layer.

FIG. 22 shows the different possibilities which exist for performing the selection among the possible subblock subdivisions in the evaluation 408, respectively. FIG. 22 illustrates again the portion 404 of the enhancement layer signal which the transform coefficient block 402 relates to in that the latter represents the spectral decomposition of portion 404. For example, the transform coefficient block 402 represents the spectral decomposition of the enhancement layer residual signal with scalable video decoder/encoder predictively coding/decoding the enhancement layer signal. In particular, transform coding/decoding is used by scalable video decoder/encoder in order to encode the enhancement layer residual signal, with the transform coding/decoding being performed in a block-wise manner, i.e. in blocks into which the pictures 22b of the enhancement layer signal are subdivided. FIG. 22 shows the corresponding or co-located portion 406 of the base layer signal wherein scalable video decoder/encoder also apply predictive encoding/decoding to the base layer signal while using transform coding/decoding with respect to the prediction residual of the base layer signal, i.e. with respect to the base layer residual signal. In particular, block-wise transformation is used for the base layer residual signal, i.e. the base layer residual signal is transformed block-wise with individually transformed blocks being illustrated in FIG. 22 by way of dashed lines. As illustrated in FIG. 22, the block boundaries of the transform blocks of the base layer do not necessarily coincide with the outline of co-located portion 406.

In order to nevertheless perform the evaluation 408, one or a combination the following options A to C may be used.

In particular, scalable video decoder/encoder may perform a transform 422 onto the base layer residual signal or the reconstructed base layer signal within portion 406 so as to obtain a transform coefficient block 424 of transform coefficients coinciding in size with a transform coefficient block 402 to be coded/decoded. An inspection of the distribution of the values of the transform coefficients within transform coefficient block 424, 426, may then be used in order to appropriately set the dimension of the subblocks 412 along the direction of horizontal frequencies, i.e. 428 and the dimension of the subblocks 412 along the direction of vertical frequencies, i.e. 432.

Additionally or alternatively, scalable video decoder/encoder may inspect all transform coefficient blocks of the base layer transform blocks 434 illustrated by different hatchings in FIG. 22, which at least partially overlay the co-located portion 406. In the exemplary case of FIG. 22, there are four base layer transform blocks, the transform coefficient blocks of which would then be inspected. In particular, as all of these base layer transform blocks may be of different sizes among each other and additionally differ in size with respect to the transform coefficient block 412, a scaling 436 may be performed onto the transform coefficient blocks of these overlaying base layer transform blocks 434, so as to result in an approximation of a transform coefficient block 438 of a spectral decomposition of the base layer residual signal within portion 406. The distribution of the values of the transform coefficients within that transform coefficient block 438, i.e. 442, may then be used within the evaluation 408 so as to appropriately set the subblock dimensions 428 and 432, thereby selecting the subblock subdivision of transform coefficient block 402.

A further alternative which may additionally or alternatively be used in order to perform the evaluation 408 is to inspect the base layer residual signal or the reconstructed base layer signal within the spatial domain by use of edge detection 444 or determination of the main gradient direction, for example, deciding based on the extension direction of the edges detected or the gradient determined within the co-located portion 406 so as to appropriately set the subblock dimensions 428 and 432.

Although not specifically described above, it may be advantageous to, in traversing the positions of the transform coefficients and units of the subblocks 412, to traverse the subblocks 412 in an order which starts from the zero frequency corner of the transform coefficient block, i.e. the upper left corner in FIG. 21, to the highest frequency corner of block 402, i.e. the lower right corner in FIG. 21. Further, entropy coding may be used in order to signal the syntax elements within data stream 6b: that is, syntax elements 416 and 418 may be coded suing entropy coding such as arithmetic or variable length coding or some other form of entropy coding. The order of traversing subblocks 412 may be dependent on the subblock shape chosen according to 408, too: for subblocks chosen to be broader than their height, the order of traversal may traverse subblocks rowwise first and then proceeding to the next row and so forth. Beyond this, it is again noted that the base layer information used for choosing the subblock dimensions may be base layer residual signal or the base layer signal as reconstructed itself.

In the following, different embodiments are described which could be combined with the aspects described above. The embodiments described below relate to many different aspects or measures to render scalable video coding even more efficient. Partially, the above aspects are described below in further detail, to present another derivate embodiment thereof, but with keeping the general concept. These below-presented descriptions may be used for obtaining alternatives or extensions of the above embodiments/aspects. Most of the embodiments described below, however, relate to subaspects which may, optionally, be combined with the aspects already described above, i.e. they may be implemented within one scalable video decoder/encoder concurrently with the above embodiments, but need not.

In order to be able to more easily understand the description brought forward now a more detailed embodiment for implementing a scalable video encoder/decoder suitable for incorporating the any of the embodiments and combination if embodiments, is presented next. The different aspects described below are enumerated by use of alphanumeric signs. The description of some of these aspects references elements in the figures described now, where, in accordance with one embodiment, these aspects could be commonly implemented. However, it should be noted that as far as the individual aspects are concerned, the presence of every of element in the implementation of a scalable video decoder/encoder is not necessitated as far as every aspect is concerned. Depending on the aspect in question, some of the elements and some of the inter-connections may be left out in the figures described next. Merely the elements cited with respect to the respective aspects should be present in order to perform the task or function mentioned in the description of the respective aspect, wherein, however, sometimes alternatives do also exist especially when several elements are cited with respect to one function.

However, in order to provide an overview of the functionality of a scalable video decoder/encoder where the aspects subsequently explained may be implemented, the elements shown in the figure below are briefly described now.

FIG. 23 shows a scalable video decoder for decoding a coded data stream 6 into which a video is coded in a manner so that a proper subpart of the coded data stream 6, namely 6a, represents the video at a first resolution or quality level, whereas an additional portion 6b of the coded data stream corresponds to a representation of the video at an increased resolution or quality level. In order to keep the amount of data of the coded data stream 6 low, inter-layer redundancies between substreams 6a and 6b are exploited in forming substream 6b. Some of the aspects described below are directed to the inter-layer prediction from a base layer which substream 6a relates to and to an enhancement layer which substream 6b relates to.

The scalable video decoder comprises two block-based predictive decoders 80, 60 running in parallel and receiving substream 6a and 6b, respectively. As shown in the figure, a demultiplexer 40 may separately provide decoding stages 80 and 60 with their corresponding substreams 6a and 6b.

The internal construction of the block-based predictive coding stages 80 and 60 may, as shown in the figure, be similar. From an input of the respective decoding stage 80, 60 on, an entropy decoding module 100; 320, an inverse transformer 560; 580, an adder 180; 340 and optional filters 120; 300 and 140; 280 are serially connected in the order of their mentioning so that at the end of this serial connection a reconstructed base layer signal 600 and a reconstructed enhancement layer signal 360, respectively, are derivable. While the output of adders 180, 340 and filters 120, 140, 300 and 280 provide different versions of reconstructions of the base layer and enhancement layer signals, respectively, a respective prediction provider 160; 260 is provided in order to receive a subset or all of these versions and to provide, based thereon, a prediction signal to the remaining input of adder 180; 340, respectively. The entropy decoding stages 100; 320 decode from the respective input signal 6a and 6b, respectively, transform coefficient blocks entering inverse transformer 560; 580 and coding parameters including prediction parameters for prediction provider 160; 260, respectively.

Thus, prediction providers 160 and 260 predict blocks of frames of the video at the respective resolution/quality level and, to this end, same may choose among certain prediction modes such as a spatial intra-prediction mode and a temporal inter-prediction mode, both of which are intra-layer prediction modes, i.e. prediction modes solely depending on the data in the substream entering the respective level.

However, in order to exploit the aforementioned inter-layer redundancies, enhancement layer decoding stage 60 additionally comprises a coding parameter inter-layer predictor 240, a resolution/quality refiner 220 and/or a prediction provider 260 which, compared to prediction provider 160, additionally/alternatively supports inter-layer prediction modes which are able to provide the enhancement layer prediction signal 420 based on data derived from internal states of base layer decoding stage 80. The resolution/quality refiner 220 is to subject any of the reconstructed base layer signals 200a, 200b and 200c or the base layer residual signal 480 to a resolution or quality refinement to obtain a inter-layer prediction signal 380, and the coding parameter inter-layer predictor 240 is to somehow predict coding parameters such as prediction parameters and motion parameters, respectively. The prediction provider 260, may, for example, additionally support inter-layer prediction modes according to which reconstructed portions of the base layer signal, such as 200a, 200b and 200c, or reconstructed portions of the base layer residual signal 640, potentially refined to the increased resolution/quality level, are used as a reference/basis.

As described above, the decoding stages 60 and 80 may operate in a block-based manner. That is, frames of the video may be subdivided into portions such as blocks. Different granularity levels may be used to assign the prediction modes as performed by prediction providers 160 and 260, the local transformations by inverse transformers 560 and 580, filter coefficient selections by filters 120 and 140 and prediction parameter settings for the prediction modes by prediction providers 160 and 260. That is, the sub-partitioning of the frames into the prediction blocks may, in turn, be a continuation of the sub-partitioning of the frames into the blocks for which the prediction modes are selected, called coding units or prediction units, for example. The sub-partitioning of the frames into blocks for transform coding, which may be called transform units, may be different from the partitioning into prediction units. Some of the inter-layer prediction modes used by prediction provider 260 are described below with respect to the aspects. The same applies with respect to some intra-layer prediction modes, i.e. prediction modes which internally derive the respective prediction signal input into adders 180 and 340, respectively, i.e. solely base on states involved in the current level's coding stage 60 and 80, respectively.

Some further details of the blocks shown in the figure will become apparent from the description of the individual aspects below. It is noted that, as far as such descriptions do not specifically relate to the aspect with respect to which they have been provided, these descriptions shall be equally transferable to the other aspect and the description of the figure in general.

In particular, the embodiment for a scalable video decoder of FIG. 23 represents a possible implementation of the scalable video decoders according to FIGS. 2 and 4. While the scalable video decoder according to FIG. 23 has been described above, FIG. 23 shows the corresponding scalable video encoder and the same reference signs are used for the internal elements of the predictive coding/decoding schemes in FIGS. 23, 24A and 24B. The reason is, as set out above: for sake of maintaining a common prediction basis between encoder and decoder, the reconstructable version of base and enhancement layer signals is used at the encoder, too, which to this end, reconstructs the already coded portions, too, to obtain the reconstructable version of the scalable video. Accordingly, the only difference to the description of FIG. 23 is that the prediction provider 160 and the prediction provider 260 as well as the coding parameter inter-layer predictor 240 determine the prediction parameters within a process of some rate/distortion optimization rather than receiving same from the data stream. Rather, the providers send the prediction parameters thus determined to the entropy decoders 19a and 19b, which in turn send the respective base layer substream 6a and enhancement layer substream 6b via multiplexer 16 so as to be included into data stream 6. In the same manner, these entropy encoders 19a and 19b receive the prediction residual between the reconstructed base layer signal 200 and reconstructed enhancement layer signal 400 and the original base layer and enhancement layer versions 4a and 4b, as obtained via a subtracter 720 and 722 followed by a transformation module 724, 726, respectively, rather than outputting an entropy decoding result of such a residual. Besides this, however, the construction of the salable video encoder in FIGS. 24A and 24B coincides with the construction of the scalable video decoder of FIG. 23 and accordingly, with regard to these issues, reference is made to the above description of FIG. 23 where, as just outlined, portions mentioning any derivation from any data stream has to be turned into a respective determination of the respective element with subsequent insertion into the respective data stream.

The techniques for intra coding of an enhancement layer signal used in the embodiment described next include multiple methods for generating an intra prediction signal (using base layer data) for enhancement layer blocks. These methods are provided in addition to methods that generate the intra prediction signal based on reconstructed enhancement layer samples only.

Intra prediction is part of the reconstruction process of intra coded blocks. The final reconstruction block is obtained by adding the transform-coded residual signal (which may be zero) to the intra prediction signal. The residual signal is generated by inverse quantization (scaling) of the transform coefficient levels transmitted in the bitstream followed by an inverse transform.

The following description applies to scalable coding with quality enhancement layers (the enhancement layer has the same resolution as the base layer, but represents the input video with a higher quality or fidelity) and scalable coding with spatial enhancement layers (the enhancement layer has a higher resolution, i.e., a larger number of samples, than the base layer). For quality enhancement layers, no upsampling of base layer signals is necessitated, such as in block 220, but a filtering, such as 500, of the reconstructed base layer samples may be applied. In case of spatial enhancement layers, an upsampling of the base layer signals is generally necessitated, such as in block 220.

The aspect described next supports different methods for using the reconstructed base layer samples (cp. 200) or base layer residual samples (cp. 640) for intra prediction of an enhancement layer block. It is possible to support one or more of the methods described below in addition to an intra-layer intra coding (in which only reconstructed enhancement layer samples (cp. 400) are used for intra prediction). The usage of a particular method can be signaled at the level of the largest supported block size (such as a macroblock in H.264/AVC or a coding tree block/largest coding unit in HEVC), or it can be signaled at all supported block sizes, or it can be signaled for a subset of the supported block sizes.

For all methods described in the following, the prediction signal can be directly used as reconstruction signal for the block, i.e. no residual is transmitted. Or the selected method for inter-layer intra prediction can be combined with residual coding. In a particular embodiment the residual signal is transmitted via transform coding, i.e., quantized transform coefficients (transform coefficient levels) are transmitted using an entropy coding technique (e.g., variable length coding or arithmetic coding (cp. 19*b*)) and the residual is obtained by inverse quantizing (scaling) the transmitted transform coefficient levels and applying an inverse transform (cp. 580). In a particular version, the complete residual block that corresponds to the block for which the inter-layer intra prediction signal is generated is transformed (cp. 726) using a single transform (i.e., the entire block is transformed using a single transform of the same size as the prediction block). In another embodiment, the prediction block can be further subdivided (e.g., using a hierarchical decomposition) into smaller block and for each of the smaller block (which can also have different block sizes) a separate transform is applied. In a further embodiment, a coding unit can be divided into smaller prediction blocks and for zero or more of the prediction blocks the prediction signal is generated using one of the methods for inter-layer intra prediction. And then, the residual of the entire coding unit is transformed using a single transform (cp. 726), or the coding unit is subdivided into different transform units, where the subdivision for forming the transform units (blocks to which a single transform is applied) is different from the subdivision for decomposing a coding unit into prediction blocks.

In a particular embodiment, the (upsampled/filtered) reconstructed base layer signal (cp. 380) is directly used as prediction signal. Multiple methods for employing the base layer for intra predicting the enhancement layer include the following method: The (upsampled/filtered) reconstructed base layer signal (cp. 380) is directly used as enhancement layer prediction signal. This method is similar to the known H.264/SVC inter-layer intra prediction mode. In this method a prediction block for the enhancement layer is formed by the co-located samples of the base layer reconstruction signal which might have been upsampled (cp. 220) to match the corresponding sample positions of the enhancement layer and might have been optionally filtered before or after the upsampling. In contrast to the SVC inter-layer intra prediction mode, this mode may be not only supported at a macroblock level (or largest supported block size), but at arbitrary block sizes. That means, the mode cannot only be signaled for the largest supported block size, but a block of the largest supported block size (macroblock in MPEG-4, H.264 and coding tree block/largest coding unit in HEVC) can be hierarchically subdivided into smaller blocks/coding units and the usage of the inter-layer intra prediction mode can be signaled at any supported block size (for the corresponding block). In a particular embodiment, this mode is only supported for selected block sizes. Then, the syntax element that signals the usage of this mode can be transmitted only for the corresponding block sizes, or the values of a syntax element that signals (among other coding parameters) the usage of this mode can be correspondingly restricted for other block sizes. Another difference to the inter-layer intra prediction mode in the SVC extension of H.264/AVC is that the inter-layer intra prediction mode is not only supported if the co-located area in the base layer is intra coded, but it is also supported if the co-located base layer area is inter coded or partly inter coded.

In a particular embodiment, spatial intra prediction of a difference signal (see aspect A) is performed. The multiple methods include the following method: The (potentially upsampled/filtered) reconstructed base layer signal (cp. 380) is combined with a spatial intra prediction signal, where the spatial intra prediction (cp. 420) is derived (cp. 260) based on difference samples for neighboring blocks. The difference samples represent the difference of the reconstructed enhancement layer signal (cp. 400) and the (potentially upsampled/filtered) reconstructed base layer signal (cp. 380).

Figure 25:
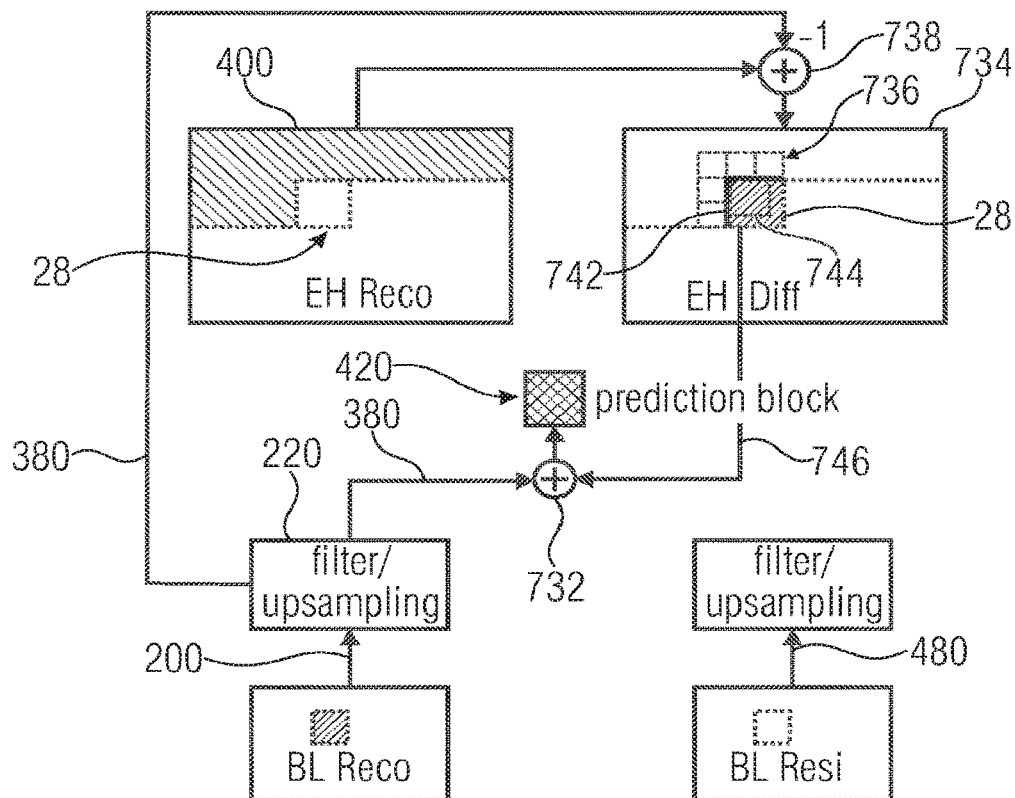
FIG. 25 illustrates a generation of an inter-layer intra prediction signal by a sum of an (upsampled/filtered) base layer reconstruction signal (BL Reco) and a spatial intra prediction that uses a difference signal (EH Diff) of already coding neighboring blocks.

FIG. 25 shows such generation of an inter-layer intra prediction signal by a sum 732 of an (upsampled/filtered) base layer reconstruction signal 380 (BL Reco) and a spatial intra prediction that uses a difference signal 734 (EH Diff) of already coding neighboring blocks 736, where the difference signal (EH Diff) for the already coded blocks 736 is generated by subtracting 738 an (upsampled/filtered) base layer reconstruction signal 380 (BL Reco) from a reconstructed enhancement layer signal (EH Reco) (cp. 400) where already coded/decoded portions are shown hatched, the currently coded/decoded block/area/portion is 28. That is, the inter-layer intra prediction method illustrated in FIG. 25 uses two superimposed input signals to generate the prediction block. For this method a difference signal 734 is necessitated which is the difference of the reconstructed enhancement-layer signal 400 and the co-located reconstructed base layer signal 200 which might have been upsampled 220 to match the corresponding sample positions of the enhancement layer and can optionally be filtered before or after upsampling (it can also be filtered if no upsampling is applied as it would be the case in quality scalable coding). In particular, for spatial scalable coding, the difference signal 734 typically contains primarily high frequency components. The difference signal 734 is available for all already reconstructed blocks (i.e., for all enhancement layer blocks that have been already coded/decoded). The difference signal 734 for the neighboring samples 742 of already coded/decoded blocks 736 is used as input to a spatial intra prediction technique (such as the spatial intra prediction modes specified in H.264/AVC or HEVC). By the spatial intra prediction illustrated by arrows 744 a prediction signal 746 for the difference component of the block 28 to be predicted is generated. In a particular embodiment, any clipping functionality of the spatial intra prediction process (as known from H.264/AVC or HEVC) is modified or disabled to match the dynamic range of the difference signal 734. The actually used intra prediction method (which may be one of multiple provided methods and can include planar intra prediction, DC intra prediction, or a directional intra prediction 744 with any particular angle) is signaled inside the bitstream 6*b*. It is possible to use a spatial intra prediction technique (a method for generating a prediction signal using samples of already coded neighboring blocks) that is different from the methods provided in H.264/AVC and HEVC. The obtained prediction block 746 (using difference samples of neighboring blocks) is the first portion of the final prediction block 420.

The second portion of the prediction signal is generated using the co-located area 28 in the reconstructed signal 200 of the base layer. For quality enhancement layers, the co-located base layer samples can be directly used or they can be optionally filtered, e.g., by a low-pass filter or a filter 500 that attenuates high-frequency components. For spatial enhancement layers, the co-located base layer samples are upsampled. For upsampling 220, an FIR filter or a set of FIR filters can be used. It is also possible to use BR filters. Optionally, the reconstructed base layer samples 200 can be filtered before upsampling or the base layer prediction signal (signal obtained after upsampling the base layer) can be filtered after the upsampling stage. The reconstruction process of the base layer can include one or more additional filters such as a deblocking filter (cp. 120) and an adaptive loop filter (cp. 140). The base layer reconstruction 200 that is used for upsampling can be the reconstruction signal before any of the loop filters (cp. 200c), or it can be the reconstruction signal after the deblocking filter but before any further filter (cp. 200b), or it can be the reconstruction signal after a particular filter or the reconstruction signal after applying all filters used in the base layer decoding process (cp. 200a).

The two generated portions of the prediction signal (the spatially predicted difference signal 746 and the potentially filtered/upsampled base layer reconstruction 380) are added 732 sample by sample in order to form the final prediction signal 420.

Transferring the just outlined aspect onto the embodiment of FIGS. 6 to 10, it could be that the just outlined possibility of predicting a current block 28 of the enhancement layer signal is supported by respective scalable video decoder/encoder as an alternative to the prediction scheme outlined with respect to FIGS. 6 to 10. As to which mode is used is signaled in the enhancement layer substream 6b via a respective prediction mode identifier not shown in FIG. 8.

In a particular embodiment, intra prediction is continued with inter-layer residual prediction (see aspect B). The multiple methods for generating an intra prediction signal using base layer data include the following method: A conventional spatial intra prediction signal (derived using neighboring reconstructed enhancement layer samples) is combined with an (upsampled/filtered) base layer residual signal (inverse transform of base layer transform coefficients or difference between base layer reconstruction and base layer prediction).

Figure 26:
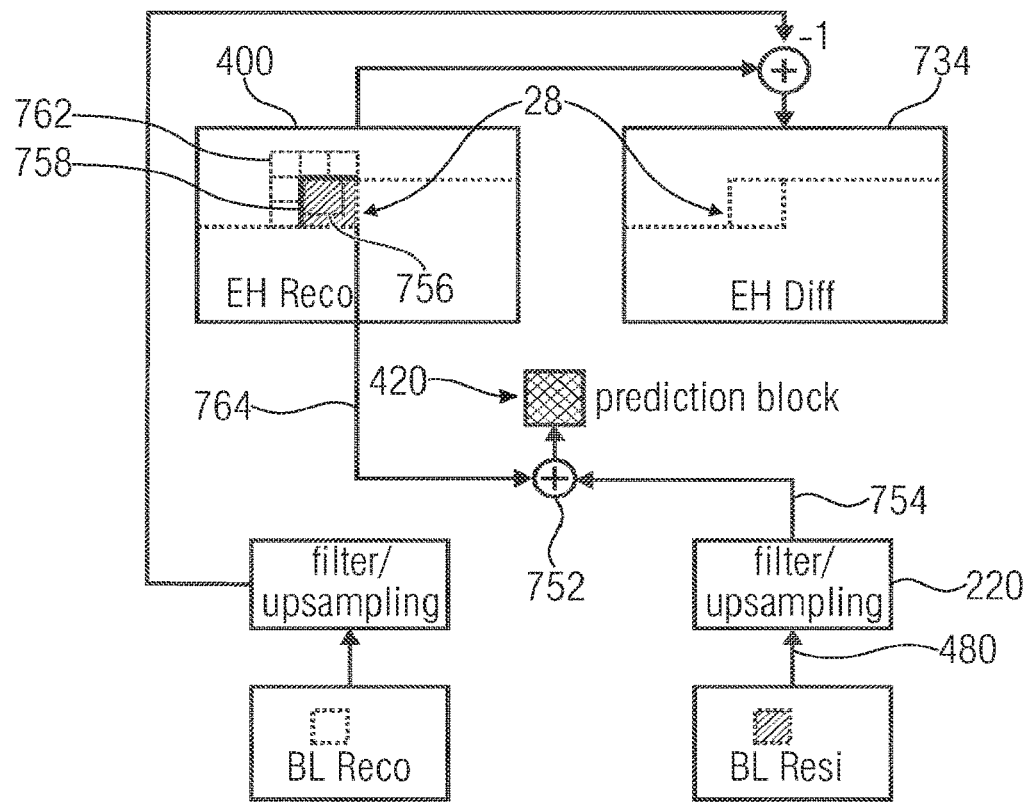
FIG. 26 illustrates a generation of an inter-layer intra prediction signal by a sum of an (upsampled/filtered) base layer residual signal (BL Resi) and a spatial intra prediction that uses reconstructed enhancement layer samples (EH Reco) of already coding neighboring blocks.

FIG. 26 shows such a generation of an inter-layer intra prediction signal 420 by a sum 752 of an (upsampled/filtered) base layer residual signal 754 (BL Resi) and a spatial intra prediction 756 that uses reconstructed enhancement layer samples 758 (EH Reco) of already coding neighboring blocks illustrated by dotted lines 762.

The concept shown in FIG. 26 thus superimposes two prediction signals to form the prediction block 420, where one prediction signal 764 is generated from already reconstructed enhancement layer samples 758 and the other prediction signal 754 is generated from base layer residual samples 480. The first portion 764 of the prediction signal 420 is derived by applying a spatial intra prediction 756 using reconstructed enhancement layer samples 758. The spatial intra prediction 756 can be one of the methods specified in H.264/AVC or one of the methods specified in HEVC, or it can be another spatial intra prediction technique that generated a prediction signal 764 for a current block 18 form samples 758 of neighboring blocks 762. The actually used intra prediction method 756 (which may be one of multiple provided methods and can include planar intra prediction, DC intra prediction, or a directional intra prediction with any particular angle) is signaled inside the bitstream 6b. It is possible to use a spatial intra prediction technique (a method for generating a prediction signal using samples of already coded neighboring blocks) that is different from the methods provided in H.264/AVC and HEVC. The second portion 754 of the prediction signal 420 is generated using the co-located residual signal 480 of the base-layer. For quality enhancement layers, the residual signal can be used as reconstructed in the base layer or it can be additionally filtered. For a spatial enhancement layer 480, the residual signal is upsampled 220 (in order to map the base layer sample positions to the enhancement layer sample positions) before it is used as second portion of the prediction signal. The base layer residual signal 480 can also be filtered before or after the upsampling stage. For upsampling 220, the residual signal, FIR filters can be applied. The upsampling process can be constructed in a way that no filtering across transform block boundaries in the base layer is applied for the purpose of upsampling.

The base layer residual signal 480 that is used for inter-layer prediction can be the residual signal that is obtained by scaling and inverse transforming 560 the transform coefficient levels of the base layer. Or it can be the difference between the reconstructed base layer signal 200 (before or after deblocking and additional filtering or between any filtering operations) and the prediction signal 660 used in the base layer.

The two generated signal components (spatial intra prediction signal 764 and inter-layer residual prediction signal 754) are added 752 together to form the final enhancement layer intra prediction signal.

This means, the prediction mode just outlined with respect to FIG. 26 may be used, or supported, by any scalable video decoder/encoder in accordance with FIGS. 6 to 10, to form an alternative prediction mode with respect to that described above with respect to FIGS. 6 to 10 for a currently coded/decoded portion 28.

In a particular embodiment, a weighted prediction of spatial intra prediction and base layer reconstruction (see aspect C) is used. This actually does represent the above announced specification of a specific implementation of the embodiment outlined above with respect to FIGS. 6 to 10 and accordingly, the description with respect to such weighted prediction shall not only be interpreted as an alternative to the above embodiments, but also as a description of possibilities of how to implement the embodiments outlined above with respect to FIGS. 6 to 10 differently in certain aspects.

The multiple methods for generating an intra prediction signal using base layer data include the following method: The (upsampled/filtered) reconstructed base layer signal is combined with a spatial intra prediction signal, where the spatial intra prediction is derived based on reconstructed enhancement layer samples of neighboring blocks. The final prediction signal is obtained by weighting (cp. 41) the spatial prediction signal and the base layer prediction signal in a way that different frequency components use a different weighting. This can be for example realized by filtering (cp. 62) the base layer prediction signal (cp. 38) with a low-pass filter and filtering (cp. 64) the spatial intra prediction signal (cp. 34) with a high-pass filter and adding up (cp. 66) the obtained filtered signals. Or the frequency-based weighting can be realized by transforming (cp. 72, 74) the base layer prediction signal (cp. 38) and the enhancement layer prediction signal (cp. 34) and superimpose the obtained transform blocks (cp. 76, 78), where different weighting factors (cp. 82, 84) are used for different frequency positions. The obtained transform block (cp. 42 in FIG. 10) can then be inverse transformed (cp. 84) and used as enhancement layer prediction signal (cp. 54) or the obtained transform coefficients are added (cp. 52) to the scaled transmitted transform coefficient levels (cp. 59) and are then inverse transformed (cp. 84) in order to obtain the reconstructed block (cp. 54) before deblocking and in-loop processing.

Figure 27:
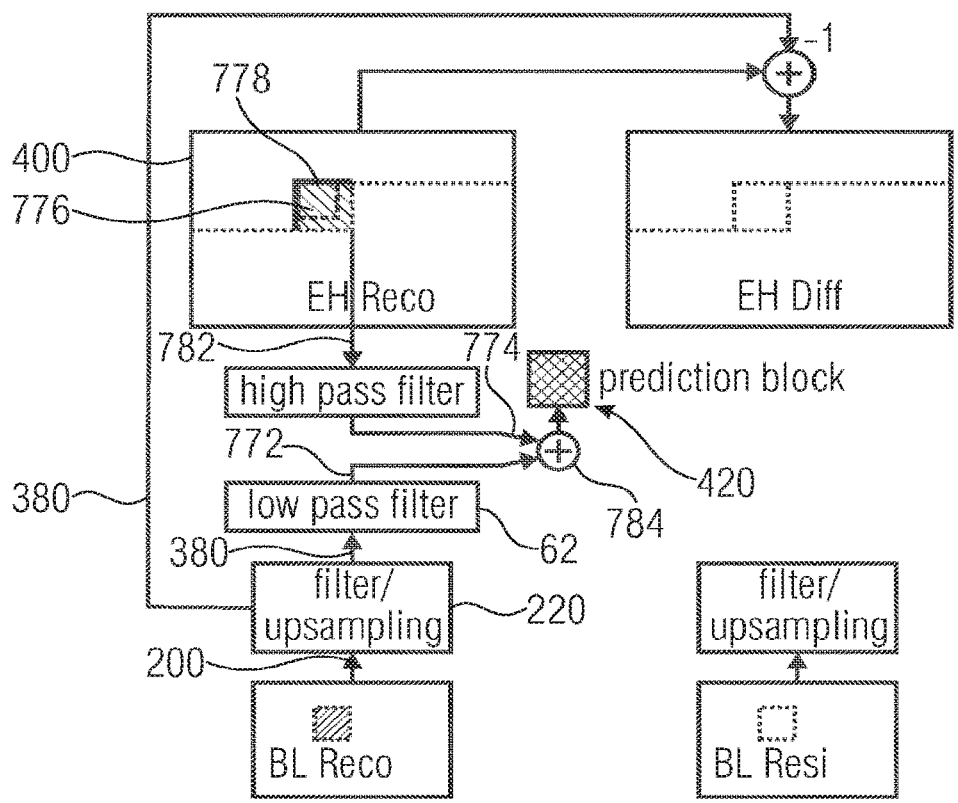
FIG. 27 illustrates a generation of an inter-layer intra prediction signal by a frequency-weighted sum of an (upsampled/filtered) base layer reconstruction signal (BL Reco) and a spatial intra prediction that uses reconstructed enhancement layer samples (EH Reco) of already coding neighboring blocks.

FIG. 27 shows such generation of an inter-layer intra prediction signal by a frequency-weighted sum of an (upsampled/filtered) base layer reconstruction signal (BL Reco) and a spatial intra prediction that uses reconstructed enhancement layer samples (EH Reco) of already coding neighboring blocks.

The concept of FIG. 27 uses two superimposed signals 772, 774 to form the prediction block 420. The first portion 774 of the signal 420 is derived by applying a spatial intra prediction 776 corresponding to 30 in FIG. 6, using reconstructed samples 778 of already constructed neighboring block in the enhancement layer. The second portion 772 of the prediction signal 420 is generated using the co-located reconstructed signal 200 of the base-layer. For quality enhancement layers, the co-located base layer samples 200 can be directly used or they can be optionally filtered, e.g., by a low-pass filter or a filter that attenuates high-frequency components. For spatial enhancement layers, the co-located base layer samples are upsampled 220. For upsampling, a FIR filter or a set of FIR filters can be used. It is also possible to use BR filters. Optionally, the reconstructed base layer samples can be filtered before upsampling or the base layer prediction signal (signal obtained after upsampling the base layer) can be filtered after the upsampling stage. The reconstruction process of the base layer can include one or more additional filters such as a deblocking filter 120 and an adaptive loop filter 140. The base layer reconstruction 200 that is used for upsampling can be the reconstruction signal 200c before any of the loop filters 120, 140, or it can be the reconstruction signal 200b after the deblocking filter 120 but before any further filter, or it can be the reconstruction signal 200a after a particular filter or the reconstruction signal after applying all filters 120, 140 used in the base layer decoding process.

When comparing reference signs used in FIGS. 23 and 24 with those used in connection with FIGS. 6 to 10, block 220 corresponds to reference sign 38 used in FIG. 6, 39 corresponds to the portion of 380, co-located to the current portion 28, 420 corresponds to 42, as least as far as the portion co-located to the current portion 28 is concerned, and the spatial prediction 776 corresponds to 32.

The two prediction signals (potentially upsampled/filtered base layer reconstruction 386 and enhancement layer intra prediction 782) are combined to form the final prediction signal 420. The method for combining these signals can have the property that different weighting factors are used for different frequency components. In a particular embodiment, the upsampled base layer reconstruction is filtered with a low-pass filter (cp. 62) (it is also possible to filter the base layer reconstruction before the upsampling 220) and the intra prediction signal (cp. 34 obtained by 30) is filtered with a high-pass filter (cp. 64), and both filtered signals are added 784 (cp. 66) to form the final prediction signal 420. The pair of low-pass and high-pass filter may represent a quadrature mirror filter pair, but this is not necessitated.

In another particular embodiment (cp. FIG. 10), the combination process of the two prediction signals 380 and 782 is realized via a spatial transform. Both the (potentially upsampled/filtered) base layer reconstruction 380 and the intra prediction signal 782 are transformed (cp. 72, 74) using a spatial transform. Then the transform coefficients (cp. 76, 78) of both signals are scaled with appropriate weighting factors (cp. 82, 84) and are then added (cp. 90) to form the transform coefficient block (cp. 42) of the final prediction signal. In one version, the weighting factors (cp. 82, 84) are chosen in a way that for each transform coefficient position, the sum of the weighting factors for both signal components is equal to 1. In another version, the sum of the weighting factors can be unequal to 1 for some or all transform coefficient positions. In a particular version, the weighting factors are chosen in a way that for transform coefficients that represent low-frequency components, the weighting factor for the base layer reconstruction is greater than the weighting factor for the enhancement layer intra prediction signal, and, for transform coefficients that represent high-frequency components, the weighting factor for the base layer reconstruction is less than the weighting factor for the enhancement layer intra prediction signal.

In one embodiment, the obtained transform coefficient block (cp. 42) (obtained by summing up the weighted transformed signals for both components) is inverse transformed (cp. 84) to form the final prediction signal 420 (cp. 54). In another embodiment, the prediction is directly done in the transform domain. That is, the coded transform coefficient levels (cp. 59) are scaled (i.e., inverse quantized) and added (cp. 52) to the transform coefficients (cp. 42) of the prediction signal (which is obtained by summing up the weighted transformed signals for both components), and then the resulting block of transform coefficients (not shown in FIG. 10 is inverse transformed (cp. 84) to obtain the reconstructed signal 420 for the current block (before potential de-blocking 120 and further in-loop filtering steps 140). In other words, in a first embodiment, the transform block obtained by summing up the weighted transformed signals for both components can be either inverse transformed and used as enhancement layer prediction signal or, in a second embodiment, the obtained transform coefficients can be added to the scaled transmitted transform coefficient levels and then inverse transformed in order to obtain the reconstructed block before deblocking and in-loop processing.

A selection of a base layer reconstruction and residual signal (see aspect D) may be used, too. For methods (as described above) that use the reconstructed base layer signal, the following versions can be used:
 Reconstructed base layer samples 200c before deblocking 120 and further in-loop processing 140 (such as sample adaptive offset filter or adaptive loop filter).
 Reconstructed base layer samples 200b after deblocking 120 but before further in-loop processing 140 (such as sample adaptive offset filter or adaptive loop filter).
 Reconstructed base layer samples 200a after deblocking 120 and further in-loop processing 140 (such as sample adaptive offset filter or adaptive loop filter) or between multiple in-loop processing steps.

The selection of the corresponding base layer signal 200a,b,c can be fixed for a particular decoder (and encoder) implementation, or it can be signaled inside the bitstream 6. For the latter case, different versions can be used. The usage of a particular version of the base layer signal can be signaled at a sequence level, or at a picture level, or at a slice level, or at a largest coding unit level, or at a coding unit level, or a prediction block level, or at a transform block level, or at any other block level. In another version, the selection can be made dependent on other coding parameters (such as coding modes) or on the characteristic of the base layer signal.

In another embodiment, multiple versions of the methods that use the (upsampled/filtered) base layer signal 200 can be used. For example, two different modes that directly use the upsampled base layer signal, i.e. 200a, can be provided, where the two modes use different interpolation filters or one mode uses an additional filtering 500 of the (upsampled) base layer reconstruction signal. Similarly, multiple different versions for the other modes described above can be provided. The employed upsampled/filtered base layer signal 380 for the different versions of a mode can differ in the used interpolation filters (including interpolation filters that also filter the integer-sample positions), or the upsampled/filtered base layer signal 380 for the second version can be obtained by filtering 500 the upsampled/filtered base layer signal for the first version. The selection of one of the different version can be signaled at a sequence, picture, slice, largest coding unit, coding unit level, prediction block level, or transform block level, or it can be inferred from the characteristics of the corresponding reconstructed base layer signal or transmitted coding parameters.

The same applies to the mode that uses the reconstructed base layer residual signal, via 480. Here, also different versions can be used that differ in the used interpolation filters or additional filtering steps.

Different filters can be used for upsampling/filtering the reconstructed base layer signal and the base layer residual signal. That means that for upsampling the base layer residual signal, a different approach is used than for upsampling the base layer reconstruction signal.

For base layer blocks for which the residual signal is zero (i.e., no transform coefficient levels have been transmitted for a block), the corresponding base layer residual signal can be replaced with another signal derived from the base layer. This can be, for example, a high-pass filtered version of the reconstructed base layer block or any other difference-like signal derived from the reconstructed base layer samples or reconstructed base layer residual samples of neighboring blocks.

As far as samples used for spatial intra prediction in the enhancement layer (see aspect H) the following special treatments can be provided. For modes that use a spatial intra prediction, non-available neighboring samples in the enhancement layer (neighboring samples can be un-available, because neighboring blocks can be coded after the current block) can be replaced with the corresponding samples of an upsampled/filtered base layer signal.

As far as the coding of intra prediction modes (see aspect X) is concerned, the following special modes and functionalities may be provided. For modes that use a spatial intra prediction like 30 a, the coding of the intra prediction mode can be modified in a way that information about the intra prediction mode in the base layer (if available) is used for more efficiently coding the intra prediction mode in the enhancement layer. This could be used, for example, for the parameters 56. If the co-located area (cp. 36, in the base layer is intra coded using particular spatial intra prediction mode, it is likely that a similar intra prediction mode is also used in the enhancement layer block (cp. 28). The intra prediction mode is typically signaled in a way that among the set of possible intra prediction modes one or more modes are classified as most probable modes, which can then be signaled with shorter code words (or less arithmetic codes binary decisions results in less bits). In the intra prediction of HEVC, the intra prediction mode of the block to the top (if available) and the intra prediction mode of the block to the left (if available) are included in the set of most probable modes. In addition to these modes, one or more additional modes (which are often used) are included into the list of most probable modes, where the actual added modes depend on the availability of the intra prediction modes of the block above the current block and the block to the left of the current block. In HEVC, exactly 3 modes are classified as most probable modes. In H.264/AVC, one mode is classified as most probable mode, this mode is derived based on the intra prediction modes that are used for the block above the current block and the block to the left of the current block. Any other concept (different from H.264/AVC and HEVC) for classifying the intra prediction modes is possible, and can be used for the following extension.

In order to use the base layer data for an efficient coding of the intra prediction modes in the enhancement layer, the concept of using one or more most probable modes is modified in a way that the most probable modes include the intra prediction mode that was used in the co-located base layer block (if the corresponding base layer block was intra coded). In a particular embodiment, the following approach is used: Given the current enhancement layer block, a co-located base layer block is determined. In a particular version, the co-located base layer block is the base layer block that covers the co-located position of the top-left sample of the enhancement block. In another version, the co-located base layer block is the base layer block that covers the co-located position of a sample in the middle of the enhancement block. In other versions, other sample inside the enhancement layer block can be used for determining the co-located base layer block. If the determined co-located base layer block is intra coded and the base layer intra prediction mode specifies an angular intra prediction mode and the intra prediction mode derived from the enhancement layer block to the left of the current enhancement layer block does not use an angular intra prediction mode, then the intra prediction mode derived from the left enhancement layer block is replaced with the corresponding base layer intra prediction mode. Otherwise, if the determined co-located base layer block is intra coded and the base layer intra prediction mode specifies an angular intra prediction mode and the intra prediction mode derived from the enhancement layer block above the current enhancement layer block does not use an angular intra prediction mode, then the intra prediction mode derived from the above enhancement layer block is replaced with the corresponding base layer intra prediction mode. In other versions, a different approach for modifying the list of most probable modes (which may consist of a single element) using the base layer intra prediction mode is used.

Inter coding techniques for spatial and quality enhancement layers are presented next.

In the state-of-the-art hybrid video coding standards (such as H.264/AVC or the upcoming HEVC), the pictures of a video sequence are divided into blocks of samples. The block size can either be fixed or the coding approach can provide a hierarchical structure which allows blocks to be further subdivided into blocks with smaller block sizes. The reconstruction of a block is typically obtained by generating a prediction signal for the block and adding a transmitted residual signal. The residual signal is typically transmitted using transform coding, which means the quantization indices for transform coefficients (also referred to as transform coefficient levels) are transmitted using entropy coding techniques, and at the decoder side, these transmitted transform coefficient levels are scaled and inverse transformed to obtain the residual signal which is added to the prediction signal. The residual signal is generated either by intra prediction (using only already transmitted data for the current time instant) or by inter prediction (using already transmitted data for different time instants).

In inter prediction the prediction block is derived by motion-compensated prediction using samples of already reconstructed frames. This can be done by unidirectional prediction (using one reference picture and one set of motion parameters), or the prediction signal can be generated by multi-hypothesis prediction. In the latter case, two or more prediction signals are superimposed, i.e., for each sample, a weighted average is constructed to form the final prediction signal. The multiple prediction signals (which are superimposed) can be generated by using different motion parameters for the different hypotheses (e.g., different reference pictures or motion vectors). For uni-directional prediction, it is also possible to multiply the samples of the motion-compensated prediction signal with a constant factor and add a constant offset in order to form the final prediction signal. Such a scaling and offset correction can also be used for all or selected hypothesis in multi-hypotheses prediction.

In scalable video coding also the base layer information can be utilized to support the inter prediction process for the enhancement layer. In the state-of-the-art video coding standard for scalable coding, the SVC extension of H.264/AVC, there is one additional mode for improving the coding efficiency of the inter prediction process in an enhancement layer. This mode is signaled at a macroblock level (a block of 16×16 luma samples). In this mode, the reconstructed residual samples in the lower layer are used for improving the motion-compensated prediction signal in the enhancement layer. This mode is also referred to as inter-layer residual prediction. If this mode is selected for a macroblock in a quality enhancement layer, the inter-layer prediction signal is built by the co-located samples of the reconstructed lower layer residual signal. If the inter-layer residual prediction mode is selected in a spatial enhancement layer, the prediction signal is generated by upsampling the co-located reconstructed base layer residual signal. For upsampling, FIR filters are used, but no filtering is applied across transform block boundaries. The prediction signal that is generated from the reconstructed base layer residual samples is added to the conventional motion-compensated prediction signal to form the final prediction signal for the enhancement layer block. In general, for the inter-layer residual prediction mode, an additional residual signal is transmitted by transform coding. The transmission of the residual signal can also be omitted (inferred to be equal to zero) if it is correspondingly signaled inside the bitstream. The final reconstruction signal is obtained by adding the reconstructed residual signal (obtained by scaling the transmitted transform coefficient levels and applying an inverse spatial transform) to the prediction signal (which is obtained by adding the inter-layer residual prediction signal to the motion-compensated prediction signal).

Next, techniques for inter coding of an enhancement layer signal are described. This section describes methods for employing base layer signals in addition to already reconstructed enhancement layer signals for inter predicting the enhancement layer signal to be coded in a scalable video coding scenario. By employing the base layer signals for inter-predicting the enhancement layer signal to be coded, the prediction error can be significantly reduced, which results in an overall bit rate saving for coding the enhancement layer. The main focus of this section is to augment the block based motion compensation of enhancement layer samples using already coded enhancement layer samples with additional signals from the base layer. The following description provides possibilities to use various signals from the coded base layer. The examples presented are applicable to general block-based hybrid coding approaches without assuming any particular block partitioning, although a quadtree block partitioning is generally employed as an embodiment. The usage of base layer reconstruction of current time index, base layer residual of current time index, or even base layer reconstruction of already coded pictures for inter prediction of enhancement layer block to be coded is described. It is also described how the base layer signals can be combined with already coded enhancement layer signals to obtain a better prediction for current enhancement layer.

One of the main techniques in state-of-the-art is the inter-layer residual prediction in H.264/SVC. Inter-layer residual prediction in H.264/SVC can be employed for all inter-coded macroblocks regardless whether they are coded using the SVC macroblock type signalled by the base mode flag or by using any of the conventional macroblock types. A flag is added to the macroblock syntax for spatial and quality enhancement layers, which signals the usage of inter-layer residual prediction. When this residual prediction flag is equal to 1, the residual signal of the corresponding area in the reference layer is block-wise upsampled using a bilinear filter and used as prediction for the residual signal of the enhancement layer macroblock, so that only the corresponding difference signal needs to be coded in the enhancement layer.

Figure 28:
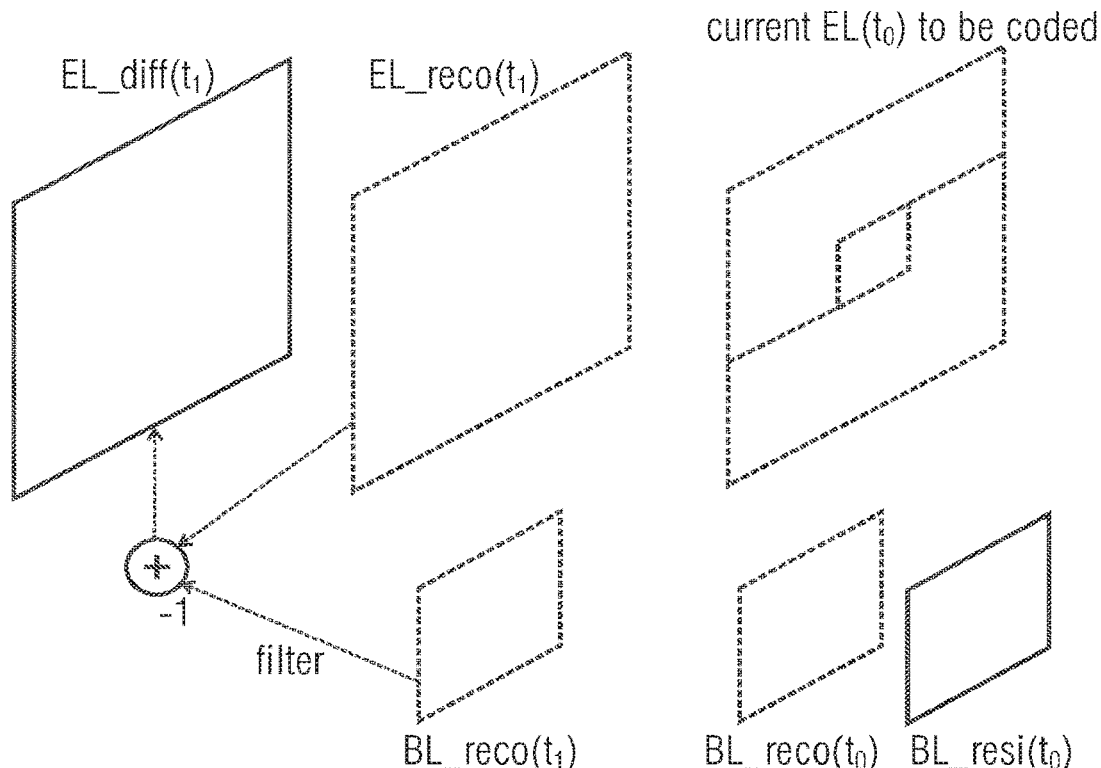
FIG. 28 illustrates of base and enhancement layer signals used in the description.

For the description in this section, the following notation is used:
$t_0$:=time index of the current picture
$t_1$:=time index of an already reconstructed picture
EL:=enhancement layer
BL:=base layer
$EL(t_0)$:=current enhancement layer picture to be coded
EL_reco:=enhancement layer reconstruction
BL_reco:=base layer reconstruction
BL_resi:=base layer residual signal (inverse transform of base layer transform coefficients or difference between base layer reconstruction and base layer prediction)
EL_diff:=difference between enhancement layer reconstruction and upsampled/filtered base layer reconstruction The different base layer and enhancement layer signals that are used in the description are illustrated in FIG. 28.

For the description, the following properties of filters are used:
Linearity: Most filters referred to in the description are linear, but also non-linear filters may be used.
Number of output samples: In the upsampling operation, the number of output samples is larger than the number of input samples. Here the filtering of the input data produces more samples than input values. In conventional filtering, the number of output samples is equal to the number of input samples. Such filtering operations can, for example, used in quality scalable coding.
Phase delay: For the filtering of samples at integer positions, the phase delay is typically zero (or an integer-valued delay in samples). For generating samples of fractional positions (for example at half-pel or quarter-pel positions), typically filters with a fractional delay (in units of samples) are applied to the samples of the integer grid.

Figure 29:
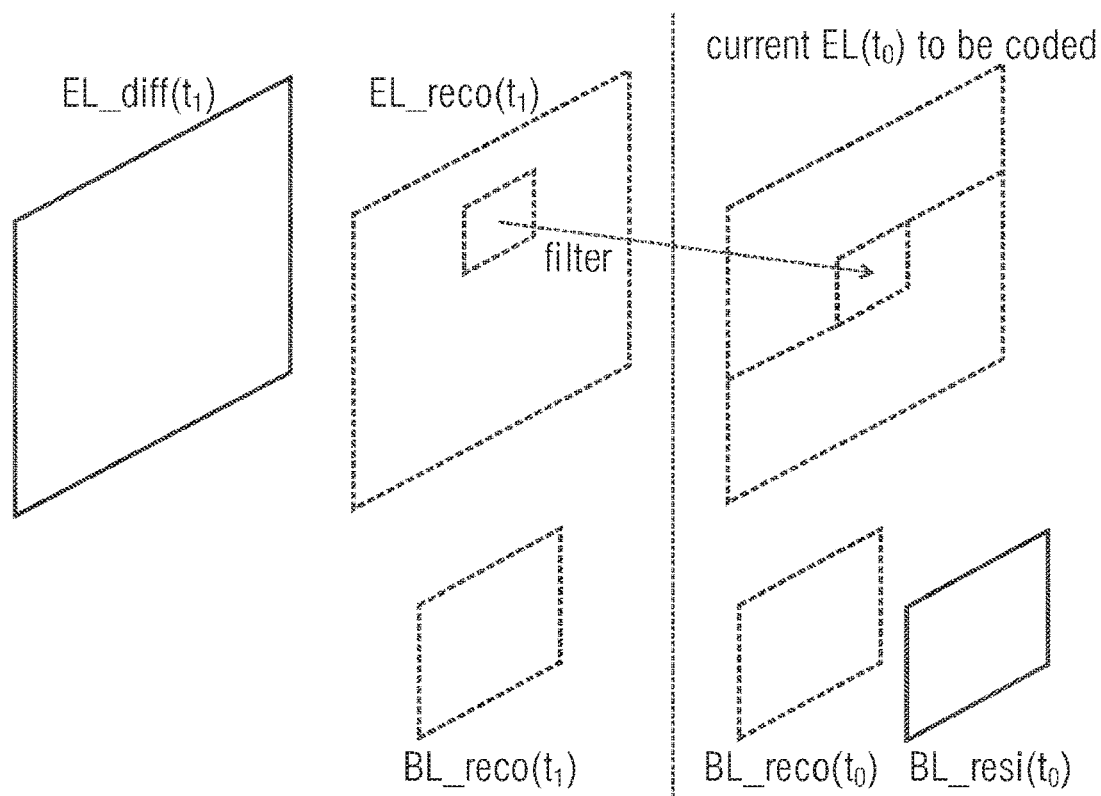
FIG. 29 illustrates motion compensated prediction of enhancement layer.

Conventional motion-compensated prediction as used in all hybrid video coding standards (e.g., MPEG-2, H.264/AVC, or the upcoming HEVC standard) is illustrated in FIG. 29. For predicting the signal of a current block, an area of an already reconstructed picture is displaced and used as prediction signal. For signaling the displacement, a motion vector is typically coded inside the bitstreams. For integer-sample precision motion vectors, the referenced area in the reference picture can be directly copied to form the prediction signal. It is, however, also possible to transmit fractional-sample precision motion vectors. In this case, the prediction signal is obtained by filtering the reference signal with a filter with fractional sample delay. The used reference picture can typically be specified by including a reference picture index into the bitstream syntax. In general, it is also possible to superimpose two or more prediction signals for forming the final prediction signal. The concept is for example supported in B slices, with two motion hypothesis. In this case, the multiple prediction signals are generated by using different motion parameters for the different hypotheses (e.g., different reference pictures or motion vectors). For uni-directional prediction, it is also possible to multiply the samples of the motion-compensated prediction signal with a constant factor and add a constant offset in order to form the final prediction signal. Such a scaling and offset correction can also be used for all or selected hypothesis in multi-hypotheses prediction.

The following description applies to scalable coding with quality enhancement layers (the enhancement layer has the same resolution as the base layer, but represents the input video with a higher quality or fidelity) and scalable coding with spatial enhancement layers (the enhancement layer has a higher resolution, i.e., a larger number of samples, than the base layer). For quality enhancement layers, no upsampling of base layer signals is necessitated, but a filtering of the reconstructed base layer samples may be applied. In case of a spatial enhancement layers, an upsampling of the base layer signals is generally necessitated.

The embodiments support different methods for using the reconstructed base layer samples or base layer residual samples for inter prediction of an enhancement layer block. It is possible to support one or more of the methods described below in addition conventional inter prediction and intra prediction. The usage of a particular method can be signaled at the level of the largest supported block size (such as a macroblock in H.264/AVC or a coding tree block/largest coding unit in HEVC), or it can be signaled at all supported block sizes, or it can be signaled for a subset of the supported block sizes.

For all methods described in the following, the prediction signal can be directly used as reconstruction signal for the block. Or the selected method for inter-layer inter prediction can be combined with residual coding. In a particular embodiment the residual signal is transmitted via transform coding, i.e., quantized transform coefficients (transform coefficient levels) are transmitted using an entropy coding technique (e.g., variable length coding or arithmetic coding) and the residual is obtained by inverse quantizing (scaling) the transmitted transform coefficient levels and applying an inverse transform. In a particular version, the complete residual block that corresponds to the block for which the inter-layer inter prediction signal is generated is transformed using a single transform (i.e., the entire block is transformed using a single transform of the same size as the prediction block). In another embodiment, the prediction block can be further subdivided (e.g., using a hierarchical decomposition) into smaller block and for each of the smaller block (which can also have different block sizes) a separate transform is applied. In a further embodiment, a coding unit can be divided into smaller prediction blocks and for zero or more of the prediction blocks the prediction signal is generated using one of the methods for inter-layer inter prediction. And then, the residual of the entire coding unit is transformed using a single transform, or the coding unit is subdivided into different transform units, where the subdivision for forming the transform units (blocks to which a single transform is applied) is different from the subdivision for decomposing a coding unit into prediction blocks.

Figure 30:
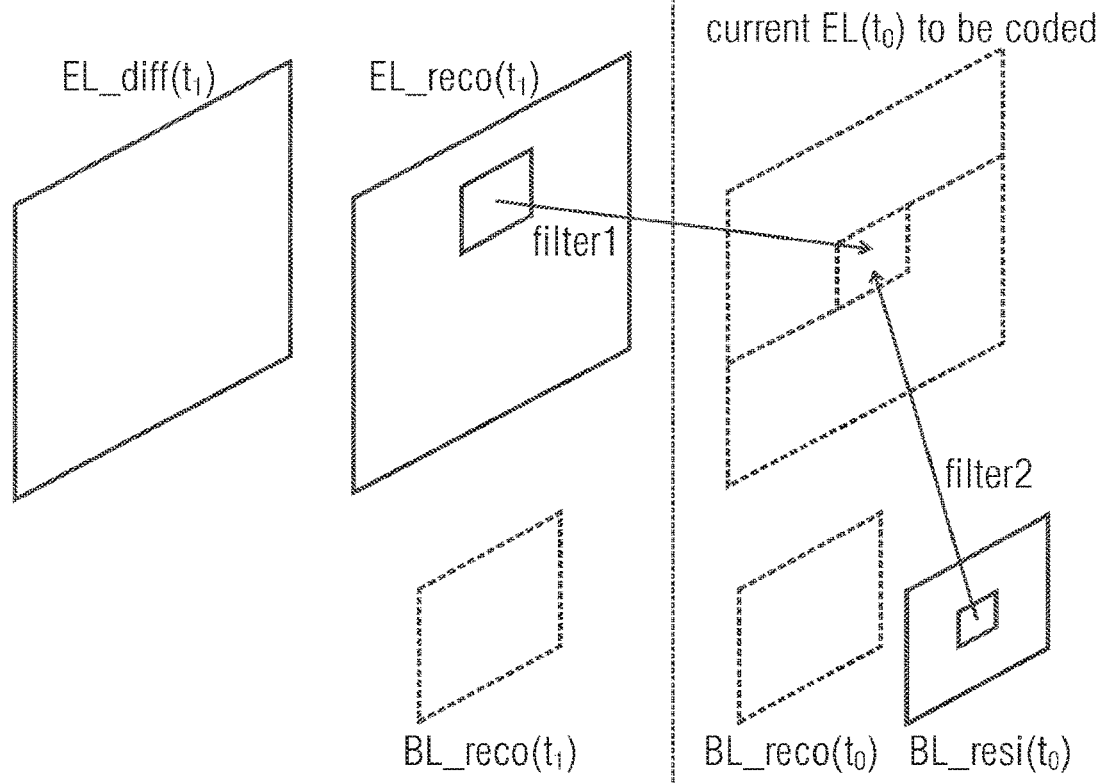
FIG. 30 illustrates prediction using the base layer residual and the enhancement layer reconstruction.

In the following, possibilities of performing the prediction using the base layer residual and the enhancement layer reconstruction are described. The multiple methods include the following method: A conventional inter prediction signal (derived by motion-compensated interpolation of already reconstructed enhancement layer pictures) is combined with an (upsampled/filtered) base layer residual signal (inverse transform of base layer transform coefficients or difference between base layer reconstruction and base layer prediction). This method is also referred to as the BL resi mode (cp. FIG. 30).

In short, the prediction for enhancement layer samples can be written as:

EL prediction=filter(BL resi($t_0$))+MCP_filter(EL reco ($t_1$)).

It is also possible that 2- or more hypotheses of enhancement layer reconstruction signals are used, for example, EL prediction=filter(BL resi($t_0$))+MCP_filter1(EL reco($t_1$))+MCP_filter2(EL reco($t_2$)).

The motion-compensated prediction (MCP) filters used on enhancement layer (EL) reference pictures can be of integer or fractional sample accuracy. The MCP filters used on the EL reference pictures can be the same or different from the MCP filters used on the BL reference pictures during the BL decoding process.

A motion vector MV(x,y,t) is defined to point to a particular location in an EL reference picture. The parameters x and y point to a spatial location within a picture and the parameter t is used to address the time index of reference pictures, also called as reference index. Often the term motion vector is used to refer only to the two spatial components (x,y). The integer part of a MV is used to fetch a set of samples from a reference picture and the fractional part of a MV is used to select a MCP filter from a set of filters. The fetched reference samples are filtered to produce filtered reference samples.

The motion vectors are generally coded using differential prediction. That means, a motion vector predictor is derived based on already coded motion vectors (and potentially a syntax element indicating the used of one of a set of potential motion vector predictors), and a difference vector is included in the bitstream. The final motion vector is obtained by adding the transmitted motion vector difference to the motion vector predictor. Typically, it is also possible to completely derive the motion parameters for a block. Therefore, typically, a list of potential motion parameter candidates is constructed based on already coded data. This list can include the motion parameters of spatially neighboring blocks as well as motion parameters that are derived based on motion parameters of a co-located block in a reference frame.

The base layer (BL) residual signal can be defined as one of the following:
 inverse transform of BL transform coefficients, or
 difference between BL reconstruction and BL prediction, or
 for BL blocks for which the inverse transform of BL transform coefficients is zero, it can be replaced with another signal derived from the BL, e.g., a high-pass filtered version of the reconstructed BL block, or
 a combination of the above methods.

For computing the EL prediction component from the current BL residual, the region in BL picture co-located with the considered region in EL picture is identified and the residual signal is taken from the identified BL region. A definition of co-located region can be made such that it accounts for integer scaling factor of BL resolution (e.g. 2× scalability), or fractional scaling factor of BL resolution (e.g. 1.5× scalability) or even producing the same EL resolution as the BL resolution (e.g. quality scalability). In case of quality scalability, the co-located block in the BL picture has the same coordinates as the EL block to be predicted.

The co-located BL residual can be upsampled/filtered to generate filtered BL residual samples.

The final EL prediction is obtained by adding the filtered EL reconstruction samples and the filtered BL residual samples.

The multiple methods concerning prediction using a base layer reconstruction and enhancement layer difference signal (see aspect J) include the following method: The (upsampled/filtered) reconstructed base layer signal is combined with a motion-compensated prediction signal, where the motion-compensated prediction signal is obtained by motion compensating difference pictures. The difference pictures represent the difference of the reconstructed enhancement layer signal and the (upsampled/filtered) reconstructed base layer signal for the reference pictures. This method is also referred to as the BL_reco mode.

Figure 31:
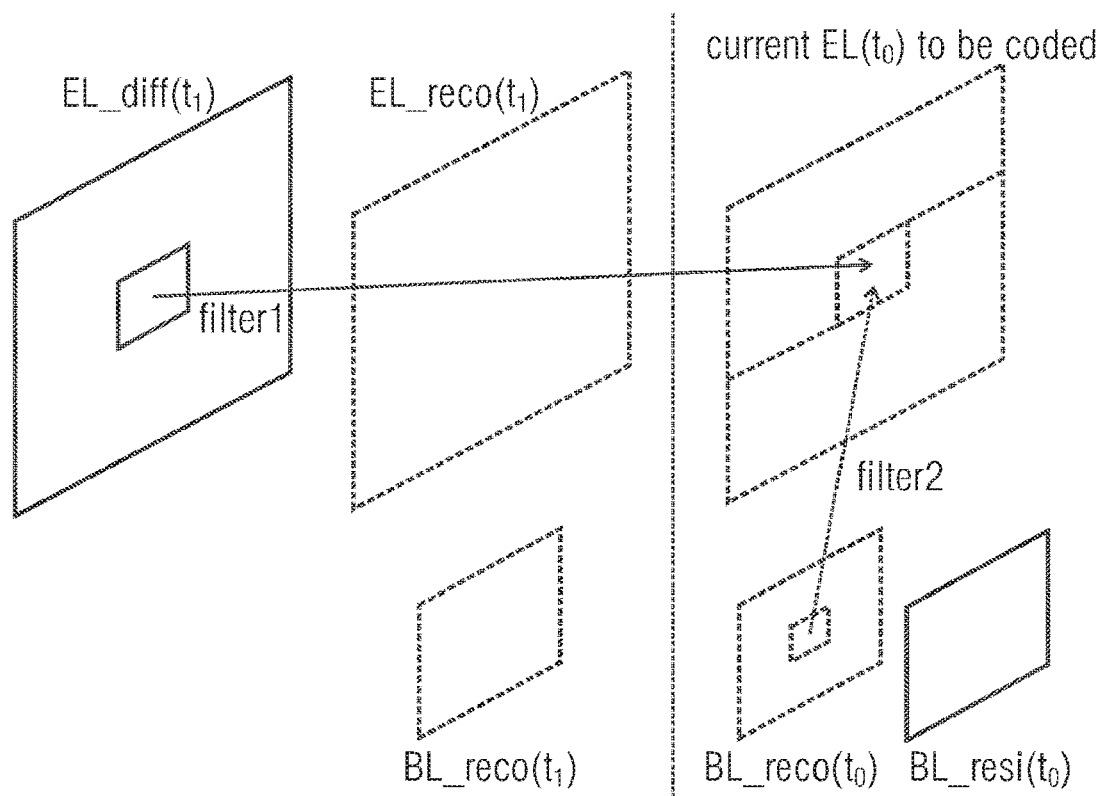
FIG. 31 illustrates prediction using BL reconstruction and EL difference signal.

This concept is illustrated in FIG. 31. In short, the prediction for EL samples can be written as:

EL prediction=filter(BL_reco($t_0$))+MCP_filter(EL diff($t_1$)).

It is also possible that 2- or more hypotheses of EL difference signals are used, e.g., EL prediction=filter(BL resi($t_0$))+MCP_filter1(EL diff($t_1$))+MCP_filter2(EL diff($t_2$)).

For the EL difference signal, the following versions can be used:
difference between EL reconstruction and upsampled/filtered BL reconstruction, or
difference between EL reconstruction before or between loop filtering stages (like Deblocking, SAO, ALF) and upsampled/filtered BL reconstruction.

The usage of a particular version can be can be fixed in the decoder or it can be signaled at a sequence level, picture level, slice level, largest coding unit level, coding unit level, or other partitioning levels. Or it can be made dependent on other coding parameters.

When the EL difference signal is defined to use the difference between EL reconstruction and upsampled/filtered BL reconstruction, it becomes amenable to just save EL reconstruction and BL reconstruction and compute the EL difference signal on-the-fly for the blocks using this prediction mode, thereby saving the memory necessitated to store the EL difference signal. However, it may incur a slight computational complexity overhead.

The MCP filters used on EL difference pictures can be of integer or fractional sample accuracy.
For MCP of difference pictures, different interpolation filters than for MCP of reconstructed pictures can be used.
For MCP of difference pictures, interpolation filters can be selected based on the characteristics of the corresponding area in the difference picture (or based on coding parameters or based on information transmitted in the bitstream).

A motion vector MV(x,y,t) is defined to point to a particular location in an EL difference picture. The parameters x and y point to a spatial location within a picture and the parameter t is used to address the time index of the difference picture.

The integer part of a MV is used to fetch a set of samples from a difference picture and the fractional part of a MV is used to select a MCP filter from a set of filters. The fetched difference samples are filtered to produce filtered difference samples.

The dynamic range of difference pictures can theoretically exceed the dynamic range of original pictures. Assuming an 8-bit representation of images in the range 0 255, the difference images can have a range of −255 255. However, in practice, most of the amplitudes are distributed around the positive and negative vicinity of 0. In an embodiment of storing the difference images, a constant offset of 128 is added and the result is clipped to the range 0 255 and stored as regular 8-bit images. Later, in the encoding and decoding process, the offset of 128 is subtracted back from the difference amplitude loaded from the difference pictures.

For methods that use the reconstructed BL signal, the following versions can be used. This can be fixed or it can be signaled at a sequence level, picture level, slice level, largest coding unit level, coding unit level, or other partitioning levels. Or it can be made dependent on other coding parameters.
Reconstructed base layer samples before deblocking and further in-loop processing (such as sample adaptive offset filter or adaptive loop filter).
Reconstructed base layer samples after deblocking but before further in-loop processing (such as sample adaptive offset filter or adaptive loop filter).
Reconstructed base layer samples after deblocking and further in-loop processing (such as sample adaptive offset filter or adaptive loop filter) or between multiple in-loop processing steps.

For computing the EL prediction component from current BL reconstruction, the region in BL picture co-located with the considered region in EL picture is identified and the reconstruction signal is taken from the identified BL region. A definition of co-located region can be made such that it accounts for integer scaling factor of BL resolution (e.g. 2× scalability), or fractional scaling factor of BL resolution (e.g. 1.5× scalability) or even producing the same EL resolution as the BL resolution (e.g. SNR scalability). In case of SNR scalability, the co-located block in the BL picture has the same coordinates as the EL block to be predicted.

The final EL prediction is obtained by adding the filtered EL difference samples and the filtered BL reconstruction samples.

Figure 32:
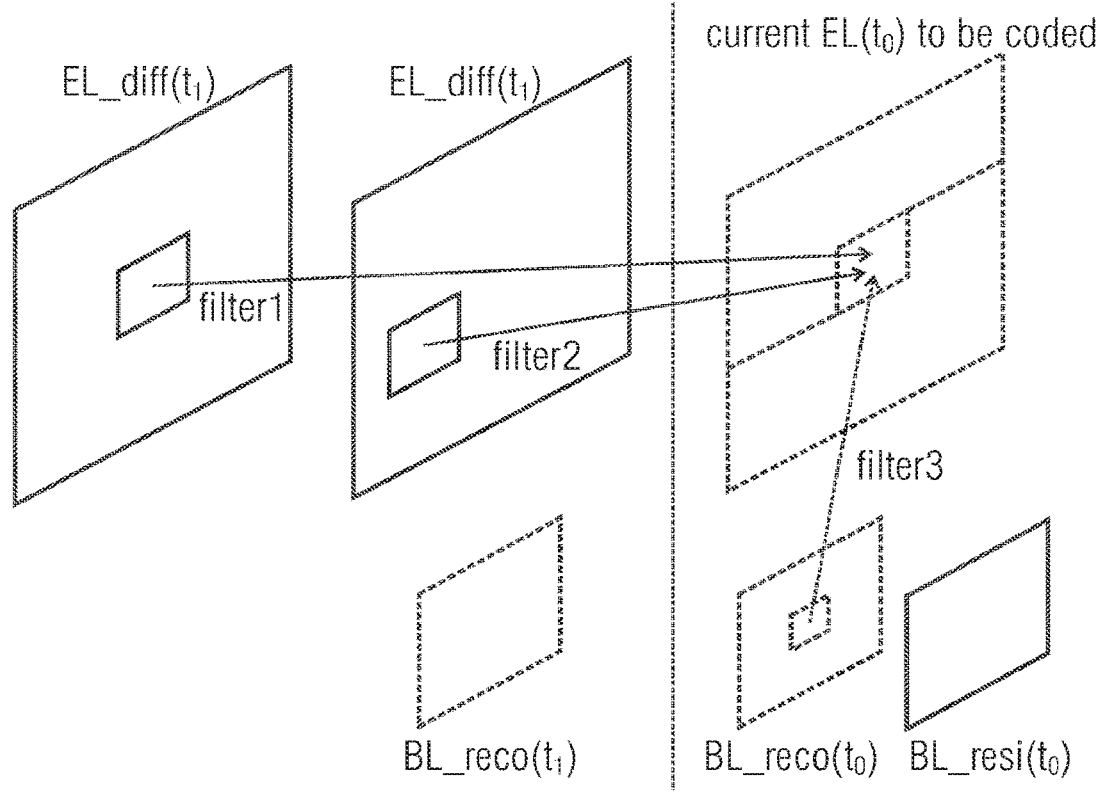
FIG. 32 illustrates prediction using BL reconstruction and 2-hypotheses of EL difference signal.

Some possible variations of the mode that combines an (upsampled/filtered) base layer reconstruction signal and a motion-compensated enhancement layer difference signal are listed below:
Multiple versions of the methods that use the (upsampled/filtered) BL signal can be used. The employed upsampled/filtered BL signal for these versions can differ in the used interpolation filters (including interpolation filters that also filter the integer-sample positions), or the upsampled/filtered BL signal for the second version can be obtained by filtering the upsampled/filtered BL signal for the first version. The selection of one of the different version can be signaled at a sequence, picture, slice, largest coding unit, coding unit level, or other levels of picture partitioning, or it can be inferred from the characteristics of the corresponding reconstructed BL signal or the transmitted coding parameters.
Different filters can be used for upsampling/filtering the BL reconstructed signal in case of the BL reco mode and the BL residual signal in case of the BL resi mode.
It is also possible that the upsampled/filtered BL signal is combined with 2- or more hypotheses of motion-compensated difference signals. This is illustrated in FIG. 32

Considering the above, a prediction may be performed by using a combination of base layer reconstruction and enhancement layer reconstruction (see aspect C). One major difference to the description above with respect to FIGS. 11, 12 and 13, is the coding mode to obtain the intra-layer prediction 34 which is performed temporally rather than spatially. That is, instead of spatial prediction 30, temporal prediction 32 is used so as to form the intra-layer prediction signal 34. Accordingly, some aspects described below are readily transferable onto the above embodiments of FIGS. 6 to 10 and 11 to 13, respectively. The multiple methods include the following method: The (upsampled/filtered) reconstructed base layer signal is combined with an inter prediction signal, where the inter prediction is derived by motion-compensated prediction using reconstructed enhancement layer pictures. The final prediction signal is obtained by weighting the inter prediction signal and the base layer prediction signal in a way that different frequency components use a different weighting. This can be, for example, realized by any of the following:

Filtering the base layer prediction signal with a low-pass filter and filtering the inter prediction signal with a high-pass filter and adding up the obtained filtered signals.

Transform the base layer prediction signal and the inter prediction signal and superimpose the obtained transform blocks, where different weighting factors are used for different frequency positions. The obtained transform block can then be inverse transformed and used as enhancement layer prediction signal or the obtained transform coefficients can be added to the scaled transmitted transform coefficient levels and then inverse transformed in order to obtain the reconstructed block before deblocking and in-loop processing.

This mode is may also be referred to as BL comb mode illustrated in FIG. 33.

In short, the EL prediction can be expressed as,

EL prediction=BL_weighting(BL_reco($t_0$))+
EL_weighting(MCP_filter(EL_reco($t_1$))).

In an embodiment, the weighting is made dependent on the ratio of EL resolution to the BL resolution. For instance, when the BL is to be scaled up by a factor in the range 1, 1.25) certain set of weights for the EL and BL reconstruction can be used. When the BL is to be scaled up by a factor in the range 1.25 1.75), a different set of weights can be used. When the BL is to be scaled up by a factor of 1.75 or above, a further different set of weights can be used, and so on.

Rendering the specific weighting dependent on the scaling factor separating base and enhancement layer is also feasible with the other embodiment concerning spatial intra-layer prediction.

In another embodiment, the weighting is made dependent on the EL block size to be predicted. For instance, for a 4×4 block in the EL, a weighting matrix can be defined that specifies the weighting for the EL reconstruction transform coefficients and another weighting matrix can be defined that specifies the weighting for the BL reconstruction transform coefficients. A weighting matrix for BL reconstruction transform coefficients can be, e.g., 64, 63, 61, 49,
63, 62, 57, 40,
61, 56, 44, 28,
49, 46, 32, 15,
and a weighting matrix for the EL reconstruction transform coefficients can be, e.g.,
0, 2, 8, 24,
3, 7, 16, 32,
9, 18, 20, 26,
22, 31, 30, 23, Similarly for block sizes like 8×8, 16×16, 32×32 and others, separate weighting matrices can be defined.

The actual transform used for the frequency domain weighting can be the same or different from the transform used to code the prediction residual. For example, an integer approximation for the DCT can be used for both frequency domain weighting and to compute transform coefficients of prediction residual to be coded in frequency domain.

In another embodiment, a maximum transform size is defined for the frequency domain weighting, in order to restrict the computational complexity. If the considered EL block size is greater than the maximum transform size, the EL reconstruction and BL reconstruction is spatially split into a series of adjacent sub-blocks and the frequency domain weighting is performed on the sub-blocks and the final prediction signal is formed by assembling the weighted results.

Furthermore, the weighting can be performed on luminance and chrominance components or a selected subset of the color components.

In the following, different possibilities for deriving enhancement layer coding parameters are described. The coding (or prediction)-parameters to be used for reconstructing an enhancement layer block can be derived by multiple methods from the co-located coding parameters in the base layer. The base and enhancement layers can have different spatial resolution or they can have the same spatial resolution.

In the scalable video extension of the H.264/AVC inter-layer motion prediction is performed for macroblock types, which are signaled by the syntax element base mode flag. If the base mode flag is equal to 1 and the corresponding reference macroblock in the base layer is inter-coded the enhancement layer macroblock is also inter-coded, and all motion parameters are inferred from the co-located base layer block(s). Otherwise (base mode flag is equal to 0), for each motion vector a so-called motion prediction flag syntax element is transmitted and specified whether base layer motion vectors are used as motion vector predictor. If the motion prediction flag equals 1 the motion vector predictor of the collocated reference block of the base layer is scaled according to the resolution ratio and used as the motion vector predictor. If the motion prediction flag equals to 0 the motion vector predictor is computed as specified in H.264/AVC.

In the following, methods for deriving enhancement layer coding parameters are described. The sample array associated with a base layer picture is decomposed into blocks and each block has associated coding (or prediction)-parameters. In other words, all sample positions inside a particular block have identical associated coding (or prediction)-parameters. The coding parameters may include parameters for motion compensated prediction comprised of the number of motion hypotheses, reference indices, motion vectors, motion vector predictor identifiers and merge identifiers. The coding parameters may also include intra prediction parameters such as intra prediction directions.

It can be signaled inside the bit stream that a block in the enhancement layer is coded using co-located information from the base layer.

For example, the derivation of enhancement layer coding parameters (see aspect T) could be made as follows. For an N×M block in an enhancement layer, which is signaled to be using co-located base layer information, the coding parameters associated to the sample positions inside the block can be derived based on the coding parameters associated to the co-located sample positions in the base layer sample array.

In a particular embodiment, this process is done by the following steps:

1. Derivation of coding parameters for each sample position in the N×M enhancement layer block based on the base layer coding parameters.
2. Derivation of a partitioning of the N×M enhancement layer block into sub-blocks, such that all sample positions inside a particular sub-block have identical associated coding parameters.

The second step can also be omitted.

Step 1 can be performed by using a function $f_c$ of the enhancement layer sample position $P_{el}$, giving the coding parameters c, i.e., $C=f_c(P_{el})$.

For example, to ensure a minimum block size m×n in the enhancement layer, the function $f_c$ an return the coding parameters c associated to $P_{bl}$ given by the function $f_{p,m\times n}$ with $$f_{p,mxn}(P_{el}) = P_{bl}$$
$$x_{bl} = \text{floor}\left(\frac{x_{el}}{n}\right)*n$$
$$y_{bl} = \text{floor}\left(\frac{y_{el}}{m}\right)*m$$
$$P_{bl} = (x_{bl}, y_{bl})$$
$$P_{el} = (x_{el}, y_{el})$$

The distance between two horizontally or vertically adjacent base layer sample positions is thereby equal to 1, and the top left most base layer sample and the top left most enhancement layer sample both have position p=(0,0).

As another example, the function $f_c$ ($P_{el}$) can return the coding parameters c associated to the base layer sample position $P_{b1}$ which is nearest to the base layer sample position $P_{el}$.

The function $f_c(P_{el})$ can also interpolate coding parameters in case the given enhancement layer sample position has fractional components in units of the distance between base layer sample positions.

Before returning motion parameters, the function $f_c$ rounds the spatial displacement components of the motion parameters to the nearest available value in the enhancement layer sampling grid.

After step 1, each enhancement layer sample can be predicted, as each sample position has associated prediction parameters after step 1. Nevertheless, in step 2 a block partitioning can be derived for the purpose of performing prediction operations on larger blocks of samples, or for the purpose of transform coding the prediction residual within the blocks of the derived partitioning.

Step 2 can be performed by grouping enhancement layer sample positions into square or rectangular blocks, each being decomposed into one of a set of allowed decompositions into sub-blocks. The square or rectangular blocks correspond to leafs in a quad tree structure in which they can exist on different levels as depicted in FIG. 34.

The level and decomposition of each square or rectangular block can be determined by performing the following ordered steps:
a) Set the highest level to the level corresponding to blocks of size N×M. Set the current level to the lowest level, that is the level at which a square or rectangular block contains a single block of the minimum block size. Go to step b).
b) For each square or rectangular block at the current level, if an allowed decomposition of the square or rectangular block exists, such that all sample positions inside each sub-block are associated to identical coding parameters, or are associated to coding parameters with small differences (according to some difference measure), that decomposition is a candidate decomposition. Of all candidate decompositions, choose the one that decomposes the square or rectangular block into the least number of sub-blocks. If the current level is the highest level, go to step c). Otherwise, set the current level to the next higher level and go to step b).
c) Finished The function $f_c$ can be chosen in such a way, that there exists at least one candidate decomposition at some level in step b).

The grouping of blocks with identical coding parameters is not restricted to square blocks, but the blocks can also be summarized to rectangular blocks. Furthermore, the grouping is not restricted to a quadtree structure, it is also possible to use decomposition structures in which a block is decomposed into two rectangular blocks of the same size or two rectangular blocks of different sizes. It is also possible to use a decomposition structures that uses a quadtree decomposition up to a particular level and then uses a decomposition into two rectangular blocks. Also, any other block decomposition is possible.

In contrast to the SVC inter-layer motion parameter prediction mode, the described mode is not only supported at a macroblock level (or largest supported block size), but at arbitrary block sizes. That means, the mode cannot only be signaled for the largest supported block size, but a block of the largest supported block size (macroblock in MPEG-4, H.264 and coding tree block/largest coding unit in HEVC) can be hierarchically subdivided into smaller blocks/coding units and the usage of the inter-layer motion mode can be signaled at any supported block size (for the corresponding block). In a particular embodiment, this mode is only supported for selected block sizes. Then, the syntax element that signals the usage of this mode can be transmitted only for the corresponding block sizes, or the values of a syntax element that signals (among other coding parameters) the usage of this mode can be correspondingly restricted for other block sizes. Another difference to the inter-layer motion parameter prediction mode in the SVC extension of H.264/AVC is that the block that is coded in this mode is not completely inter coded. The block can contain intra coded sub-blocks, depending on the co-located base layer signal.

One of several methods to reconstruct an M×M enhancement layer block of samples using coding parameters derived by the above described method can be signaled inside the bit stream. Such methods to predict an enhancement layer block using derived coding parameters may include the following:

- Derive a prediction signal for the enhancement layer block using the derived motion parameters and the reconstructed enhancement layer reference pictures for motion compensation.
- Combination of (a) (upsampled/filtered) base layer reconstruction for current picture and (b) motion compensated signal using the derived motion parameters and enhancement layer reference picture that are generated by subtracting the (upsampled/filtered) base layer reconstruction from the reconstructed enhancement layer picture.
- Combination of (a) (upsampled/filtered) base layer residual (difference between reconstructed signal and prediction or inverse transform of coded transform coefficient values) for current picture and (b) motion compensated signal using the derived motion parameters and the reconstructed enhancement layer reference pictures.

The process for deriving the partitioning into smaller blocks for the current blocks and deriving coding parameters for the sub-blocks can classify some of the sub-blocks as intra-coded while the other sub-blocks are classified as inter-coded. For inter-coded sub-block, the motion parameters are also derived from the co-located base layer blocks. But if the co-located base layer block is intra coded, the corresponding subblock in the enhancement layer may be also classified as intra coded. For the samples of such intra-coded sub-blocks, the enhancement layer signal can be predicted by using information from the base layer, as for example:

An (upsampled/filtered) version of the corresponding base layer reconstruction is used as intra prediction signal.

The derived intra prediction parameters are used for spatial intra prediction in the enhancement layer.

The following embodiments to predict an enhancement layer block using a weighted combination of prediction signals contain a method to generate a prediction signal for an enhancement layer block by combining (a) an enhancement layer internal prediction signal obtained by spatial or temporal (i.e. motion compensating) prediction using reconstructed enhancement layer samples and (b) a base layer prediction signal which is the (upsampled/filtered) base layer reconstruction for the current picture. The final prediction signal is obtained by weighting the enhancement layer internal prediction signal and the base layer prediction signal in a way that for each sample a weight according to weighting function is used.

The weighting function can for example be realized by the following method. Compare a low pass filtered version of the original enhancement layer internal prediction signal v with a low pass filtered version of the base layer reconstruction u. Derive from that comparison a weight for each sample position to be used to combine the original inter prediction signal and the (upsampled/filtered) base layer reconstruction. The weight can for example be derived by mapping the difference u−v to a weight w using a transfer function t, i.e., $$t(u-v)=w$$

A different weighting function can be used for different block sizes of the current block to be predicted. Also, the weighting function can be modified according to the temporal distance of the reference pictures the inter prediction hypotheses are obtained from.

In case of the enhancement layer internal prediction signal being an intra prediction signal, the weighting function can for example also be realized by using a different weight depending on the position inside the current block to be predicted.

In an embodiment, the method to derive enhancement layer coding parameters is used, and step 2 of the method is using the set of allowed decompositions of a square block as depicted in FIG. 35.

In an embodiment, the function $f_c(P_{el})$ returns the coding parameters associated to the base layer sample position given by the function $f_{p,m \times n}(P_{el})$ described above with m=4, n=4.

In an embodiment, the function $f_c(P_{el})$ returns the following coding parameters c:

First, a base layer sample position is derived as $P_{bl}=f_{p,4 \times 4}(P_{el})$.

If $P_{bl}$ has associated inter prediction parameters that were obtained by merging with a previously coded base layer block (or has the same motion parameters), c is equal to the motion parameters of the enhancement layer block which corresponds to the base layer block that is used for merging in the base layer (i.e., the motion parameters are copied from the corresponding enhancement layer block).

Otherwise, c equals the coding parameters associated to $P_{bl}$.

Also a combination of the above embodiments is possible.

In another embodiment, for an enhancement layer block which is signaled to be using co-located base layer information, associate to those enhancement layer sample positions with derived intra prediction parameters a default set of motion parameters, so that a block can be merged with the block containing these samples (i.e. copy the default set of motion parameters). The default set of motion parameters is comprised of an indicator to use one or two hypotheses, reference indices referencing the first picture in a reference picture list, and motion vectors with zero spatial displacement.

In another embodiment, for an enhancement layer block which is signaled to be using co-located base layer information, the enhancement layer samples with derived motion parameters are predicted and reconstructed first in some order. After that, the samples with derived intra prediction parameters are predicted in an intra reconstruction order. Thereby, the intra prediction can then use the already reconstructed sample values from (a) any neighboring inter prediction block and (b) neighboring intra prediction blocks which are predecessors in the intra reconstruction order.

In another embodiment, for enhancement layer blocks being merged (i.e. taking the motion parameters derived from other inter predicted blocks), the list of merge candidates additionally contains a candidate from the corresponding base layer block and if the enhancement layer has a higher spatial sampling rate than the base layer, additionally contains up to four candidates derived from the base layer candidate by refining the spatial displacement components to neighboring values only available in the enhancement layer.

In another embodiment, the difference measure used in step 2 b) states that there are small differences in a sub-block only if there are no differences at all, i.e. a sub-block can only be formed when all contained sample positions have identical derived coding parameters.

In another embodiment, the difference measure used in step 2 b) states that there are small differences in a sub-block if either (a) all contained sample positions have derived motion parameters and no pair of sample positions inside the block have derived motion parameters differing more than a particular value according to a vector norm applied to the corresponding motion vectors or (b) all contained sample positions have derived intra prediction parameters and no pair of sample positions inside the block have derived intra prediction parameters differing more than a particular angle of directional intra prediction. The resulting parameters for the sub-block are calculated by mean or median operations.

In another embodiment, the partitioning obtained by inferring coding parameters from the base layer can be further refined based on side information signaled inside the bitstream.

In another embodiment, the residual coding for a block for which the coding parameters are inferred from the base layer is independent of the partitioning into blocks that is inferred from the base layer. That means, for example, that a single transform may be applied to a block although the inferring of coding parameters from the base layer partitions the blocks into several sub-block each with a separate set of coding parameters. Or the block for which the partitioning and the coding parameters for the sub-blocks are inferred from the base layer may be split into smaller blocks for the purpose of transform coding the residual, where the splitting into transform blocks is independent from the inferred partitioning into blocks with different coding parameters.

In another embodiment, the residual coding for a block for which the coding parameters are inferred from the base layer is dependent of the partitioning into blocks that is inferred from the base layer. That means, for example, that for transform coding the splitting of the block in transform blocks is dependent of the partitioning that is inferred from the base layer. In one version, a single transform may be applied to each of the sub-blocks with different coding parameters. In another version, the partitioning may be refined based on side information include into the bitstream. In another version, some of the sub-blocks may be summarized to a larger block as signaled inside the bitstream for the purpose of transform coding the residual signal.

Embodiments obtained by combinations of the above described embodiments are also possible.

Relating to enhancement layer motion vector coding, this following part describes a method for reducing motion information in scalable video coding applications by providing multiple enhancement layers predictors and employing the motion information coded in the base layer to code the motion information of the enhancement layer efficiently. This idea is applicable for scalable video coding including spatial, temporal and quality scalability.

In the scalable video extension of the H.264/AVC interlayer motion prediction is performed for macroblock types, which are signaled by the syntax element base mode flag.

If the base mode flag is equal to 1 and the corresponding reference macroblock in the base layer is inter-coded the enhancement layer macroblock is also inter-coded, and all motion parameters are inferred from the co-located base layer block(s). Otherwise (base mode flag is equal to 0), for each motion vector a so-called motion prediction flag syntax element is transmitted and specified whether base layer motion vectors are used as motion vector predictor. If the motion prediction flag equals 1 the motion vector predictor of the collocated reference block of the base layer is scaled according to the resolution ratio and used as the motion vector predictor. If the motion prediction flag equals to 0 the motion vector predictor is computed as specified in H.264/AVC.

In HEVC motion parameters are predicted by applying advanced motion vector competition (AMVP). AMVP features two spatial and one temporal motion vector predictors that compete with each other. The spatial candidates are selected from positions of neighboring prediction blocks located to the left or above the current prediction block. The temporal candidate is selected among co-located positions of a previously coded picture. The positions of all spatial and temporal candidates are displayed in FIG. 36.

After the spatial and temporal candidates are inferred a redundancy check is performed which may introduce zero motion vector as candidates to the list. An index addressing the candidate list is transmitted to identify the motion vector predictor that is used together with the motion vector difference for motion compensated prediction.

Figure 37:
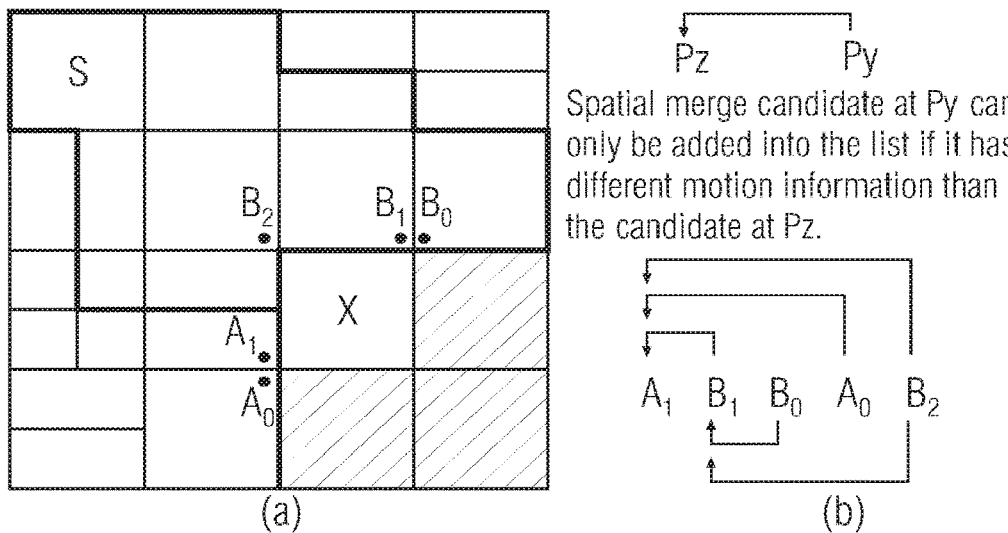
FIG. 37 illustrates the block merging algorithm (a) and the performed redundancy check for spatial candidates (b)

HEVC further employs a block merging algorithm, which targets the reduction of coding redundant motion parameters that result from quad-tree based coding schemes. This is achieved by creating regions consisting of multiple prediction blocks sharing identical motion parameters. These motion parameters only need to be coded once for the first prediction block of each region—seeding new motion information. Similar to AMVP the block merging algorithm constructs a list containing possible merge candidates for each prediction block. The number of candidates is defined by NumMergeCands, which is signaled in the slice header and ranges from 1 up to 5. The candidates are inferred from spatially neighboring prediction blocks and from prediction blocks in collocated temporal pictures. Possible sample positions for the prediction blocks that are considered as candidates are equal to the positions shown in FIG. 36. An example of the block merging algorithm with a possible prediction block partitioning in HEVC is illustrated in FIG. 37. The bold line in illustration (a) defines the prediction blocks that are merged into one region and that all hold the identical motion data. This motion data is transmitted for block S only. The current prediction block to be coded is denoted by X. The blocks in the striped area do not have associated prediction data yet, as these prediction blocks are successors to prediction block X in block scanning order. The dots indicate the sample positions of the adjacent blocks that are possible spatial merge candidates. Before the possible candidates are inserted to the predictor list a redundancy check for the spatial candidates is performed as denoted in (b) of FIG. 37.

In cases where the number of spatial and temporal candidates is less than NumMergeCands additional candidates are provided by combining existing candidates or by inserting zero motion vector candidates. If a candidate is added to the list it is equipped with an index, which is used to identify the candidate. With the addition of a new candidate to the list the index is increased (starting from 0) until the list is completed with the last candidate identified by index NumMergeCands−1. A fixed length codeword is used for coding the merge candidate index to ensure an independent operation of the derivation of the candidate list and the parsing of the bit stream.

The following section describes a method for using multiple enhancement layer predictors including predictors derived from the base layer to code the motion parameters of the enhancement layer. Motion information that is already coded for the base layer can be employed to significantly reduce the motion data rate while coding the enhancement layer. This method includes the possibility to directly derive all motion data of a prediction block from the base layer in which case no additional motion data needs to be coded. In the following description the term prediction block refers to a prediction unit in HEVC, a M×N block in H.264/AVC and can be understood as a general set of samples in a picture.

Figure 38:
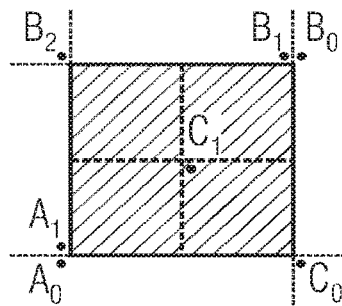
FIG. 38 illustrates alternative positions that can be used to infer the motion vector predictors.

The first part of the present section is about extending the list of motion vector prediction candidates by a base layer motion vector predictor (see aspect K). A base layer motion vector is added to the motion vector predictor list during the enhancement layer coding. This is achieved by inferring one or multiple motion vector predictors of the co-located prediction block from the base layer and use them as candidates in the list of the predictors for the motion compensated prediction. The co-located prediction block of the base layer is located at the center, to the left, above, to the right or underneath of the current block. If the prediction block of the base layer of the selected position does not contain any motion related data or resides outside of the current scope and is therefore currently not accessible alternative positions can be used to infer the motion vector predictors. These alternative positions are depicted in FIG. 38.

The motion vectors inferred of the base layer may be scaled according to the resolution ratio before they can be used as predictor candidates. An index addressing the candidate list of motion vector predictors as well as a motion vector difference are transmitted for a prediction block, which specify the final motion vector used for motion-compensated prediction. In contrast to the scalable extension of the H.264/AVC standard the embodiments presented here do not constitute the usage of the motion vector predictor of the collocated block in the reference picture—rather it is available in a list among other predictors and can be addressed by an index which is transmitted.

In an embodiment the motion vector is derived from center position $C_1$ of the collocated prediction block of the base layer and added to the top of the candidate list as a first entry. The candidate list of motion vector predictors is extended by one item. If there is no motion data in the base layer available for the sample position $C_1$ the list construction is untouched. In another embodiment any sequence of sample positions in the base layer may be checked for motion data. In case motion data is found, the motion vector predictor of the corresponding position is inserted to the candidate list and available for the motion compensated prediction of the enhancement layer. Furthermore the motion vector predictor derived from the base layer may be inserted to the candidate list at any other position of the list. In another embodiment the base layer motion predictor may only be inserted to the candidate list if certain constraints are met. These constraints include the value of the merge flag of the collocated reference block, which has to be equal to 0. Another constraint may be the dimensions of the prediction block in the enhancement layer equaling the dimensions of the collocated prediction block of the base with respect to the resolution ratio. For example in the application of K×spatial scalability—if the width of the collocated block in the base layer equals to N the motion vector predictor may only be inferred if the width of the prediction block to be coded in the enhancement layer equals to K*N.

In another embodiment more than one motion vector predictors from several sample position of the base layer may be added to the candidate list of the enhancement layer. In another embodiment the candidate with the motion vector predictor inferred from the collocated block may replace spatial or temporal candidates in the list rather than extending the list. It is also possible to include multiple motion vector predictors derived from base layer data into the motion vector predictor candidate list.

The second part is about extending the list of merge candidates by a base layer candidate (see aspect K). Motion data of one or more collocated blocks of the base layer is added to the merge candidate list. This method enables the possibility to create a merge region sharing the identical motion parameters across the base and the enhancement layer. Similar to the previous section the base layer block that covers the collocated sample at the center position is not limited to this center position but can be derived from any position in the immediate vicinity, as depicted in FIG. 38. In case no motion data is available or accessible for a certain position alternative positions can be selected to infer possible merge candidates. Before the derived motion data is inserted to the merge candidate list it may be scaled according to the resolution ratio. An index addressing the merge candidate list is transmitted and defines the motion vector, which is used for the motion compensation prediction. However the method may also suppress possible motion predictor candidates depending on the motion data of the prediction block in the base layer.

In an embodiment the motion vector predictor of the collocated block in the base layer covering the sample position $C_1$ of FIG. 38 is considered as a possible merge candidate for coding the current prediction block in the enhancement layer. However the motion vector predictor is not inserted to the list if the merge_flag of the reference block equals 1 or if the collocated reference block contains no motion data. In any other case the derived motion vector predictor is added as a second entry to the merge candidate list. Note, in this embodiment the length of the merge candidate list is retained and not extended. In another embodiment one or more motion vector predictors may be derived from prediction blocks covering any of the sample positions as depicted in FIG. 38 and added to merge candidate list. In another embodiment one or several motion vector predictors of the base layer may be added at any position to the merge candidate list. In another embodiment, one or multiple motion vector predictor may only be added to the merge candidate list if certain constraints are met. Such constraints include the prediction block dimensions of the enhancement layer matching the dimensions of the collocated block of the base layer (with respect to the resolution ratio as described in the previous embodiment section for motion vector prediction). Another constraint in another embodiment may be the value of the merge_flag equaling to 1. In another embodiment the length of the merge candidate list may be extended by the number of motion vector predictors inferred from the collocated reference blocks of the base layer.

The third part of this specification is about reordering the motion parameter (or merge) candidate list using base layer data (see aspect L) and describes the process of re-ordering the merge candidate list according to the information already coded in the base layer. If the collocated base layer block that covers the sample of the current block is motion compensated predicted with a candidate derived from a particular origin, the corresponding enhancement layer candidate from the equivalent origin (if existent) is put as the first entry at the top of the merge candidate list. This step is equal to addressing this candidate with the lowest index, which results in assigning the cheapest codeword to this candidate.

In an embodiment the collocated base layer block is motion compensated predicted with a candidate that originates from a prediction block that covers the sample position $A_1$ as depicted in FIG. 38. If the merge candidate list of the prediction block in the enhancement layer contains a candidate whose motion vector predictor originates from the corresponding sample position $A_1$ inside the enhancement layer this candidate is put as the first entry into the list. Consequently this candidate is indexed by index 0 and therefore assigned the shortest fixed length codeword. In this embodiment this step is performed after the derivation of the motion vector predictor of the collocated base layer block for the merge candidate list in the enhancement layer. Hence the reordering process assigns the lowest index to the candidate that originates from the corresponding block as the collocated base layer block's motion vector predictor. The second lowest index is assigned to the candidate that is derived from the collocated block in the base layer as described in the second part of this section. Furthermore the reordering process is only taking place if the merge_flag of the collocated block in the base layer is equal to 1. In another embodiment the reordering process may be performed independent of the value of merge_flag of the collocated prediction block in the base layer. In another embodiment the candidate with the motion vector predictor of the corresponding origin may be put at any position of the merge candidate list. In another embodiment the reordering process may remove all other candidates in the merge candidate list. Here only the candidate whose motion vector predictor has the same origin as the motion vector predictor used for the motion compensated prediction of collocated block in the base layer remains in list. In this case a single candidate is available and the no index is transmitted.

The fourth part of this specification is about reordering the motion vector predictor candidate list using base layer data (see aspect L) and embodies the process of re-ordering the candidate list of the motion vector prediction using the motion parameters of the base layer block. If the collocated base layer block that covers the sample of the current prediction block uses a motion vector from a particular origin, the motion vector predictor from the corresponding origin in the enhancement layer is used as a first entry in the motion vector predictor list of the current prediction block. This results in assigning the cheapest codeword to this candidate.

In an embodiment the collocated base layer block is motion compensated predicted with a candidate that originates from a prediction block that covers the sample position $A_1$ as depicted in FIG. 38. If the motion vector predictor candidate list of the block in the enhancement layer contains a candidate whose motion vector predictor originates from the corresponding sample position A1 inside the enhancement layer this candidate is put as the first entry into the list. Consequently this candidate is indexed by index 0 and therefore assigned the shortest fixed length codeword. In this embodiment this step is performed after the derivation of the motion vector predictor of the collocated base layer block for the motion vector predictor list in the enhancement layer. Hence the reordering process assigns the lowest index to the candidate that originates from the corresponding block as the collocated base layer block's motion vector predictor. The second lowest index is assigned to the candidate that is derived from the collocated block in the base layer as described in the first part of this section. Furthermore the reordering process is only taking place if the merge_flag of the collocated block in the base layer is equal to 0. In another embodiment the reordering process may be performed independent of the value of merge_flag of the collocated prediction block in the base layer. In another embodiment the candidate with the motion vector predictor of the corresponding origin may be put at any position of the motion vector predictor candidate list.

The following is about enhancement layer coding of transform coefficients.

In the state-of-the-art video and image coding the residual of a prediction signal is forward transformed and the resulting quantized transform coefficients are signaled within the bit stream. This coefficient coding follows a fixed scheme:

Depending on the transformation size (for luma residuals: 4×4, 8×8, 16×16 and 32×32) different scan directions are defined. Given the first and the last position in scan order, these scans uniquely determine which coefficient positions can be significant, and thus need to be coded. In all scans the first coefficient is set to be the DC coefficient at position (0,0), whereas the last position has to be signaled within the bitstream, which is done by coding its x (horizontal) and y (vertical) position within the transformation block. Starting from the last position, the signaling of significant coefficients is done in a reverse scan order until the DC position is reached.

For transformation sizes 16×16 and 32×32 only one scan is defined, i.e. the 'diagonal scan', whereas transformation blocks of sizes 2×2, 4×4, and 8×8 can additionally make use of the 'vertical' and 'horizontal' scan. However, the use of the vertical and horizontal scan is restricted to residuals of intra predicted coding units and the actual used scan is derived from the direction mode of that intra prediction. Direction modes with an index in the range of 6 and 14 result in a vertical scan, whereas direction modes with an index in the range of 22 and 30 result in a horizontal scan. All remaining direction modes result in a diagonal scan.

Figure 39:
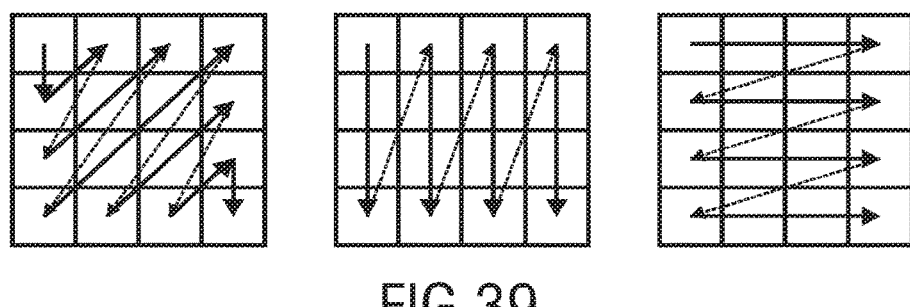
FIG. 39 illustrates scan directions for 4×4 transformation blocks (diagonal, vertical, horizontal)
Figure 41:
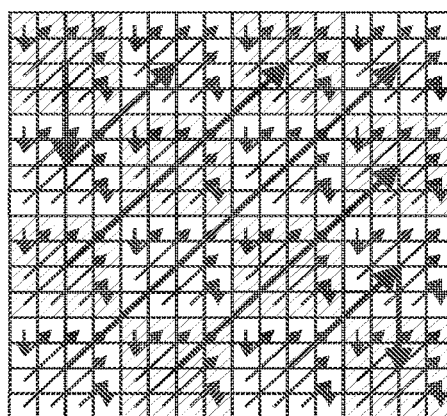
FIG. 41 illustration of 16×16 transformations, only diagonal scans are defined.

FIG. 39 shows the diagonal, vertical and horizontal scan as it is defined for a 4×4 transformation block. Coefficients of larger transformations are divided into subgroups of 16 coefficients. These subgroups allow a hierarchical coding of significant coefficient positions. A subgroup signaled as non-significant does not contain any significant coefficients. Scans for 8×8 and 16×16 transformations are depicted together with their associated subgroup divisions in FIG. 40 and FIG. 41, respectively. The large arrows represent the scan order of coefficient subgroups.

Figure 42:
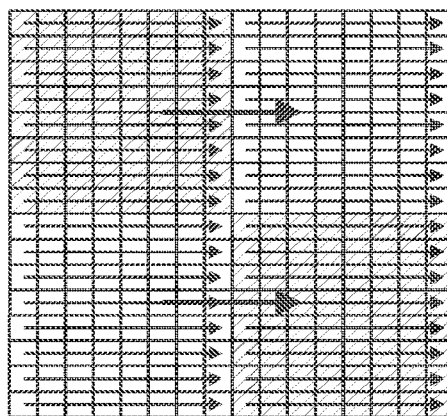
FIG. 42 illustrates vertical scan for 16×16 transformation as proposed in JCTVC-G703.

In zigzag scan, for blocks of size greater than 4×4 the subgroup consists of 4×4 pixels block scanned in a zigzag scan. The subgroups are scanned in a zigzag manner. FIG. 42 shows a vertical scan for 16×16 transformation as proposed in JCTVC-G703.

The following section describes extensions for transformation coefficient coding. These include an introduction of new scan modes, methods of assigning scans to transformation blocks and a modified coding of significant coefficient positions. These extensions allow a better adaptation to different coefficient distributions within the transformation block, and thus achieve a coding gain in rate-distortion sense.

New realizations for vertical and horizontal scan patterns are introduced for 16×16 and 32×32 transformation blocks. In contrast to previously proposed scan patterns, the size of a scan subgroup is, 16×1 for horizontal scan, and 1×16 for vertical scans, respectively. Subgroups with a size of 8×2 and 2×8, respectively, might be also chosen. The subgroups themselves are scanned in the same manner.

The vertical scan is efficient for transformed coefficients that are located in a column wise spread. This can be found in images that contain horizontal edges.

The horizontal scan is efficient for transformed coefficients that are found in a row wise spread. This can be found in images that contain vertical edges.

FIG. 43 shows a realization of vertical and horizontal scans for 16×16 transformation blocks. A coefficient subgroup is defined as a single column or single row, respectively.

VerHor scan is a introduced scan pattern, which allows coding of coefficients in a column by row wise scan. For 4×4 blocks the first column is scanned followed by the rest of the first row then the rest of the second column then the rest of the coefficients in second row. Then the rest of the third column is scanned and finally the rest of the fourth row and column.

For larger blocks the block is divided into 4×4 subgroups. These 4×4 blocks are scanned in a VerHor scan, whereas the subgroups are scanned VerHor scan themselves.

The VerHor scan can be used in cases where coefficients are located in the first columns and rows in the block. In this way, the coefficients are scanned earlier than the cases when using other scans for example diagonal scan. This can be found for images that contain both horizontal and vertical edges.

Figure 44:
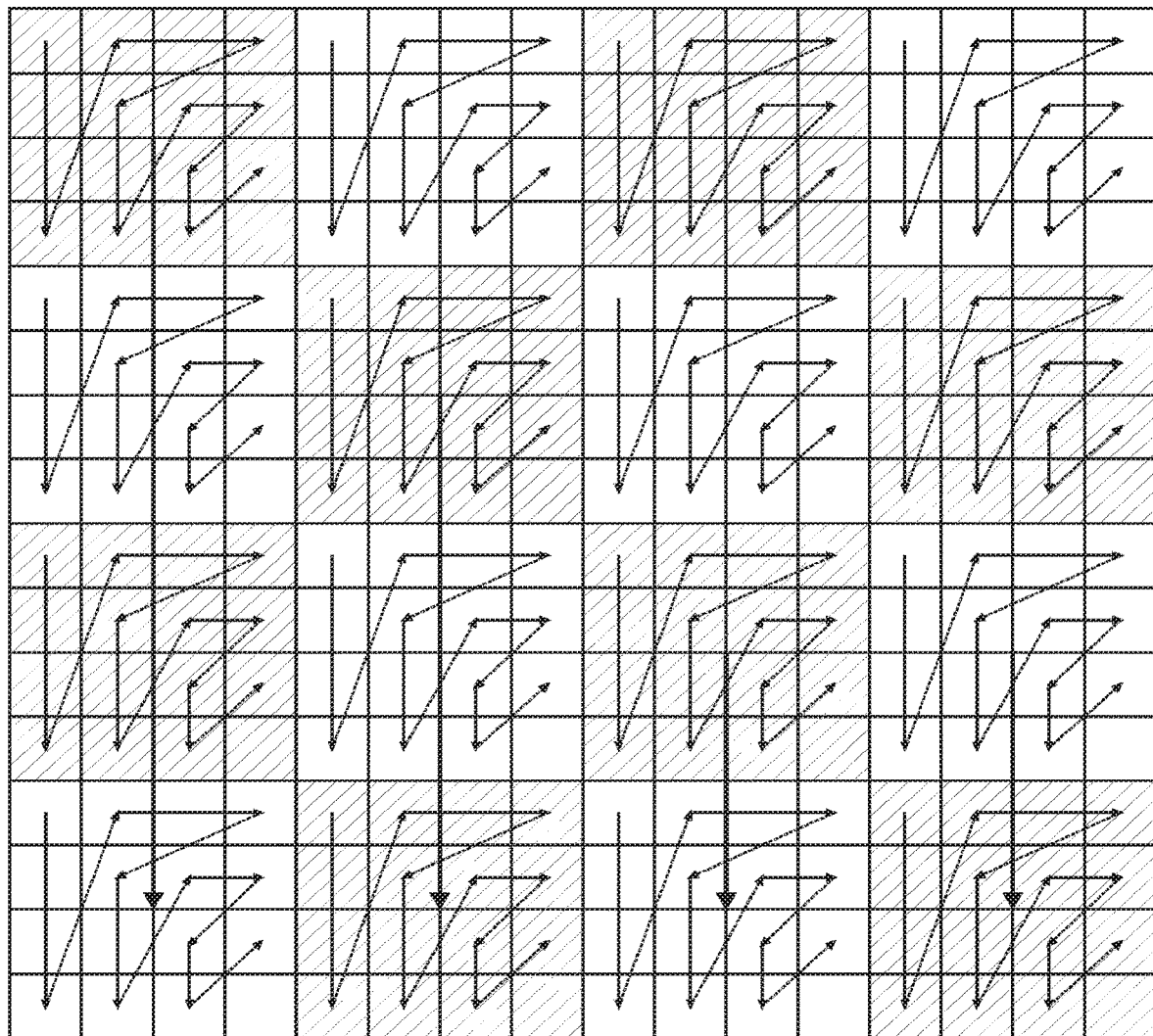
FIG. 44 illustrates VerHor scan for a 16×16 transformation block.

FIG. 44 shows a VerHor scan for a 16×16 transformation block.

Other Scans are feasible as well. All combinations between the scans and the subgroups can be used, for example. For example using the horizontal scan for the 4×4 blocks with the diagonal scan of the subgroups. Adaptive selection of scans can be applied by selecting a different scan for each subgroup.

It should be mentioned that the different scans can be realized in a way that the transform coefficients are re-ordered after quantization at the encoder side and the conventional coding is used. At the decoder side, the transform coefficients are conventionally decoded and re-ordered before the scaling and inverse transform (or after the scaling and before the inverse transform).

Different parts of the base layer signal might be utilized to derive coding parameters from baselayer signal. Among those signals are:
co-located reconstructed base layer signal
co-located residual base layer signal
estimated enhance layer residual signal, obtained by subtracting the enhancement layer prediction signal from the reconstructed base layer signal
picture partitioning of the base layer frame.

Gradient Parameters:
Gradient parameters may be derived as follows:
For each pixel of the investigated block, a gradient is calculated. From these gradients the magnitude and angle are calculated. The angle that occurred most in the block is associated to the block (block angle). The angles are rounded so that only three directions are used horizontal (0°), vertical(90°) and diagonal (45°).

Detecting Edges:
An edge detector may be applied on the investigated block as follows:
First the block is smoothed by n×n smoothing filter (e.g. Gaussian).
A gradient matrix of size m×m is used to calculate the gradient on each pixel. The magnitude and angle of every pixel is calculated. The angles are rounded so that only three directions are used horizontal (0°), vertical(90°) and diagonal (45°).
For every pixel that has a magnitude greater than a certain threshold1, the neighboring pixels are checked. If the neighboring pixel has a magnitude higher than a threshold2 and has the same angle as the current pixel then the counter of this angle is increased. For the whole block the counter with the highest number is selected as the angle of the block.

Obtaining Base Layer Coefficients by Forward Transformation
In order to derive coding parameters, for a particular TU, from the frequency domain of the base layer signal, the investigated co-located signal (reconstructed base layer signal/residual base layer signal/estimated enhancement layer signal) might be transformed into frequency domain. Advantageously, this is done using the same transformation, as is used by that particular enhancement layer TU.

The resulting base layer transformation coefficients might be quantized, or not.

In order to obtain comparable coefficient distributions as in the enhancement layer block, rate distortion quantization with a modified lambda could be used.

Scan Effectiveness Score of a Given Distribution and Scan
A scan effectiveness score of a given significant coefficient distribution might be defined as follows:
Let each position of an investigated block be represented by its index in order of the investigated scan. Then, the sum of index values of significant coefficients positions is defined as the effectiveness score of this scan. Thus, scans with a smaller score, represent the particular distribution more efficiently.

Adaptive Scan Pattern Selection for Transformation Coefficient Coding
If several scans are available for a particular TU, a rule needs to be defined which uniquely selects one of them.

Methods for Scan Pattern Selection
The selected scan can be directly derived from already decoded signals (without transmitted any additional data). This can be done, either based on the properties of the co-located base layer signal, or by utilizing enhancement layer signals only.

The scan pattern can be derived from the EL signal by State-of-the art derivation rule as described above.
Using that scan pattern for chrominance residuals, that was chosen for the co-located luminance residual
Defining a fixed mapping between coding modes and used scan pattern.
Derivation the scan pattern from the last significant coefficient position (relative to an assumed fixed scan pattern).

In an embodiment, the scan pattern is selected depending on the already decoded last position as follows:
The last position is represented as x and y coordinates within the transformation block, and already decoded (For scan dependent last coding, a fixed scan pattern is assumed for the decoding process of the last position, which can be the state-of-the-art scan pattern of that TU). Let T be a defined threshold, which might depend on the particular transformation size. If neither the x coordinate, nor the y coordinate of the last significant position exceeds T, diagonal scan is selected.

Otherwise, x is compared to y. If x exceeds y horizontal scan is chosen, vertical scan otherwise. An advantageous value of T for 4×4 TUs is 1. An advantageous value of T for TUs larger than 4×4 is 4.

In a further embodiment, the derivation of the scan pattern as described in the previous embodiment is restricted to be done only for TUs of size 16×16 and 32×32. It can be further restricted to luminance signals only.

The scan pattern can also be derived from the BL signal. For deriving the selected scan pattern from the base layer signal, any coding parameter described above can be used. In particular, a gradient of a co-located base layer signal can be calculated and compared to predefined thresholds and/or potentially found edges can be utilized.

In an embodiment, the scan direction is derived depending on the block gradient angle, as follows: For gradients quantized in horizontal direction, a vertical scan is used. For gradients quantized in vertical direction, a horizontal scan is used. Otherwise, a diagonal scan is selected.

In a further embodiment, the scan pattern is derived as described in the previous embodiment, but for those transformation blocks only, for which the number of occurrence of the block angle exceeds a threshold. The remaining transformation units are decoded using the state-of-the-art scan pattern of the TU.

If base layer coefficients of the co-located block are available, either explicitly signaled in the base layer data stream or calculated by a forward transformation, these can be utilized in the following ways:
For each available scan the costs for coding the base layer coefficients can be estimated. The scan with minimum costs is used for decoding the enhancement layer coefficients.

An effectiveness score of each available scan is calculated for the base layer coefficient distribution, the scan with the minimum score is used for decoding the enhancement layer coefficients.

The distribution of base layer coefficients within the transformation block is classified to one of a predefined set of distributions, which is associated with a particular scan pattern.

The scan pattern is selected depending on the last significant base layer coefficient.

If the co-located base layer block was predicted using an intra prediction, the intra direction of that prediction can be used to derive an enhancement layer scan pattern.

Furthermore, the transformation size of the co-located base layer block might be utilized for deriving the scan pattern.

In an embodiment, the scan pattern is derived from the BL signal for TUs only, which represent residuals of INTRA COPY mode predicted blocks, and their co-located base layer block has been intra predicted. For those blocks, a modified state-of-the-art scan selection is used. In contrast to the state-of-the-art scan-selection, the intra prediction direction of the co-located base layer block is used for selecting the scan pattern.

Signaling of an Scan Pattern Index within the Bitstream (See Aspect R)

Scan patterns of transformation blocks can also be chosen by the encoder in rate-distortion sense and then signaled within the bitstream.

A specific scan pattern can be coded, by signaling an index into a list of available scan pattern candidates. This list can be either a fixed list of scan patterns defined for a particular transformation size, or can be filled dynamically within the decoding process. Filling the list dynamically, allows the adaptive picking of those scan patterns, which most likely code the particular coefficient distribution most efficiently. By doing so, the number of available scan patterns for a particular TU can be reduced, and thus, the signaling of an index into that list is less expensive. If the number of scan patterns in a particular list is reduced to one, no signaling is necessitated.

The process of selecting scan pattern candidates for a particular TU may utilize any coding parameter, described above, and/or follow certain rules, which utilize specific characteristics of that particular TU. Among those are:

The TU represents a residual of a luminance/chrominance signal.

The TU has a specific size.

The TU represents a residual of a specific prediction mode.

The last significant position within the TU is known by the decoder and lies within a specific subdivision of the TU.

The TU is part of an I/B/P-Slice.

The coefficients of the TU are quantized using specific quantization parameters.

In an embodiment, the list of scan pattern candidates contains the three scans: 'diagonal scan', 'vertical scan' and 'horizontal scan', for all TUs.

Further embodiments can be obtained by letting the candidate list contain an arbitrary combination of scan patterns.

In a particular embodiment, a list of scan pattern candidates may contain any of the scans: 'diagonal scan', 'vertical scan' and 'horizontal scan'.

Whereas the scan pattern chosen by the state-of-the-art scan derivation (as described above) is set to be first in the list. Only if a particular TU has a size of 16×16 or 32×32, further candidates are added to the list. The order of the remaining scan patterns depends on the last significant coefficient position.

(Note: diagonal scan is the first pattern in the list assuming 16×16 and 32×32 transformations)

If the magnitude of its x coordinate exceeds the y coordinates magnitude, horizontal scan is chosen next, and vertical scan is put at last position. Otherwise, vertical scan is put at $2^{nd}$ position, followed by horizontal scan.

Other embodiments are obtained by further restricting the condition for having more than one candidate in the list.

In another embodiment, the vertical and horizontal scan are only added to the candidate lists of 16×16 and 32×32 transformation blocks, if their coefficients represent a residual of a luminance signal.

In another embodiment, the vertical and horizontal scan are added to the candidate lists of a transformation block, if both the x and y coordinates of the last significant position are greater than a specific threshold. This threshold can be mode and/or TU size dependent. An advantageous threshold value is 3 for all sizes larger than 4×4, and 1 for 4×4 TUs.

In another embodiment, the vertical and horizontal scan are added to the candidate lists of a transformation block, if either, the x or the y coordinates of the last significant position is greater than a specific threshold. This threshold can be mode and/or TU size dependent. An advantageous threshold value is 3 for all sizes larger than 4×4, and 1 for 4×4 TUs.

In another embodiment, the vertical and horizontal scans are only added to the candidate lists of 16×16 and 32×32 transformation blocks, if the x and y coordinates of the last significant position both are greater than a specific threshold. This threshold can be mode and/or TU size dependent. An advantageous threshold value is 3 for all sizes larger than 4×4, and 1 for 4×4 TUs.

In another embodiment, the vertical and horizontal scans are only added to the candidate lists of 16×16 and 32×32 transformation blocks, if either, the x or the y coordinates of the last significant position both is greater than a specific threshold. This threshold can be mode and/or TU size dependent. An advantageous threshold value is 3 for all sizes larger than 4×4, and 1 for 4×4 TUs.

For either of the described embodiments, where specific scan patterns are signaled within the bitstream, the signaling itself can be done at different signaling levels. In particular, the signaling can be done for each TU (which falls in the subgroup of TUs with signaled scan patterns), at any node of the residual quad-tree (all sub-TUs of that node, that use a signaled scan, use the same candidate list index), at CU/LCU level, or at slice level.

The index into the candidate list can be transmitted using fixed-length coding, variable-length coding, arithmetic coding (including context-adaptive binary arithmetic coding), or PIPE coding. If context-adaptive coding is used, the context can be derived based on the parameters of neighboring blocks, the coding modes described above and/or specific characteristics of the particular TU itself.

In an embodiment, context-adaptive coding is used for signaling an index into the scan pattern candidate list of a TU, whereas the context model is derived based on the transformation size and/or the position of the last significant position within the TU.

Either method described above for deriving scan patterns, could also be used to derive a context model for signaling an explicit scan pattern for a particular TU.

For coding the last significant scanning position, the following modifications may be used in an enhancement layer:

Separate context models are used for all or a subset of the coding modes that use base layer information. It is also possible to use different context models for different modes with base layer information.

The context modeling can depend on the data in the co-located base layer block (e.g., transform coefficient distribution in base layer, gradient information of base layer, last scanning position in co-located base layer blocks).

The last scanning position can be coded as difference to the last base layer scanning position.

If the last scanning position is coded by signaling its x and y positions within the TU, the context modeling of the second signaled coordinate can depend on the value of the first one.

Either method described above for deriving scan patterns, which is independent of the last significant position, could also be used to derive context models for signaling the last significant position.

In a particular version, the scan pattern derivation depends on the last significant position:

If the last scanning position is coded by signaling its x and y position within the TU, the context modeling of the second coordinate can depend on those scan patterns, which are still possible candidates, when already knowing the first coordinate.

If the last scanning position is coded by signaling its x and y position within the TU, the context modeling of the second coordinate can depend on whether, the scan pattern is already uniquely selected, when already knowing the first coordinate.

In another version, the scan pattern derivation is independent of the last significant position:

The context modeling can depend on the used scan pattern in a particular TU.

Either method described above for deriving scan patterns, could also be used to derive context models for signaling the last significant position.

For coding significant positions within a TU and the significance flags (sub-group flags and/or significance flags for single transform coefficients), respectively, the following modifications may be used in an enhancement layer:

Separate context models are used for all or a subset of the coding modes that use base layer information. It is also possible to use different context models for different modes with base layer information.

The context modeling can depend on the data in the co-located base layer block (e.g., number of significant transform coefficients for particular frequency positions).

Either method described above for deriving scan patterns, could also be used to derive context models for signaling significant position and/or their levels.

A generalized template can be used that evaluated both, the number of significant already coded transform coefficient levels in a spatial neighborhood of the coefficient to be coded and the number of significant transform coefficients in the co-located base layer signal of similar frequency positions.

A generalized template can be used that evaluated both, the number of significant already coded transform coefficient levels in a spatial neighborhood of the coefficient to be coded and the levels of significant transform coefficients in the co-located base layer signal of similar frequency positions.

The context modeling for sub-group flags might depend on the used scan pattern and/or particular transformation sizes.

A usage of different context initialization tables for base and enhancement layer may be used. The context model initialization for the enhancement layer might be modified in the following ways:

The enhancement layer uses a separate set of initialization values.

The enhancement layer uses separate sets of initialization values, for the different operation modes (spatial/temporal or quality scalability)

Enhancement layer context models which have counterparts in the base layer, might use the state of their counterpart as initialization states.

The algorithm for deriving the initial states of context models, can be base layer QP and/or delta QP dependent.

Next, a possibility of backward adaptive enhancement layer coding using base layer data is described. This following part describes methods to create an enhancement layer prediction signal in a scalable video coding system. The methods use the base layer decoded picture sample information to infer the value of prediction parameters, which are not transmitted in the coded video bitstream, but which are used to form a prediction signal for the enhancement layer. Thus the overall bitrate necessitated to code the enhancement layer signal is reduced.

A state-of-the-art hybrid video encoder decomposes the source image into blocks of different sizes, usually following a hierarchy. For each block the video signal is predicted from spatial neighboring blocks (intra prediction), or temporally previously coded pictures (inter prediction). The difference between the prediction and the actual image is transformed and quantized. The resulting prediction parameters and transform coefficients are entropy coded to form a coded video bitstream. The matching decoder follows the steps in inverse order.

Scalable video coding a bitstream is composed of different layers: a base layer offering complete decodable video and enhancement layers which can additionally be used for decoding. Enhancement layers can provide a higher spatial resolution (spatial scalability), temporal resolution (temporal scalability) or quality (SNR scalability).

In previous standards like H.264/AVC SVC the syntax elements like motion vectors, reference picture indexes or intra prediction modes are predicted directly from a corresponding syntax element in the coded base layer.

In the enhancement layer a mechanism exists at block level to switch between using a prediction signal that is derived from the base layer syntax elements or predict from other enhancement layer syntax elements or decoded enhancement layer samples.

In the following part, base layer data are used for deriving enhancement layer parameters at the decoder side.

Method 1: Motion Parameter Candidate Derivation

For a block (a) of the spatial or quality enhancement layer picture the corresponding block (b) of the base layer picture is determined, that covers the same picture area.

An inter prediction signal for block (a) of the enhancement layer is formed using the following method:

1. Motion compensation parameter set candidates are determined, e.g. from temporally or spatially neighboring enhancement layer blocks or derivatives thereof.

2. A motion compensation is performed for each candidate motion compensation parameter set to form an inter prediction signal in the enhancement layer.
3. The best motion compensation parameter set is selected by minimizing an error measure between the prediction signal for the enhancement layer block (a) and the reconstruction signal of base layer block (b). For spatial scalability the base layer block (b) can be spatially upsampled using an interpolation filer.

Motion compensation parameters sets contain a specific combination of motion compensation parameters.

Motion compensation parameters can be motion vectors, reference picture indexes, the selection between uni- and bi-prediction and other parameters.

In an alternative embodiment motion compensation parameter set candidates from base layer blocks are used. The inter prediction is also performed in the base layer (using base layer reference pictures). For applying the error measure the base layer block (b) reconstruction signal can be directly used without upsampling. The selected optimal motion compensation parameter set is applied to enhancement layer reference pictures to form the prediction signal of block (a). When applying motion vectors in a spatial enhancement layer, the motion vectors are scaled according to the resolution change.

Both encoder and decoder can perform the same prediction steps to select the optimal motion compensation parameter set among the available candidates and create identical prediction signals. These parameters are not signaled in the coded video bitstream.

The selection of the prediction method is signaled in the bitstream and can be coded using entropy coding. Inside a hierarchical block subdivision structure this coding method can be selected in every sub-level or alternatively only on subsets of the coding hierarchy.

In an alternative embodiment the encoder can transmit a refinement motion parameter set prediction signal to the decoder. The refinement signal contains differentially coded values of the motion parameters. The refinement signal can be entropy coded.

In an alternative embodiment the decoder creates a list of the best candidates. The index of the used motion parameter set is signaled in the coded video bitstream. The index can be entropy coded. In an example implementation the list can be ordered by increasing error measure.

An example implementation uses the adaptive motion vector prediction (AMVP) candidate list of HEVC to generate motion compensation parameter set candidates.

Another example implementation uses the merge mode candidate list of HEVC to generate motion compensation parameter set candidates.

Method 2: Motion Vector Derivation

For a block (a) of the spatial or quality enhancement layer picture the corresponding block (b) of the base layer picture is determined, that covers the same picture area.

An inter prediction signal for block (a) of the enhancement layer is formed using the following method:
1. A motion vector predictor is selected.
2. A motion estimation on a defined set of search positions is performed on the enhancement layer reference pictures.
3. For each search position an error measure is determined and the motion vector with the smallest error is selected.
4. A prediction signal for block (a) is formed using the selected motion vector.

In an alternative embodiment the search is performed on the reconstructed base layer signal. For spatial scalability the selected motion vector is scaled according to the spatial resolution change before creating the prediction signal in step 4.

The search positions can be at full or sub-pel resolution. The search can also be performed in multiple steps, e.g. first determining the best full-pel position followed by another set of candidates based on the selected full-pel position. The search can be terminated early, e.g. when the error measure lies below a defined threshold.

Both encoder and decoder can perform the same prediction steps to select the optimal motion vector among the candidates and create identical prediction signals. These vectors are not signaled in the coded video bitstream.

The selection of the prediction method is signaled in the bitstream and can be coded using entropy coding. Inside a hierarchical block subdivision structure this coding method can be selected in every sub-level or alternatively only on subsets of the coding hierarchy.

In an alternative embodiment the encoder can transmit a refinement motion vector prediction signal to the decoder. The refinement signal can be entropy coded.

An example implementation uses the algorithm described in Method 1 to select a motion vector predictor.

Another example implementation uses the adaptive motion vector prediction (AMVP) method of HEVC to select a motion vector predictor from temporally or spatially neighboring blocks of the enhancement layer.

Method 3: Intra Prediction Mode Derivation

For each block (a) in an enhancement layer (n) picture, the corresponding block (b) covering the same area in the reconstructed base layer (n−1) picture is determined.

In a scalable video decoder for each base layer block (b) an intra prediction signal is formed using an intra prediction mode (p) which is inferred by the following algorithm.
1) An intra prediction signal is created for each available intra prediction mode following the rules for intra prediction of the enhancement layer, but using sample values from the base layer.
2) The best prediction mode (pbest) is determined by minimizing an error measure (e.g. sum of absolute differences) between the intra prediction signal and the decoded base layer block (b).
3) The prediction (pbest) mode selected in step 2) is used for creating the prediction signal for the enhancement layer block (a) following the intra prediction rules for the enhancement layer Both encoder and decoder can perform the same steps to select the best prediction mode ln 1 and form a matching prediction signal. The actual intra prediction mode (pbest) is thus not signaled in the coded video bitstream.

The selection of the prediction method is signaled in the bitstream and can be coded using entropy coding. Inside a hierarchical block subdivision structure this coding mode can be selected in every sub-level or alternatively only on subsets of the coding hierarchy.

An alternative embodiment uses samples from the enhancement layer in step 2) to create the intra prediction signal. For a spatial scalable enhancement layer, the base layer can be upsampled using an interpolation filter to apply the error measure.

An alternative embodiment splits the enhancement layer block into multiple blocks of a smaller block size ($a_i$) (e.g. a 16×16 block (a) can be split into 16 4×4 block ($a_i$)). The algorithm described above is applied to each sub-block ($a_i$)

and corresponding base layer block ($b_i$). After prediction of block ($a_i$) a residual coding is applied and the result is used for predicting block ($a_{i+1}$).

An alternative embodiment uses the surrounding sample values of (b) or ($b_i$) to determine the predicted intra prediction mode ($p_{best}$). For instance when a 4×4 block ($a_i$) of a spatial enhancement layer (n) has a corresponding 2×2 base layer block ($b_i$), the surrounding samples of ($b_i$) are used to form a 4×4 block ($c_i$) which is used for determining the predicted intra prediction mode ($p_{best}$).

In an alternative embodiment the encoder can transmit a refinement intra prediction direction signal to the decoder. In video codecs, like e.g. HEVC, most intra prediction modes correspond to an angle from which border pixels are used to form the prediction signal. The offset to the optimal mode can be transmitted as difference to the predicted mode ($p_{best}$) (which is determined as described above). The refinement mode can be entropy coded.

Intra prediction modes are usually coded depending on their probability. In H.264/AVC one most probable mode is determined based on modes used in the (spatial) neighborhood of a block. In HEVC a list most probable modes is created. These most probable modes can be selected using fewer symbols in the bitstream than the whole mode number would necessitate. An alternative embodiment uses the predicted intra prediction mode ($p_{best}$) for block (a) (which is determined as described in the algorithm above) as most probably mode or member of the list of most probable modes.

Method 4: Intra Prediction Using Border Areas

Figure 45:
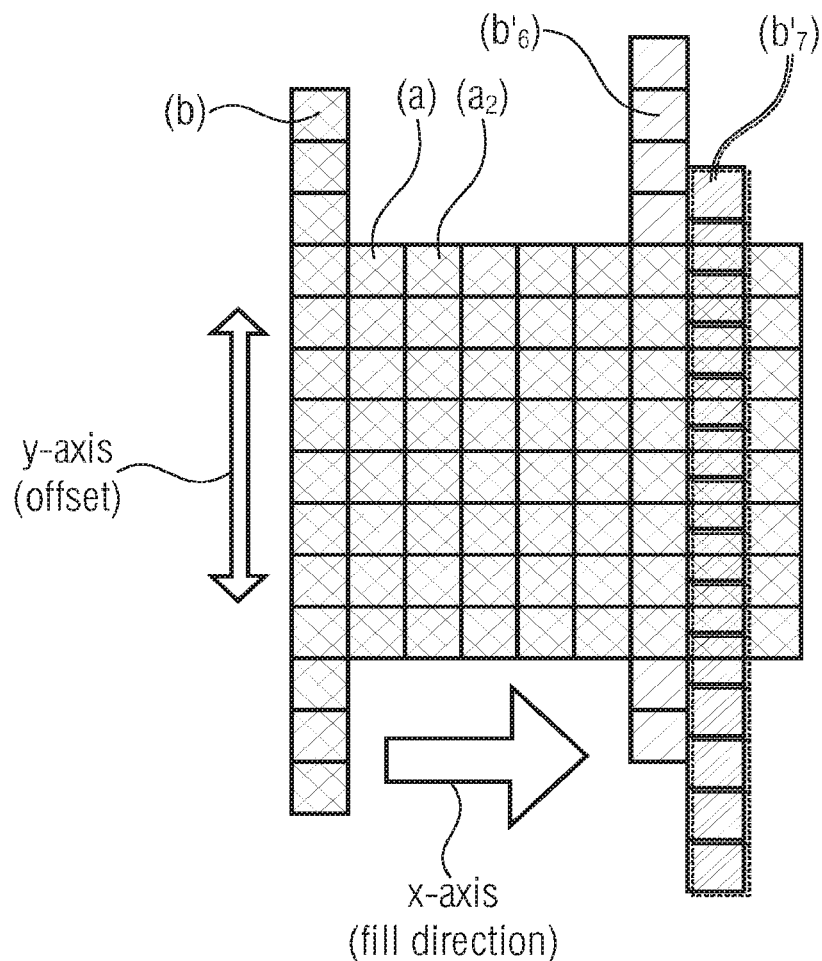
FIG. 45 illustrates backwards-adaptive enhancement layer intra prediction using neighboring reconstructed enhancement layer samples and reconstructed base layer samples.

In a scalable video decoder to form an intra prediction signal for a block (a) (see FIG. 45) of a scalable or quality enhancement layer, a line of samples (b) from the surrounding area of the same layer are used to fill in the block area. These samples are taken from areas that are already coded (usually, but not necessarily on the upper and left border).

The following alternative variants of selecting these pixels may be used:
  a) if the pixel in the surrounding area is not yet coded, the pixel value is not used for predicting the current block
  b) if the pixel in the surrounding area is not yet coded, the pixel value is derived from neighboring pixels that are already coded (e.g. by repetition)
  c) if the pixel in the surrounding area is not yet coded, the pixel value is derived from a pixel in the corresponding area of the decoded base layer picture To form the intra prediction of the block (a) a neighboring line of pixels (b) (that is derived as described above) is used as a template to fill in each line (a) of the block (a).

The lines ($a_j$) of block (a) are filled in step-by-step along the x-axis. To achieve the best possible prediction signal, the row of template samples (b) is shifted along the y-axis to form the prediction signal ($b'_j$) for the associated line ($a_j$).

For finding the optimal prediction in each line, the shift offset ($o_j$) is determined by minimizing an error measure between the resulting prediction signal ($a_j$) and the sample values of corresponding line in the base layer.

If ($o_j$) is a non-integer value, an interpolation filter can be used to map the values of (b) to the integer sample positions of ($a_j$) as shown in ($b'_7$).

If spatial scalability is used, an interpolation filter can be used to create a matching number of sample values of the corresponding line of the base layer.

The fill direction (x-axis) can be horizontal (left to right or right to left), vertical (top to bottom or bottom to top), diagonal, or any other angle. The samples used for the template line (b) are the samples in the direct neighborhood of the block along the x-axis. The template line (b) is shifted along the y-axis, which forms a 90° angle to the x-axis.

To find the optimal direction of the x-axis, a full intra prediction signal is created for block (a). The angle with a minimum error measure between the prediction signal and the corresponding base layer block is selected.

The number of possible angles can be restricted.

Both encoder and decoder run the same algorithm to determine the best prediction angles and offsets. No explicit angle or offset information needs to be signaled in the bitstream.

In an alternative embodiment only samples of the base layer picture are used to determine the offsets ($0_i$).

In an alternative embodiment a refinement (e.g. difference value) of the predicted offsets ($o_i$) is signaled in the bitstream. Entropy coding can be used for coding the refinement offset value.

In an alternative embodiment a refinement (e.g. difference value) of the predicted direction is signaled in the bitstream. Entropy coding can be used for coding the refinement direction value.

An alternative embodiment uses a threshold to select if the line ($b'_j$) is used for prediction. If the error measure for the optimal offset ($o_j$) is below the threshold, the line ($c_i$) is used to determine the values of the block line ($a_j$). If the error measure for the optimal offset ($o_j$) is above the threshold, the (upsampled) base layer signal is used to determine the values of the block line ($a_j$)

Method 5: Other Prediction Parameters

Other prediction information is inferred similar to methods 1-3, for instance the partitioning of block into sub-blocks:

For a block (a) of the spatial or quality enhancement layer picture the corresponding block (b) of the base layer picture is determined, that covers the same picture area.

A prediction signal for block (a) of the enhancement layer is formed using the following method:
  1) A prediction signal is created for each possible value of the tested parameter.
  2) The best prediction mode ($p_{best}$) is determined by minimizing an error measure (e.g. sum of absolute differences) between the prediction signal and the decoded base layer block (b).
  3) The best prediction ($p_{best}$) mode selected in step 2) is used for creating the prediction signal for the enhancement layer block (a)

Both encoder and decoder can perform the same prediction steps to select the optimal prediction mode among the possible candidates and create identical prediction signals. The actual prediction mode is not signaled in the coded video bitstream.

The selection of the prediction method is signaled in the bitstream and can be coded using entropy coding. Inside a hierarchical block subdivision structure this coding method can be selected in every sub-level or alternatively only on subsets of the coding hierarchy.

The following description briefly summarizes some of the above embodiments.

Enhancement Layer Coding with Multiple Methods for Generating an Intra Prediction Signal Using Reconstructed Base Layer Samples Main aspect: For coding a block in the enhancement layer multiple methods for generating an intra prediction signal using reconstructed base layer samples are provided in addition to methods that generate the prediction signal based on reconstructed enhancement layer samples only.

Sub Aspects:

The multiple methods include the following method: The (upsampled/filtered) reconstructed base layer signal is directly used as enhancement layer prediction signal.

The multiple methods include the following method: The (upsampled/filtered) reconstructed base layer signal is combined with a spatial intra prediction signal, where the spatial intra prediction is derived based on difference samples for neighboring blocks. The difference samples represent the difference of the reconstructed enhancement layer signal and the (upsampled/filtered) reconstructed base layer signal (see aspect A).

The multiple methods include the following method: A conventional spatial intra prediction signal (derived using neighboring reconstructed enhancement layer samples) is combined with an (upsampled/filtered) base layer residual signal (inverse transform of base layer transform coefficients or difference between base layer reconstruction and base layer prediction) (see aspect B).

The multiple methods include the following method: The (upsampled/filtered) reconstructed base layer signal is combined with a spatial intra prediction signal, where the spatial intra prediction is derived based on reconstructed enhancement layer samples of neighboring blocks. The final prediction signal is obtained by weighting the spatial prediction signal and the base layer prediction signal in a way that different frequency components use a different weighting. (see aspect C1) This can be, for example, realized by any of the following:

- Filtering the base layer prediction signal with a low-pass filter and filtering the spatial intra prediction signal with a high-pass filter and adding up the obtained filtered signals. (see aspect C2)
- Transform the base layer prediction signal and the enhancement layer prediction signal and superimpose the obtained transform blocks, where different weighting factors are used for different frequency positions. (see aspect C3) The obtained transform block can then be inverse transformed and used as enhancement layer prediction signal or (see aspect C4) the obtained transform coefficients are added to the scaled transmitted transform coefficient levels and are then inverse transformed in order to obtain the reconstructed block before deblocking and in-loop processing.

For methods that use the reconstructed base layer signal, the following versions can be used. This can be fixed or it can be signalled at a sequence level, picture level, slice level, largest coding unit level, coding unit level. Or it can be made dependent on other coding parameters.

- Reconstructed base layer samples before deblocking and further in-loop processing (such as sample adaptive offset filter or adaptive loop filter).
- Reconstructed base layer samples after deblocking but before further in-loop processing (such as sample adaptive offset filter or adaptive loop filter).
- Reconstructed base layer samples after deblocking and further in-loop processing (such as sample adaptive offset filter or adaptive loop filter) or between multiple in-loop processing steps (see aspect D).

Multiple versions of the methods that use the (upsampled/filtered) base layer signal can be used. The employed upsampled/filtered base layer signal for these versions can differ in the used interpolation filters (including interpolation filters that also filter the integer-sample positions), or the upsampled/filtered base layer signal for the second version can be obtained by filtering the upsampled/filtered base layer signal for the first version. The selection of one of the different version can be signalled at a sequence, picture, slice, largest coding unit, or coding unit level or it can be inferred from the characteristics of the corresponding reconstructed base layer signal or the transmitted coding parameters (see aspect E).

Different filters can be used for upsampling/filtering the reconstructed base layer signal (see aspect E) and the base layer residual signal (see aspect F).

For base layer blocks for which the residual signal is zero, it can be replaced with another signal derived from the base layer, e.g., a high-pass filtered version of the reconstructed base layer block (see aspect G).

For modes that use a spatial intra prediction, non-available neighboring samples in the enhancement layer (due to a given coding order) can be replaced with the corresponding samples of an upsampled/filtered base layer signal (see aspect H).

For modes that use a spatial intra prediction, the coding of the intra prediction mode can be modified. The list of most probably modes includes the intra prediction mode of the co-located base layer signal.

In a particular version, the enhancement layer pictures are decoded in a two-stage process. In a first stage, only the blocks that only use the base layer signal (but do not use neighboring blocks) or an inter prediction signal for prediction are decoded and reconstructed. In the second stage, the remaining block that use neighboring samples for prediction are reconstructed. For the blocks that are reconstructed in the second stage, the spatial intra prediction concept can be extended. (see aspect I) Based on the availability of already reconstructed blocks, not only the neighboring samples to the top and to the left, but also neighboring samples at the bottom and to the right of a current block can be used for spatial intra prediction.

Enhancement Layer Coding with Multiple Methods for Generating an Inter Prediction Signal Using Reconstructed Base Layer Samples Main aspect: For coding a block in the enhancement layer multiple methods for generating an inter prediction signal using reconstructed base layer samples are provided in addition to methods that generate the prediction signal based on reconstructed enhancement layer samples only.

Sub Aspects:

The multiple methods include the following method: A conventional inter prediction signal (derived by motion-compensated interpolation of already reconstructed enhancement layer pictures) is combined with an (upsampled/filtered) base layer residual signal (inverse transform of base layer transform coefficients or difference between base layer reconstruction and base layer prediction).

The multiple methods include the following method: The (upsampled/filtered) reconstructed base layer signal is combined with a motion-compensated prediction signal, where the motion-compensated prediction signal is obtained by motion compensating difference pictures. The difference pictures represent the difference of the reconstructed enhancement layer signal and the (upsampled/filtered) reconstructed base layer signal for the reference pictures (see aspect J).

The multiple methods include the following method: The (upsampled/filtered) reconstructed base layer signal is combined with an inter prediction signal, where the inter prediction is derived by motion-compensated prediction using reconstructed enhancement layer pictures. The final prediction signal is obtained by weighting the inter prediction signal and the base layer prediction signal in a way that different frequency components use a different weighting (see aspect C). This can be, for example, realized by any of the following:
- Filtering the base layer prediction signal with a low-pass filter and filtering the inter prediction signal with a high-pass filter and adding up the obtained filtered signals.
- Transform the base layer prediction signal and the inter prediction signal and superimpose the obtained transform blocks, where different weighting factors are used for different frequency positions. The obtained transform block can then be inverse transformed and used as enhancement layer prediction signal or the obtained transform coefficients are added to the scaled transmitted transform coefficient levels and are then inverse transformed in order to obtain the reconstructed block before deblocking and in-loop processing.

For methods that use the reconstructed base layer signal, the following versions can be used. This can be fixed or it can be signalled at a sequence level, picture level, slice level, largest coding unit level, coding unit level. Or it can be made dependent on other coding parameters.
- Reconstructed base layer samples before deblocking and further in-loop processing (such as sample adaptive offset filter or adaptive loop filter).
- Reconstructed base layer samples after deblocking but before further in-loop processing (such as sample adaptive offset filter or adaptive loop filter).
- Reconstructed base layer samples after deblocking and further in-loop processing (such as sample adaptive offset filter or adaptive loop filter) or between multiple in-loop processing steps (see aspect D).

For base layer blocks for which the residual signal is zero, it can be replaced with another signal derived from the base layer, e.g., a high-pass filtered version of the reconstructed base layer block (see aspect G).

Multiple versions of the methods that use the (upsampled/filtered) base layer signal can be used. The employed upsampled/filtered base layer signal for these versions can differ in the used interpolation filters (including interpolation filters that also filter the integer-sample positions), or the upsampled/filtered base layer signal for the second version can be obtained by filtering the upsampled/filtered base layer signal for the first version. The selection of one of the different version can be signalled at a sequence, picture, slice, largest coding unit, or coding unit level or it can be inferred from the characteristics of the corresponding reconstructed base layer signal or the transmitted coding parameters (see aspect E).

Different filters can be used for upsampling/filtering the reconstructed base layer signal (see aspect E) and the base layer residual signal (see aspect F).

For motion-compensated prediction of difference pictures (difference between enhancement layer reconstruction and upsampled/filtered base layer signal) (see aspect J), different interpolation filters than for motion-compensated prediction of reconstructed pictures are used.

For motion-compensated prediction of difference pictures (difference between enhancement layer reconstruction and upsampled/filtered base layer signal) (see aspect J), interpolation filters are selected based on characteristic of the corresponding area in the difference picture (or based on coding parameters or based on information transmitted in the bitstream).

Enhancement Layer Motion Parameter Coding

Main aspect: Use multiple enhancement layer predictors and at least one predictor derived from the base layer for enhancement layer motion parameter coding.

Sub Aspects:
- Addition of (scaled) base layer motion vector to motion vector predictor list (see aspect K)
  - Use base layer block that covers co-located sample of centre position of current block (other derivations possible)
  - Scale motion vectors according to resolution ratio
- Add motion data of co-located base layer block to merge candidate list (see aspect K)
  - Use base layer block that covers co-located sample of centre position of current block (other derivations possible)
  - Scale motion vectors according to resolution ratio
  - Don't add if merge flag is equal to 1 in base layer
- Re-ordering of merge candidate list based on base layer merge information (see aspect L)
  - If co-located base layer block is merged with a particular candidate, the corresponding enhancement layer candidate is used as first entry in the enhancement layer merge candidate list
- Re-ordering of motion predictor candidate list based on base layer motion predictor information (see aspect L)
  - If co-located base layer block uses a particular motion vector predictor, the corresponding enhancement layer motion vector predictor is used as first entry in the enhancement layer motion vector predictor candidate list
- Derivation of merge index (i.e., the candidate with which the current block is merged) based on base layer information in a co-located block (see aspect M). As an example, if the base layer block is merged with a particular neighboring block and it is signalled inside the bitstream that the enhancement layer block is also merged, no merge index is transmitted, but instead the enhancement layer block is merged with the same neighbor (but in the enhancement layer) as the co-located base layer block.

Enhancement Layer Partitioning and Motion Parameter Inference

Main aspect: Inference of enhancement layer partitioning and motion parameters based on base layer partitioning and motion parameters (probably necessitated to combine this aspect with any of the sub aspects).

Sub Aspects:
- Derive motion parameters for N×M sub-blocks of an enhancement layer based on the co-located base layer motion data; summarize block with identical derived parameters (or parameters with small differences) to larger blocks; determine prediction and coding units (see aspect T).
- Motion parameters may include: number of motion hypotheses, reference indices, motion vectors, motion vector predictor identifiers, merge identifiers.

Signal one of multiple methods for generating the enhancement layer prediction signal; such methods can include the following:
- Motion compensation using the derived motion parameters and the reconstructed enhancement layer reference pictures.
- Combination of (a) (upsampled/filtered) base layer reconstruction for current picture and (b) motion compensated signal using the derived motion parameters and enhancement layer reference picture that are generated by subtracting the (upsampled/filtered) base layer reconstruction from the reconstructed enhancement layer picture.
- Combination of (a) (upsampled/filtered) base layer residual (difference between reconstructed signal and prediction or inverse transform of coded transform coefficient values) for current picture and (b) motion compensated signal using the derived motion parameters and the reconstructed enhancement layer reference pictures.

If the co-located block in the base layer is intra-coded, the corresponding enhancement layer M×N block (or CU) is also intra coded, where the intra prediction signal is derived by using base layer information (see aspect U), for example:
- An (upsampled/filtered) version of the corresponding base layer reconstruction is used as intra prediction signal (see aspect U).
- The intra prediction mode is derived based on the intra prediction mode used in the base layer and this intra prediction mode is used for spatial intra prediction in the enhancement layer.

If the co-located base layer block for an M×N enhancement layer block (subblock) is merged with a previously coded base layer block (or has the same motion parameters), the M×N enhancement layer (sub-)block is also merged with the enhancement layer block that corresponds to the base layer block that is used for merging in the base layer (i.e., the motion parameters are copied from the corresponding enhancement layer block) (see aspect M).

Coding of Transform Coefficient Levels/Context Modelling
  Main aspect: Transform coefficient coding using different scan patterns. For enhancement layers, context modelling based on coding mode and/or base layer data, and different initializations for context models.
  Sub Aspects:
  Introduce one or more additional scan patterns, for example a horizontal and vertical scan pattern. Redefine the subblocks for the additional scan pattern. Instead of 4×4 subblocks, for example 16×1 or 1×16 subblocks can be used, or 8×2 and 8×2 subblocks can be used. The additional scan pattern can be introduced only for blocks greater than or equal to a particular size, e.g. 8×8 or 16×16 (see aspect V).
  The selected scan pattern is signalled inside the bitstreams (if the coded block flag is equal to 1) (see aspect N). For signalling the corresponding syntax element, fixed context can be used. Or the context derivation for the corresponding syntax elements can depend on any of the following:
    Gradient of the co-located reconstructed base layer signal or the reconstructed base layer residual. Or detected edges in the base layer signal.
    Transform coefficient distribution in the co-located base layer blocks.
  The selected scan can be directly derived from the base layer signal (without transmitted any additional data) based on the properties of the co-located base layer signal (see aspect N):
    Gradient of the co-located reconstructed base layer signal or the reconstructed base layer residual. Or detected edges in the base layer signal.
    Transform coefficient distribution in the co-located base layer blocks.
  The different scans can be realized in a way that the transform coefficients are re-ordered after quantization at the encoder side and the conventional coding is used. At the decoder side, the transform coefficients are conventionally decoded and re-ordered before the scaling and inverse transform (or after the scaling and before the inverse transform).
  For coding the significance flags (sub-group flags and/or significance flags for single transform coefficients), the following modifications may be used in an enhancement layer:
    Separate context models are used for all or a subset of the coding modes that use base layer information. It is also possible to use different context models for different modes with base layer information.
    The context modelling can depend on the data in the co-located base layer block (e.g., number of significant transform coefficients for particular frequency positions) (see aspect 0).
    A generalized template can be used that evaluated both, the number of significant already coded transform coefficient levels in a spatial neighborhood of the coefficient to be coded and the number of significant transform coefficients in the co-located base layer signal of similar frequency positions (see aspect 0).
  For coding the last significant scanning position, the following modifications may be used in an enhancement layer:
    Separate context models are used for all or a subset of the coding modes that use base layer information. It is also possible to use different context models for different modes with base layer information (see aspect P).
    The context modelling can depend on the data in the co-located base layer block (e.g., transform coefficient distribution in base layer, gradient information of base layer, last scanning position in co-located base layer blocks).
    The last scanning position can be coded as difference to the last base layer scanning position (see aspect S).
  Usage of different context initialization tables for base and enhancement layer.

Backward Adaptive Enhancement Layer Coding Using Base Layer Data
  Main aspect: Use base layer data for deriving enhancement layer coding parameters.
  Sub Aspects:
  Derive merge candidate based on the (potentially upsampled) base layer reconstruction. In the enhancement layer, only the usage of merge is signalled, but the actually candidate that is used for merging the current block is derived based on the reconstructed base layer signal. Therefore, for all merge candidates, an error measure between the (potentially upsampled) base layer signal for the current enhancement layer block and the corresponding prediction signals (derived using the motion parameters for the merge candidates) is evaluated for all merge candidates (or a subset thereof)

and the merge candidate that is associated with the smallest error measure is selected. The calculation of the error measure can also be done in the base layer using the reconstructed base layer signal and the base layer reference pictures (see aspect Q).

Derive motion vectors based on the (potentially upsampled) base layer reconstruction. Motion vector differences are not coded, but inferred based on the reconstructed base layer. Determine a motion vector predictor for the current block and evaluate a defined set of search positions around the motion vector predictor. For each search position, determine an error measure between the (potentially upsampled) base layer signal for the current enhancement layer block and the displaced reference frame (the displacement is given by the search position). Chose the search position/motion vector that yields the smallest error measure. The search can be split in several stages. For example, a full-pel search is carried out first, followed by a half-pel search around the best ful-pel vector, followed by a quarter-pel search around the best full/half-pel vector. The search can also be carried out in the base layer using the reconstructed base layer signal and the base layer reference pictures, the found motion vectors are then scaled according to the resolution change between base and enhancement layer (see aspect Q).

Derive intra prediction modes based on the (potentially upsampled) base layer reconstruction. Intra prediction modes are not coded, but inferred based on the reconstructed base layer. For each possible intra prediction mode (or a subset thereof), determine an error measure between the (potentially upsampled) base layer signal for the current enhancement layer block and the intra prediction signal (using the tested prediction mode). Chose the prediction mode that yields the smallest error measure. The calculation of the error measure can also be done in the base layer using the reconstructed base layer signal and the intra prediction signal in the base layer. Furthermore, an intra block can be implicitly decomposed into 4×4 blocks (or other block sizes) and for each 4×4 block a separate intra prediction mode can be determined (see aspect Q).

The intra prediction signal can be determined by a row-wise or column-wise matching of the border samples with the reconstructed base layer signal. For deriving a shift between the neighboring samples and a current line/row, an error measure is calculated between the shifted line/row of neighboring samples and the reconstructed base layer signal, and the shift that yields the smallest error measure is chosen. As neighboring samples, the (upsampled) base layer samples or the enhancement layer samples can be used. The error measure can also be directly calculated in the base layer (see aspect W).

Using backward-adaptive method for the derivation of other coding parameters such as block partitioning, etc.

Figure 46:
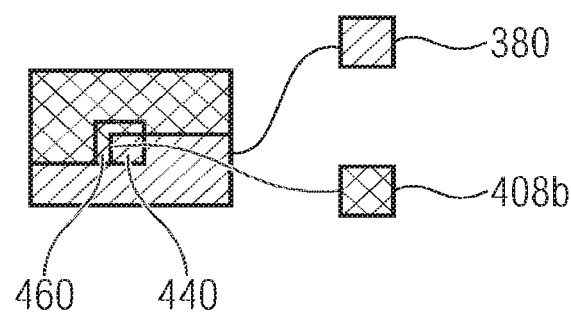
FIG. 46 schematically shows an enhancement layer picture/frame so as to illustrate the difference signal spatial interpolation in accordance with an embodiment.

A further brief summary of the above embodiments is presented below. In particular, above embodiments described, A1) Scalable video decoder configured to reconstruct (80) a base layer signal (200*a*, 200*b*, 200*c*) from a coded data stream (6), reconstruct (60) an enhancement layer signal (360) comprising subject (220) the reconstructed base layer signal (200*a*, 200*b*, 200*c*) to a resolution or quality refinement to obtain a inter-layer prediction signal (380), compute (260) a difference signal between an already reconstructed portion (400*a* or 400*b*) of an enhancement layer signal and the inter-layer prediction signal (380);

spatially predict (260) the difference signal at a first portion (440, cp. FIG. 46) collocated to a portion of the enhancement layer signal (360), currently to be reconstructed, from a second portion (460) of the difference signal, spatially neighboring the first portion and belonging to the already reconstructed portion of the enhancement layer signal (360) to obtain a spatial intra prediction signal;

combine (260) the inter-layer prediction signal (380) and the spatial intra prediction signal to obtain an enhancement layer prediction signal (420); and predictively reconstructing (320, 580, 340, 300, 280) the enhancement layer signal (360) using the enhancement layer prediction signal (420).

In accordance with the aspect A1, the base layer signal may be reconstructed by the base layer decoding stage 80 from the coded data stream 6 or the substream 6*a*, respectively, in the block-based predictive manner described above with, for example, transform decoding as far as the base layer residual signal 640/480 is concerned, but other reconstruction alternatives are also feasible.

As far as the reconstruction of the enhancement layer signal 360 by the enhancement layer decoding stage 60 is concerned, the resolution or quality refinement to which the reconstructed base layer signal 200*a*, 200*b*, or 200*c* is subject may, for example, involve up-sampling in the case of a resolution refinement, or copying in case of quality refinement, or tone-mapping from n bits to m bits with m>n in case of bit depth refinement.

The computation of the difference signal may be done pixel-wise, i.e., co-located pixels of the enhancement layer signal on the one hand and the prediction signal 380 on the other hand are subtracted from each other and this is done per pixel position.

The spatial prediction of the difference signal may be done in any way, such as by transmitting in the coded data stream 6 or within substream 6*b* an intra-prediction parameter, such as an intra prediction direction, and copying/interpolating already reconstructed pixels bordering the portion of the enhancement layer signal 360, currently to be reconstructed, along this intra prediction direction into the current portion of the enhancement layer signal. The combination may involve a summation, a weighted sum or even more sophisticated combinations such as combinations which differently weight the contributions in the frequency domain.

The predictive reconstruction of the enhancement layer signal 360 using the enhancement layer prediction signal 420 may, as shown in the figure, involve the entropy decoding and inverse transformation of an enhancement layer residual signal 540 and a combination 340 of the latter with the enhancement layer prediction signal 420.

B1) Scalable video decoder configured to decode (100) a base layer residual signal (480) from a coded data stream (6), reconstruct (60) the enhancement layer signal (360) comprising subjecting (220) the reconstructed base layer residual signal (480) to a resolution or quality refinement to obtain a inter-layer residual prediction signal (380), spatially predicting (260) a portion of an enhancement layer signal (360), currently to be reconstructed, from an already reconstructed portion of the enhancement layer signal (360) to obtain an enhancement layer internal prediction signal;

combining (260) the inter-layer residual prediction signal and the enhancement layer internal prediction signal to obtain an enhancement layer prediction signal (420); and predictively reconstructing (340) the enhancement layer signal (360) using the enhancement layer prediction signal (420).

The decoding of the base layer residual signal from the coded data stream may, as shown in the figure, be performed by using entropy decoding and inverse transformation. Moreover, the scalable video decoder may also, optionally, perform the reconstruction of the base layer signal itself, namely by predictive decoding by deriving a base layer prediction signal 660 and combining same with the base layer residual signal 480. As just mentioned, this is merely optional.

As far as the reconstruction of the enhancement layer signal is concerned, the resolution or quality refinement may be performed as denoted above with respect to A).

As far as the spatial prediction of the portion of the enhancement layer signal is concerned, this spatial prediction may also be performed as exemplarily outlined in A) with respect to the difference signal. A similar note is valid as far as the combination and the predictive reconstruction is concerned.

However, it should be mentioned that the base layer residual signal 480 in aspect B is not restricted to equal the explicitly signaled version of the base layer residual signal 480. Rather, it may be possible that the scalable video decoder subtracts any reconstructed base layer signal version 200 with the base layer prediction signal 660, thereby obtaining a base layer residual signal 480 which may deviate from the explicitly signaled one by deviations stemming from filter functions such as of filters 120 or 140. The latter statement is also valid for other aspects where the base layer residual signal is involved in inter-layer prediction.

C1) Scalable video decoder configured to reconstruct (80) a base layer signal (200*a*. 200*b*; 200*c*) from a coded data stream (6), reconstruct (60) an enhancement layer signal (360) comprising subjecting (220) the reconstructed base layer signal (200) to a resolution or quality refinement to obtain a inter-layer prediction signal (380), spatially or temporally predicting (260) a portion of an enhancement layer signal (360), currently to be reconstructed, from an already reconstructed portion (400*a,b* in case of "spatially"; 400*a,b,c* in case of "temporally") of the enhancement layer signal (360) to obtain an enhancement layer internal prediction signal;

forming (260), at the portion currently to be reconstructed, a weighted average of the inter-layer prediction signal and the enhancement layer internal prediction signal (380) to obtain an enhancement layer prediction signal (420) such that the weights at which the inter-layer prediction signal and the enhancement layer internal prediction signal (380) contribute to the enhancement layer prediction signal (420) vary over different spatial frequency components; and predictively reconstructing (320, 340) the enhancement layer signal (360) using the enhancement layer prediction signal (420).

C2) Wherein the formation (260) of the weighted average comprises, at the portion currently to be reconstructed, filtering (260) the inter-layer prediction signal (380) with a low-pass filter and filtering (260) the enhancement layer internal prediction signal with a high-pass filter to obtain filtered signals, and adding-up the obtained filtered signals.

C3) Wherein the formation (260) of the weighted average comprises, at the portion currently to be reconstructed, transforming (260) the inter-layer prediction signal and the enhancement layer internal prediction signal so as to obtain transform coefficients; and superimposing (260) the obtained transform coefficients with using different weighting factors for different spatial frequency components to obtain superimposed transform coefficients; and inverse transforming the superimposed transform coefficients to obtain the enhancement layer prediction signal.

C4) Wherein the predictive reconstruction (320, 340) of the enhancement layer signal using the enhancement layer prediction signal (420) comprises extracting (320) transform coefficient levels for the enhancement layer signal from a coded data stream (6), performing (340) a sum of the transform coefficient levels and the superimposed transform coefficients so as to obtain a transformed version of the enhancement layer signal and subjecting the transformed version of the enhancement layer signal to an inverse transform so as to obtain the enhancement layer signal (360) (i.e. the inverse transform $T^{-1}$ in the figure would be placed downstream the adder 340, at least for that coding mode).

As far as the reconstruction of the base layer signal is concerned, reference is made to the above descriptions, such as with respect to the figure in general and with respect to aspects A) and B).

The same applies to the resolution or quality refinement mentioned in C, as well as the spatial prediction.

The temporal prediction mentioned in C may involve the prediction provider 160 deriving motion prediction parameters from the coded data stream 6 and substream 6*a*, respectively. The motion parameters may comprise: a motion vector, a reference frame index, or they may comprise a combination of a motion subdivision information and a motion vector per sub-block of the currently reconstructed portion.

As described before, the formation of the weighted average may end up in the spatial domain or the transform domain and accordingly, the adding at adder 340 may be performed in the spatial or transform domain. In the latter case, the inverse transformer 580 would apply the inverse transform onto the weighted average.

D1) Scalable video decoder configured to reconstruct (80) a base layer signal (200*a,b*, 200*c*) from a coded data stream (6), reconstruct (60) an enhancement layer signal (380) comprising subjecting (220) the reconstructed base layer signal to a resolution or quality refinement to obtain a inter-layer prediction signal (380), predictively reconstructing (320, 340) the enhancement layer signal (360) using the inter-layer prediction signal (380), wherein the reconstruction (60) of the enhancement layer signal is performed such that the inter-layer prediction signal (380) evolves, controlled via side-information in the coded bit-stream 360), from a different one of none (200*a*), one or all (200*b,c*) of a deblocking and an in-loop filtering (140) for different portions of a video scalably represented by the base layer signal and enhancement layer signal, respectively.

As far as the reconstruction of the base layer signal is concerned, reference is made to the above descriptions, such as with respect to the figure in general and with respect to aspects A) and B). The same applies to the resolution or quality refinement.

The predictive reconstruction mentioned in D may involve the prediction provider 160, as described above, and may involve spatially or temporally predicting (260) a portion of an enhancement layer signal (360), currently to be reconstructed, from an already reconstructed portion of the enhancement layer signal (380) to obtain an enhancement layer internal prediction signal;

combining (260) the inter-layer prediction signal (380) and the enhancement layer internal prediction signal to obtain the enhancement layer prediction signal (420).

The fact that the inter-layer prediction signal (380) evolves, controlled via side-information in the coded bit-stream (360), from a different one of none (200a), one or all (200b,c) of a deblocking and an in-loop filtering (140) for different portions of the video means the following:

Naturally, the base layer substream 6a itself may (optionally) signal the usage of different measures to result in the final base layer signal 600 such as bypassing all filters 120, 140, the use of merely deblocking or the use of merely in-loop filtering or the use of both deblocking and in-loop filtering. Even the filter transfer functions may be signaled/varied by side information in 6a. The granularity defining the different portions at which these variations are done may be defined by the afore-mentioned coding units, prediction blocks or any other granularity. The scalable video decoder (the coding stage 80) thus applies these variations if merely the base layer signal is to be reconstructed. However, independent therefrom, substream 6b comprises side-information, which signals a new (i.e. independent from the just-mentioned side-information in base layer signal 6a) variation of which combination of filtering is used to obtain the base layer signal which, then, is used in the predictive reconstruction of the enhancement signal: bypassing all filters 120, 140, the use of merely deblocking or the use of merely in-loop filtering or the use of both deblocking and in-loop filtering. Even the filter transfer functions may be signaled/varied by side information in 6b. The granularity defining the different portions at which these variations are done may be defined by the afore-mentioned coding units, prediction blocks or any other granularity and may differ from the granularity at which this signaling is used in the base layer signal 6a.

E1) Scalable video decoder configured to reconstruct (80) a base layer signal (200a,b,c) from a coded data stream (6);

reconstruct (60) an enhancement layer signal (360) comprising subjecting (220) the reconstructed base layer signal to a resolution or quality refinement to obtain a inter-layer prediction signal (380), predictively reconstructing (320, 340) the enhancement layer signal (60) using the inter-layer prediction signal (380), wherein the reconstruction (60) of the enhancement layer signal (360) is performed such that the inter-layer prediction signal evolves, controlled via side-information in the coded bit-stream (6) or signal-dependent, from different filter transfer functions for an upsampling interpolation filter (220) for different portions of a video scalably represented by the base layer signal and enhancement layer signal, respectively.

As far as the reconstruction of the base layer signal is concerned, reference is made to the above descriptions, such as with respect to the figure in general and with respect to aspects A) and B). The same applies to the resolution or quality refinement.

The predictive reconstruction mentioned may involve the prediction provider 160, as described above, and may involve spatially or temporally predicting (260) a portion of an enhancement layer signal (360), currently to be reconstructed, from an already reconstructed portion of the enhancement layer signal (360) to obtain an enhancement layer internal prediction signal;

combining (260) the inter-layer prediction signal (380) and the enhancement layer internal prediction signal to obtain an enhancement layer prediction signal (420).

The fact that the inter-layer prediction signal evolves, controlled via side-information in the coded bit-stream (6) or signal-dependent, from different filter transfer functions for an upsampling interpolation filter (220) for different portions of the video means the following:

Naturally, the base layer substream 6a itself may (optionally) signal the usage of different measures to result in the final base layer signal 600 such as bypassing all filters 120, 140, the use of merely deblocking or the use of merely in-loop filtering or the use of both deblocking and in-loop filtering. Even the filter transfer functions may be signaled/varied by side information in 6a. The granularity defining the different portions at which these variations are done may be defined by the aforementioned coding units, prediction blocks or any other granularity. The scalable video decoder (the coding stage 80) thus applies these variations if merely the base layer signal is to be reconstructed. However, independent therefrom, substream 6b may comprise side-information, which signal additionally (i.e. independent from the just-mentioned side-information in base layer signal 6a) a variation of the filter transfer function used in refiner 220 to obtain refined signal 380. The granularity defining the different portions at which these variations are done may be defined by the afore-mentioned coding units, prediction blocks or any other granularity and may differ from the mentioned granularity of the base layer signal 6a.

As described above, the variation to be used may be inferred signal-dependent, with or without using additional side information, from the base-layer signal, base layer residual signal or the coding parameters in substream 6a.

F1) Scalable video decoder configured to decode (100) a base layer residual signal (480) from a coded data stream, reconstruct (60) an enhancement layer signal (360) by subjecting (220) the reconstructed base layer residual signal (480) to a resolution or quality refinement to obtain a inter-layer residual prediction signal (380) and predictively reconstructing (320,340, and, optionally, 260) the enhancement signal (360) using the inter-layer residual prediction signal (380), wherein the reconstruction (60) of the enhancement layer signal (360) is performed such that the inter-layer residual prediction signal evolves, controlled via side-information in the coded bit-stream or signal-dependent, from different filter transfer functions for different portions of a video scalably represented by the base layer signal and enhancement layer signal, respectively.

As far as the reconstruction of the base layer residual signal is concerned, reference is made to the above descriptions, such as with respect to the figure in general and with respect to aspect B). The same applies to the resolution or quality refinement.

The predictive reconstruction mentioned may involve the prediction provider 160, as described above, and may involve spatially or temporally predicting (260) a portion of an enhancement layer signal (360), currently to be reconstructed, from an already reconstructed portion of the enhancement layer signal (360) to obtain an enhancement layer internal prediction signal;

decoding (320) an enhancement residual signal from the coded data stream;

combining (involving also 340 and 260) the enhancement layer internal prediction signal, the inter-layer residual prediction signal (380) and the enhancement layer residual signal to obtain the enhancement layer signal (360).

The fact that the inter-layer residual prediction signal evolves, controlled via side-information in the coded bitstream, from different filter transfer functions for different portions of the video means the following:

Naturally, the base layer substream 6a itself may (optionally) signal the usage of different measures to result in the final base layer signal 600 such as bypassing all filters 120, 140. See above descriptions of D) and E). However, independent therefrom, substream 6b may comprise side-information, which signal additionally (i.e. independent from the just-mentioned side-information in base layer signal 6a) a variation of the filter transfer function used in refiner 220 to obtain refined residual signal 380. The granularity defining the different portions at which these variations are done may be defined by the afore-mentioned coding units, prediction blocks or any other granularity and may differ from the mentioned granularity of the base layer signal 6a.

As described above, the variation to be used may be inferred signal-dependent, with or without using additional side information, from the base-layer signal, base layer residual signal or the coding parameters in substream 6a.

G1) Scalable video decoder configured to decode (100) a base layer residual signal (480) of a base layer signal (200) from a coded data stream (6), reconstruct (60) an enhancement layer signal (360) by subjecting (220) the reconstructed base layer residual signal (480) to a resolution or quality refinement to obtain a inter-layer residual prediction signal (380) and predictively reconstructing (320,340, and, optionally, 260) the enhancement layer signal (360) using the inter-layer residual prediction signal (480), wherein the reconstruction (60) of the enhancement layer signal (360) comprises identifying (260) blocks of the base layer residual signal (480) being all zero and replacing the identified blocks with a replacement signal derived from a portion of the base layer signal (200).

As far as the decoding of the base layer residual signal is concerned, reference is made to the above descriptions, such as with respect to the figure in general and with respect to aspect B). The same applies to the resolution or quality refinement.

The predictive reconstruction mentioned may involve the prediction provider 160, as described above, and may involve spatially or temporally predicting (260) a portion of an enhancement layer signal (360), currently to be reconstructed, from an already reconstructed portion of the enhancement layer signal (360) to obtain an enhancement layer internal prediction signal;

decoding (320) an enhancement residual signal from the coded data stream;

combining (involving also 340 and 260) the enhancement layer internal prediction signal, the inter-layer residual prediction signal (380) and the enhancement layer residual signal to obtain the enhancement layer signal (360).

Advantageously, the identification involves the provider 260 checking a syntax element in the base layer stream (6a) indicating, at a granularity of transform blocks, for example, which are, for example, a further subdivision of the afore-mentioned coding units, as to whether the respective transform block is all zero or not.

The portion of the base layer signal used for replacement may, as described above, for example, be a high-pass filtered version of the base layer signal 200a,b,c.

H1) Scalable video decoder configured to reconstruct (80) a base layer signal (200a,b,c) from a coded data stream (6);

reconstruct (60) an enhancement layer signal comprising subjecting (220) the reconstructed base layer signal (200) to a resolution or quality refinement to obtain a inter-layer prediction signal (380), spatially predicting (260) a portion of an enhancement layer signal (360), currently to be reconstructed, from an already reconstructed portion of the enhancement layer signal (360) to obtain an enhancement layer prediction signal (420);

predictively reconstructing (340) the enhancement layer signal (360) using the enhancement layer prediction signal (420), wherein the spatially predicting (260) comprises replacing a non-available portion within an predetermined neighborhood of the portion currently to be reconstructed, with a co-located portion, co-located to the non-available portion, of the inter-layer prediction signal (380) and performing the spatial prediction also dependent on the co-located portion of the inter-layer prediction signal (380).

As far as the reconstruction of the base layer signal is concerned, reference is made to the above descriptions, such as with respect to the figure in general and with respect to aspects A) and B). The same applies to the resolution or quality refinement, as well as the spatial prediction and the predictive reconstruction which were also described above.

The non-availability may result from the following facts: imagine that the predetermined neighborhood encompasses neighboring samples above the top edge of the portion/block currently to be reconstructed as well as samples extending further to the right thereof, and samples to the left of the left edge of the current block/portion currently to be reconstructed as well as samples extending further downwards thereof. Further, imagine that the spatial prediction is applied to blocks/portions being the leafs of a multi-tree based subdivision and that these blocks are traversed in the predictive reconstruction process in a depth-first-zig-zag-traversal order. Then, some blocks have all neighboring samples in question available, i.e. they are already reconstructed. Some blocks, however, lack some of these samples, i.e. they are not completely reconstructed. The missing samples are then replaced as described. Another fact potentially necessitating replacement is the position of slice borders in internal to any frame. The replacement itself is done by copying the co-located samples of the inter-layer prediction signal (380) to the missing samples. Then, the spatial prediction is done using the complete (completed) predetermined neighborhood, including samples copied from the inter-layer prediction signal (380) and samples from the reconstructed enhancement layer signal.

I1) Scalable video decoder configured to reconstruct (60) an enhancement layer signal (360) by using, for different blocks of a frame, different ones of an inter-layer prediction mode, a temporal inter prediction mode and a spatial intra-prediction mode, wherein the scalable video decoder is configured to, in reconstructing (60) an enhancement layer signal (360), reconstruct (60) the blocks by traversing the blocks in a first scan and then in a second scan, and, in the first scan, skip blocks to be reconstructed using the spatial intra-prediction mode and reconstruct blocks to be reconstructed using one of the inter-layer prediction mode and the inter prediction mode, and, in the second scan, reconstruct the blocks to be reconstructed using the spatial intra-prediction mode.

As to "spatial intra prediction mode" and "temporal inter-prediction mode" reference is made to the above discussion for possible implementations. As to "inter-layer prediction mode" any of the examples for such modes may be used as described so far or below. Due to the increased chance of having the complete outline of the spatial intra-prediction mode blocks of the enhancement layer signal surrounded by already reconstructed samples, the template of neighboring samples from which the inner of the currently predicted spatial intra-prediction mode block is to be filled, may be increased to completely surround the outline.

J1) Scalable video decoder configured to
reconstruct (80) a base layer signal (200a,b,c) from a coded data stream (6),
reconstruct (60) an enhancement layer signal (360) comprising
subjecting (220) the reconstructed base layer signal (200a,b,c) to a resolution or quality refinement to obtain a inter-layer prediction signal (380) for a reference frame and a current frame,
forming (260) a difference signal between the inter-layer prediction signal (380) for a reference frame and the already reconstructed enhancement layer signal (360) for the reference frame;
subjecting (260) the difference signal to motion compensated prediction so as to obtain a difference signal prediction for the current frame;
combining (260) the inter-layer prediction signal (380) for the current frame and the difference signal prediction for the current frame so as to obtain an enhancement layer prediction signal (420); and
predictively reconstructing (320, 340, 300, 280) the enhancement layer signal (360) using the enhancement layer prediction signal (420).

J2) Wherein in forming the difference signal for the reference frame, the used reconstructed enhancement layer signal is the enhancement layer reconstruction before deblocking, after deblocking but before optional loop filtering, or after deblocking and optional loop filtering.

J3) Wherein the selection of the enhancement layer signal that is used for forming the difference signal of the reference frame is signaled inside the bitstream at a sequence, picture, or block level.

The motion compensated prediction may involve the prediction provider 260 deriving motion prediction parameters from the coded data stream 6 and substream 6b, respectively, for a currently reconstructed block of the enhancement signal, the derivation involving the decoder 320. The motion vector(s) is/are applied to the location of the portion of the enhancement signal currently to be reconstructed, and the respectively displaced portion(s) is/are copied (with or without fractional-sample interpolation) from the difference signal. The thus copied portion is, in the combination, for example, pixel-wise added with the portion of the inter-layer prediction signal (380), co-located to the currently to be reconstructed portion.

K1) Scalable video decoder configured to
decode base layer motion parameters (520) from a coded data stream (6),
reconstruct (60) an enhancement layer signal (260) comprising
gathering (260), for a block of a frame of the enhancement layer signal (360), a set of motion parameter candidates from neighboring already reconstructed blocks of the frame;
gathering (260) base layer motion parameters of a block of the base layer signal, collocated to the block of the frame of the enhancement layer signal (360), from the base layer motion parameters (520);
adding (260) the base layer motion parameters or a scaled version of the base layer motion parameters to the set of motion parameter candidates so as to obtain an extended motion parameter candidate set of motion parameter candidates,
selecting (260) at least one of the motion parameter candidates of the extended motion parameter candidate set,
predicting (260), by motion compensated prediction, the enhancement layer signal using the selected one of the motion parameter candidates of the extended motion parameter candidate set.

K2) Wherein the scalable video decoder is configured to scale the base layer motion parameters according to a spatial resolution ratio between the base layer signal and the enhancement layer signal to obtain the scaled version of the base layer motion parameters.

K3) Wherein the scalable video decoder is configured to check as to whether the base layer motion parameters are coded in the coded data stream using merging or not, and, if the base layer motion parameters are coded in the coded data stream using merging, suppress the adding.

The motion parameters mentioned in this aspect may pertain to the motion vectors only (motion vector prediction), or to the complete set of motion parameters including the number of motion hypotheses per block, reference indices, partitioning information (merging).

Accordingly, the "scaled version" may stem from a scaling of the motion parameters used in the base layer signal in accordance with the spatial resolution ratio between base and enhancement layer signal in case of spatial scalability.

The decoding of the base layer motion parameters 520 from the coded data stream, may involve the motion vector prediction or merging also.

The incorporation of the motion parameters used at a co-located portion of the base layer signal into the set of merging/motion vector candidates enables a very effective indexing among the intra-layer candidates and the inter-layer candidate.

The selection may involve explicit signaling of an index into the extended set/list of motion parameter candidates in the enhancement layer signal such as for a prediction block, a coding unit or the like. Alternatively, the selection index may be inferred from other information of the enhancement layer signal 6b or inter-layer information.

L1) Scalable video decoder configured to
decode (100) base layer motion parameters (520) from a coded data stream (6),
reconstruct (60) an enhancement layer signal (360) comprising
ordering (240) a motion parameter candidate list for the enhancement layer signal depending on the base layer motion parameters;
selecting (240), controlled via an explicitly signaled index syntax element in the coded data stream (6), enhancement layer motion parameters from the ordered motion parameter candidate list for the enhancement layer signal, and predicting (260), by motion compensated prediction, the enhancement layer signal using the determined motion parameter.

As to the motion parameters mentioned in this aspect, the same as said above with respect to aspect K applies.

The decoding of the base layer motion parameters 520 from the coded data stream, same may (optionally) involve the motion vector prediction or merging also.

The ordering may be done in accordance with a measure which measures the difference between the respective enhancement layer motion parameter candidates and the base layer motion parameters of the base layer signal, relating to a block of the base layer signal co-located to a current block of the enhancement layer signal. That is, for a current block of the enhancement layer signal, the list of enhancement layer motion parameter candidates may be determined first. Then, the ordering is performed is just-described. Thereinafter, the selection is performed by explicit signaling.

The ordering may also be done in accordance with a measure which measures the difference between the base layer motion parameters of the base layer signal, relating to a block of the base layer signal co-located to a current block of the enhancement layer signal, and the base layer motion parameters of spatially and/or temporally neighboring blocks in the base layer. The determined ordering in the base layer is then transferred to the enhancement layer, so that the enhancement layer motion parameter candidates are ordered in a way that the ordering is the same as the determined ordering for the corresponding base layer candidates, where a base layer motion parameter candidate is said to correspond to an enhancement layer motion parameter candidate when the associated base layer block is spatially/temporally co-located with the enhancement layer block that is associated with the considered enhancement layer motion parameters candidate. Based on the ordering, the selection is performed by explicit signaling.

M1) Scalable video decoder configured to decode (100) base layer motion parameters (520) from a coded data stream (6) using an index into a motion parameter candidate list for a base layer signal (200), reconstruct (60) an enhancement layer signal (360) comprising determining (240) an index into a motion parameter candidate list for the enhancement layer signal depending on the index into the motion parameter candidate list for the base layer signal;

determining (240) an enhancement layer motion parameter using the index into the motion parameter candidate list for the enhancement layer signal, and predicting (260), by motion compensated prediction, the enhancement layer signal using the determined motion parameter.

As to the motion parameters mentioned in this aspect, the same as said above with respect to aspect K applies.

The decoding of the base layer motion parameters 520 may involve, for blocks of the base layer signal:

Inspecting a flag signaling as to whether the motion parameter for the current block is signaled in the base layer substream 6a by way of merging or without merging (predictively or independently coded), If coded using merging or coded predictively, Determining a list of base layer motion parameters; for example, the motion parameters having been used/selected for neighboring blocks of the base layer signal are used for the determination;

an index into the respective list is obtained from the base layer signal 6a and used to select one of the base layer motion parameters in the list;

the index for the enhancement layer is determined in a way that the enhancement layer block co-located with the base layer block associated with the indexed base layer candidate is selected.

For a current block of the enhancement layer signal, a list of enhancement layer motion parameters is determined; for example, the motion parameters having been used/selected for neighboring blocks of the enhancement layer signal are used for the determination.

The selection of the motion parameter index in the enhancement layer may be done in accordance with a measure which measures the difference between the respective enhancement layer motion parameters and the base layer motion parameter of (i.e. having been used or selected in) the base layer signal, relating to a block of the base layer signal co-located to the current block of the enhancement layer signal.

The selection of the motion parameter index in the enhancement layer may also be done in accordance with a measure which measures the difference between the base layer motion parameters of the base layer signal, relating to a block of the base layer signal co-located to a current block of the enhancement layer signal, and the base layer motion parameters of spatially and/or temporally neighboring blocks in the base layer. The selection for the base layer is then transferred to the enhancement layer, so that the enhancement layer motion parameter candidate that corresponds to the selected base layer candidate is chosen, where a base layer motion parameter candidate is said to correspond to an enhancement layer motion parameter candidate when the associated base layer block is spatially/temporally co-located with the enhancement layer block that is associated with the considered enhancement layer motion parameters candidate.

N1) Scalable video decoder configured to decode (100) a base layer residual signal (480) of a base layer signal from a coded data stream (6), reconstruct (60) an enhancement layer signal (360) comprising determining (240) a gradient of, or information on a spectral decomposition of, the base layer residual signal (480) or the base layer signal to obtain a scan predictor (520);

decode (320) transform coefficients of an enhancement layer residual signal (540) from the coded data stream (6) using a scan pattern which depends on the scan predictor (520).

That is, the decoding of the transform coefficients may involve a selection of the scan pattern out of a set of possible scan patterns all of which completely cover the transform block. Advantageously, the selection is made such that the scan pattern selected traverses the significant spectral components of the base layer residual signal earlier than the other scan patterns of the set of possible scan patterns.

R1) Video decoder configured to decode (320) transform coefficients of transform block of a residual signal (540 or output of 100) from a coded data stream (6) by selecting a scan pattern out of a set of possible scan patterns all of which completely cover the transform block, the selection being dependent on an explicit signaling in the coded data stream.

R2) Wherein decoding (320) uses a context model for syntax elements related to transform coefficients which depends on (via 520 and 240) the selection of the scan pattern.

R2a) Wherein the syntax elements related to transform coefficients include a syntax element that indicates whether a transform coefficient is equal or unequal to zero for a particular scan position.

R2b) Wherein the syntax elements related to transform coefficients include a syntax element that indicates the position of the last non-zero transform coefficient in the given scan order.

R2c) Wherein the syntax elements related to transform coefficients include a syntax element that indicates whether a subblock of the transform block contains transform coefficients unequal to zero.

R3) Wherein the explicit signaling involves entropy decoding (320) an index into the set of possible scan patterns using a context model which depends on a gradient of, or information on a spectral decomposition of, the base layer residual signal (480) or the base layer signal.

R4) Wherein for decoding (320) the transform coefficient levels the transform block is subdivided into subblocks, a syntax element is transmitted that signals whether a subblock contains non-zero-transform coefficients, and the size or form of the subblocks or the partitioning of the transform block into subblocks is dependent on the selected scan pattern.

S1) Scalable video decoder configured to decode (100) transform coefficients of transform block of a base layer residual signal from a coded data stream (6) including decoding a first syntax element from the coded data stream which indicates a position of a last significant transform coefficient of the transform block of the base layer residual signal; and decode (100) transform coefficients of transform block of an enhancement layer residual signal from the coded data stream (6) including a second decoding syntax element from the coded data stream and computing a position of a last significant transform coefficient of the transform block of the enhancement layer residual signal based on the first syntax element and the second syntax element.

O1) Scalable video decoder configured to decode (100) a base layer residual signal (480) of a base layer signal from a coded data stream (6), reconstruct (60) an enhancement layer signal (360) comprising decoding (320) a syntax element relating to a transform coefficient block of the enhancement layer residual signal (540) from the coded data stream (6) using a context model or a predictor which depends on (via 520 and 240) the base layer residual signal (480) or the base layer signal.

For example, a template is used to determine a context for coding a certain transform coefficient at a currently visited transform coefficient position, and the template also involves positions in one or more transform blocks in the base layer residual signal which are correspond to the certain transform coefficient position in terms of location (at granularity of the transform block sizes in base and enhancement layer) and spectral frequency.

Or, the gradient of, or information on a spectral decomposition of, the base layer residual signal (480) or the base layer signal is used to determine the context model.

P1) Scalable video decoder configured to decode (100) a base layer residual signal (480) of a base layer signal from a coded data stream (6), reconstruct (60) an enhancement layer signal (360) comprising predict (260) portions of an enhancement layer signal (360) from already reconstructed portions of the enhancement layer signal (360), the base layer residual signal and the base layer signal in accordance with prediction modes which differ for the portions of the enhancement layer signal (360);

decoding (320) a syntax element relating to a transform coefficient block of an enhancement layer residual signal (540) from the coded data stream (6) using a context model which depends on (via 520 and 240) as to whether the portion of the enhancement layer signal (360) which the transform coefficient block belongs to, involves inter-layer prediction based on any of the base layer residual signal and the base layer signal, or not; and predictively reconstructing (340) the enhancement layer signal (360) using the enhancement layer prediction signal (420).

Q1) Scalable video decoder configured to reconstruct (80) a base layer signal (200a, b, c) from a coded data stream (6), reconstruct (60) an enhancement layer signal (360), comprising subjecting (220) the reconstructed base layer signal (200) to a resolution or quality refinement to obtain a inter-layer prediction signal (380), experimentally performing (260), for each coding parameter candidate of a set of coding parameter candidates, a reconstruction or partial reconstruction of the enhancement layer signal (360) using the respective coding parameter candidate to obtain a respective experimental reconstruction or partial reconstruction result;

determining (260), for each coding parameter candidate, a measure of a difference between the inter-layer prediction signal (380) and the respective experimental reconstruction or partial reconstruction result;

selecting (260) among the set of coding parameter candidates, depending on the measure for each coding parameter candidate; and eventually reconstructing (320, 340, 260) the enhancement layer signal (360) using the selected coding parameter candidate.

Q2) Wherein the coding parameters determined for the enhancement layer relate to intra prediction modes.

Q3) Wherein the coding parameters determined for the enhancement layer relate to motion parameters such as reference pictures or motion vectors.

Q4) Wherein the coding parameters determined for the enhancement layer relate to merge candidates.

Z1) Scalable video decoder configured to reconstruct (80) a base layer signal (200a, b, c) from a coded data stream (6), reconstruct (60) an enhancement layer signal (360), comprising experimentally performing (260), for each coding parameter candidate of a set of coding parameter candidates, a reconstruction or partial reconstruction of the base layer signal (360) using the respective coding parameter candidate to obtain a respective experimental reconstruction or partial reconstruction result;

determining (260), for each coding parameter candidate, a measure of a difference between the actual decoded base layer reconstruction and the respective experimental reconstruction or partial reconstruction result;

selecting (260) among the set of coding parameter candidates, depending on the measure for each coding parameter candidate;

transferring the selected coding parameter candidate to the enhancement layer, where the transferring may include a scaling according to the resolution difference; and eventually reconstructing (320, 340, 260) the enhancement layer signal (360) using the transferred coding parameter candidate.

T1) Scalable video decoder configured to
predictively reconstruct (100, 180, 160) a base layer signal by sub-dividing frames into intra-blocks and inter-blocks with using spatial intra prediction for intra-blocks and temporal inter-prediction for inter blocks,
predictively reconstruct (320, 340, 260) an enhancement layer signal (360) comprising
locally transferring the block sub-division of blocks of the base layer signal, co-located to a portion of an enhancement layer signal (360), currently to be reconstructed, onto the portion of the enhancement layer signal (360), currently to be reconstructed, so as to obtain sub-portions of the portion of the enhancement layer signal (360), currently to be reconstructed, and associating enhancement layer motion vectors to the sub-portions based on the base layer motion vectors;
predicting (260), by motion compensated prediction, the portion of the enhancement layer signal (360), currently to be reconstructed, from an already reconstructed portion of the enhancement layer signal (360) using the enhancement layer motion vectors associated with the sub-portions based on the base layer motion vector.

T2) Scalable video decoder configured to
predictively reconstruct (10, 18, 16) a base layer signal using base layer coding parameters spatially varying over the base layer signal;
reconstruct (32, 34, 26) an enhancement layer signal (36) in units of blocks comprising
selecting, for a predetermined block of the blocks, a subblock subdivision among a set of possible subblock subdivisions such that the selected subblock subdivision is the coarsest among the set of possible subblock subdivisions subdividing, when transferred onto a co-located portion of the base layer signal, the base layer signal such that within each subblock of the respective subblock subdivision the base layer coding parameters are sufficiently similar to each other;
predictively reconstruct the predetermined block using the selected subblock subdivision.

U1) Scalable video decoder configured to
predictively reconstruct (100, 180, 160) a base layer signal by sub-dividing frames of the base layer signal into intra-blocks and inter-blocks with using spatial intra prediction for intra-blocks and temporal inter-prediction for inter blocks, and setting prediction parameters associated with the spatial intra and temporal inter prediction, respectively, in units of blocks into which the intra- and inter-blocks are sub-divided;
predictively reconstruct (320, 340, 260) an enhancement layer signal (360) comprising
assigning, controlled via prediction mode syntax in the coded data stream, frames of the enhancement signal in coding units into which the frames of the enhancement signal are subdivided to a respective one of a set of prediction modes comprising a spatial intra prediction mode, a temporal inter-prediction mode, and an inter-layer prediction mode,
predictively reconstructing each coding unit using the respective prediction mode to which the respective coding unit has been assigned with
for coding units having any of the spatial intra prediction mode and the temporal inter-prediction mode assigned thereto,
further sub-dividing the coding units into prediction blocks and setting prediction parameters associated with the respective prediction mode to which the respective coding unit has been assigned in units of the prediction blocks; and
subjecting all prediction blocks to spatial intra prediction using the prediction parameters set, in case of the respective coding unit having the spatial intra prediction assigned thereto, and subjecting all prediction blocks to temporal inter prediction using the prediction parameters set, in case of the respective coding unit having the temporal inter prediction assigned thereto,
for each coding unit having the inter-layer prediction mode assigned thereto,
locally transferring the sub-division of the intra and inter-blocks of the base layer signal onto the respective coding unit such that coding units locally overlaying both intra and inter blocks, are sub-divided into at least one prediction block associated with the non-temporal mode and locally coinciding with the intra blocks, and at least one prediction block associated with the temporal inter prediction mode and locally coinciding with the inter blocks;
subjecting all prediction blocks of the respective coding unit, having the non-temporal prediction mode assigned thereto, to spatial intra prediction with using prediction parameters derived from the prediction parameters of the locally coinciding intra blocks, or
inter layer prediction by
subjecting (220) the base layer signal to a resolution or quality refinement to obtain a inter-layer prediction signal (380),
predicting (260) the prediction blocks of the respective coding unit, having the non-temporal prediction mode assigned thereto, using the inter-layer prediction signal (380);
and subjecting all prediction blocks of the respective coding unit, having the temporal inter prediction mode assigned thereto, to temporal inter prediction using the prediction parameters derived from the prediction parameters of the locally coinciding inter blocks.

V1) Scalable video decoder configured to
decode (100) a base layer residual signal (480) of a base layer signal (200) from a coded data stream (6),
reconstruct (60) an enhancement layer signal (360) comprising
decoding a transform coefficient block of transform coefficients representing an enhancement layer signal from the coded data stream, by
selecting a subblock subdivision among a set of possible subblock subdivisions on the basis of the base layer residual signal or the base layer signal,
traverse positions of the transform coefficients in units of subblocks into which the transform coefficient block is regularly subdivided in accordance with the selected subblock subdivision such that all positions within one subblock are traversed in an immediately consecutive manner with then proceeding to a next subblock in a subblock order defined among the subblocks,
for a currently visited subblock,
decoding from the data stream a syntax element indicating as to whether the current visited subblock has any significant transform coefficient or not;
if the syntax element indicates that the currently visited subblock does not have any significant transform coefficient, setting the transform coefficients within the currently visited subblock to zero,
if the syntax element indicates that the currently visited subblock has any significant transform coefficient, decoding from the data stream syntax elements indicating levels of the transform coefficients within the currently visited subblock.

W1) Scalable video decoder configured to

Reconstruct (80) a base layer signal (200) from a coded data stream (6), reconstruct (60) an enhancement layer signal (360) comprising spatially predicting a block of the enhancement signal by subject (220) the reconstructed base layer signal (200a, 200b, 200c) to a resolution or quality refinement to obtain a inter-layer prediction signal (380), registering (260) a first line of the inter-layer prediction signal (380), locally overlaying the block, with a second line of an already reconstructed portion of the enhancement layer signal, neighboring the block, wherein the first and second lines are both parallel to a line direction, thereby obtaining a shift value filling (260) a line of the block co-located to the first line, with content of the first line, shifted by the shift value.

The line direction may for example be horizontal or vertical, so that that prediction is done row by row or column by column, respectively.

X1) Scalable video decoder configured to

Reconstruct (80) a base layer signal (200) from a coded data stream (6) by block-wise prediction, a block-wise selection between a spatial intra prediction and a temporal inter-prediction mode, and using an intra prediction parameter for blocks of the base layer signal for which the spatial intra prediction mode has been selected, reconstruct (60) an enhancement layer signal (360) from the coded data stream (6) by block-wise prediction, a block-wise selection between a spatial intra prediction and a temporal inter-prediction mode, and using an intra prediction parameter for blocks of the enhancement layer signal for which the spatial intra prediction mode has been selected, comprising checking a neighboring block of the enhancement layer signal, neighboring a current block of the enhancement layer signal, as to whether same has been predicted using the spatial intra prediction mode;

if yes, appointing the intra prediction parameter of the neighboring block a probably advantageous intra prediction parameter for the current block, if not, appointing the intra prediction parameter of a block of the base layer signal, which is co-located to the current block, the probably advantageous intra prediction parameter for the current block, determine the intra prediction parameter for the current block based on a syntax element present in the coded data stream for the current block, and the probably advantageous intra prediction parameter.

Y1) Scalable video decoder configured to

Reconstruct (80) a base layer signal (200) from a coded data stream (6) by block-wise prediction, a block-wise selection between a spatial intra prediction and a temporal inter-prediction mode, and using an angular intra prediction parameter for a subset of the blocks of the base layer signal for which the spatial intra prediction mode has been selected, reconstruct (60) an enhancement layer signal (360) from the coded data stream (6) by block-wise prediction, a block-wise selection between a spatial intra prediction and a temporal inter-prediction mode, and using an angular intra prediction parameter for a subset of the blocks of the enhancement layer signal for which the spatial intra prediction mode has been selected, comprising checking a neighboring block of the enhancement layer signal, neighboring a current block of the enhancement layer signal, as to whether same has been predicted using the spatial intra prediction mode with an angular intra prediction parameter;

if yes, appointing the angular intra prediction parameter of the neighboring block a probably advantageous intra prediction parameter for the current block, if not but a block of the base layer signal, which is co-located to the current block, is coded with an angular intra prediction parameter, appointing the angular intra prediction parameter of a block of the base layer signal, which is co-located to the current block, the probably advantageous intra prediction parameter for the current block, determine the intra prediction parameter for the current block based on a syntax element present in the coded data stream for the current block, and the probably advantageous intra prediction parameter.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed:

1. A video decoder for decoding a video represented by a base layer signal and an enhancement layer signal, the video decoder comprising:
    a first decoding unit including a base layer decoder configured to reconstruct, using a processor, a base layer signal based on transform decoding of a base layer residual signal from a coded data stream; and
    a second decoding unit including an enhancement layer decoder configured to reconstruct, using the processor, an enhancement layer signal from the coded data stream at least by:
    determining an inter-layer prediction signal based on a scalability refinement of the reconstructed base layer signal, the scalability refinement including bit-depth refinement, the bit-depth refinement being based on tone-mapping from n bits to m bits with m>n, and
    predictively reconstructing the enhancement layer signal using the inter-layer prediction signal, wherein the first and second decoding units are configured to reconstruct the base layer and enhancement layer signals, respectively, based on one of the following:
        bypassing both deblocking filtering and in-loop filtering,
        bypassing one, and using the other, of the deblocking filtering and the in-loop filtering, and using both of the deblocking and the in-loop filtering;
    wherein the first and second decoding units are configured to bypass or use one or both of the deblocking filtering and the in-loop filtering based on: (i) first side information in the coded data stream signaling a combination of the deblocking filtering and the in-loop filtering used to obtain the base layer signal, and (ii) second side information in the coded data stream signaling a combination of the deblocking filtering and the in-loop filtering used to obtain a base layer signal which is used in the predictive reconstruction of the enhancement layer signal.

2. The video decoder of claim 1, wherein the first decoding unit is configured to reconstruct the base layer signal from the coded data stream based on block-based prediction coding.

3. The video decoder of claim 1 wherein the second decoding unit is configured to perform the sociability refinement by up-sampling the reconstructed base layer signal so as to achieve the resolution refinement.

4. The video decoder of claim 1, wherein the second decoding unit is configured to perform the predictive reconstruction by
    spatially or temporally predicting a portion of an enhancement layer signal, currently to be reconstructed, from an already reconstructed portion of the enhancement layer signal to acquire an enhancement layer internal prediction signal, and
    combining the inter-layer prediction signal and the enhancement layer internal prediction signal to acquire the enhancement layer prediction signal.

5. The video decoder of claim 4, wherein the second decoding unit is configured to perform the combining by forming, at a portion currently to be reconstructed, a weighted average of the inter-layer prediction signal and the enhancement layer internal prediction signal to acquire the enhancement layer prediction signal.

6. The video decoder of claim 5, wherein weights at which the inter-layer prediction signal and the enhancement layer internal prediction signal contribute to the enhancement layer prediction signal vary over different spatial frequency components.

7. The video decoder of claim 1, wherein the deblocking and/or in-loop filtering varies in transfer function according to side information in the coded data stream.

8. A non-transitory computer-readable medium for storing data associated with a video, comprising a data stream stored in the non-transitory computer-readable medium, the data stream comprising information related to an encoded video represented by a base layer signal and an enhancement layer signal, wherein the data stream is decoded using a plurality of operations including:
    reconstructing, using a processor, the base layer signal based on transform decoding of a base layer residual signal from the data stream; and
    reconstructing, using the processor, the enhancement layer signal from the data stream at least by:
    determining an inter-layer prediction signal based on a scalability refinement of the reconstructed base layer signal, the scalability refinement including bit-depth refinement, the bit-depth refinement being based on tone-mapping from n bits to m bits with m>n, and
    predictively reconstructing the enhancement layer signal using the inter-layer prediction signal, wherein the reconstructing of the base layer and enhancement layer signals, respectively, is based on one of the following:

bypassing both deblocking filtering and in-loop filtering, bypassing one, and using the other, of the deblocking filtering and the in-loop filtering, and using both of the deblocking and the in-loop filtering;

wherein the bypassing or using of one or both of the deblocking filtering and the in-loop filtering are based on: (i) first side information in the data stream signaling a combination of the deblocking filtering and the in-loop filtering used to obtain the base layer signal, and (ii) second side information in the data stream signaling a combination of the deblocking filtering and the in-loop filtering used to obtain a base layer signal which is used in the predictive reconstruction of the enhancement layer signal.

9. A video encoder for encoding a video, comprising:

a first encoding unit including a base layer encoder configured to, using a processor, determine a base layer residual signal for a base layer of the video, and encode into a data stream a base layer signal based on transform decoding of the base layer residual signal; and a second encoding unit including an enhancement layer encoder configured to encode, using the processor, an enhancement layer signal into the coded data stream at least by:

determining an inter-layer prediction signal based on a scalability refinement of the base layer signal, the scalability refinement including bit-depth refinement, the bit-depth refinement being based on tone-mapping from n bits to m bits with m>n, and predictively encoding the enhancement layer signal using the inter-layer prediction signal, wherein the first and second encoding units are configured to encode the base layer and enhancement layer signals, respectively, based on one of the following:

bypassing both deblocking filtering and in-loop filtering, bypassing one, and using the other, of the deblocking filtering and the in-loop filtering, and using both of the deblocking and the in-loop filtering;

wherein the first and second decoding units are configured to bypass or use one or both of the deblocking filtering and the in-loop filtering based on: (i) first side information in the coded data stream signaling a combination of the deblocking filtering and the in-loop filtering used to obtain the base layer signal, and (ii) second side information in the coded data stream signaling a combination of the deblocking filtering and the in-loop filtering used to obtain a base layer signal which is used in the predictive reconstruction of the enhancement layer signal.

10. The video encoder of claim 9, wherein the first encoding unit is configured to encode the base layer signal based on block-based prediction coding.

11. The video encoder of claim 9, wherein the second encoding unit is configured to perform the sea/ability refinement by up-sampling the reconstructed base layer signal so as to achieve the resolution refinement.

12. The video encoder of claim 9, wherein the second encoding unit is configured to perform the predictive encoding by spatially or temporally predicting a portion of an enhancement layer signal, currently to be encoded, from an already encoded portion of the enhancement layer signal to acquire an enhancement layer internal prediction signal, and combining the inter-layer prediction signal and the enhancement layer internal prediction signal to acquire the enhancement layer prediction signal.

13. The video encoder of claim 12, wherein the second encoding unit is configured to perform the combining by forming, at a portion currently to be encoded, a weighted average of the inter-layer prediction signal and the enhancement layer internal prediction signal to acquire the enhancement layer prediction signal.

* * * * *